United States Patent [19]

Hirato et al.

[11] Patent Number: 5,228,035
[45] Date of Patent: Jul. 13, 1993

[54] SYNCHRONIZING SYSTEM IN DIGITAL COMMUNICATION LINE

[75] Inventors: Akira Hirato; Yuji Kondo, both of Tokyo; Hideharu Omori, Saitama; Naoyuki Yamaguchi; Koichi Ichimura, both of Tokyo; Yoshihiro Kawata, Saitama, all of Japan

[73] Assignee: Iwatsu Electric Co., Ltd., Tokyo, Japan

[21] Appl. No.: 784,588

[22] Filed: Oct. 29, 1991

[30] Foreign Application Priority Data

Oct. 29, 1990 [JP] Japan ................................ 2-291409

[51] Int. Cl.$^5$ .............................................. H04J 3/06
[52] U.S. Cl. ........................................ 370/103; 370/58.3
[58] Field of Search ................... 370/58.1, 58.2, 58.3, 370/100.1, 103; 375/120

[56] References Cited

U.S. PATENT DOCUMENTS

| | | | |
|---|---|---|---|
| 3,869,579 | 3/1975 | Karl | 370/103 |
| 4,658,397 | 4/1987 | Kawamura et al. | 370/63 |
| 5,027,375 | 6/1991 | Ernst | 370/103 |

*Primary Examiner*—Douglas W. Olms
*Assistant Examiner*—Melvin Marcelo
*Attorney, Agent, or Firm*—Oblon, Spivak, McClelland, Maier & Neustadt

[57] ABSTRACT

A synchronizing system in a digital communication line comprises a plurality of local switches for storing at least one digital line and monitoring a first piece of busy information when a clock source is already present, the local switches, if a first new clock source occurs while the first busy information is indicating no busy state, being capable of transmitting a master right request to turn the busy information to the busy state and to specify the first new clock source as a master clock and, on receiving a master right specification with respect to the master right request, being capable of outputting the first new clock source as the master clock; and a master switch connected to the plurality local switches in a star manner, by a link transmission line for transmitting control information including the master clock, master right request and master right specification, for monitoring a second piece of busy information indicating a busy state, the master switch, if a second new clock source occurs while the second busy information is indicating no busy state, being capable of transmitting the second new clock source as a master clock and, if the second new clock source competes with the first new clock source in the local switches that has output the master right request, being capable of arbitrating the competition between the first and second new clock sources and selecting one of the clock sources to turn the busy information to the busy state and, if the first clock source is selected, outputting the master right specification to the local switches that have transmitted the master right request.

9 Claims, 123 Drawing Sheets

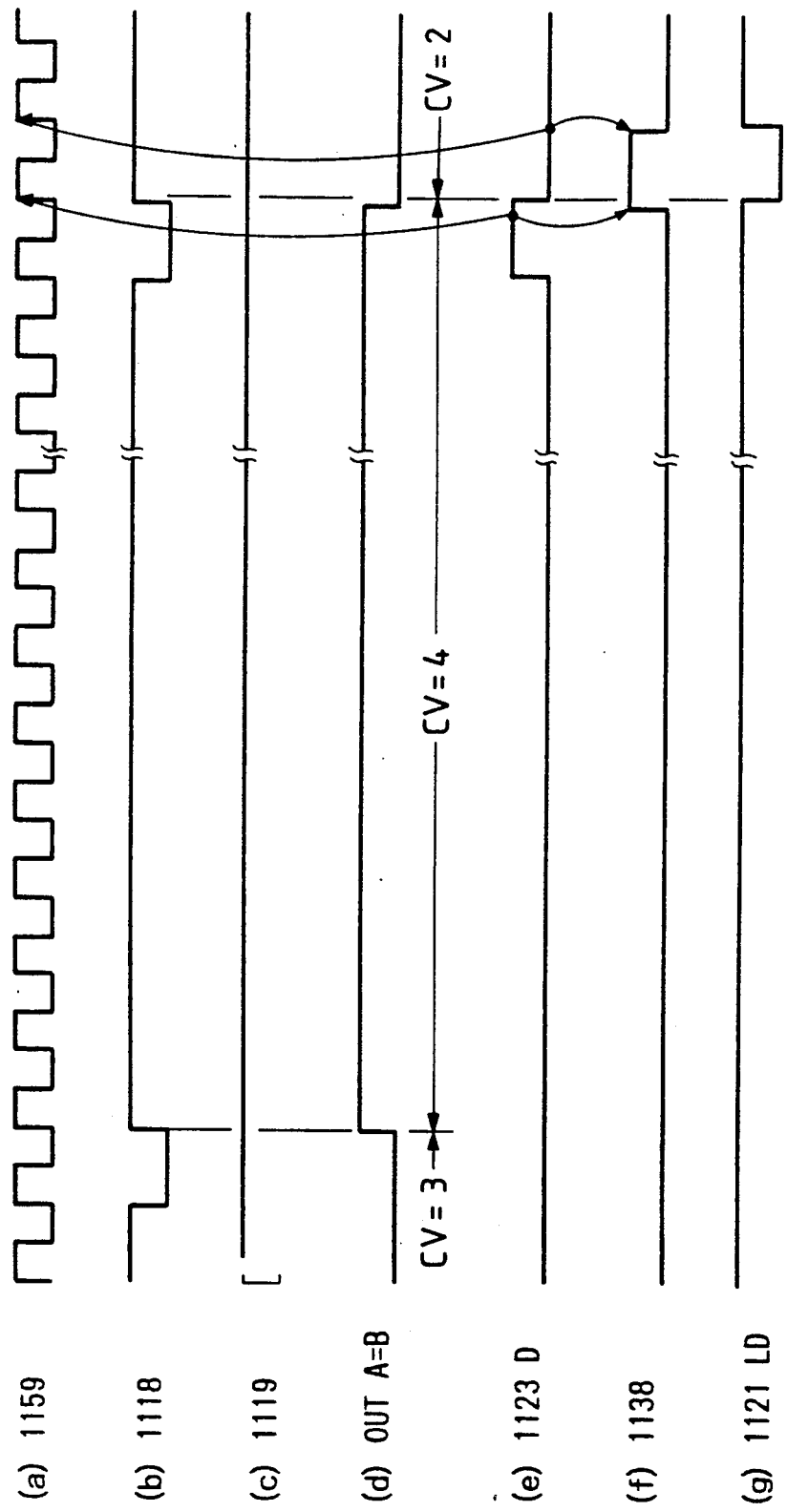

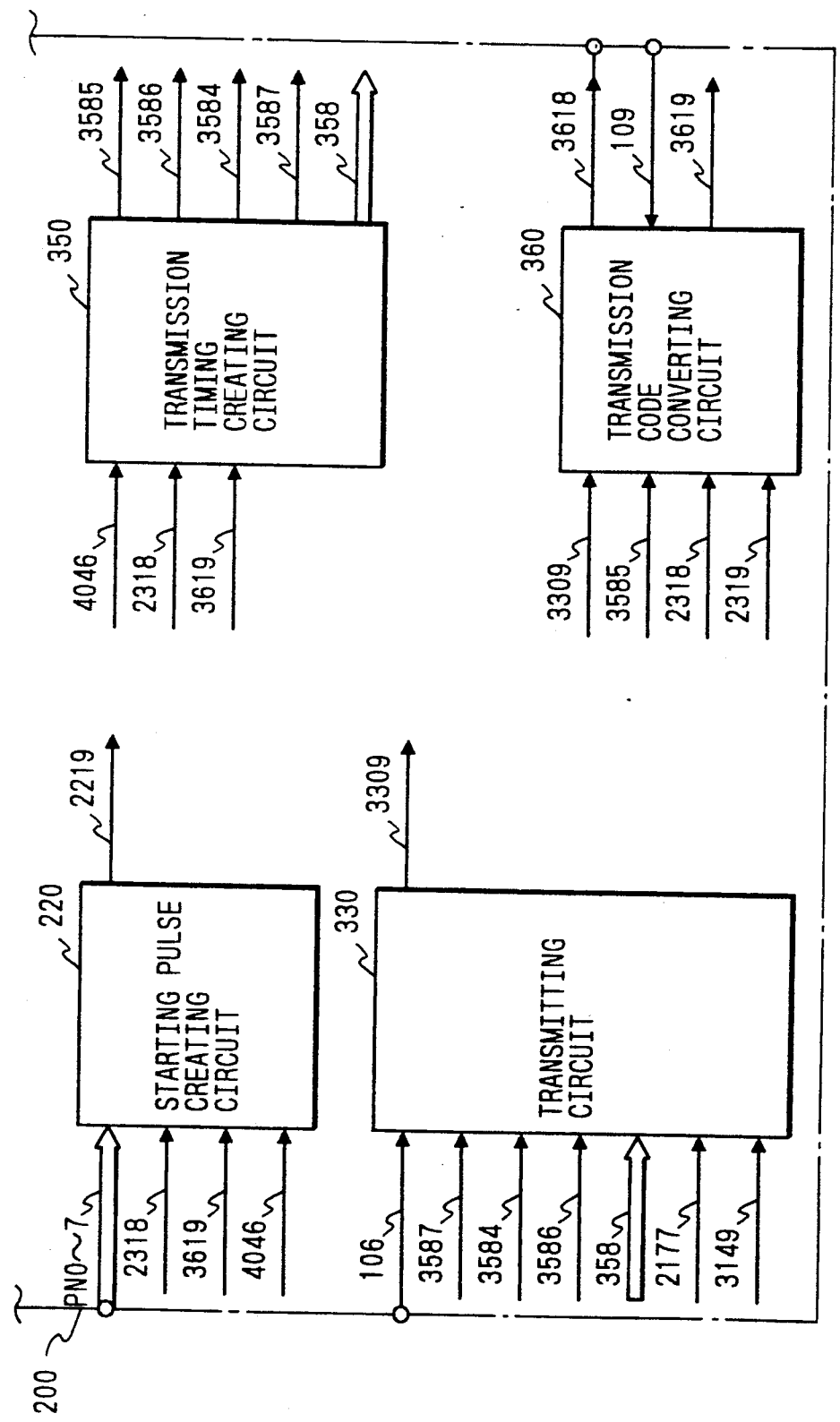

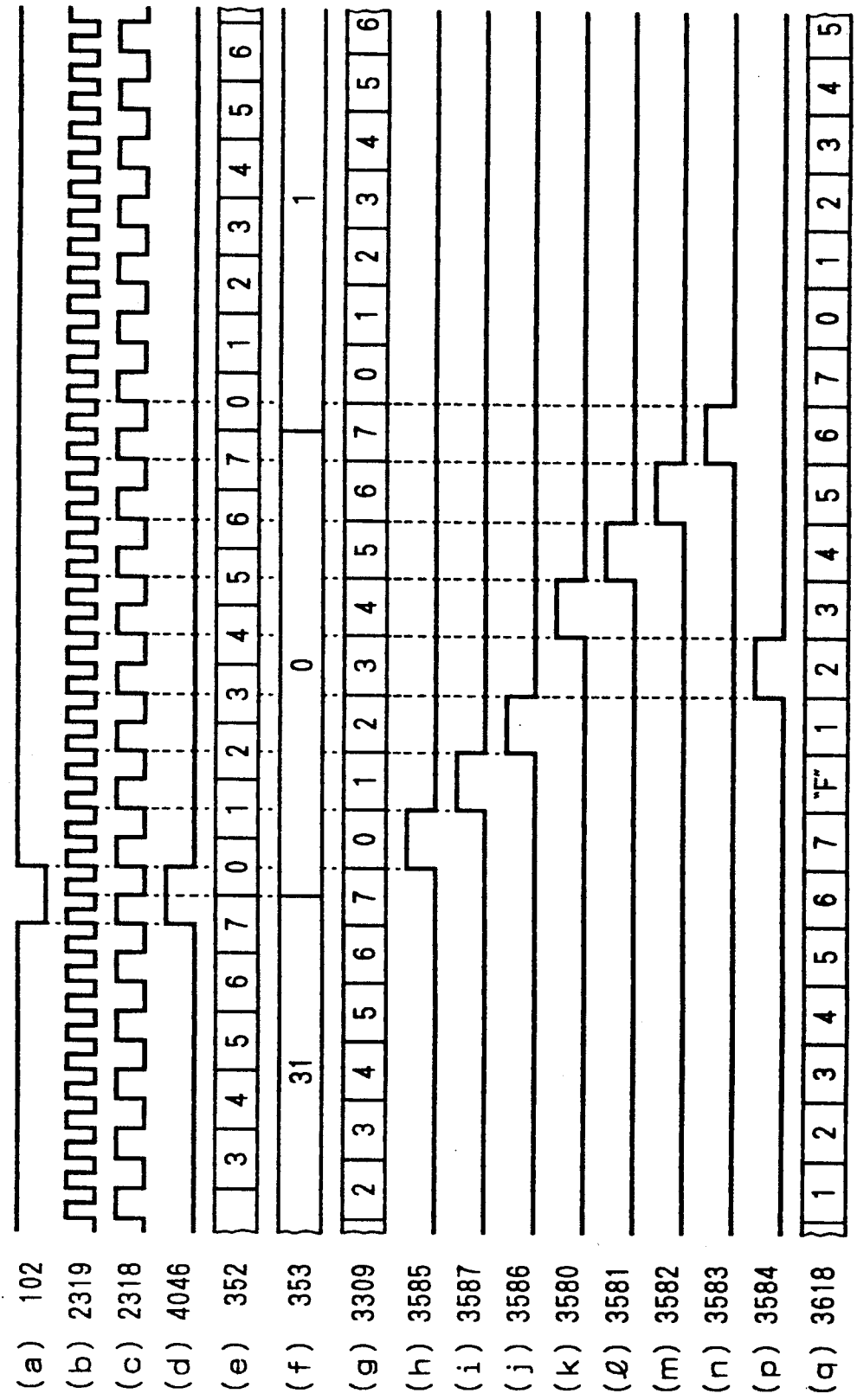

FIG. 5-3B

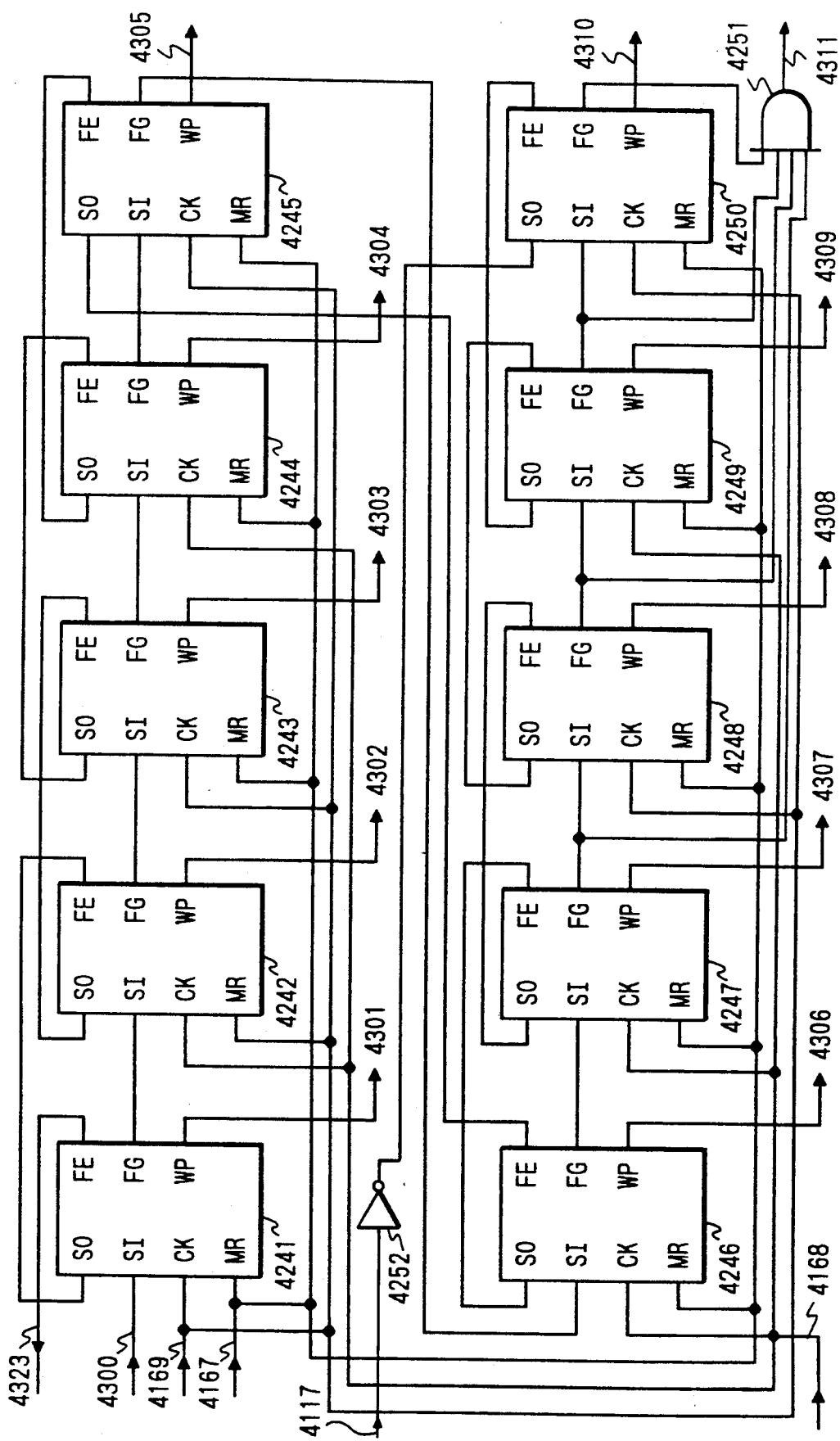

SYNCHRONIZING SYSTEM IN DIGITAL COMMUNICATION LINE

BACKGROUND OF THE INVENTION

1. Field of the Invention

The present invention relates to a synchronizing system for use in a digital communication line and, in particular, to an improved synchronizing system which controls the synchronism of the whole system that is composed of a plurality of button telephone main exchanges each having a digital communication line or a plurality of private branch exchanges (PBXs) connected together by means of links

2. Description of the Prior Art

A digital communication network, normally, includes a main exchange and a large number of local or branch exchanges. The main exchange includes a reference clock generator and each branch exchange receives a reference clock from the main exchange and is synchronized with the reference clock before it is operated. Such network in which the branch exchanges are dependent on the clock source of the main exchange is composed of a plurality of stages. In such a staged structure network, there is employed a continuously synchronous system in which a reference clock is always supplied to an exchange belonging to a certain stage from another stage which is higher by 1 than the former stage.

On the other hand, the digital communication network may sometimes request a call-by-call synchronous system of a communication device such as a PBX (private branch exchange) and the like connected to such digital communication network, in which call-by-call synchronous system a reference clock is supplied each time a call is generated from the digital communication network as in a basic circuit employed in an ISDN (Integrated Service Digital Network).

When a main exchange and a large number of local or branch exchanges respectively connected to the digital communication network of the above-mentioned call-by-call type are connected to each other in a star connection manner, conventionally, there are available two kinds of systems: that is, in one of the two systems the main exchange is in synchronism with the digital communication network and the branch exchanges are synchronized dependent on the main exchange; and, in the other system, the branch exchanges are in synchronism with the digital communication network and the main exchange is synchronized dependent on the branch exchanges.

In the conventional system that includes a main exchange and a large number of branch exchanges each of which main and branch exchanges can be connected to a digital communication network, however, a clock source which serves as a reference each time a call is made cannot be moved quickly, and a synchronizing frequency in a mutual synchronized state occurring while the clock source is being moved must be kept within a desired accuracy without being influenced by a delayed time in a link transmission line; that is, in the conventional system there are left the above problems to be solved.

SUMMARY OF THE INVENTION

The present invention aims at eliminating the drawbacks found in the above-mentioned prior art systems Accordingly, it is an object of the invention to provide a synchronizing system in which one of a plurality of devices each capable of storing a plurality of digital lines is used as a master device and the remaining devices are used as local devices, and the master device and local devices are link connected to each other so as to form a star-type system.

The master device (that is, master switch) mainly consists of structure elements including an MS link synchronizing part for connecting the master device with the large number of local devices (that is, local switches), a digital trunk for storing digital lines coming from outside, a clock generator for generating a clock, and a highway switch such as described in U.S. Pat. No. 4,658,397) for controlling a communication signal or a control signal in such a manner that such communication or control signal can be transmitted and received as a time sharing multiple data signal in a link transmission line and in a digital transmission line; and a large number of buses for connecting the above-mentioned structure elements to one another so that a large number of signals can be transmitted and received between the respective structure elements.

Each of most of the large number of local switches has substantially the same internal structure as that of the master switch.

The present synchronizing system comprising a master switch and a large number of local switches has a structure consisting of three stages, when controlling a synchronizing operation.

The first stage is a digital trunk of a local switch, the second stage is a link synchronizing part of a local switch (LS link synchronizing part), and the third is a master switch which includes an MS link synchronizing part and a digital trunk.

The bus of the master switch includes a first clock bus, a second clock bus and a busy bus. Either of digital trunks contained in the master and local switches transmits a clock sampled from a digital line, for example, a clock of 64 KHz to the second clock bus, and the clock generator considers the clock as a clock source, generates a clock, for example, of 2.048 MHz in synchronism with a clock of the second clock bus and transmits the clock to the first clock bus. The MS link synchronizing part and digital trunk in the master switch operates in synchronism with the first clock bus. The MS link synchronizing part and many digital trunks contained in the master switch respectively monitor the busy bus and thus they can know that a master clock serving as a clock source is already present in the second clock bus.

Each of the large number of local switches, as in the master switch, also includes a first clock bus, a second clock bus and a busy bus and, in addition to this, it further includes a master right control bus for transmitting a control signal relating to a master right capable of serving as a clock source, and a clock transmission control bus for controlling transmission of a clock.

Each of digital lines connected to the master switch and large number of local switches can serve as a clock source. Only one of the digital lines is selected to become a master clock, the clock of 64 KHz is transmitted to the clock generator by means of the second clock bus in the master switch or in the local switches, and the clock generator generates a clock of 2.048 MHz synchronous with the clock of 64 KHz and then transmits the clock of 2.048 to the first clock bus. The clock of the first clock bus is received by all of the MS link synchronizing parts and digital trunks in the master switch or by all of the LS link synchronizing parts and digital trunks in the local switches and the thus received clock is then synchronized. The clock of the first clock bus is transmitted from the MS link synchronizing part or LS link synchronizing part through the link transmission line to the LS link synchronizing parts of the respective local switch or to the MS link synchronizing part of the master switch, is then output from there to the second clock bus, and is synchronized with a clock of 64 KHz in the clock generator to thereby generate a clock of 2.048 MHz; and, the clock of 2.048 is transmitted by the first clock bus to all of the LS link synchronizing parts and digital trunks in the local switches or to all of the MS link synchronizing part and digital trunks in the master switch, so that an operation synchronized with the clock can be obtained.

In the selecting operation of the master clock, at first, only one clock can be selected from the digital trunks of each local switch serving as the first stage. Here, one of the large number of LS link synchronizing parts in each of local switches which serve as the second stage is an ascending link transmission line. The selected clock is transmitted to the MS link synchronizing part of the master switch which is opposed to the ascending link transmission line. When one clock is selected in each of the local switches, the busy bus, master right control bus and clock transmission control bus are used.

One of the MS link synchronizing part of the master switch serving as the third stage and a large number of digital trunks of the master switch is selected by use of the busy bus and the selected one is used as a master clock.

In this manner, all of the digital lines connected to the many digital trunks contained in the master switch and local switches can be selected as a master clock source.

If such master clock source is not present at all, a clock generator contained in the master switch operates by itself and outputs a self-operating clock unit a master clock is generated.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein:

FIG. 1-2 is a block diagram of a master switch and local switches, illustrating the more detailed connecting relationship between them and also illustrating elements included in the master switch and local switches;

FIG. 1-3 is a structure view of the internal structure of the master switch;

FIG. 1-4 is a structure view of the internal structure of the local switch;

FIGS. 2-1A and 2-1B are respectively format views of a signal transmitted and received by means of a link transmission line between the master switch and the local switches;

FIG. 2-2 is a stage view to illustrate conceptually how a master clock is selected;

FIG. 2-3 is a timing diagram of the respective starting pulses in the first stage;

FIG 2-4 is a timing diagram to illustrate how the respective starting pulses are generated;

FIG 2-5 is a timing diagram of an embodiment of a switching sequence of the master clock;

FIG 2-6 is a circuit diagram of a clock circuit in the switching sequence of the master clock;

FIG 3-1 is a circuit diagram of a clock generator included in the master switch;

FIG 3-2 is a circuit diagram of a digital PLL circuit forming a part of FIG. 3-1;

FIG 3-3A is a circuit diagram of a phase comparator forming a part of FIG. 3-1;

FIG 3-3B is a wave form chart of waves in the respective part of FIG. 3-3A;

FIG 3-4A is a circuit diagram of a random walk filter forming a part of FIG. 3-1;

FIG 3-4B is a wave form chart of the respective circuit parts of FIG. 3-4A when the digital PLL circuit of FIG. 3-2 lags in phase;

FIG 3-4C is a wave form chart of the respective circuit parts of FIG. 3-4A when the digital PLL circuit of FIG. 3-2 leads in phase;

FIG. 3-5A is a circuit diagram of a frequency division ratio control circuit and two frequency divider circuits of FIG. 3-2;

FIG. 3-5B is a wave form chart of the respective parts of the circuits of FIG. 3-5A when the digital PLL circuit of FIG. 3-2 leads in phase;

FIG. 3-5C is a wave form chart of the respective parts of the circuits of FIG. 3-5A when the digital PLL circuit of FIG. 3-2 lags in phase;

FIG. 3-6 is a circuit diagram of an analog PLL and two frequency dividers respectively shown in FIG. 3-1;

FIG. 4-1 is a circuit diagram of a digital trunk included in the master switch;

FIG. 4-2 is a circuit diagram of a digital line interface included in the digital trunk shown in FIG. 4-1;

FIG. 4-3 is a circuit diagram of a starting pulse creating circuit included in the digital trunk shown in FIG. 4-1;

FIG. 4-4 is a circuit diagram of a trunk arbiter included in the digital trunk shown in FIG. 4-1;

FIGS. 5-1A, 5-1B and 5-1C are respectively views of the structure of a MS link,synchronizing part;

FIGS. 5-2A, 5-2B and 5-2C are respectively time charts of a large number of signals when the MS link synchronizing part transmits a PCM signal to a highway switch within the master switch;

FIGS. 5-3A and 5-3B are respectively time charts of a large number of signals when a signal to be transmitted from the MS link synchronizing part to the LS synchronizing part is created;

FIG. 6-1 is a circuit diagram of an MS arbiter circuit included in the MS link synchronizing part;

FIG. 6-2 is a circuit diagram of an input signal creating circuit included in the MS arbiter circuit;

FIG. 6-3 is a circuit diagram of a coincidence circuit included in the MS arbiter circuit;

FIG. 6-4 is a circuit diagram of a timer circuit included in the MS arbiter circuit;

FIG. 6-5 is a circuit diagram of an MS link arbiter included in the MS arbiter circuit;

FIG. 6-6 is a circuit diagram of a received clock output circuit included in the MS arbiter circuit;

FIGS. 8-1A and 8-1B are respectively structure views of an MS bit synchronizing circuit included in the MS link synchronizing part;

FIG. 8-2 is a circuit diagram of a transmission clock creating circuit and a clock generation circuit included in the MS bit synchronizing circuit;

FIG. 8-3 is a circuit diagram of a received phase comparison circuit included in the MS bit synchronizing circuit;

FIGS. 8-4A, 8-4B, 8-4C, 8-4D and 8-4E are respectively circuit diagrams of a received random walk filter circuit included in the MS bit synchronizing circuit;

FIGS. 8-5A and 8-5B are respectively circuit diagrams of a received phase control circuit 242 included in the MS bit synchronizing circuit;

FIG. 8-6 is a circuit diagram of a received phase comparison circuit 246 included in the MS bit synchronizing circuit;

FIGS. 8-7A, 8-7B and 8-7C are respectively circuit diagrams of a received phase control.,circuit 249 included in the MS bit synchronizing circuit;

FIGS. 8-8A, 8-8B, 8-8C, 8-8D and 8-8E are respectively circuit diagrams of a received random walk filter circuit 254 included in the MS bit synchronizing circuit;

FIGS. 8-9A, 8-9B, 8-9C, 8-9D, 8-9E, 8-9F, 8-9G, 8-9H, 8-9I, 8-9J and 8-9K are respectively circuit diagrams of a phase filter circuit included in the MS bit synchronizing circuit;

FIGS. 8-10A, 8-10B, 8-10C and 8-10D are respectively circuit diagrams of a delay register circuit included in the MS bit synchronizing circuit;

FIG. 9-1 is a circuit diagram of a frame synchronizing circuit included in the MS link synchronizing part;

FIG. 9-2 is a circuit diagram of a violation detect circuit included in the frame synchronizing circuit;

FIG. 9-3 is a circuit diagram of a synchronizing protect circuit included in the frame synchronizing circuit;

FIG. 9-4 is a circuit diagram of a counter circuit included in the frame synchronizing circuit;

FIG. 10 is a circuit diagram of a synchronization state circuit included in the MS link synchronizing part;

FIG. 12-1 is a circuit diagram of a transmission timing creating circuit included in the MS link synchronizing part;

FIG. 12-2 is a circuit diagram of a transmission timing creating circuit included in the transmission timing creating circuit;

FIG. 12-3A and 12-3B are respectively circuit diagrams of a transmission-iming circuit included in the transmission timing creating circuit;

FIG. 16-1 is a circuit diagram of a received buffer circuit included in the MS link synchronizing part;

FIG. 16-2 is a circuit diagram of an S/P input register circuit included in the receiving buffer circuit;

FIG. 16-3A, 16-3B, 16-3C and 16-3D are respectively circuit diagrams of a FIFO control circuit included in the receiving buffer circuit;

FIG. 16-4 is a circuit diagram of an P/S output register included in the receiving buffer circuit;

FIG. 16-5A, 16-5B, 16-5D, 16-5E, 16-5F and 16-5G, 16-6A, 16-6B, 16-6C, 16-6D, 16-6E, 16-6F, 16-6G, 16-6H, 16-6I and 16-6J are respectively circuit diagrams of a FIFO register circuit included in the receiving buffer circuit;

FIG. 17-1 is a circuit diagram of a digital trunk included in a local switch;

FIG. 17-2 is a circuit diagram of a trunk arbiter included in the digital trunk shown in FIG. 17-1;

FIG. 19-1 is a circuit diagram of an LS arbiter circuit included in the MS link synchronizing part;

FIG. 19-2 is a circuit diagram of an input signal creating circuit included in the LS arbiter circuit;

FIG. 19-3A and 19-3B are respectively circuit diagrams of an LS link arbiter circuit included in the LS arbiter circuit;

FIG. 20-1 is a circuit diagram of an LS bit synchronizing circuit included in the LS link synchronizing circuit; and, FIG. 20-2 is a partial circuit diagrams of a clock generation circuit and a received phase control circuit included in the LS bit synchronizing circuit.

DETAILED DESCRIPTION OF THE PREFERRED EMBODIMENTS

Detailed description will hereunder be given of the preferred embodiments of a synchronizing system in a digital communication channel according to the present invention with reference to the accompanying drawings.

Figure 1:
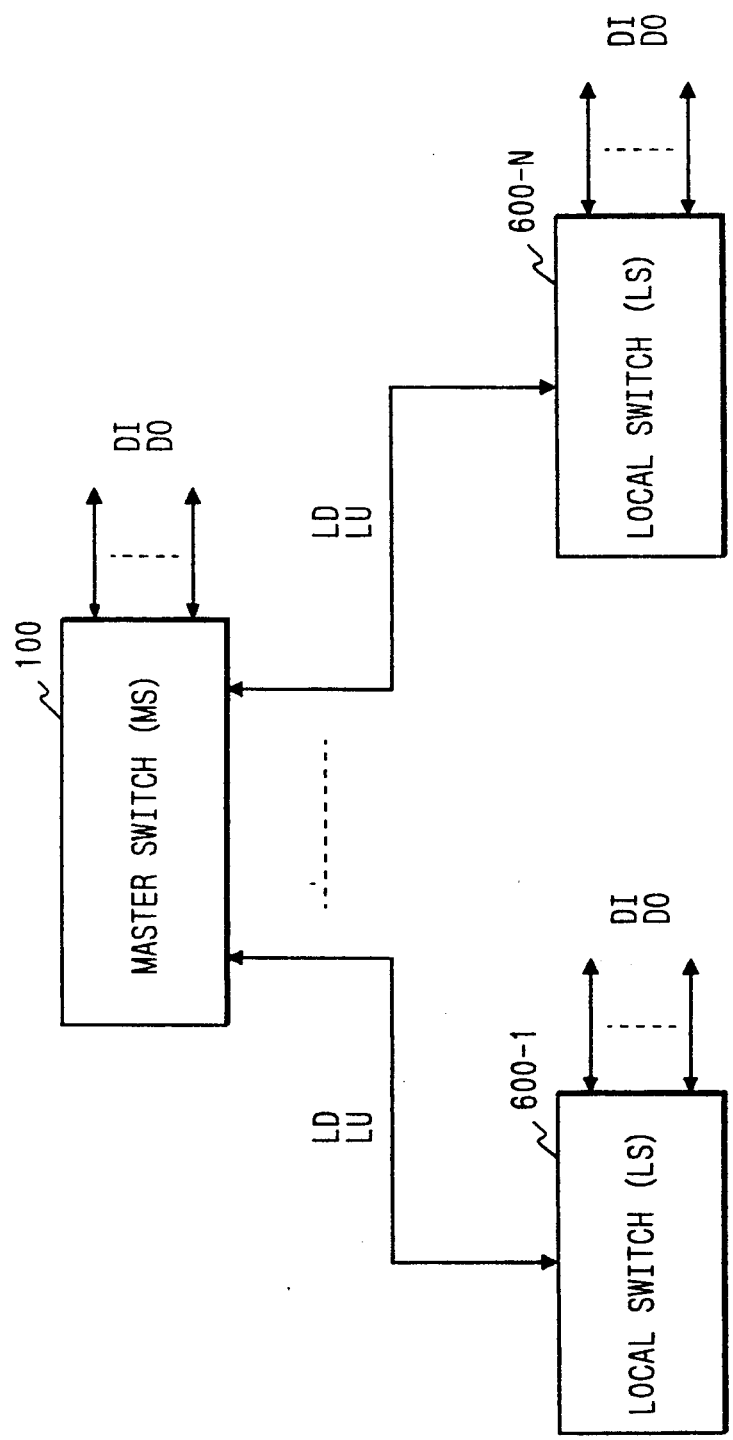
FIG. 1-1 is a block diagram of a master switch and a large number of local switches employed in the present invention, illustrating how they are connected to each other.

Referring first to FIG. 1-1, there is shown a connection view in which a master switch (MS) 100 and a large number of local switches (LS) 600-1–600-N both used in the present invention are connected to each other in a star manner. To the master switch 100 and the large number of local switches are connected the input lines DI and output lines DO of a large number of digital lines, respectively. The master switch 100 and the respective local switches 600-1–600-N are connected to each other by means of a descending link transmission line LD and an ascending link transmission line LU.

Figures 1, 2:
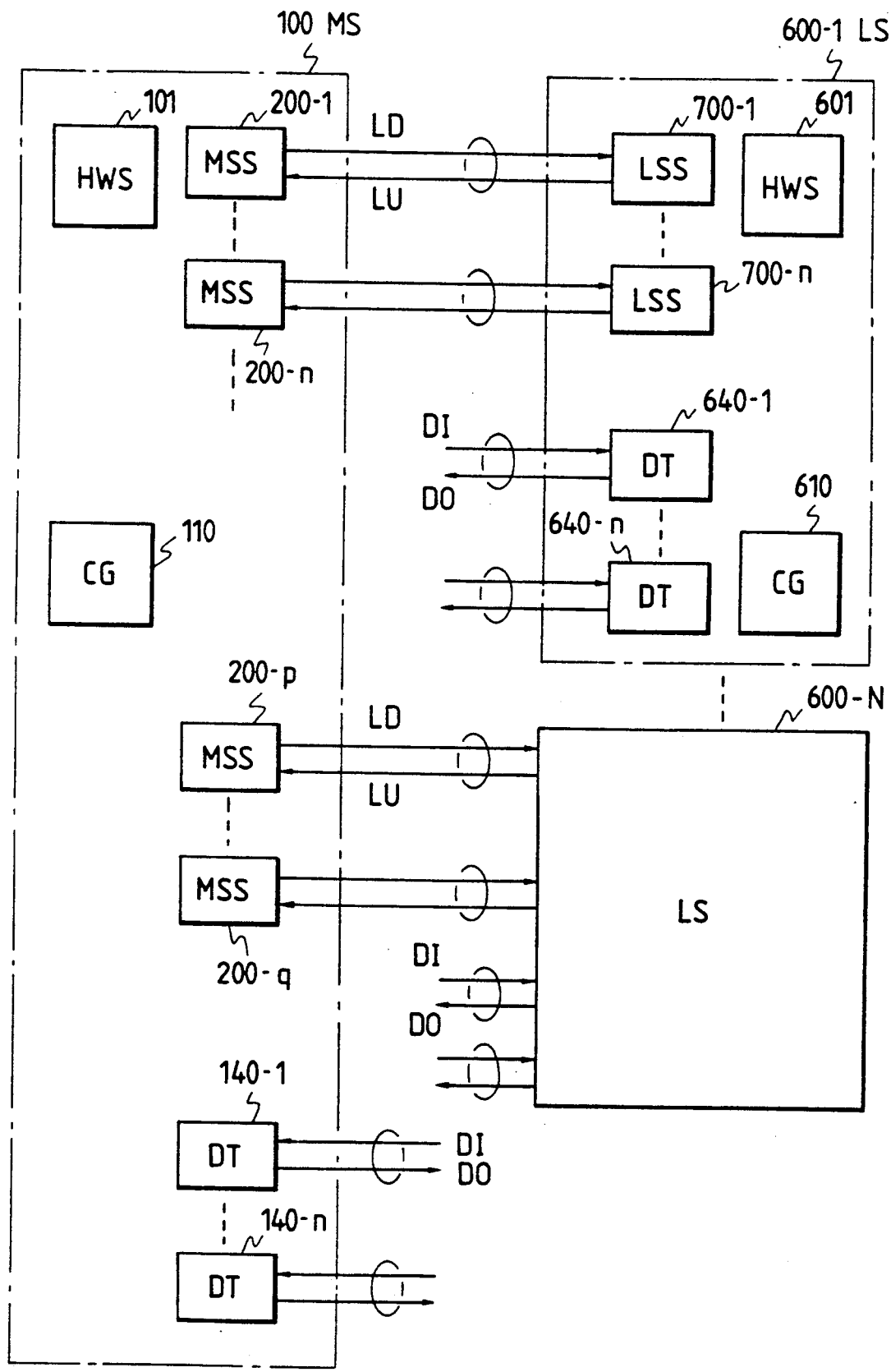

In FIG. 1-2, there is shown a more detailed connection relationship between the master switch (MS) 100 and the large number of local switches (LS) 600-1–600-N respectively shown in FIG. 1-1, and there are also shown elements included therein.

The master switch (MS) 100 includes a highway switch (HWS) 101, which is used to control a speaking signal or a control signal so that it can be transmitted and received as a time sharing multiplex data signal in the descending and ascending link transmission lines LD and LU and also which is already known to the public because of its disclosure in U.S. Pat. No. 4,658,397, a clock generator (CG) 110 for generating a clock, MS link synchronizing parts (MSS) 200-1–200-n for transmitting and receiving a signal to and from the local switch 600-1 by means of the link transmission lines LD, LU or MS link synchronizing part (MSS) 200-p–200-q for transmitting and receiving a signal to and from the local switch (LS) 600-N by means of the link transmission lines LD, LU, and digital trunks 140-1–140-n for storing the input line DI and output line DO of the digital lines.

Each of the local switches (LS) 600 also includes a highway switch (HWS) 601, a clock generator (CG) 610, LS link synchronizing part (LSS) 700-1-700-n, and digital trunks 640-1-640-n. These elements respectively correspond to the highway switch (HWS) 101, clock generator (CG) 110, MS link synchronizing part (MSS) 200 and digital trunks (DT) 140 of the master switch (MS).

Figures 1, 2, 3:
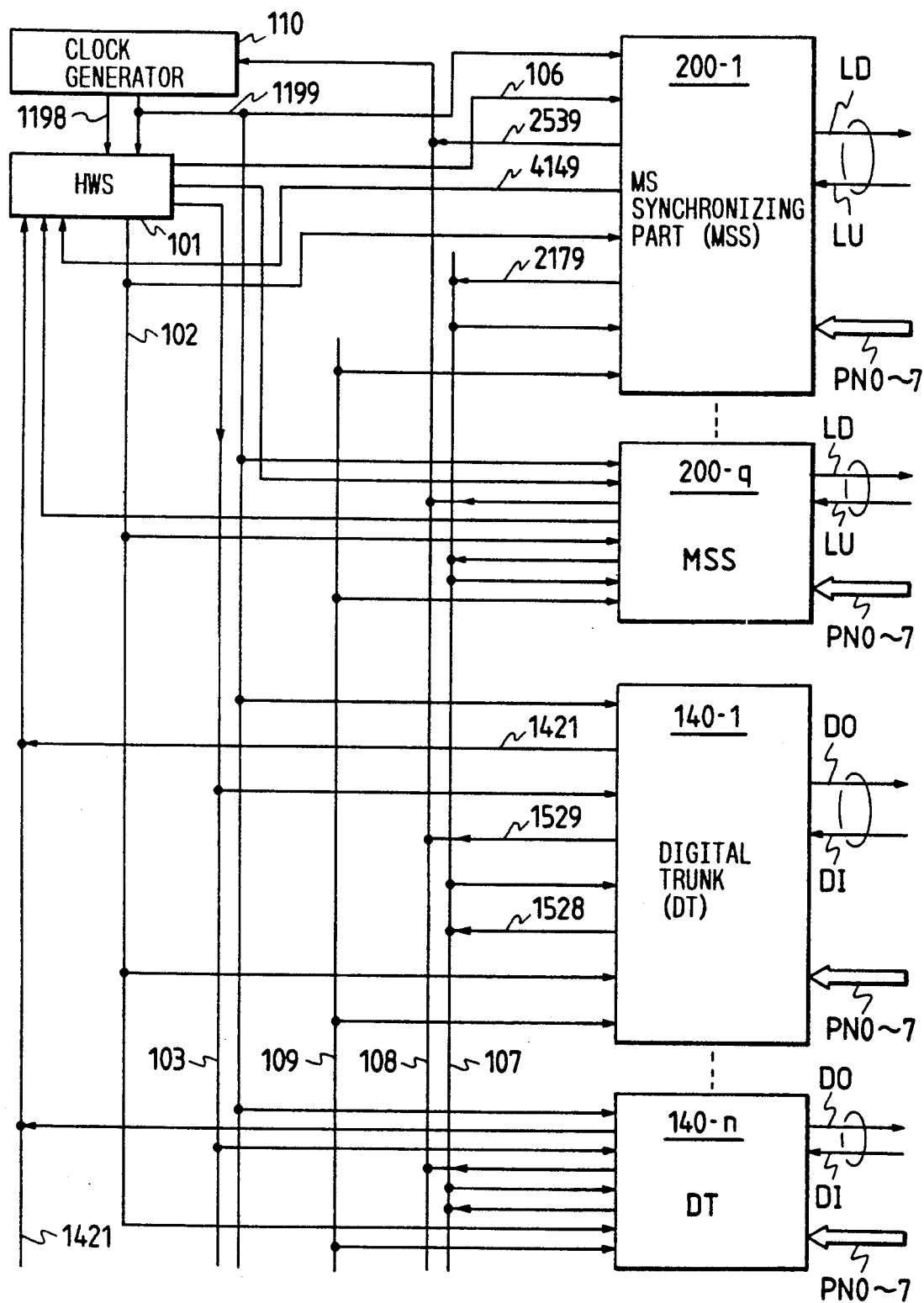

In FIG. 1-3, there is shown the internal structure of the master switch (MS) 100, in which there are provided buses for transmitting a large number of signals.

A reset signal 109 is connected through buses to the respective MS link synchronizing parts (MSS) 200-1-200-q and digital trunks (DT) 140-1-140-n and, when the operation of the present synchronizing system is started, it is applied to perform a reset operation.

A frame signal 102 is output from the highway switch (HWS) 101, and is applied through buses to the respective MS link synchronizing parts (MSS) 200-1-200-q and digital trunks (DT) 140-1-140-n, in which it is used as a timing signal when transmitting and receiving various kinds of time sharing multiplex signals having frame structure.

A PCM input signal 103 is a PCM (pulse code modulation) signal which is output from the highway switch (HWS) 101 and is input through buses to the respective digital trunks (DT) 140-1-140-n.

Similarly, a PCM input signal 106 is a PCM signal which is output from the highway switch (HWS) 101 and is input independently to the respective MS link synchronizing parts (MSS) 200-1-200-q.

A busy signal 107 is connected to the respective MS link synchronizing parts (MSS) 200-1-200-q and digital trunks (DT) 140-1-140-n. The MS link synchronizing parts (MSS) 200-1-200-q respectively monitor the state of the busy signal 107 when a candidate for a master clock serving as a master of the clock of the whole synchronizing system of the invention is transmitted from the opposing local switch 600. If the state of the busy signal 107 is found "H", then MSS can know that a master clock is not present. Then, MSS outputs a signal 2179 to turn the busy signal to "L" and also outputs a signal 2539 in order to turn a clock of 64 KHz transmitted from the opposing local switch (LS) 600 into a master clock. This is applied through buses to the clock generator (CG) 110 as a second clock signal 108.

Similarly, the digital trunks (DT) 140-1-140-n also monitors the busy signal 107 and, if it is found "H", then it can know that there exists no other master clock. Accordingly, the digital trunks transmit a signal 1528 to make the busy signal "L" and, in order to form a master clock out of a clock of 64 KHz extracted from the input line DI of the digital line, transmits a signal 1529, which is in turn applied through buses to the clock generator (CG) 110 as a second clock signal 108.

On receiving the second clock signal 108 transmitted from one of the large number of MS link synchronizing parts 200 or digital trunks 140, the clock generator (CG) 110 generates a first clock signal 1199 of 2.048 and a signal 1198 of 4.096 respectively synchronizing with the second clock signal 108, with the second clock signal 108 as a master clock. On the other hand, if it is found that the master clock is not present, then the clock generator (CG) 110 operates by itself and thus generates the first cock signal 1199 and the signal 1198.

The signal 1198 and first clock signal 1199 are applied to the highway switch (HWS) 101, and the first clock 1199 is also applied through buses to the respective MS link synchronizing parts 200 and digital trunks 140, which signals are then used as a synchronizing signal.

The PCM output signals 1421 and 4149 are respectively obtained by collecting the PCM output signals output from the respective digital trunks (DT) 140-1-140-n and by collecting the PCM output signals output from the respective MS link synchronizing parts (MSS) 200-1-200-q, and the two PCM output signals 1421 and 4149 are applied to the highway switch (HWS) separately.

To the respective MS link synchronizing parts (MSS) 200 and digital trunks (DT), there are previously given in a fixed manner signals PN 0-7 which indicates the identification numbers of the respective MS link synchronizing parts and digital trunks.

In FIG. 1-4, there is shown the internal structure of the local switch (LS) 600. The internal structure of the local switch (LS) 600 is similar to the internal structure of the master switch (MS) 100 shown in FIG. 1-3 and the corresponding relationship between them is illustrated by designations. That is, Ls link synchronizing parts (LSS) 700-1-700-n correspond to 200-1-200-n, digital trunks (DT) 640-1-640-n to 140-1-140-n, highway switch (HWS) 601 to 101, clock generator (CG) 610 to 110, frame signal 602 to 102, PCM input signals 603 and 606 respectively to 103 and 106, busy signal 607 to 107, second clock signal 608 to 108, reset signal 609 to 109, first clock signal 6199 to 1199, signal 6198, signal 7539 to 2539, signal 9149 to 4149, signal 6528 to 1528, signal 6529 to 1529, and signal 6421 to 1421, respectively.

Here, the internal structure of the local switch (LS) 600 shown in FIG. 1-4 is different from the internal structure of the master switch (MS) shown in FIG. 1-3 in that there are added a master right control signal 604 and a transmission control signal 605 and that, in association with such addition, signals 7189 and 7188 are output from the LS link synchronizing parts (LSS) 700 and are used as a master right control signal 604 and a clock transmission control signal 605, respectively.

Figures 1, 2, 3, 4:
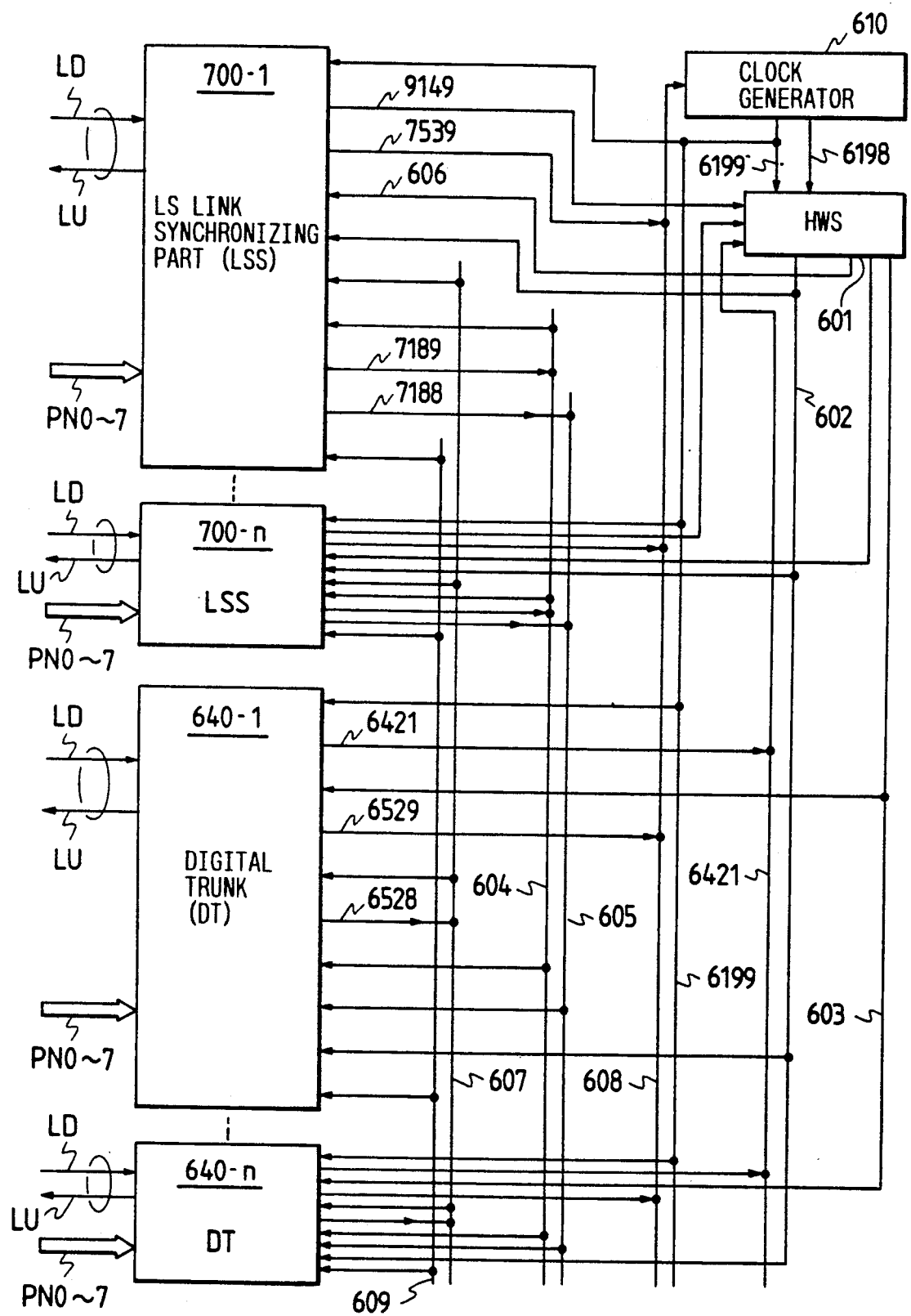
Figures 1A, 2:
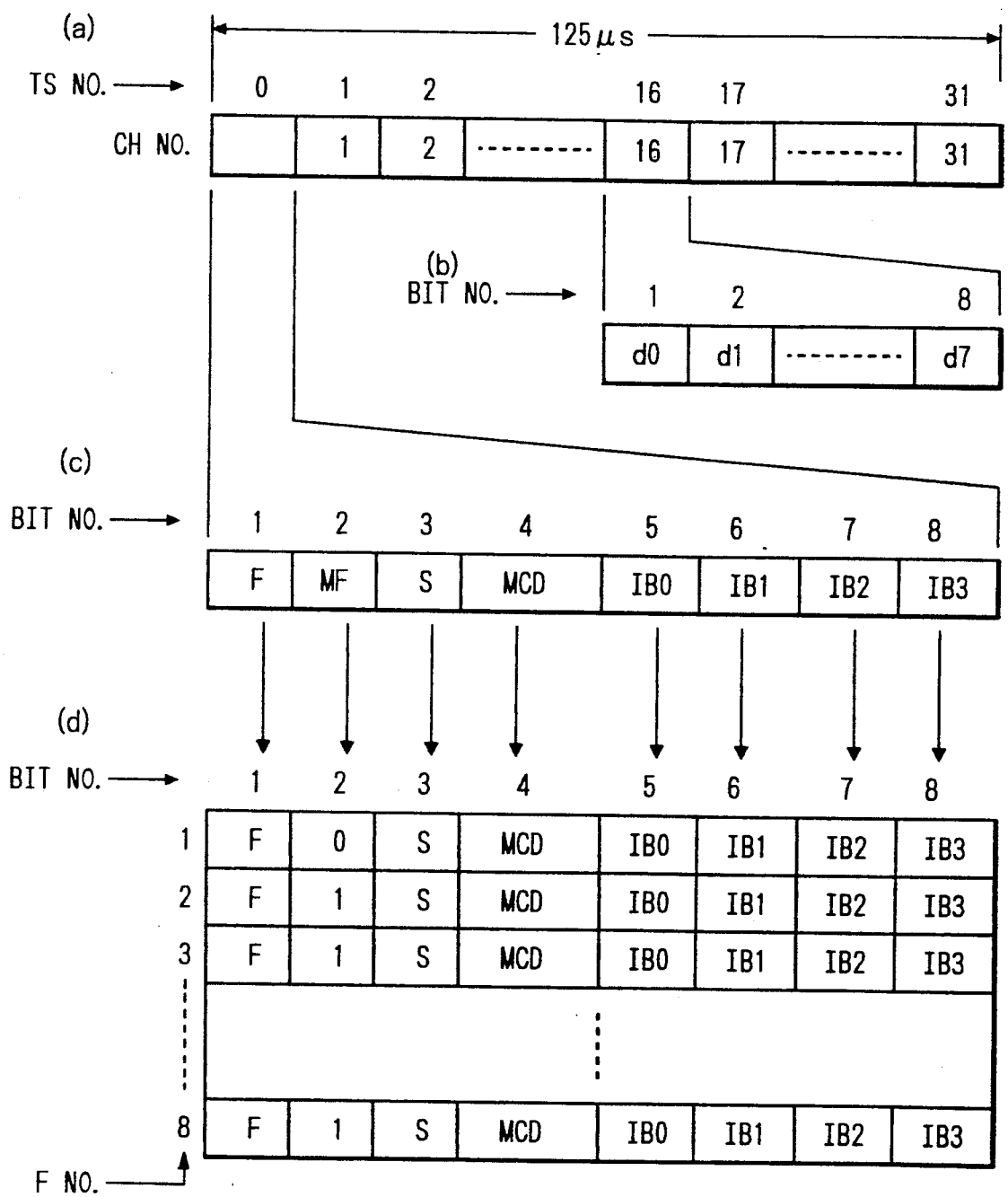
Figures 1B, 2:
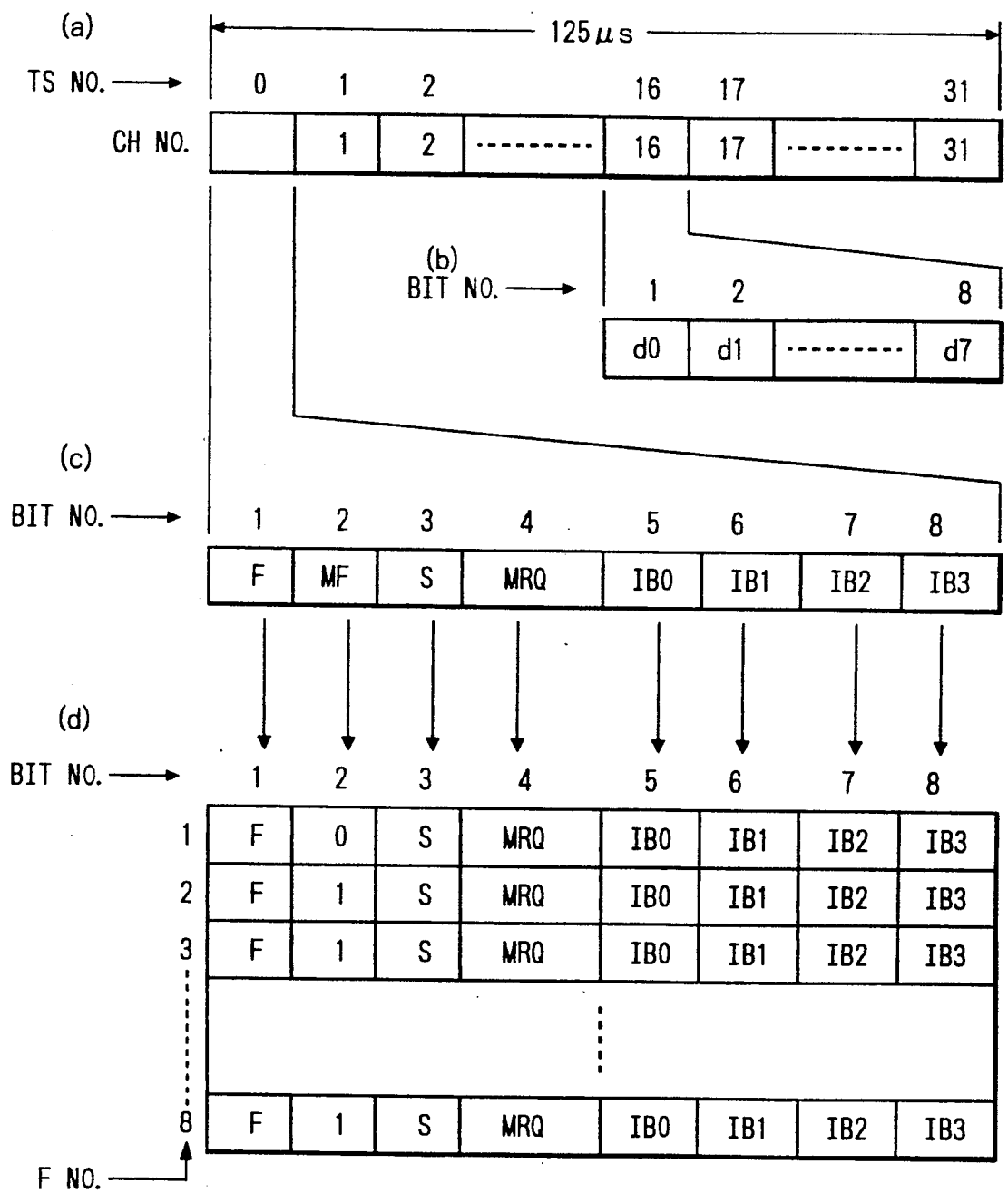
Figure 2:
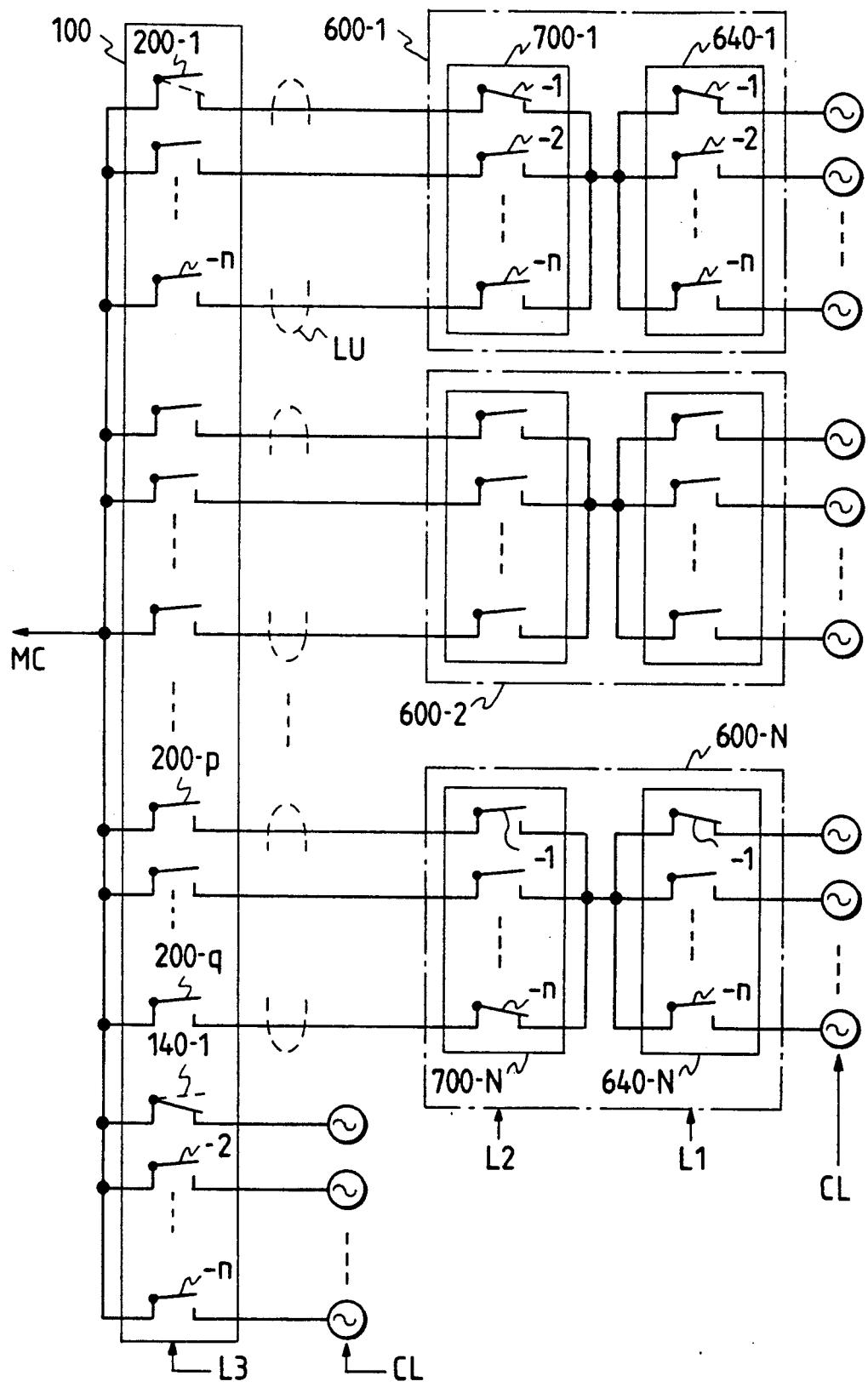
Figures 2, 3:
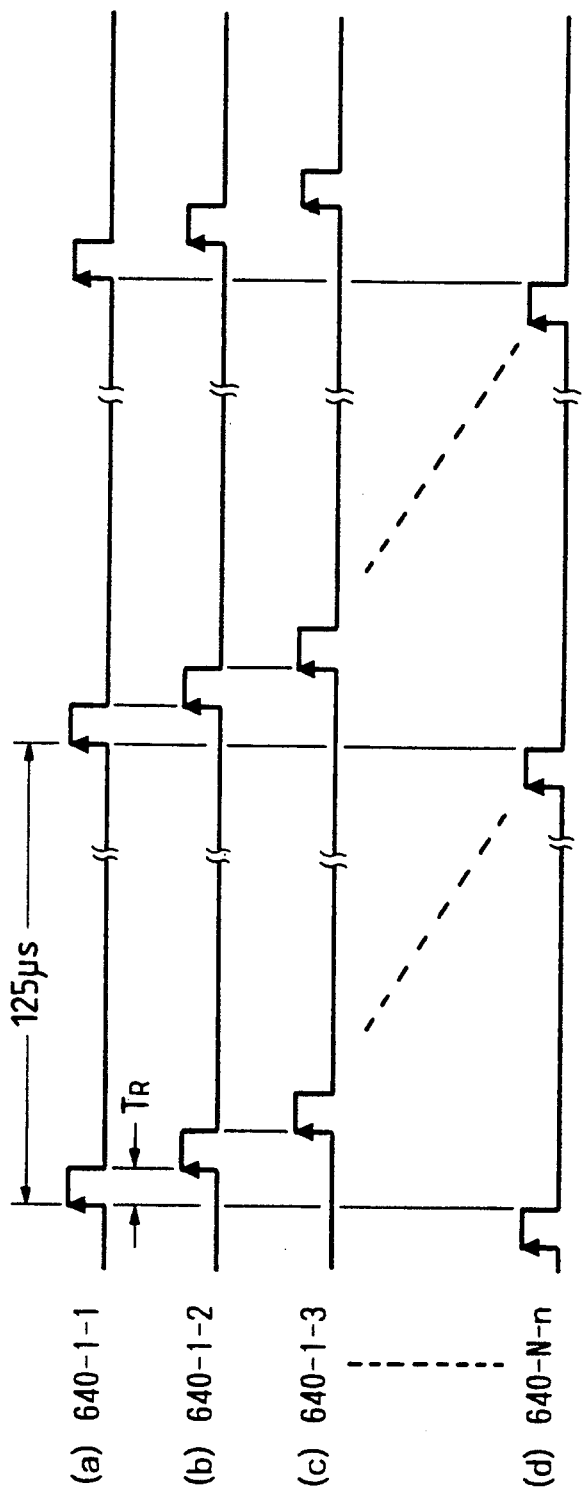
Figures 2, 3, 4:
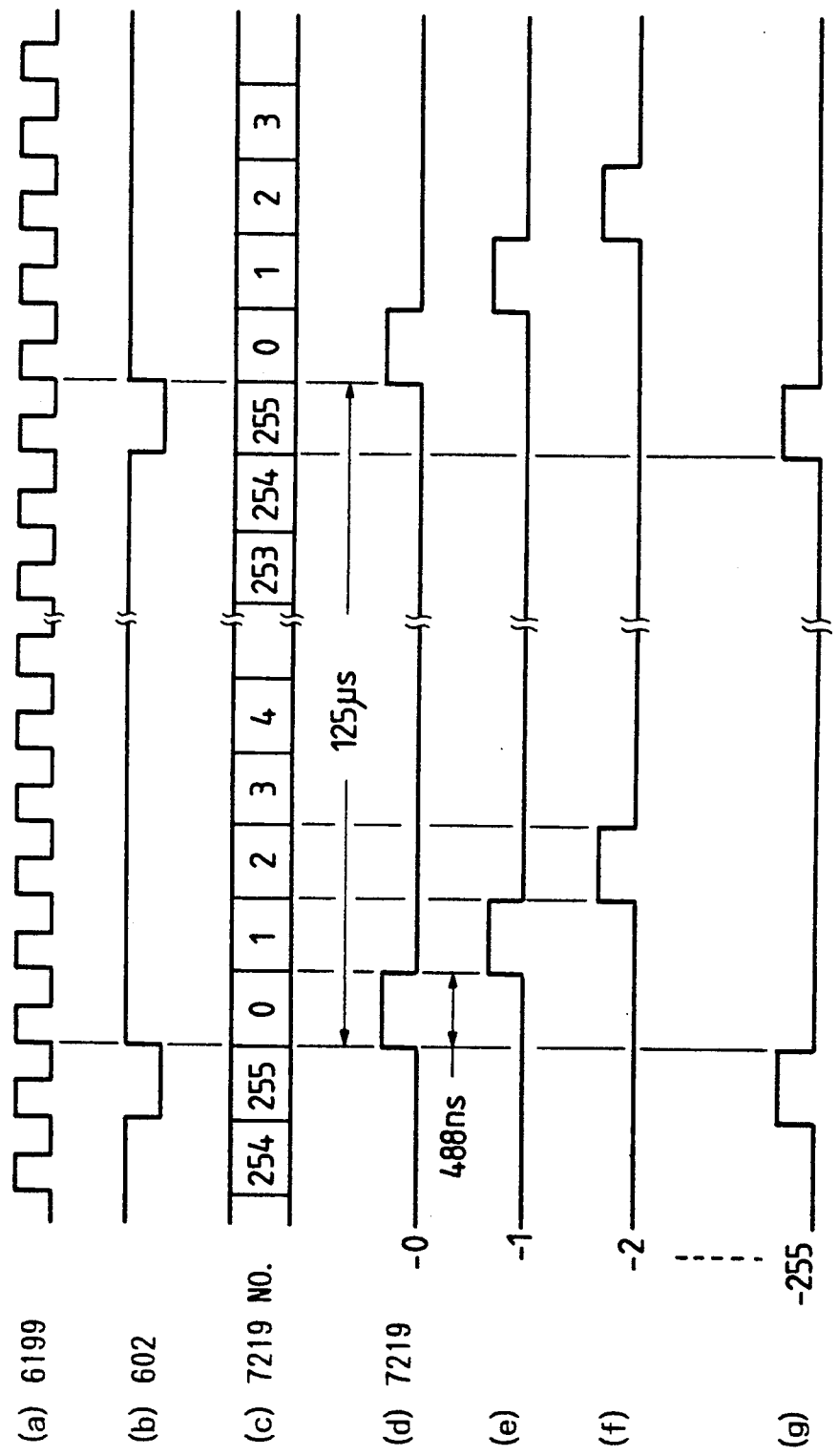

Now, FIGS. 2-1A and 2-1B respectively illustrate transmission formats which are transmitted and received as time sharing multiplex signals by means of the descending and ascending link transmission lines LD and LU in FIGS. 1-3 and 1-4.

In FIG. 2-1A (a), there are shown time slots TS No. 0-31 included in 1 frame of 125 $\mu$s and, among these time slots, in the time slots TS No. 1-31, control signals or information signals of channels CH 1-31 are employed as data d0-d7, as shown in FIG. 2-1A($b$).

The contents of the time slot TS No. 0, as shown in FIG. 2-1A($c$), include bits No. 1-8 and these bits, as shown by F No. 1-8 in FIG. 2-1A($d$), form a multi-frame by means of 8 frames. In Bit No. 1, there is included a frame synchronizing bit F of 8 KHz, which is a violation of a CMI code "1". Referring to Bit No. 2, in a frame F No. 1 there is present "0" and in frames F No. 2-8 there is present "1", whereby a multi-frame synchronizing pattern "01111111" is transmitted.

Bit No. 3 is an alarm bit S which is output when a multi-frame synchronism is not established or in other cases. Bit No. 4 is a master right specifying bit MCD in the descending link transmission line LD, and it permits a right of transmission of a master clock to the LS link synchronizing part (LSS) 700 of the local switch 600. In the ascending link transmission line LU, as showing FIGS. 2-1B(c) and (d), bit No. 4 is a master right request bit (MRQ) signal which requests the transmission of the master clock from the LS link synchronizing part (LSS) 700 to the MS link synchronizing part (MSS) 200.

In FIGS. 2-1A and 2-1B, Bit No. 5-8 are bits IB 0-3 which are used to arbitrarily transmit and received required information between the master switch (MS) 100 and the local switch (LS) 600.

FIG. 2-2 is a stage view which illustrates conceptually how a master clock is selected from a large number of clock sources.

A clock source CL selected from a digital line and the digital trunks 640-1-640-N of the local switches (LS) 600-1-600-N storing the clock source CL form the first stage L1.

Among a large number of digital trunks 640-1-1-640-1-n, --- ---. 640-N-1-640-N-n in the first stage L1, digital trunks 640-1-1 and 640-N-1 are on and only one of clocks from the digital transmission line is transmitted to the second stage L2 in each of the local switches 600.

The second stage L2 consists of a large number of LS link synchronizing parts 700-1-1-700-1-n, --- ---, 700-N-1-700-N-n and only one clock source usable as a master clock is selected in each of the LS link synchronizing parts 700. In FIG. 2-2, the LS link synchronizing parts 700-1-1 and 700-N-n are selected.

In the master switch 100 forming the third stage L3 which has received the clock source selected by the ascending link transmission line LU, there are included digital trunks 140-1-140-n besides the MS link synchronizing parts 200-1-200-q. Due to the fact that the clock source CL serving as the digital line is connected to the digital trunks 140-1-140-n as well, when the digital trunk 140-1 is already selected as the master clock (MC) in the third stage, there is no possibility that the MS link synchronizing parts 200-1-200-g and the remaining digital trunks 140-2-140-n are selected. and the remaining However, if the digital trunk 140-1 selected as the master clock is turned off, then immediately the MS link synchronizing part 200-1 is selected and is used as a master clock (MC)

As described above, only one of a large number of clock sources is selected and the selected clock source is used as a mater clock. However, when a large number of clock sources, that is, a large number of digital lines are connected at the same time, if a plurality of digital trunks 140, 640 or MS link synchronizing parts 200 transmit busy signals at the same time, then a competition arises. In such competition as well, a competition control is performed to select only one clock source. A starting pulse is used to execute such competition control.

In FIG. 2-3, there is shown a timing of starting pulses in the first stage L1.

In a large number of digital trunks 640-1-1-640-N-n (see FIG. 2-2), there are generated starting pulses respectively having timings as shown in FIG. 2-3 (a)-(d), and the busy signal 107 is checked during the period of the starting pulses. (a) designates a starting pulse which is generated in the inside of the digital trunk 640-1-1 and also which has a pulse interval of 125 μs equal to the time of a frame and a pulse width $T_R$. The pulse width $T_R$ is set to be greater than a time necessary to go from the master switch 100 to the farthest local switch 600 and return from the local switch 600 to the master switch 100 (a round trip delay time). Since the starting pulses are generated delayed by the pulse width $T_R$ as shown in FIG. 2-3 (b), (c) and (d), there is no possibility that the timings of the starting pulses can coincide with each other.

In FIG. 2-4, there is shown how the respective pulses are generated. In particular, (a) illustrates a first clock signal 6199 of 2.048 -MHz (FIG. 1-4), (b) illustrates a frame signal 602 having a cycle of 125 μs (FIG. 1-4) (c) illustrates an identification number 7219 No. which is previously given as PN 0-7 to the respective digital trunks 640 to generate a starting pulse 7219. (d) illustrates an identification No. 7219-0, (e) illustrates an identification No. 7219-1, (f) illustrates an identification No. 7219-1, and (g) illustrates an identification No. 7219-255. In this figure, the width 488ns of the starting pulse 7219 is a time which is shown as $T_R$ in FIG. 2-3. In this manner, with the frame signal 602 of (b) as a reference, the respective starting pulses are generated according to their respective identification No. 7219 No. in such a manner that they do not overlap on one another.

This operation to generate the respective pulses is performed in the master switch 100 as well.

In FIG. 2-5, there is shown an embodiment of a master clock switching sequence according to the invention.

In particular, (a) shows the state number SL1-SL8 of the Ls link synchronizing part 700, (b) shows a signal 7188 (FIG. 1-4), (c) shows a master right specifying bit MCD (FIG. 2-1A), (d) shows a busy signal 107, (e) shows a master right control signal 604, (f) shows the operation state of the LS link synchronizing part 700, (g) shows the operation of the MS link synchronizing part 200, (h) shows a signal 2179 which is output as a busy signal 107 from the MS link synchronizing part 200, (i) shows a master transmission right request bit MRQ (FIG. 2-1B), (j) shows a busy signal 107, and (k) shows the state numbers SM1-SM8 of the MS link synchronizing part 200, respectively.

The LS link synchronizing part 700 and MS link synchronizing part 200 are both reset by the reset signals 609, 109 (FIG. 1-4, FIG. 1-3) and are now in the state SL1 of (a) and in the state SM1 of (k), respectively. The MS link synchronizing part 200 keeps the master right specifying bit MCD of (c) to specify the master right in MCD="1" and has not yet given the master right to the LS link synchronizing part 700, that is, the MS link synchronizing part 200 is in the state M (g) in which it holds the master right.

On the other hand, the Ls link synchronizing part 700 is in the state (a) of SL1, and the master right control signal 604 of (e) remains still "H", that is, the LS link synchronizing part 700 is in the slave $S_6$ state (f) in which it cannot transmit the master right request bit MRQ to request the master right from the MS link synchronizing part 200. Here, if the LS link synchronizing part 700 detects that the master right control signal 604 of (e) is "H", then the LS link synchronizing part 700 outputs the signal 7189 (FIG. 1-4) in order to turn the master right control signal 604 to "L". As a result of this, the master right control signal 604 of (e) becomes "L" and thus the LS synchronizing part 700 is moved to the state of SL2(a), that is, the LS synchronizing part 700 is in the slave $S_b$ state (f) in which it is able to transmit the master right request bit MRQ to request the master right from the MS link synchronizing part 200. For example, if only one master clock candidate is selected out of the digital trunks 620-1-1-640-1-n (FIG. 2-2) of the local switch 600-1, then the busy signal 607 (FIG. 2-5(d)) in the local switch 600-1 becomes "L", the master right request bit MRQ="0" is output from the LS link synchronizing part 700 to the MS link synchronizing part 200 (f)–(g), and the LS link synchronizing part 700 is moved to the state of SL 3(a), that is, the LS link synchronizing part 700 is in the slave $S_c$ (f) state in which it waits for the master right specifying bit MCD="0" to be transmitted from the MS link synchronizing part 200.

On the other hand, if the MS link synchronizing part 200 receives the master right request bit MRQ="0" from the LS link synchronizing part 700, then the MS link synchronizing part 200 is moved to the state of SM2 (FIG. 2-5(k)) to turn the (h) signal 2179 into "L" in order to turn the busy signal 107(j), which has been "H", into "L". Then, if the slave state S1 is kept on for a time of 128 ms, then the MS link synchronizing part 200 transmits the master right specifying bit MCD="0" to the LS link synchronizing part 700, (g)→(f), and turns into the state of SM3(k), that is, the state of slave $S_2$.

If the LS link synchronizing part 700 receives the master right specifying bit MCD="0" (c), then the LS link synchronizing part 700 transmits the signal 7188 "L" of (b) to turn the clock transmission control signal 605 (FIG. 1-4) into "L", so that the LS link synchronizing part 700 is moved to the state of SL4(a), that is, the state $M_L$ (f) in which it holds the master right and then the LS link synchronizing part 700 transmits the master clock selected from the digital trunk 640 to the MS link synchronizing part 200. When the digital trunk 640 included in the local switch 600 terminates communication, then the busy signal 607 of (d) becomes "H", the signal 7188 of (b) also becomes "H", the clock transmission control signal 605 becomes "H", the master right request bit MRQ (I) from LS link synchronizing part 700 to the MS link synchronizing part 200 becomes "1" so that the master right is returned to the MS link synchronizing part 200, and the LS link synchronizing part 700 is moved to the state of SL5(a), that is, the state of slave $S_b$.

When the master right is returned to the MS link synchronizing part 200, then the MS link synchronizing part 200 is moved to the master state M(g) again. Here, if a call is generated from the digital trunk 140 within the master switch 100 and one of the digital trunk 140 becomes a master clock, then the busy signal 107 of (j) becomes "L" to thereby produce the state of SM5 (k), while the state M (g) continues in which the MS link synchronizing part 200 holds the master right.

In such state M, if the master right request bit MRQ="0" is transmitted from the LS link synchronizing part 700 to the MS link synchronizing part 200, then the LS link synchronizing part 700 is moved to the state of SL6 (a), that is, the state of slave $S_c$. On the other hand, the MS link synchronizing part 200 waits for a time of SM6 (k) unit the busy signal 107 of (j) turns into "1", which indicates that it is not busy, and if a time of 128 ms has elapsed, that is, the state of SM7 (k), namely, the state of slave $S_1$, has passed, then the MS link synchronizing part 200 transmits the master right specifying bit MCD="0" to the LS link synchronizing part 700, whereby the MS link synchronizing part 200 is moved to the state of SM8 (k), that is, the state of slave $S_2$. On receiving the master right specifying bit MCD="0", the LS link synchronizing part 700 begins to move to the state of SL7 (a), namely, the state (f) of the master $M_L$ again.

Now, in FIG. 2-6, there is shown a circuit diagram of a clock path in the master clock switching sequence. Description will be given below of clock paths occurring in various cases by using the circuit diagram.

If a master clock is present in the master switch 100, then the local switch 600 is in the slave state. In this state, the switch 700-1-SW if the LS link synchronizing part 700-1 is on, the remaining switches 700-2-SW–700-n-SW of the remaining LS link synchronizing part 700-2–700-n are off, the switches 200-1-SW–200-n-SW of the MS link synchronizing part 200-1–200-n are off, only the LS link synchronizing part 700-1 is in the slave $S_b$ or $S_c$ state (FIG. 2-5 (f)), and the remaining LS link synchronizing parts 700-2–700-n are in the slave $S_a$ state (FIG. 2-5 (f)) In this condition, only the LS link synchronizing part 700-1 is able to output the second clock signal 608, while the MS link synchronizing parts 200-1–200-n are in the master M state (FIG. 2-5 (g)).

When the master clock is moved from the master switch 100 to the local switch 600, then the master switch 100 is moved from the master state to the slave state and the local switch 600 is moved from the slave state to the master state. For this reason, in such state moving or changing process, there is produced a mutual synchronizing state in which the master and local switches are synchronized with each other. In such mutual synchronizing state, the switch 700-1-SW is on as well as the switch 200-1-SW is on.

In order that a synchronizing frequency in the mutual synchronizing state may not be dependent on the delay time of the transmission line, the amount of delay is controlled in the MS link synchronizing part 200 in such a manner that one round loop delay in the mutual synchronizing state between the link transmission lines LD and LU is the integral multiple of the cycle of a synchronizing signal in the synchronizing frequency.

For this purpose, in FIG. 2-6 which shows a clock path in a master clock switching sequence, for example, the receiver 200-1-R of the MS link synchronizing part 200-1, on receiving the master right request bit MRQ="0" through the ascending link transmission line LU form the LS link synchronizing part 700-1, performs a delay compensation operation for a time period of 128 m sec. to control the one round loop delay of the link transmission lines LD, LU so that it is an integral multiple of the synchronizing signal cycle. If the loop delay is the integral multiple of the synchronizing signal cycle as a result of the control, then the synchronizing frequency at the mutually synchronizing time between the MS and LS synchronizing parts 200 and 700 is not influenced any more by the delay time of the link transmission lines LD, LU but is equal to the self operating oscillation frequency of the receiver 200-1-R. This means that a deviation from the synchronizing frequency required in the MS and LS link synchronizing parts 200 and 700 is determined, for example, by the accuracy of the self-operating oscillation frequency of the receiver 200-1-R included in the MS link synchronizing part 200-1. In this condition, the MS link synchronizing part 200-1 is moved to the state of the slave S and the LS link synchronizing part 700-1 is changed to the state of the slave $S_c$ (FIG. 2-5).

If the master clock is moved to the LS link synchronizing part 700-1 on the side of the local switch 600 shown in FIG. 2-6, then while the switch 200-1-SW still remains on, the switch 700-1-SW is turned off and the remaining switches still remain off. As a result of this, the first clock signal 6199 of the clock generator 610 is transmitted through the LS link synchronizing part 700-1 by the ascending link transmission line LU, and is received by the receiver 200-1-R, so that the second clock signal 108 is output through the switch 200-1-SW.

The second clock signal 108 is applied to the pulse generator 110 and the first clock signal 1199 synchronized with the second clock signal 108 is output. In this condition, the MS link synchronizing part 200-1 is changed to the state of the slave S: and the LS link synchronizing part 700-1 is changed to the state of the master $M_L$ (FIG. 2-5 (f), (g)).

Due to the fact that, in a process when the master clock is moved from the LS link synchronizing part 700-1 to the MS link synchronizing part 200-1, the LS link synchronizing part 700-1 is changed from the master state to the slave state and the MS link synchronizing part 200-1 is changed from the salve state to the master state, in such process there is produced a mutual synchronized state in which the LS and MS link synchronizing parts are synchronized with each other. In this condition, both switch 200-1-SW and switch 700-1-SW are on simultaneously.

In this condition, since the delay time of the link transmission lines LD and LU has already been made up for by the delay compensation operation up to the state number SM8 or the MS link synchronizing part 200 in FIG. 2-5 (k), the synchronizing frequency of the mutually synchronized state is equal to the self-operation oscillation frequency of the receiver 200-1-R of the MS link synchronizing part 200-1. Here, the MS link synchronizing part 200-1 is changed to the state of the slave $S_2$ and the LS link synchronizing part 700-1 is changed to the state of the slave $S_c$ (FIG. 2-5 (f), (g))

Although the local switch 600 includes a large number of LS link synchronizing parts 700-2-700-n in addition to the above-mentioned LS link synchronizing part 700-1, if the LS link synchronizing part 700-1 is once changed from the state of the slave $S_a$ to the state of the salve $S_b$ to have the access right, then the remaining LS link synchronizing parts 700-2-700-n are not allowed to request the access right because the master right control signal 604 is "L" (FIG. 2-5). In this manner, if only LS link synchronizing part 700 has obtained the access right in the local switch 600, then only the LS link synchronizing part 700 is permitted to receive the master right specifying bit MCD and to transmit the master right request bit MRQ.

Referring now to FIG. 3-1, there is shown a block diagram of the circuits of the clock generator 110. A digital PLL circuit 111 receives a second clock signal 108 of 64 KHz and generates a signal 1159 of 1.024 MHz synchronized with the second clock signal 108 in phase. The signal 1159 is applied to the analog PLL circuit 118 to generate a signal 1189 of 8.192 MHz synchronized with the signal 1159. The signal 1189 is divided in frequency by a ½ frequency divider 1190 so that a signal 1198 of 4.096 MHz is output. Also, the signal 1189 is frequency divided by a ¼ frequency divider so that a first clock signal 1199 of 2.048 MHz is output.

In FIG. 3-2, there is shown a block diagram of circuits included in the digital PLL circuit 111. The second clock signal 108 of 64 KHz and signal 1159 of 1.024 MHz are applied to a phase comparator 1110, which phase comparator compares the signal 1169 with the second clock signal 108 and, when the signal 1169 leads in phase, then outputs a signal 1118 and, when the signal 1169 lags in phase, then outputs a signal 1119. A random walk filter 1120 operating as an integrator, on receiving the two signals 1118, 1119 and the signal 1159 of 1.024 Mhz, outputs a signal 1138 which becomes "H" when the signal 1169 leads in phase and a signal 1139 which becomes "H" when the signal 1169 lags in phase.

A frequency division ratio control circuit 1140, on receiving the signals 1138, 1139 and 1159, outputs a signal 1148 which becomes "H" when the phase leading and lagging occur and a signal 1149 which becomes "L" only when the phase leading occurs, and applies the two signals to a frequency divider circuit 1150.

To the frequency divider circuit 1150, besides the signals 1148 and 1149 which are used to control the frequency division ratio, there is applied a signal of 20.48 MHz from a crystal oscillator 1170. The frequency divider circuit 1150 divides the frequency of the signal 1179 to thereby obtain the signal 1150 of 1.024 MHz. The signal 1159 is further divided in frequency in a frequency divider circuit 1160 to thereby output a signal 1169, which signal 1169 is compared with the second clock signal 108 of 64 KHz in the phase comparator 110. In this manner, the signal 1159 of 1.024 MHz can be obtained synchronized in phase with the second clock signal 108.

Figures 1, 3:
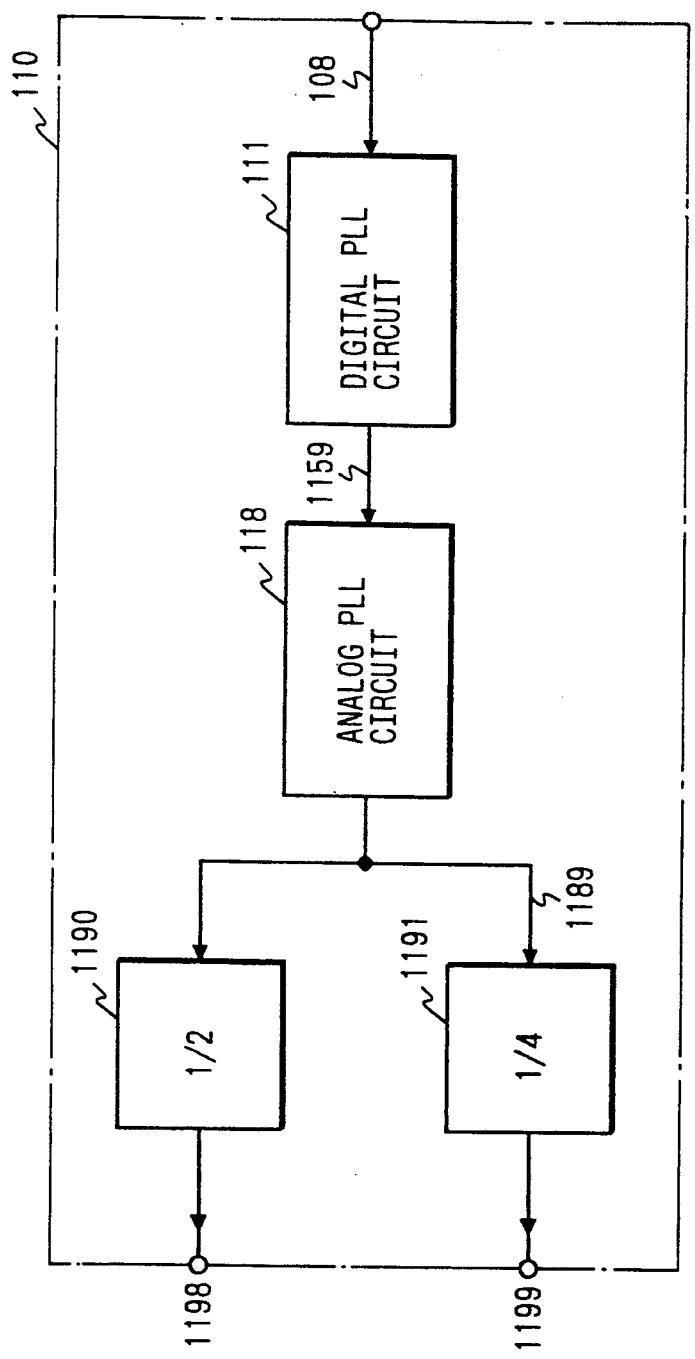
Figures 2, 3:
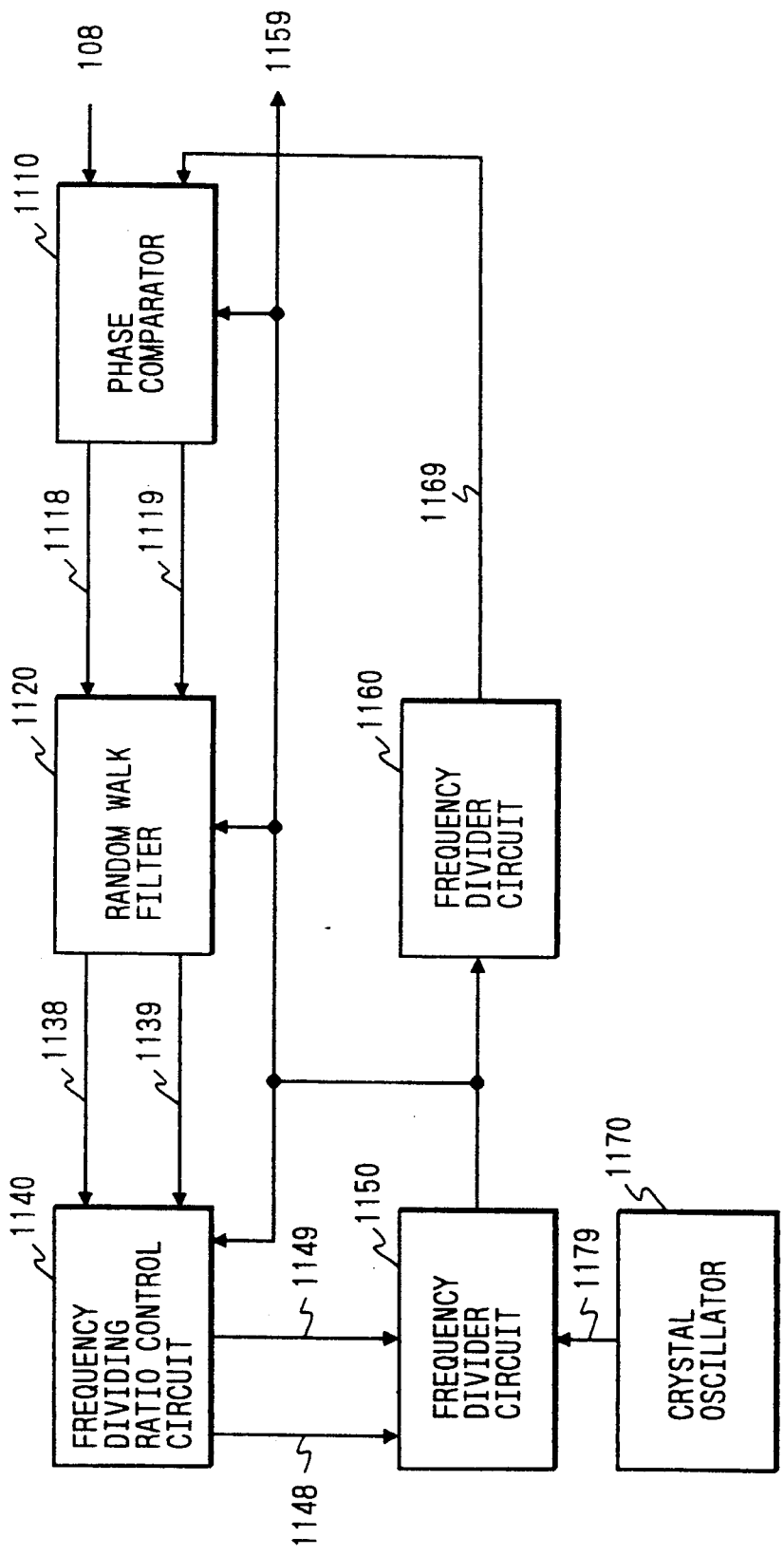
Figures 3, 3A:
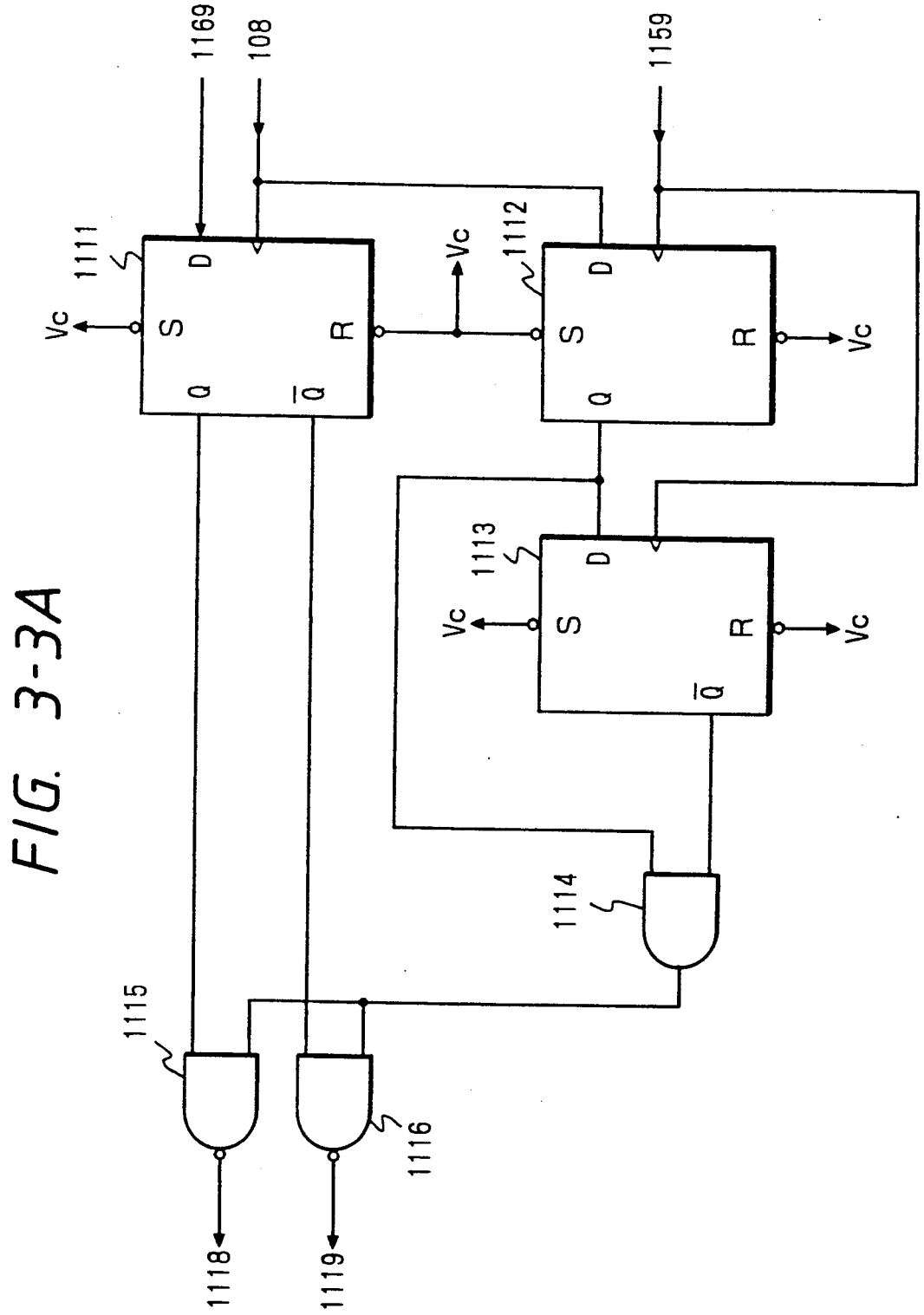

In FIG. 3-3A, there is shown a circuit diagram of a phase comparator 1110. In this figure, reference characters 1111-1113 respectively designate D flip-flops, 1114 stands for an AND gate, and 1115 and 1116 respectively represent NAND gates.

Figures 3, 3B:
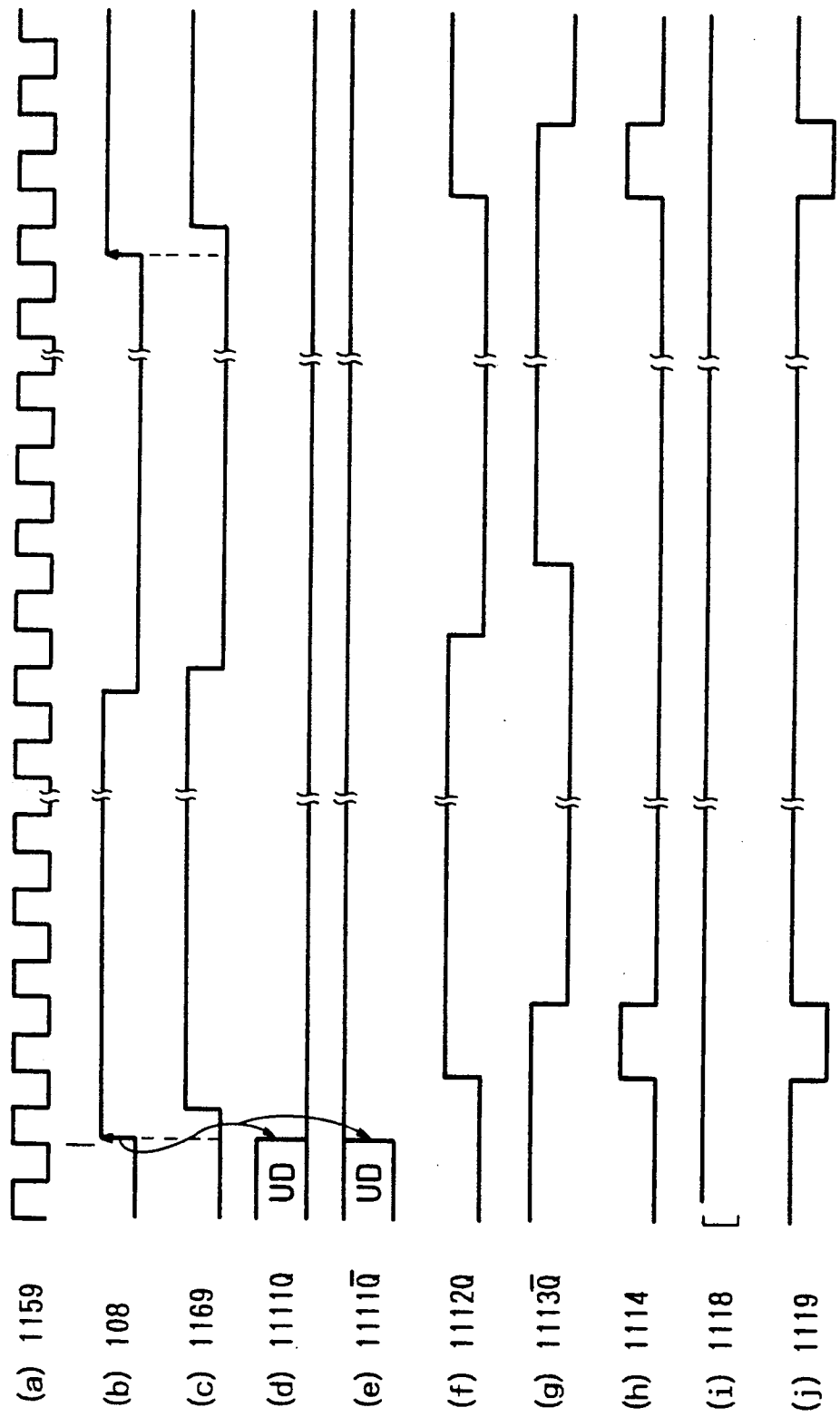

In FIG. 3-3B, there is shown a wave form chart of the wave forms of the respective parts of FIG. 3-3A obtained when the signal 1169 lags the second clock signal 108 in phase. In this figure, (a) shows a signal 1159 of 1.024 MHz, (b) shows a second clock signal 108 of 64 KHz serving as a reference, (c) shows a signal 1169 obtained by dividing the frequency of the signal 1159 of (a) into a sixteenth, (d) shows the Q output of the D flip-flop 1111, (e) shows the NOT Q output of the D flip-flop 1111, (f) shows the Q output of the D flip-flop 1112, (g) shows the NOT Q output of the D flip-flop 1113, (h) shows the output of the AND gate 1114, and (i) and (j) respectively show signals 1118 and 1119 which are respectively the outputs of the NAND gates 1115 and 1116. If sampled at the rising of the second clock signal 108 (b), then values, which have been showing the indefinite values UD of the 111Q NOT Q of (d) and (e) so far, are respectively determined to "L" and "H".

Figures 3, 4, 4A:
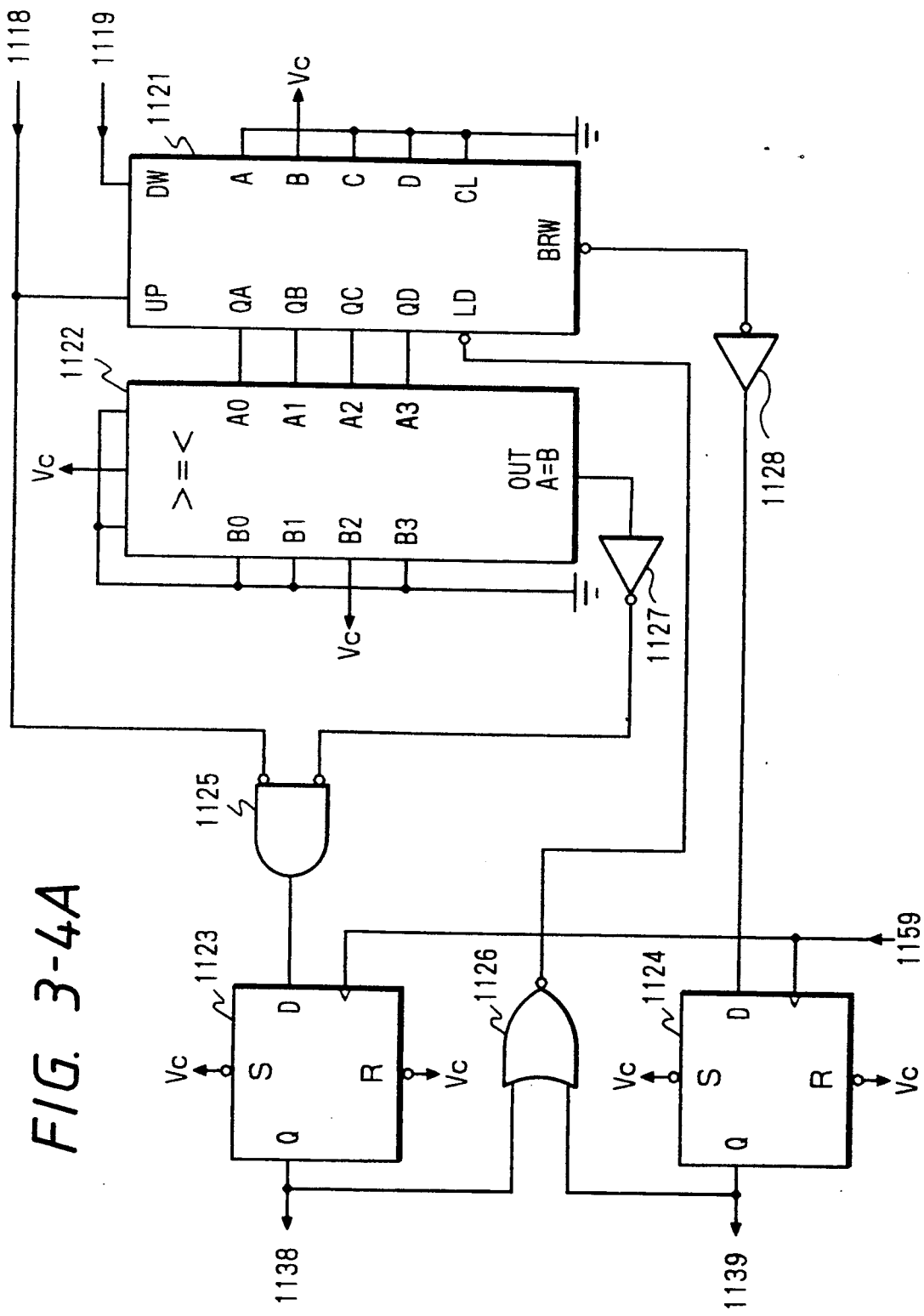

In FIG. 3-4A, there is shown a circuit diagram of the random walk filter 1120 shown in FIG. 3-2. In this figure, 1121 designates an up/down counter. The up/down counter 1121 has a down terminal DW to which the signal 1119 is applied, and an up terminal UP to which the signal 1118 is applied. The up/down counter 1121 also has a borrow terminal BRW and an output from the borrow terminal BRW is applied through an invertor 1128 to the data terminal D of a D flip-flop 1124. Further, the outputs QA-QD of the up/down counter 1121 are applied to a comparator 1122. To the load terminal LD of the up/down counter 1121 is applied the output of a NOR gate 1126. In the comparator 1122, the values of input terminals A0-A3 are compared with those of input terminals B0-B3. When A=B, then an output is applied to a D flip-flop 1123 through a NOR gate 1125 to which the signal 1118 is being applied through an invertor 1127. Signals 1138 and 1139 which are the outputs of the D flip-flops 1123 and 1124 are respectively applied to the NOR gate 1126.

Figures 3, 4, 4B:
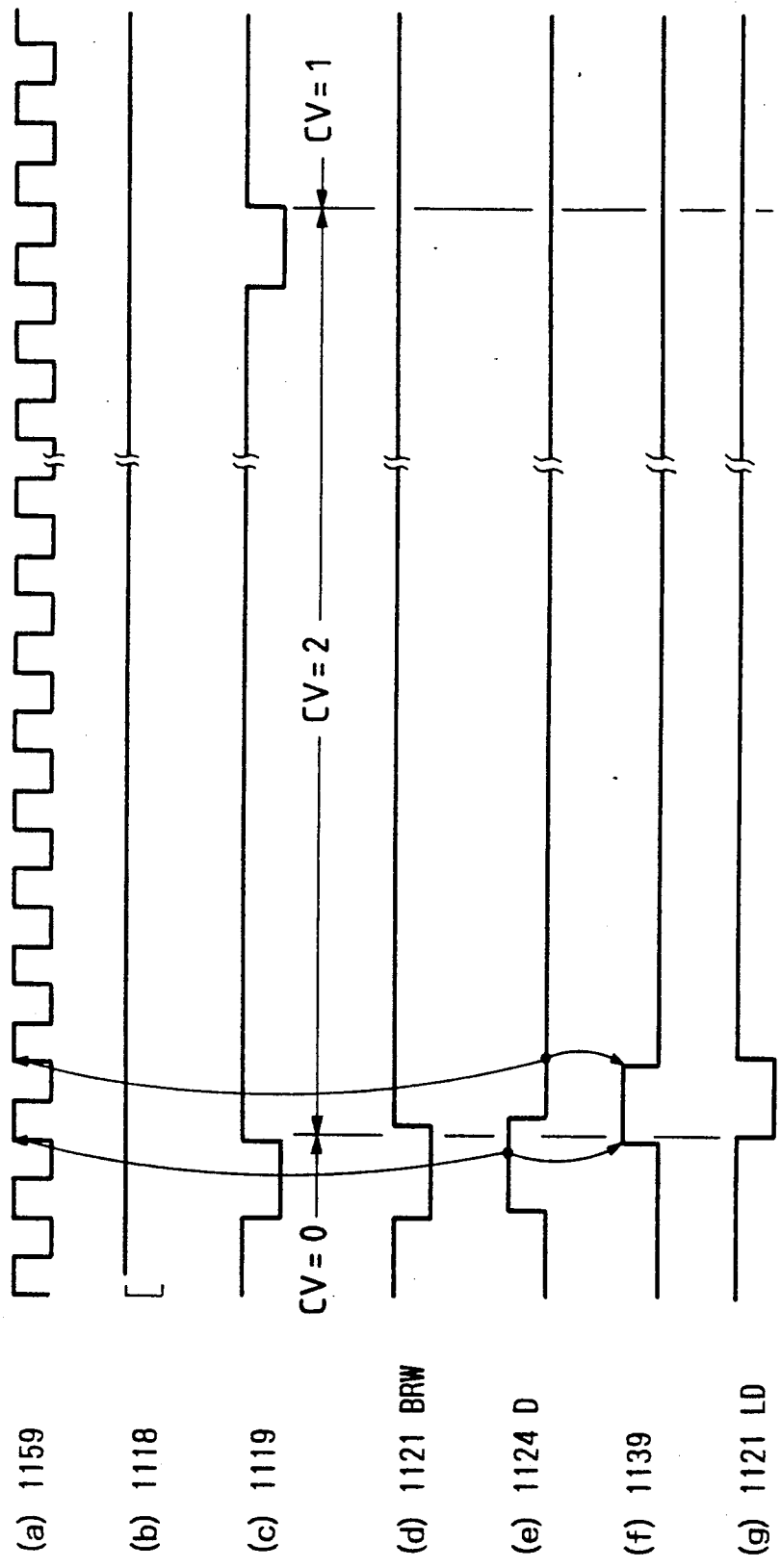

If FIG. 3-4B, there is shown a wave form chart of the wave forms of the respective parts shown in FIG. 3-4A obtained when the signal 1169 lags the second clock signal 108 in phase. In this figure, (a) shows a signal 1158, (b) shows a signal 1118, (c) shows a signal 1119, (d) shows the wave form of the borrow terminal BRW of the up/down counter 1121, (e) shows the wave form of the data terminal D of the D flip-flop 1124, (f) shows the wave form of the signal 1139, and (g) shows the wave form of the load terminal of the up/down counter 1121. When the signal 1119 of (c) turns from "H" to "L" and then turns again to "H", then a count value (the value of QA-QD) CV turns from 0 to 2. Next, when the signal 1119 turns from "H" to "L" and then turns again to "H", then the count value CV turns to 1.

Figures 1A, 8:
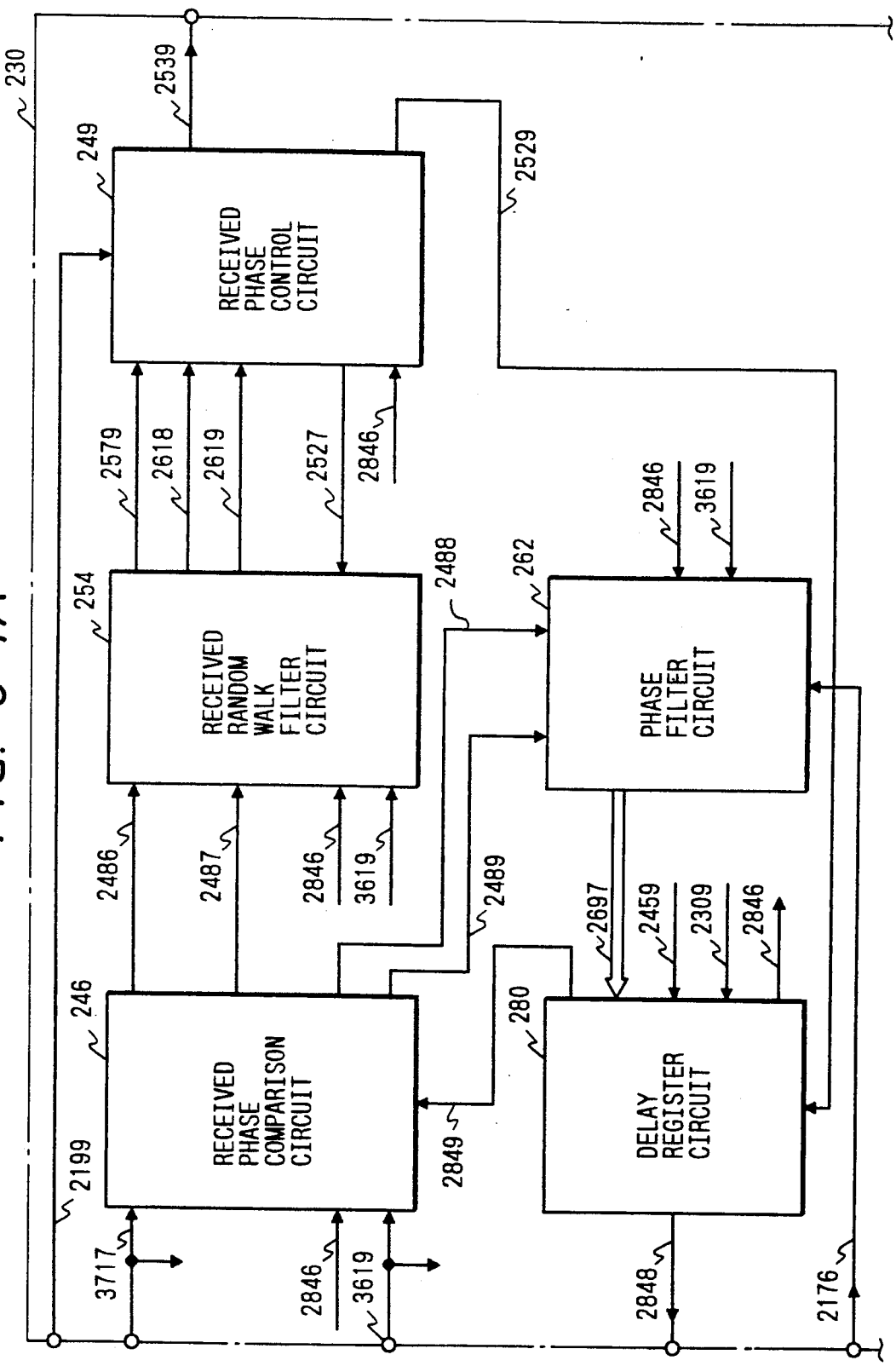
Figures 1B, 8:
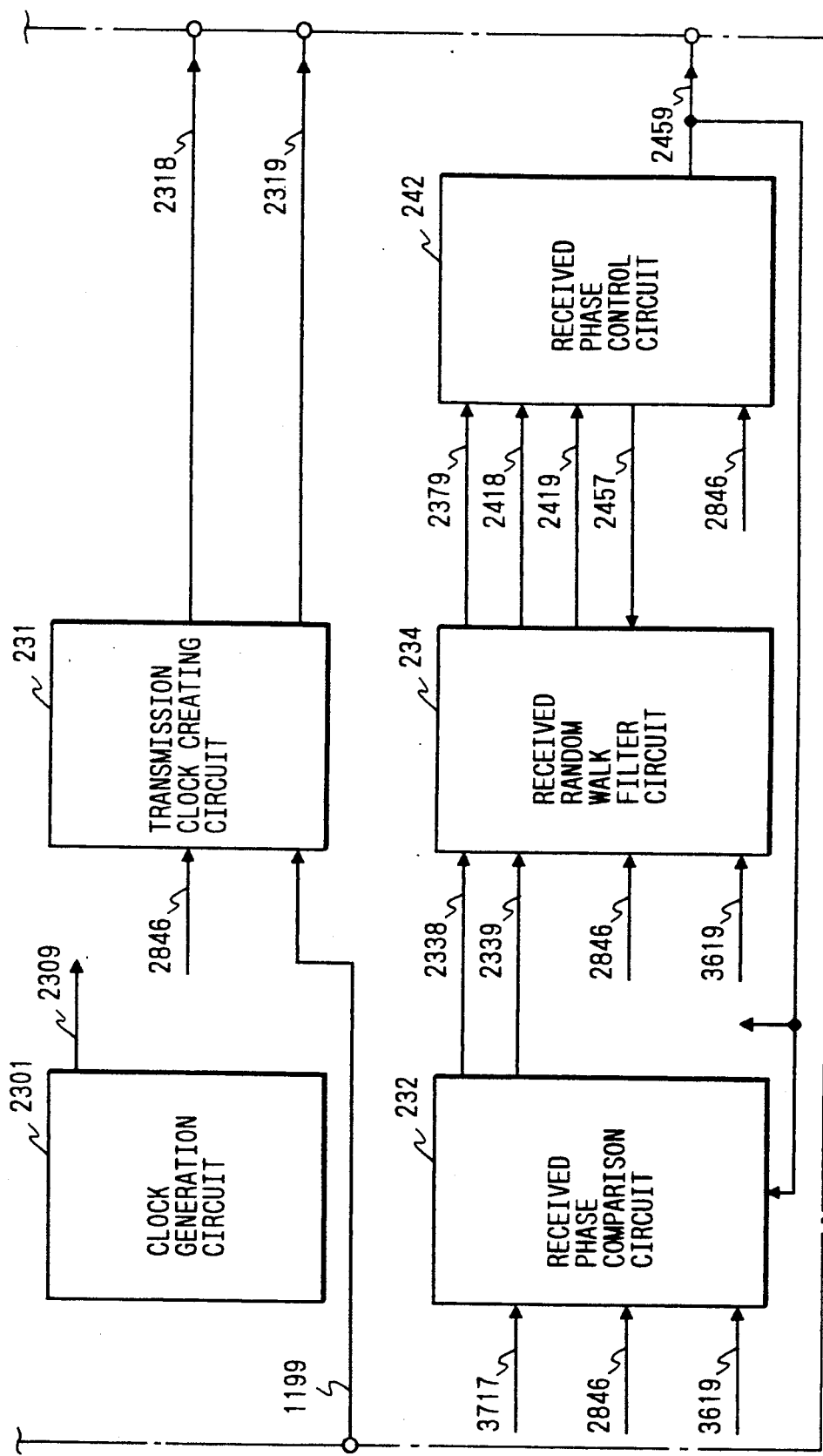
Figures 2A, 8:
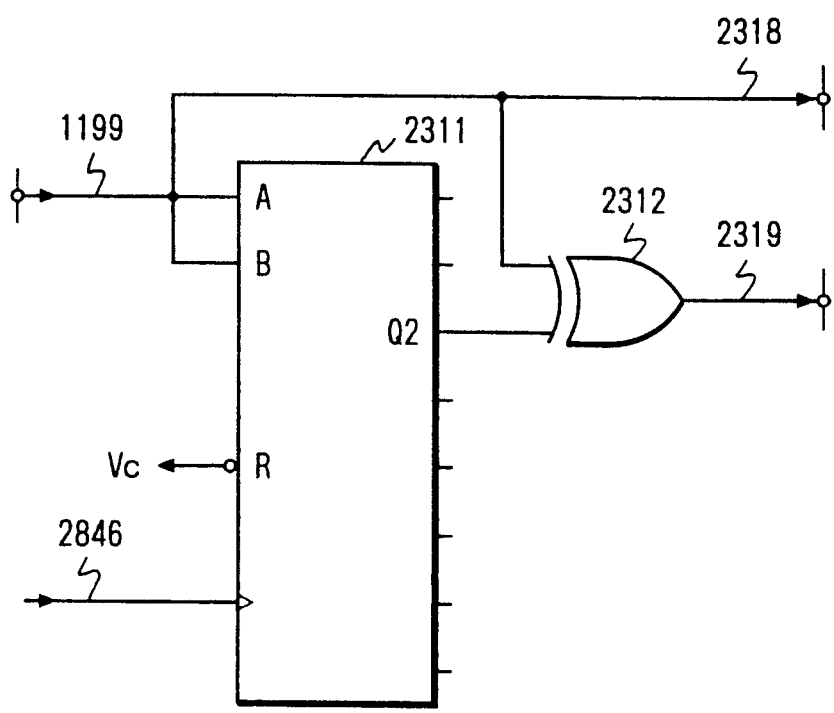
Figures 2B, 8:
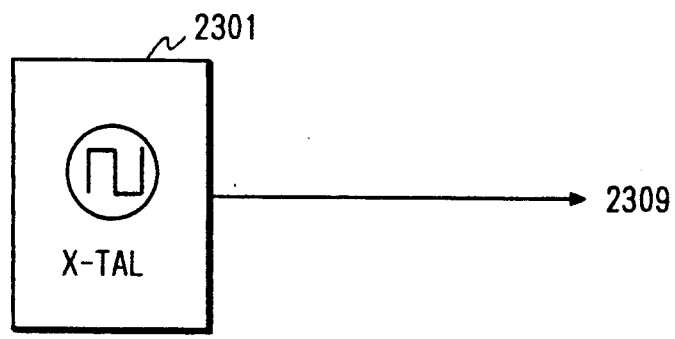
Figures 3, 8:
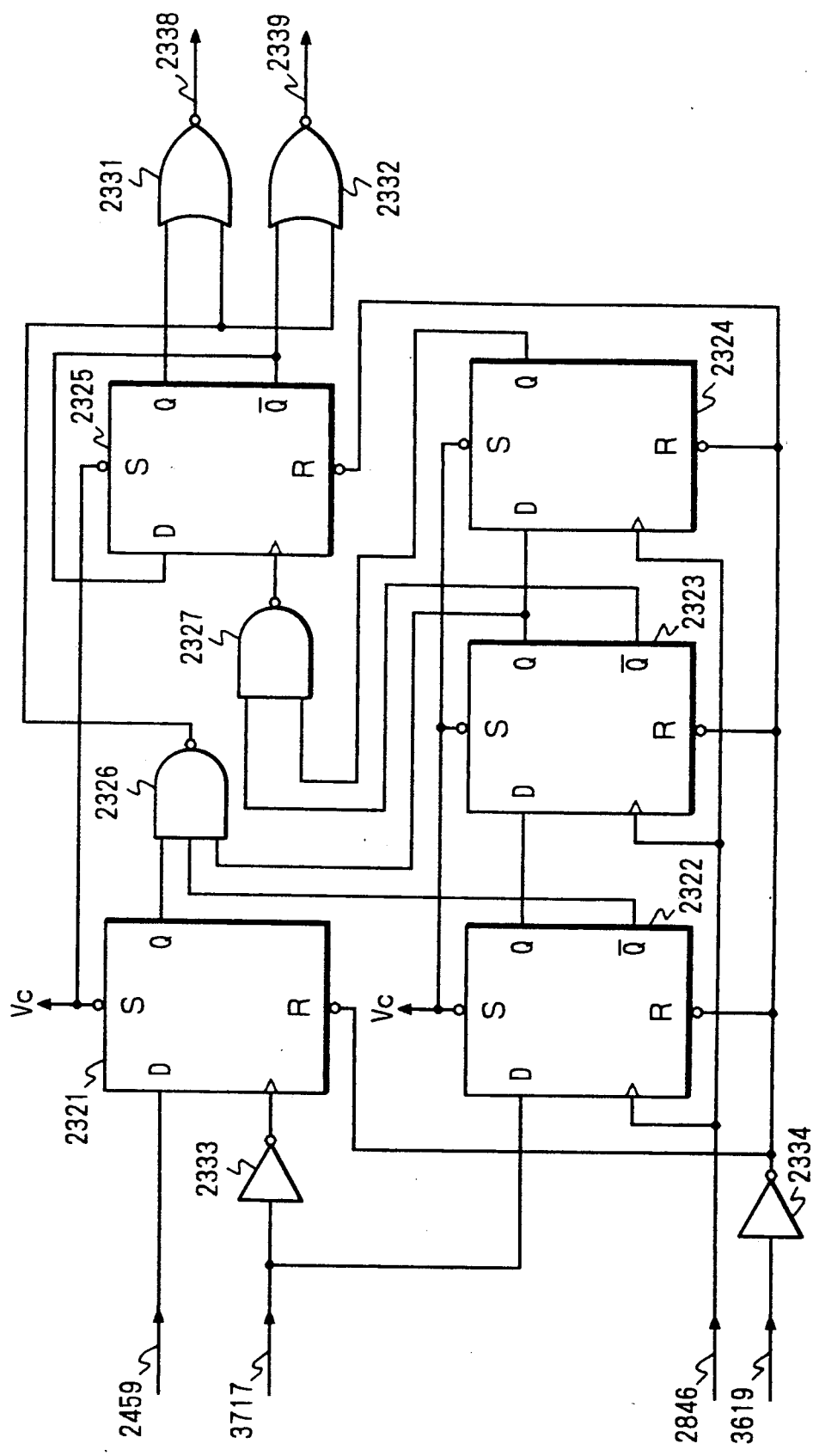
Figures 4A, 8:
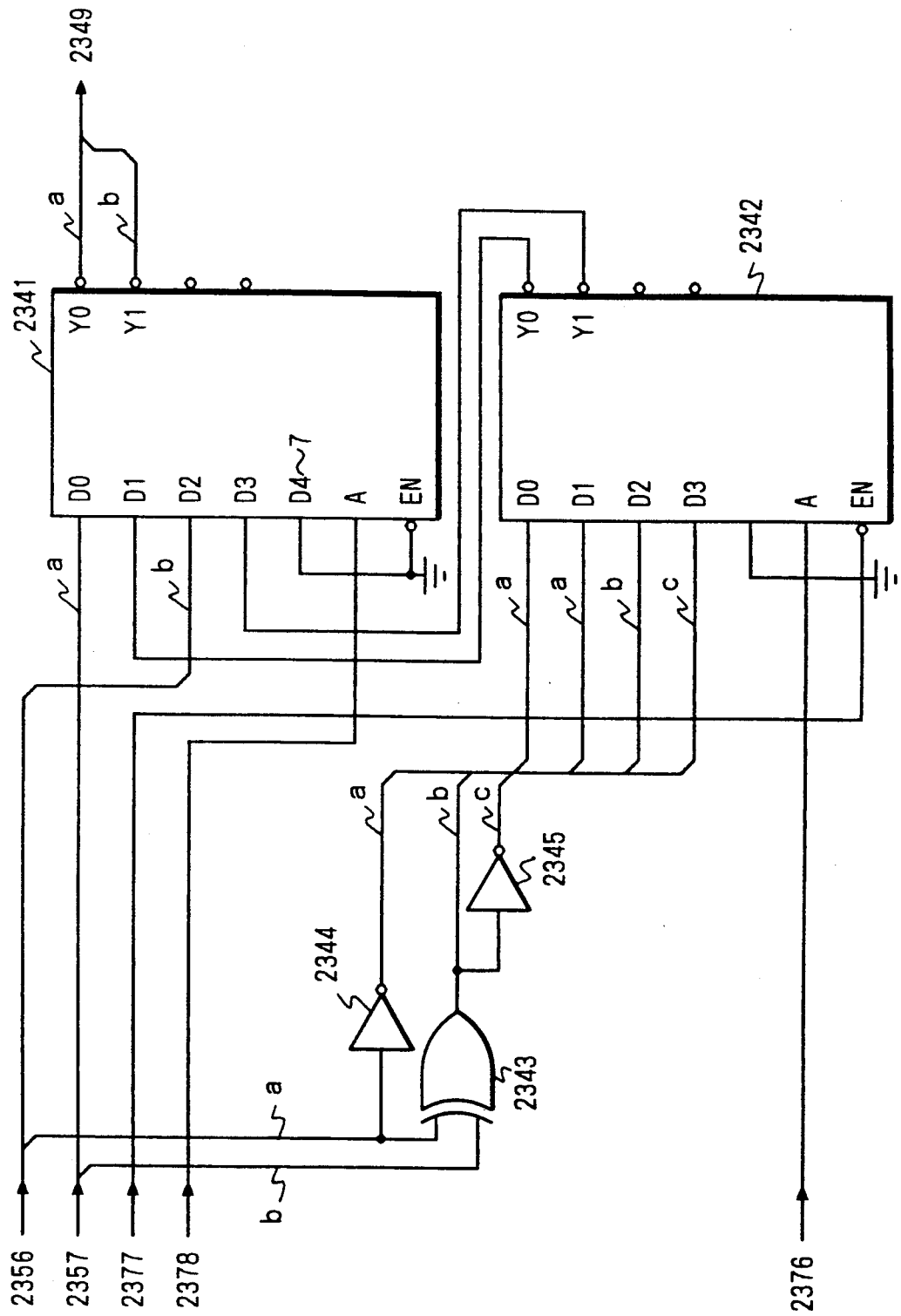
Figures 4B, 8:
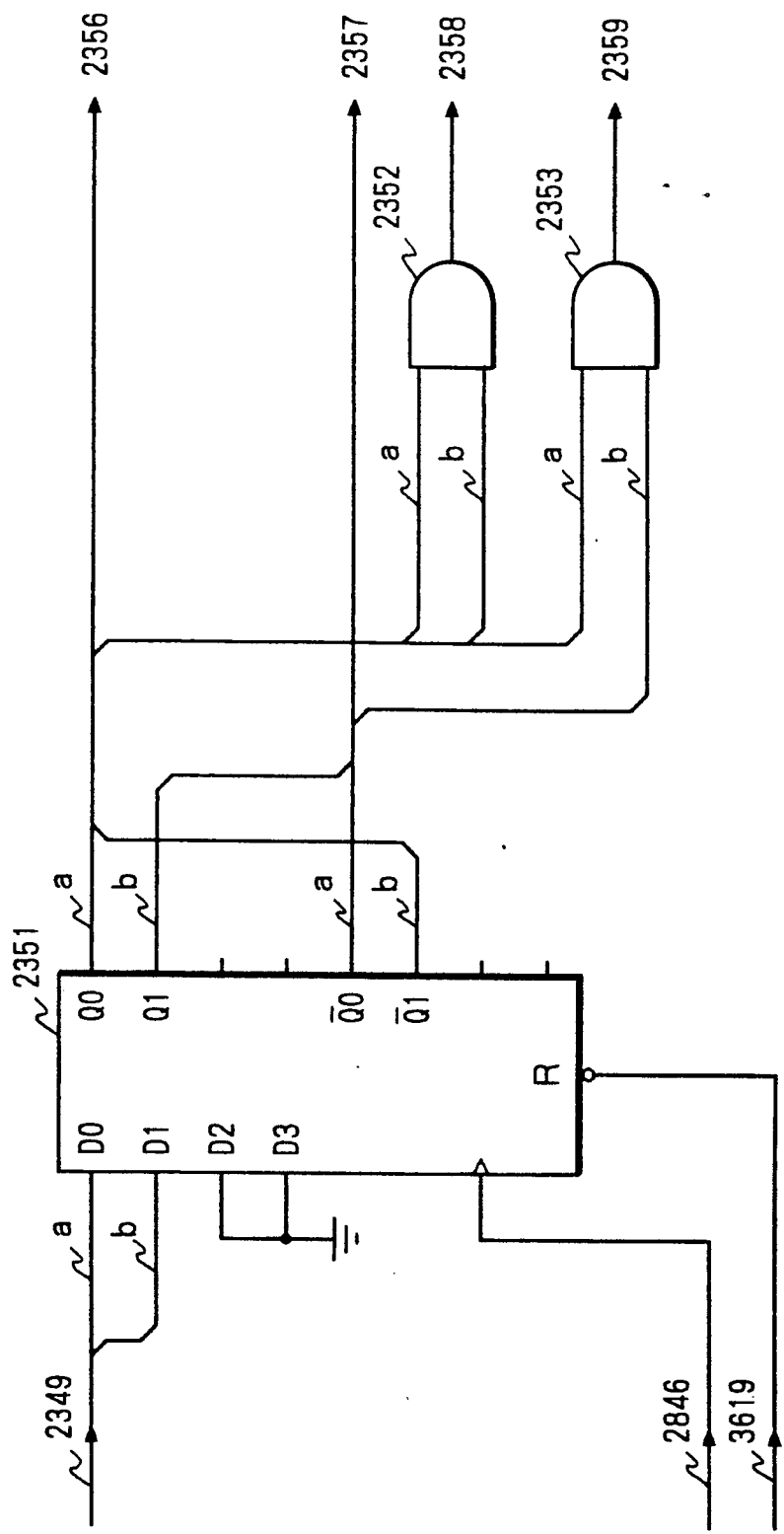
Figures 4C, 8:
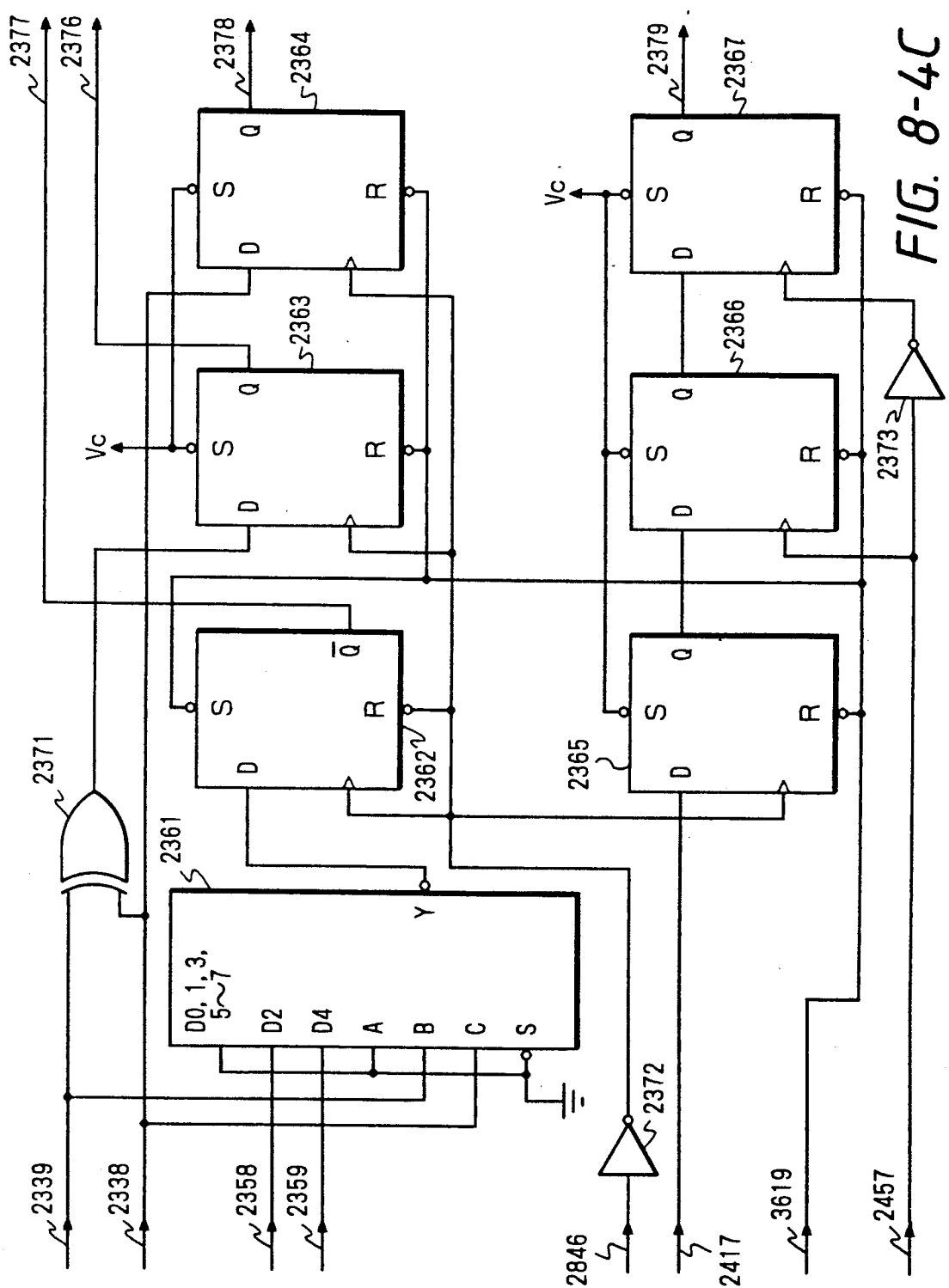
Figures 4D, 8:
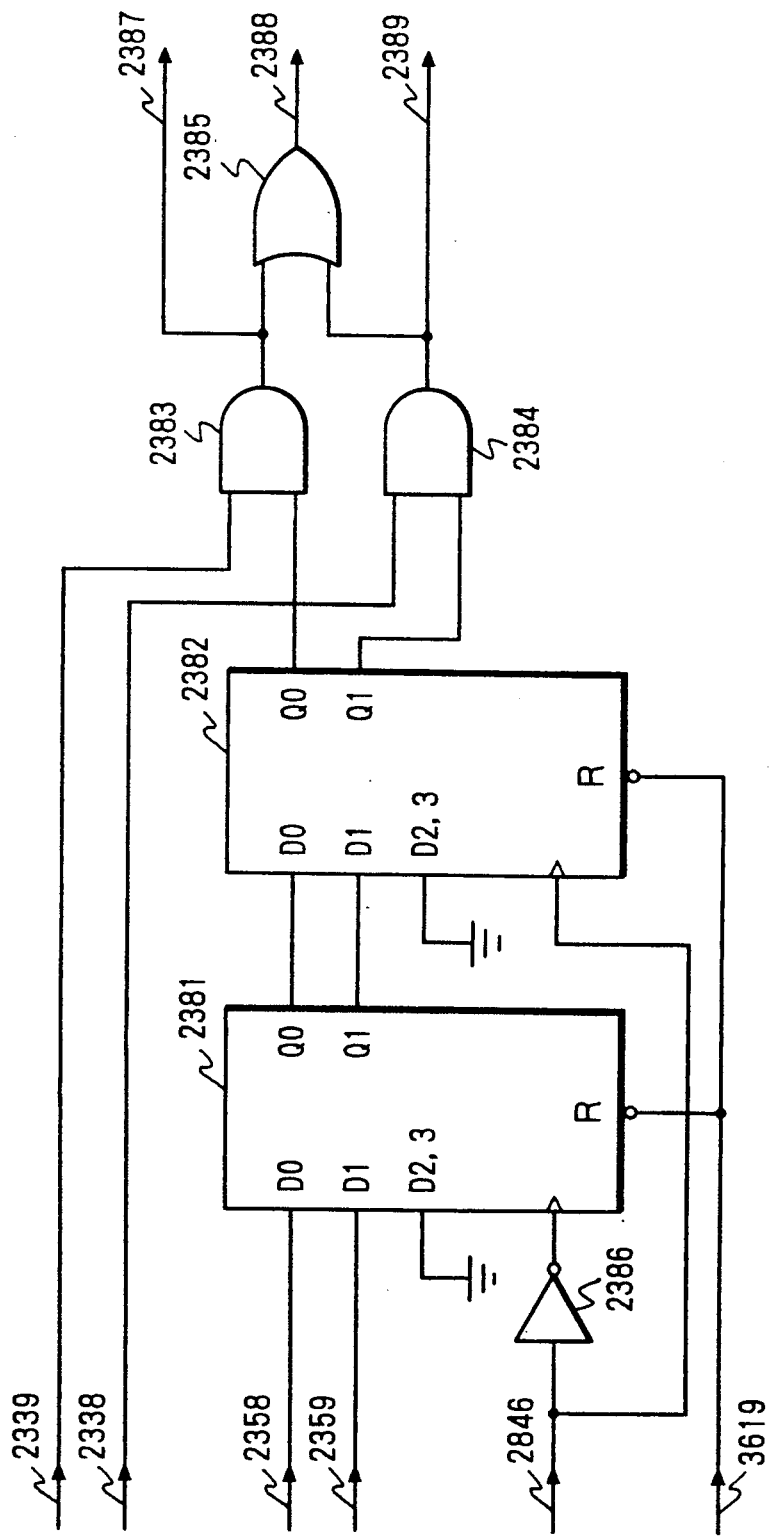

In FIG. 3-4C, there is shown a wave form chart of the wave forms of the respective parts shown in FIG. 3-4A obtained when the signal 1169 leads the second clock signal 108 in phase. In this figure, (a), (b), (c) and (g) respectively show the same signals as shown in (a), (b),(c) and (g) in FIG. 3-4B. (d) of FIG. 3-4C represents the output A=B of the comparator 1122, (e) shows the wave form of the data terminal D of the D flip-flop 1123, and (f) illustrates the wave form of the signal 1138. When the signal 1118 of (b) turns from "H" to "L" and then turns again to "H", then the counter value (the value of QA-QD) CV turns from 3 to 4. Next, when the signal 1118 turns from "H" to "L" and then again to "H", then the count value CV becomes 2.

Referring now to FIG. 3-5A, there is shown a circuit diagram of the frequency division ratio control circuit 140 and the two frequency divider circuits 1150 and 1160 shown in FIG. 3-2. The frequency dividing ratio control circuit 140 includes AND gates 1141, 1142, an OR gate 1143, and an invertor 1144. The frequency divider circuit 1150 includes a counter 1151, a D flip-flop 1152, and an invertor 1153, while the frequency divider circuit 1160 consists of a counter.

In FIG. 3-5B, there is shown a wave form of chart of the wave forms of the respective circuit shown in FIG. 3-5A when the signal 1169 leads the second clock signal 108 in phase. In this figure, (a) shows a signal 1179, (b) shows the wave form of the carry terminal CRY of the counter 1151 and the count value CV of the counter 1151, (c) shows a signal 1159, (d) shows the signal 1138, (e) shows a signal 1139, (f) shows a signal 1148, and (g) shows a signal 1149. Here, if the signal of the carry terminal CRY turns to "H" and remains "H" for a cycle of the signal 1179 of (a) when the count value of the counter 1151 of (b) is CV=15, then 6 is loaded to the load terminal LD of the counter 1151 so that CV=6 is obtained. Next, immediately after CV=15, 5 is loaded to thereby provide CV=5. After then, immediately after CV=15, 6 is loaded to thereby provide CV=6. At that time, it is shown in this figure that the signal 1159 of (c) lags an accurate time position shown by a broken line by a time $t_d$ of a cycle of the signal 1179 of (a).

FIG. 3-5C corresponds to FIG. 3-5B but the former is different from the latter in that the former shows the operations of the respective circuits when the signal 1169 lags the second clock signal 108 in phase. In this figure, it is shown that the signal 1159 of (c) leads by a time $t_p$ an accurate time position shown by a broken line.

In FIG. 3-6, there is shown a circuit diagram of the analog PLL circuit 118, ½ frequency divider 1190 and ¼ frequency divider 1191 respectively shown in FIG. 3-1. The analog PLL circuit 118 comprises an analog PLL 1180 (for example, 74HC4046), a ½ frequency divider 1181, resistors 1182-1184, and capacitors 1185, 1186. A signal 1189 output from the output terminal VO of the analog PLL 1180 has a frequency of 8.192 MHz. The signal 1189 of 8.192 MHz is frequency divided by the ½ frequency diver 1190 to provide a signal 1198 of 4.096 MHz. Also, the signal 1189 of 8.192 MHz is frequency divided by the ¼ frequency divider 1191 to provide a first clock signal of 2.048 MHz.

Referring now FIG. 4-1, there is shown a circuit diagram of a digital trunk 140. In this figure, there is shown a digital line interface 141 to which are connected an output DO for a digital line and an input DI from the digital line. Also, to the digital line interface 141 there are applied a frame signal 102, a PCM input signal 103 from the highway switch 101, a first clock signal 1199 of 2.048 MHz and a reset signal 109. Further, the digital line interface 141 outputs a PCM output signal 1421 to the highway switch 101, a signal 1432 having a cycle of a clock of 64 KHz selected from the input DI of the digital line, and a synchronizing signal 1427 having a cycle of the frame signal.

A starting pulse creating circuit 145 receives a first clock signal 1199, a frame signal 102 and a reset signal 109, and generates the same starting pulse signal 1479 as shown in FIG. 2-3 at a timing determined by the identification numbers PN 0-7.

A trunk arbiter 151, to which are applied the signals 1432, 1427 and 1479, busy signal 107 and reset signal 109, judges whether its own clock source can be a master clock or not and outputs a signal 1528 for displaying a busy state by turning a signal 1529 for a master clock and the busy signal 107 to "L".

In FIG. 4-2, there is shown a circuit diagram of the digital line interface 141. A driver/receiver circuit 1413 (EN101A manufactured by Anritsu) transmits signals in the code of AMI (Alternate Mark Inversion) from its output terminals TA, TB to the output DO of the digital line, and receives the input DI from the digital line in the code of AMI at its input terminals RA, RB. A signal processor 1412 (HD81501 manufactured by Hitachi) converts a signal, which is applied to its input terminal TB from a B channel interface 1411, to the AMI code and transmits it in the form of two signals 1423, 1424 from the two output terminals TAMIP, TAMIN thereof. These two signals are applied to the input terminals TD+, TD− of the driver/receiver circuit 1413, and are then transmitted to the output DO of the digital line.

The AMI signals received by the driver/receiver circuit 1413 through the input DI of the digital line are transmitted as signals 1429, 1430 through the output terminals RD+, RD−, which signals are in turn received by the signal processor 1412 at the input terminals thereof RAMIP, RAMIN and are then transmitted from the output terminal RB as a signal 1425. The signal 1425 is received by the B channel interface 1411 and is then output by the B channel interface 1411 to the highway switch 101 as a signal 1421 using a time slot allocated.

A PCM input signal 103 from the highway switch 101 is received by the B channel interface 1411, which takes out a signal stored in a time slot allocated and transmits it as a signal 1422 to the signal processor 1412.

On detecting that the power supply is put to work, the driver/receiver 1413 transmits a signal 1431 from the output terminal LPD to the input terminal VDET of the signal processor 1412, whereby the signal processor 1412 knows that the power supply is put work, and is started.

The B channel interface 1411 and signal processor 1412 both start their respective operations after receiving the reset signal 109, and the signal processor 1412 transmits from the output terminal SY thereof a signal 1427 to indicate that synchronism has been established when it is synchronized with a signal from the input DI of the digital line. The signal processor 1412 also selects a signal 1426 of 8 KHz and a signal 1428 of 128 KHz out of signals transmitted from the input DI of the digital line, and divides the frequency of the signal 1428 by a ½ frequency divider 1414 to output a signal 1432 of 64 KHz.

In order to take out a signal from the allocated time slot or to insert a signal into the allocated time slot, the B channel interface uses the frame signal 102, first clock signal 1199 of 2.048 MHz, signal 1428 of 128 KHz and signal 1426 of 8 KHz.

In FIG. 4-3, there is shown the starting pulse creating circuit 145. In this figure, there are used counters 1451, 1452, a D flip-flop 1453, exclusive NOR gates 1460-1467, a NAND gate 1454 and an inverter 1455. After the reset signal 109 is received, with the frame signal 102 as a reference, the first clock 1199 is counted by the two counters in order to obtain a timing determined by the identification numbers PN 0-7, 7, and the starting pulse signal 1479 is output at a given timing from the D flip-flop 1453 (see FIGS. 2-3, 2-4).

In FIG. 4-4, there is shown a circuit diagram of the trunk arbiter 151. In this figure, there are included a J-K flip-flop 1511, AND gates 1512, 1513, 1514, and an inverter 1515. The trunk arbiter 151 receives the busy signal 107, a signal 1427 indicating a synchronized state, the starting pulse signal 1479, and the reset signal 109 and, when the busy signal 107 is "H" and is synchronized, the trunk arbiter 151 transmits a signal 1528 to turn the busy signal 107 to "L" and a signal 1529 which provides the second clock signal 108.

Figures 2, 3, 4, 5:
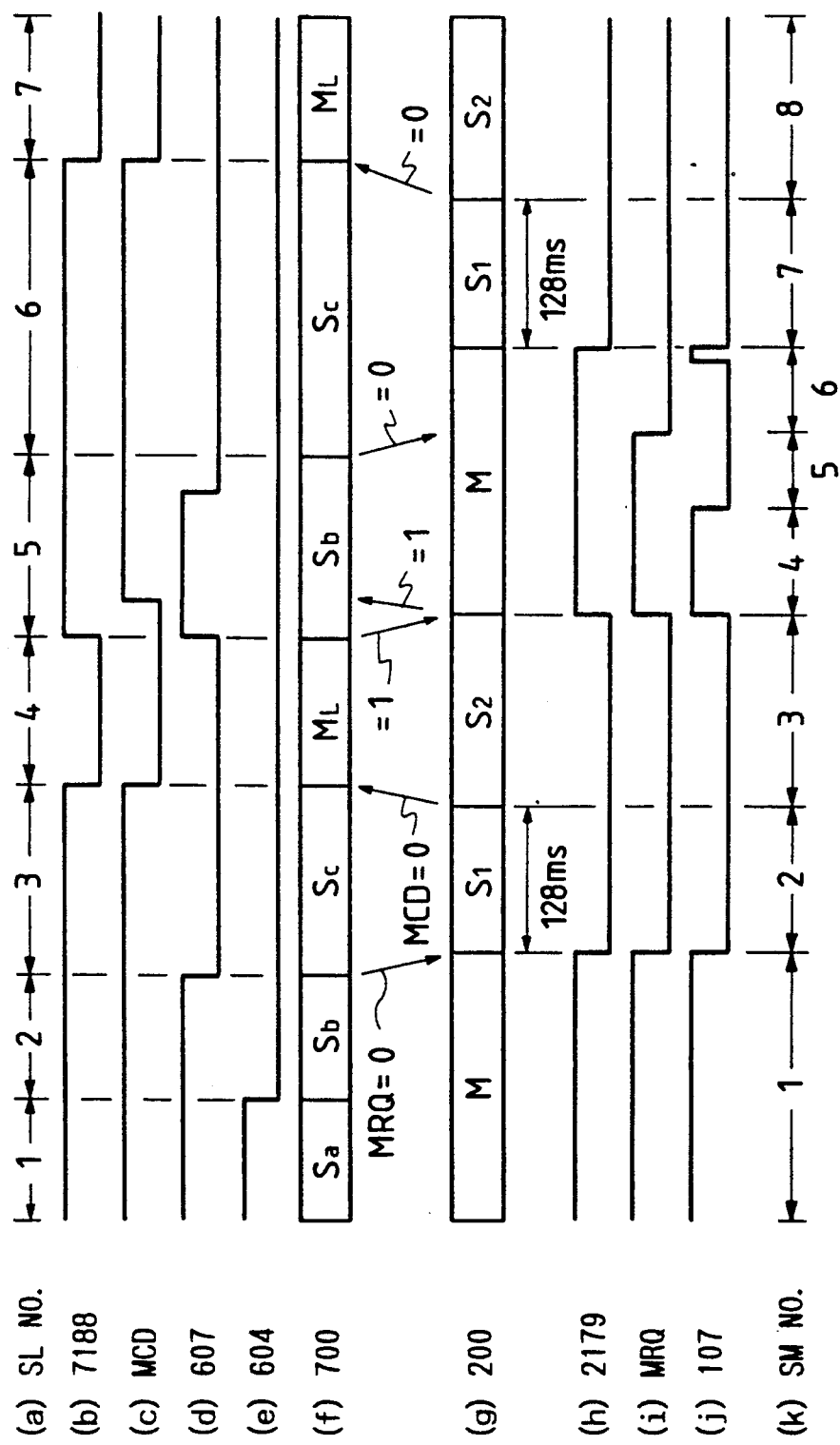

Referring now to FIGS. 5-1A through 5-1C, there is shown the structure of the MS link synchronizing part 200. In this figure, the MS link synchronizing part 200 includes an MS arbiter circuit 210, a starting pulse creating circuit 220, an MS bit synchronizing circuit 230, a frame synchronizing circuit 310, a synchronized state circuit 320, a transmitter circuit 330, a transmission timing creating circuit 350, a transmission code converter circuit 360, a received code converter circuit 370, a receiving timing creating circuit 380 and a receiving buffer circuit 400 together with a large number of input and output signals.

Figures 1A, 5:
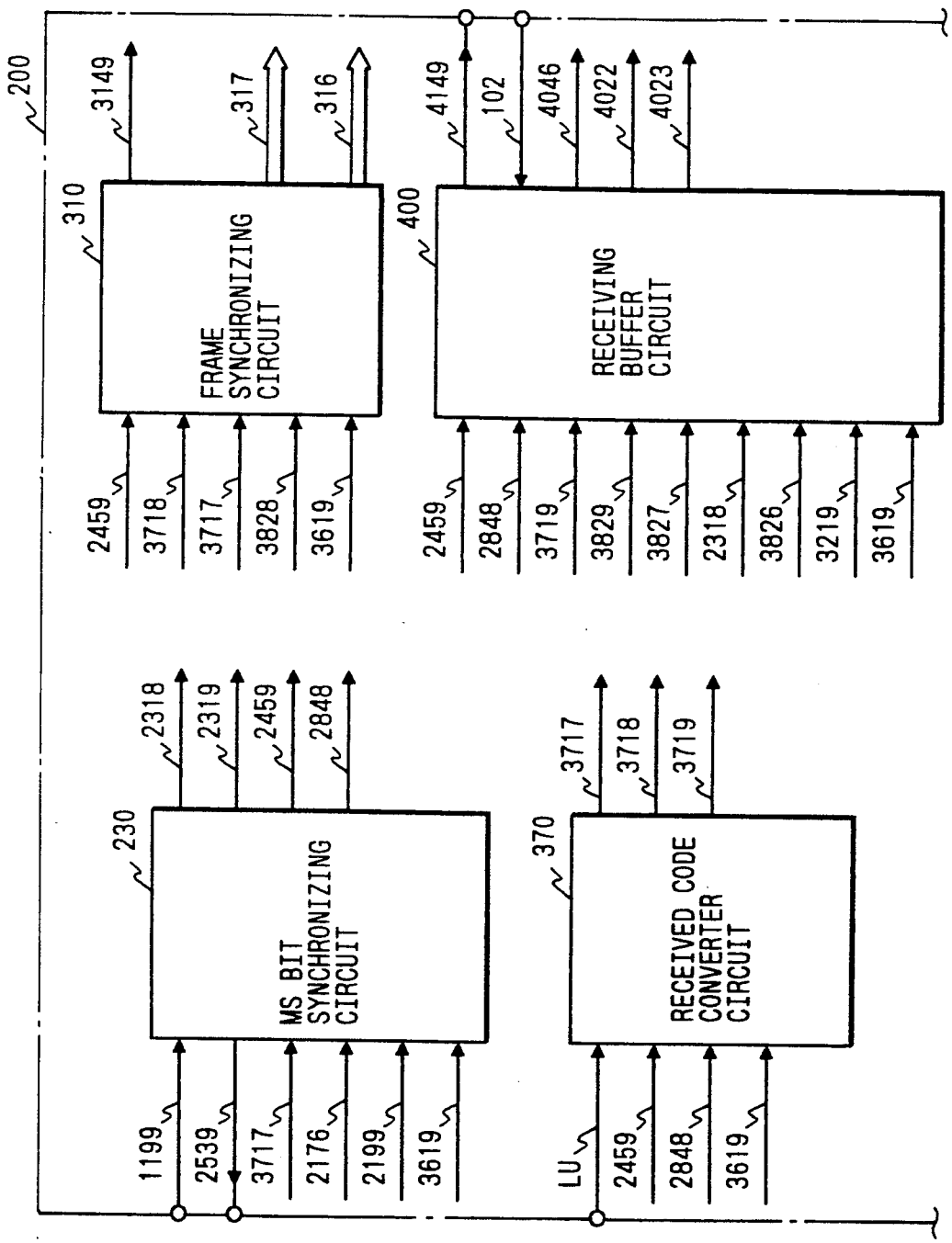
Figures 1B, 5:
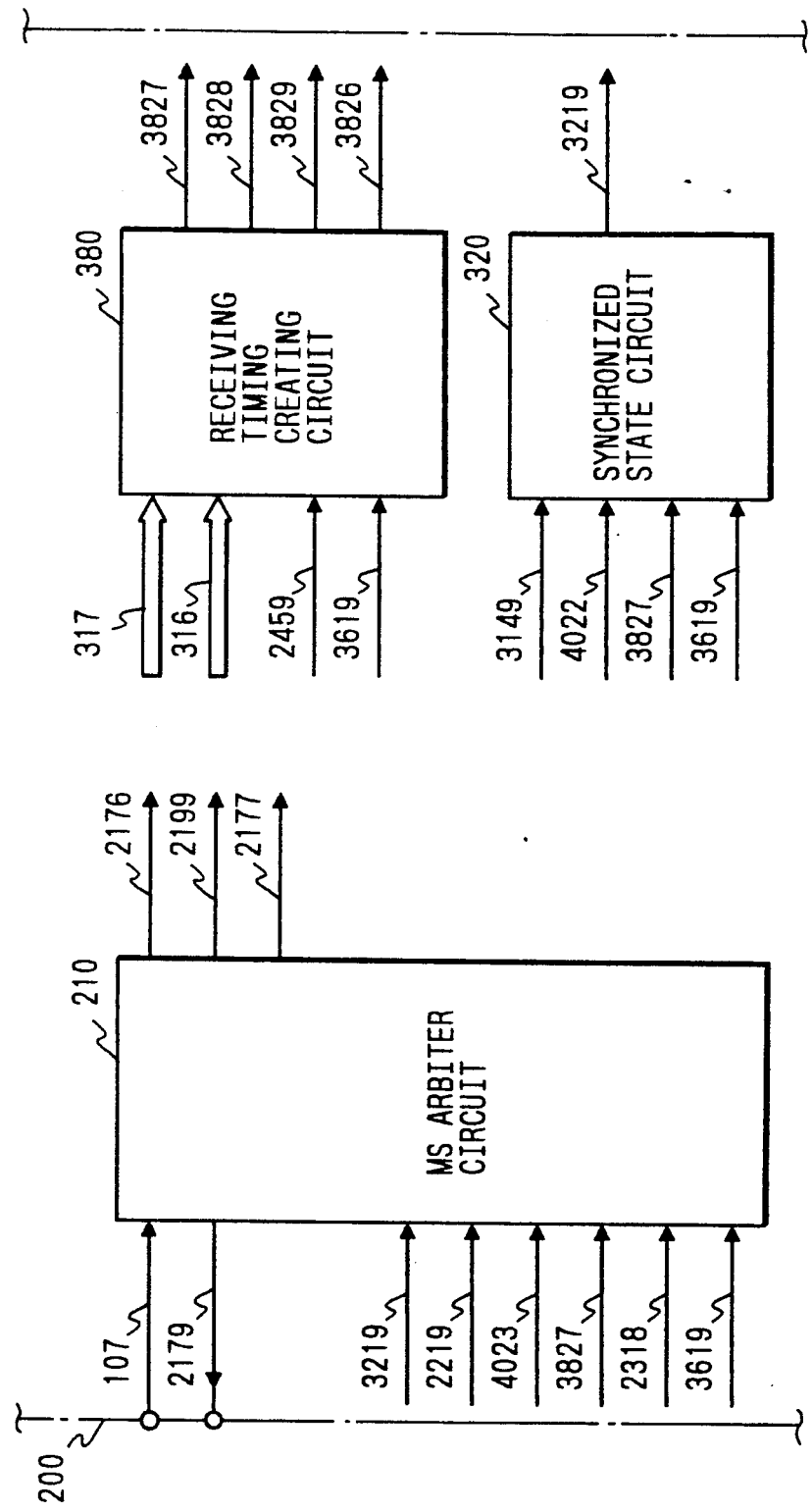
Figures 2A, 5:
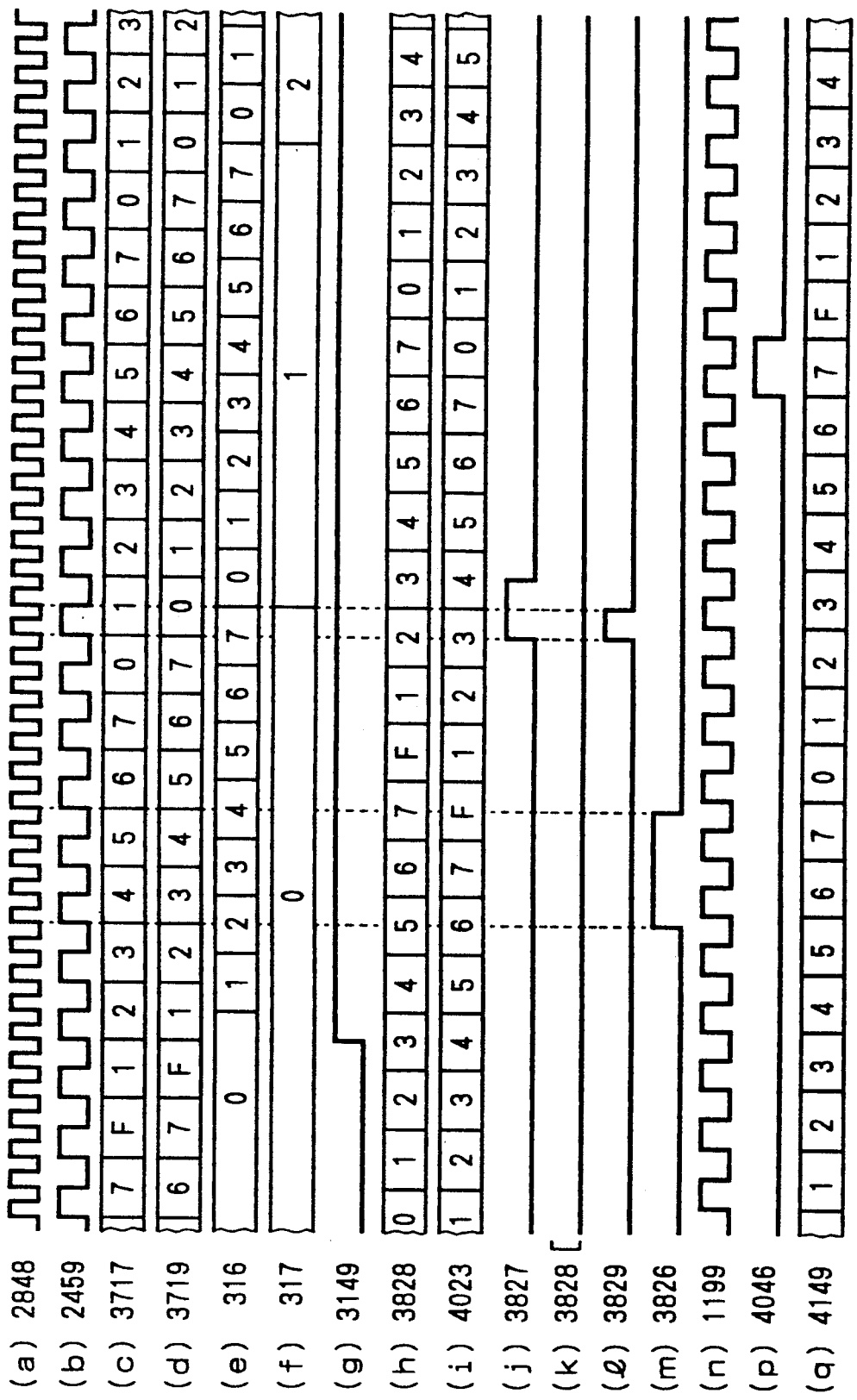
Figures 2B, 5:
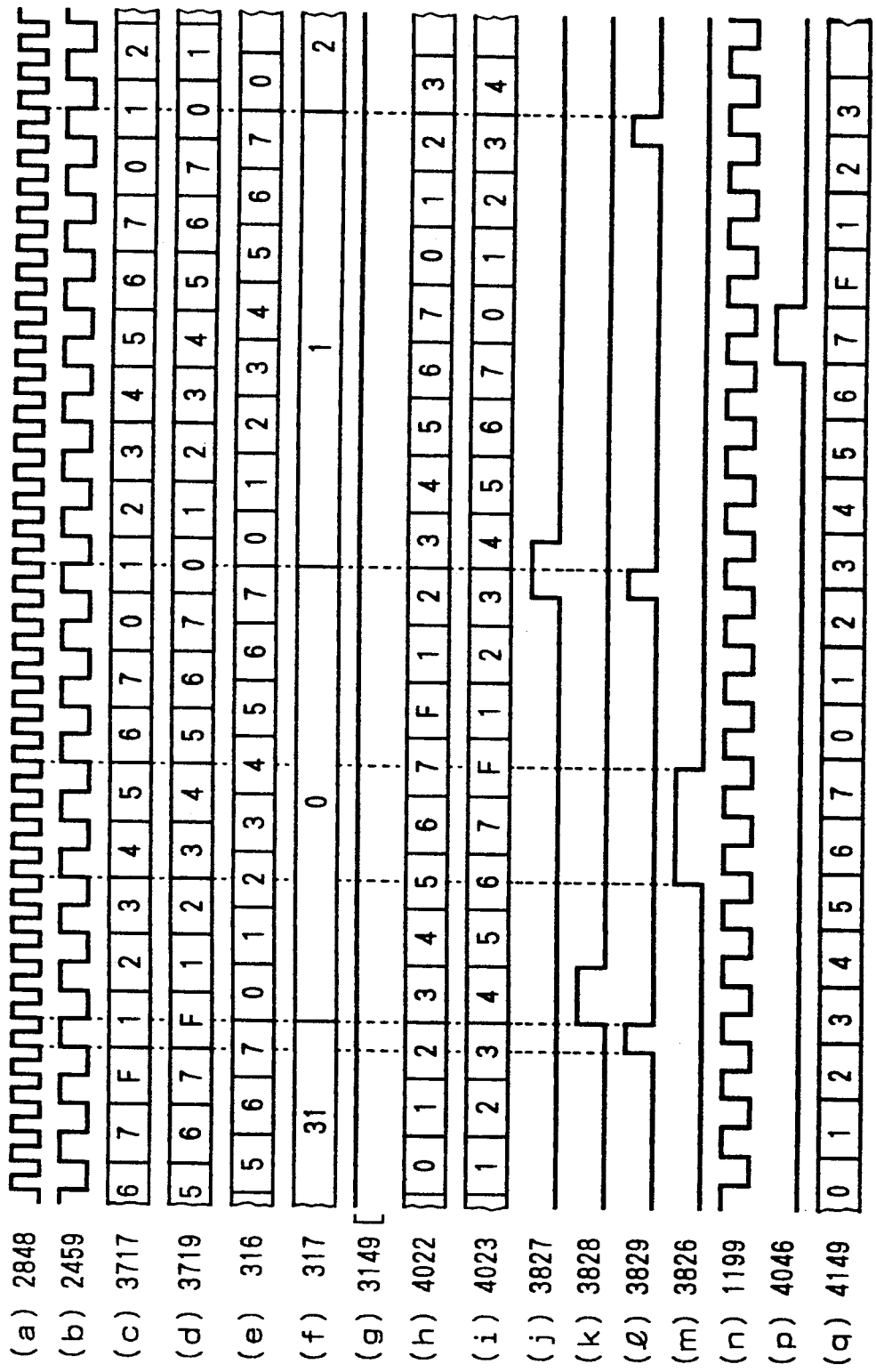
Figures 2C, 5:
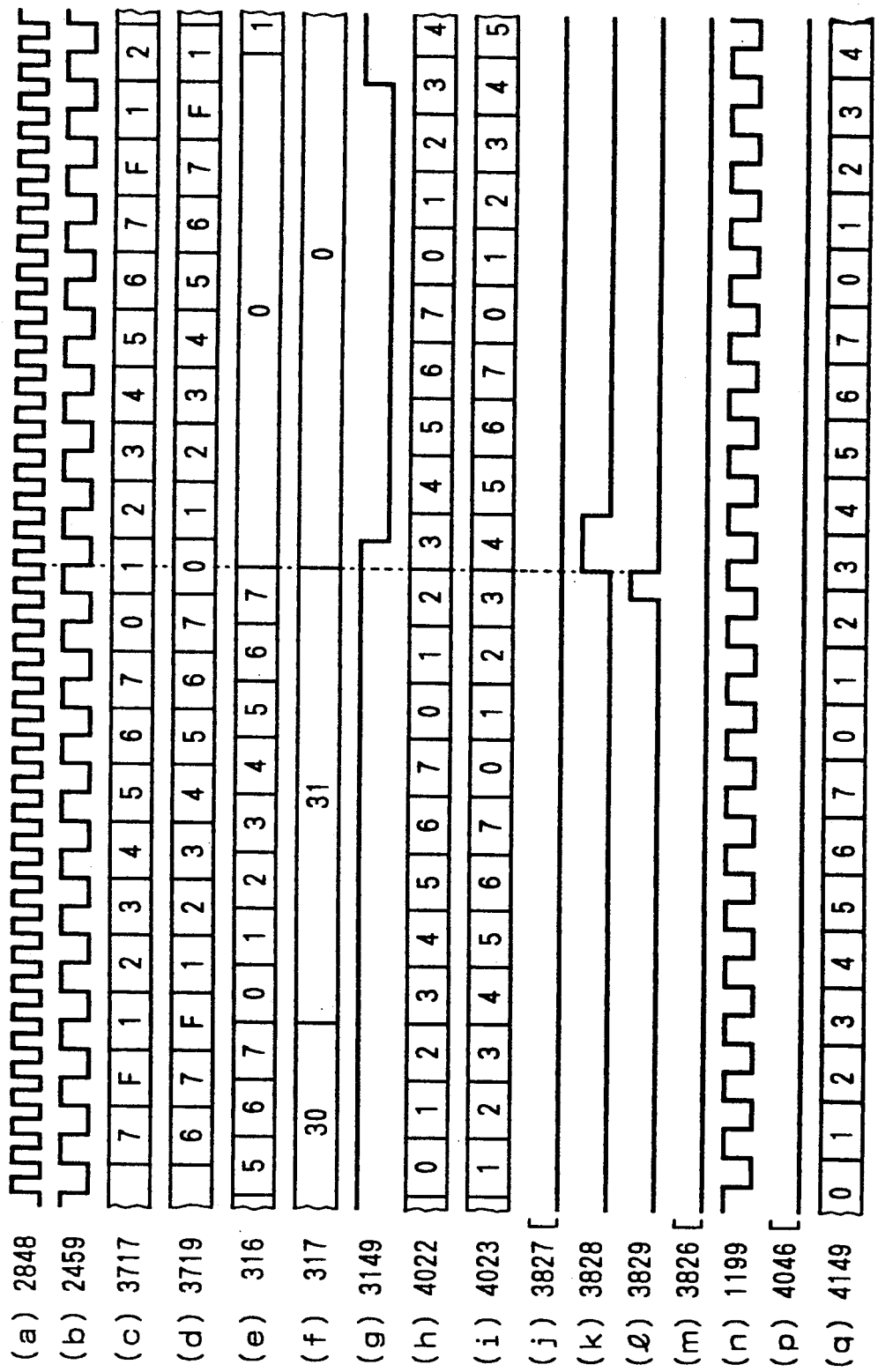
Figures 1, 6:
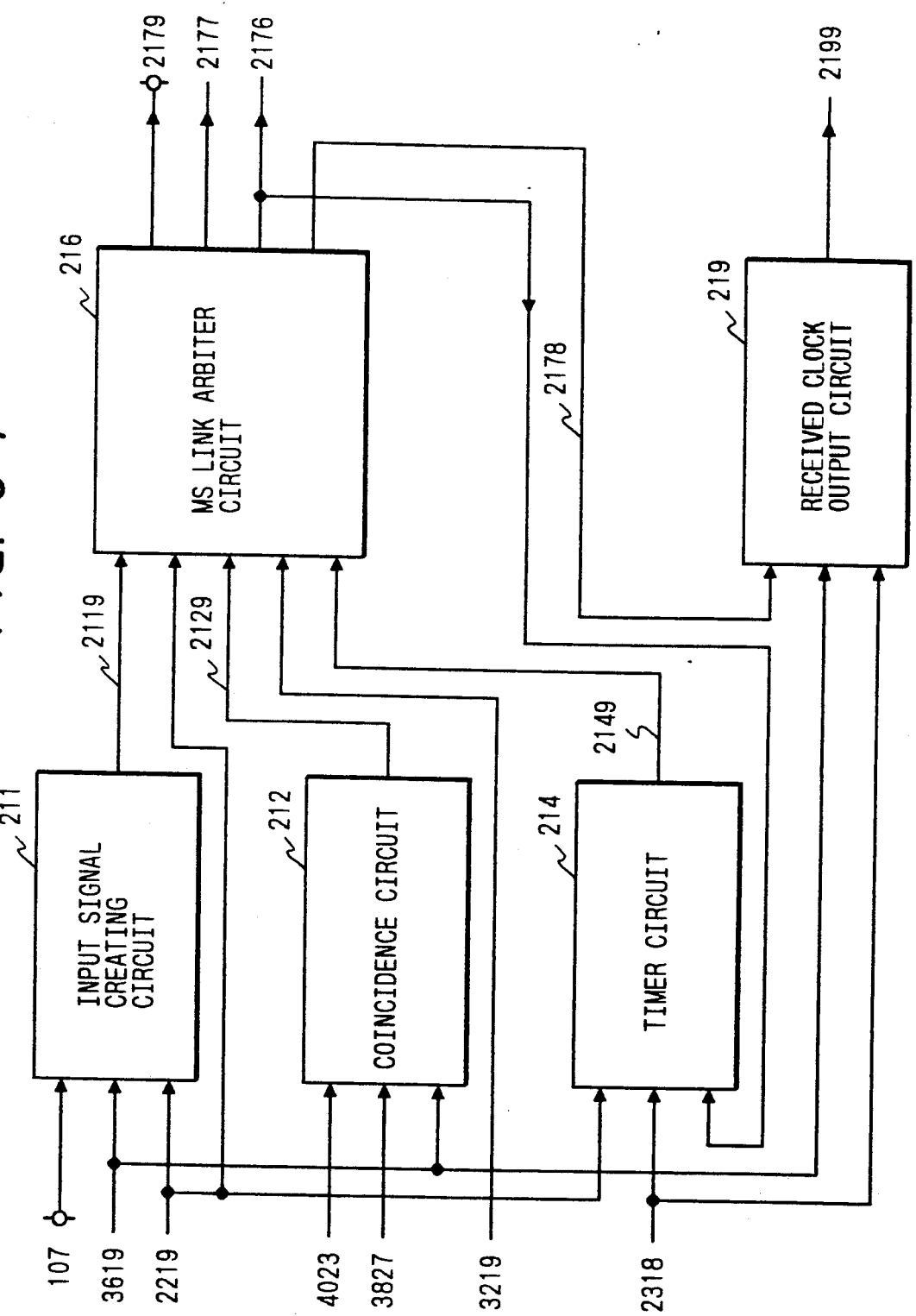
Figures 2, 6:
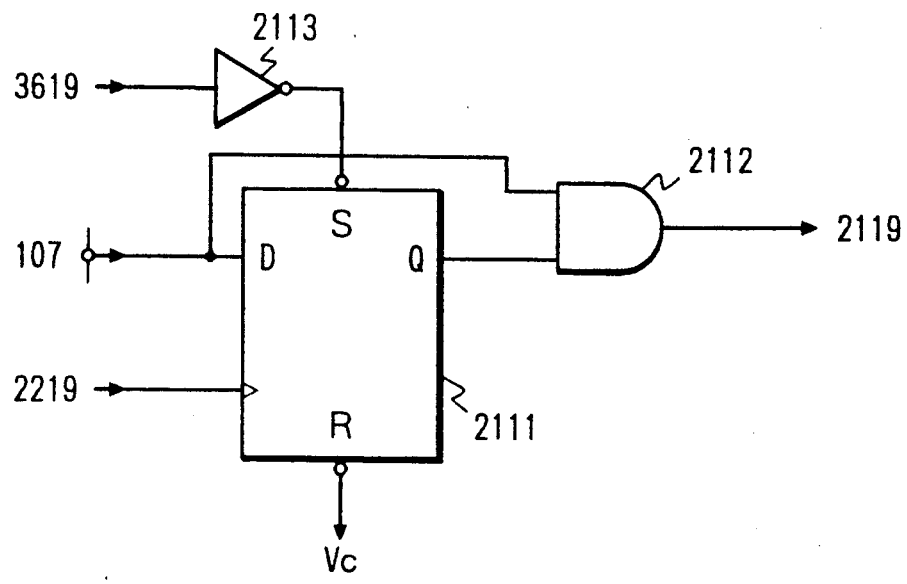
Figure 6:
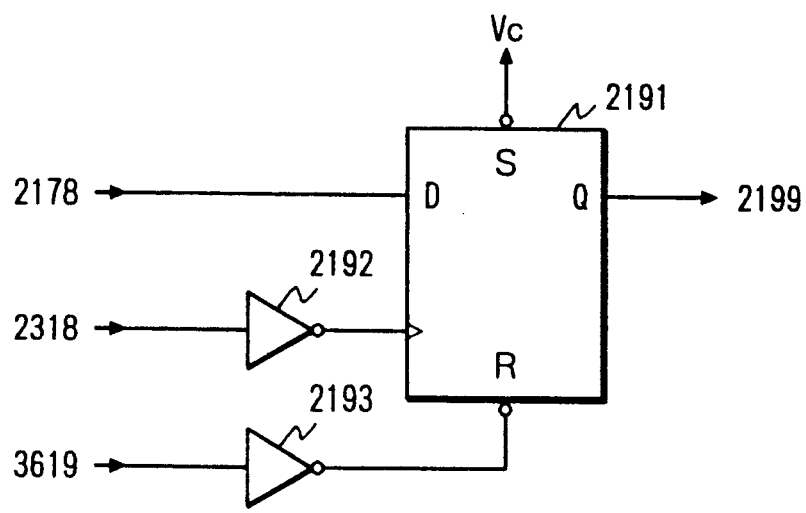
Figures 3, 6:
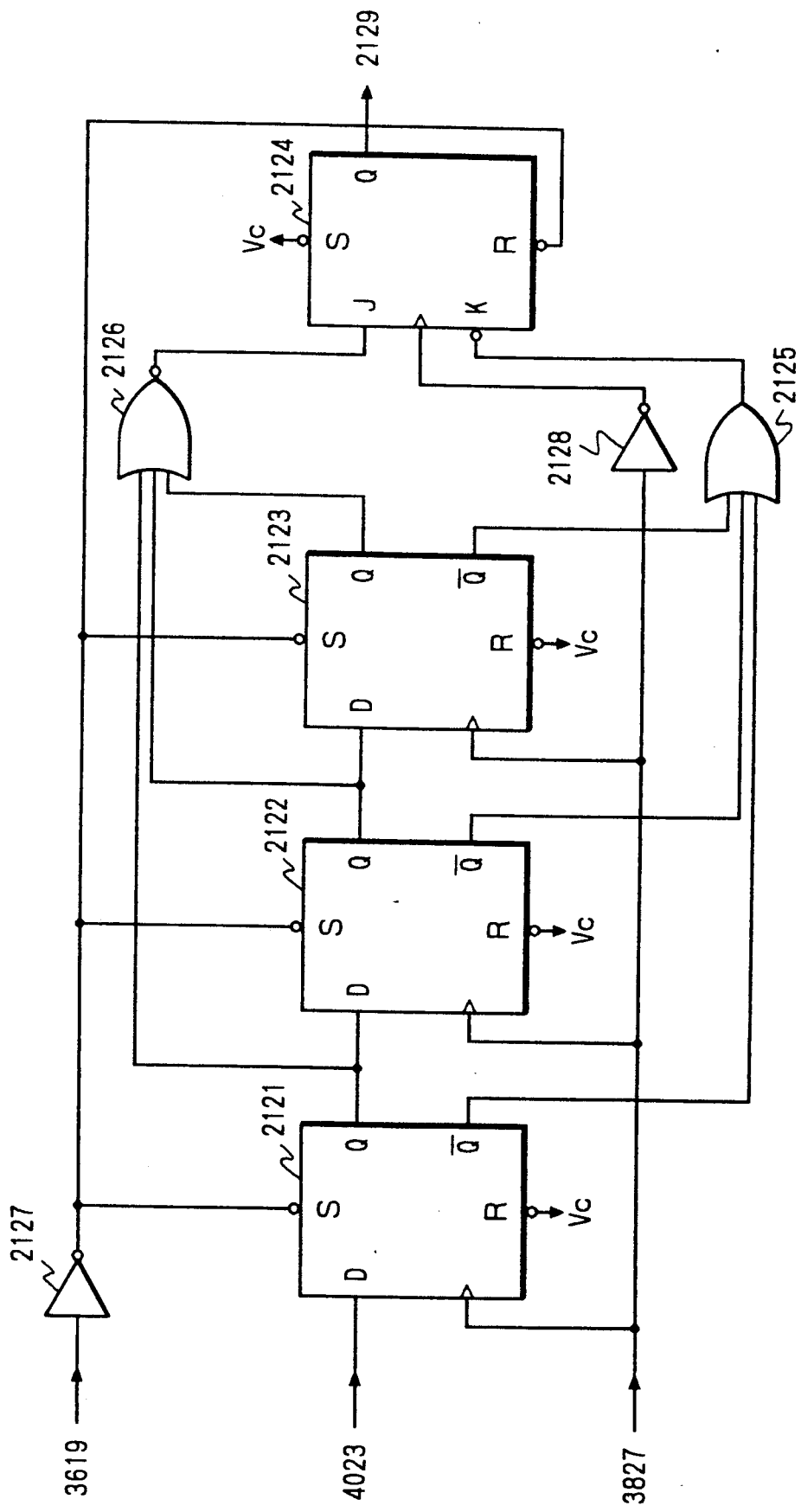
Figures 4, 6:
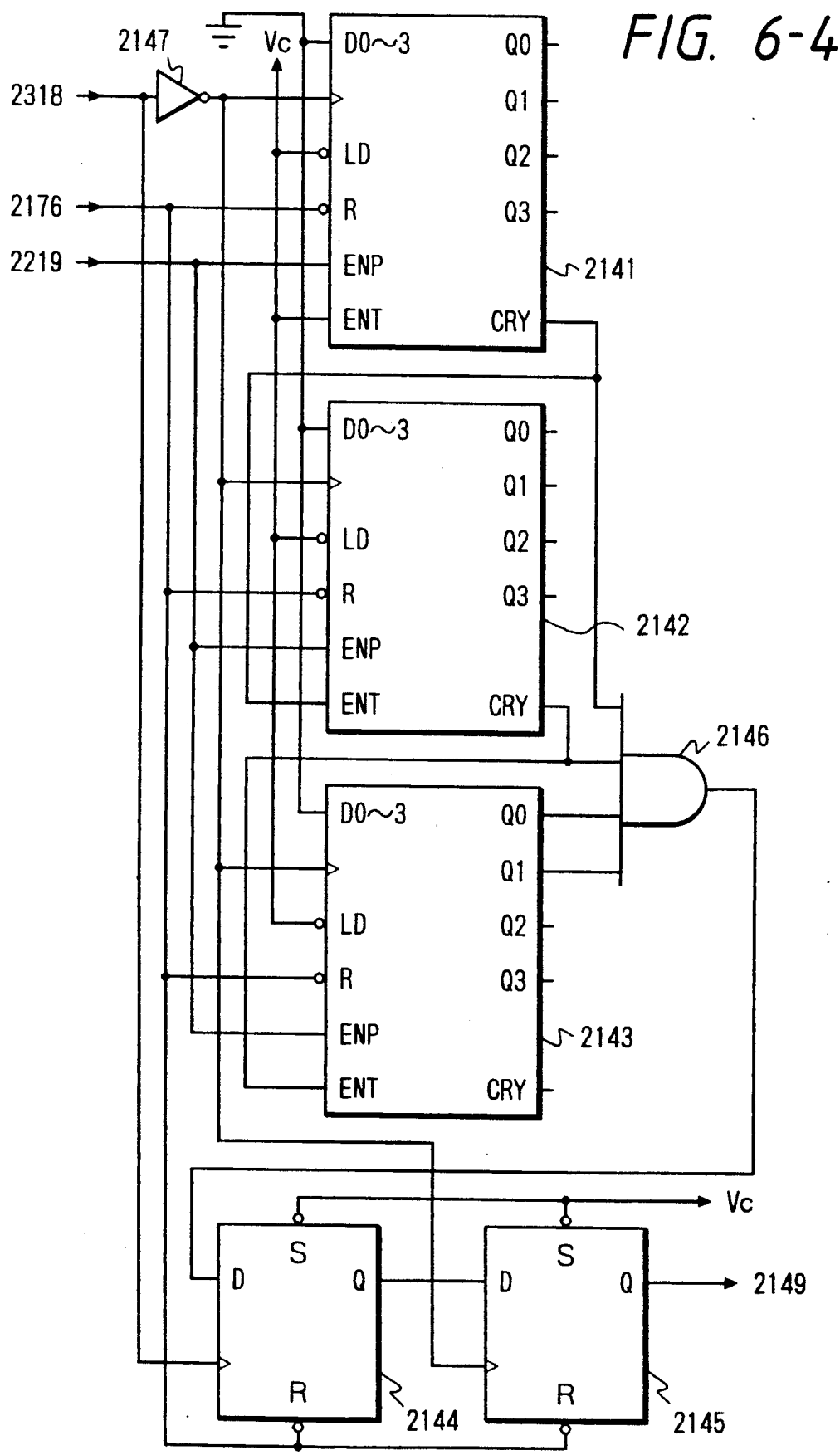
Figures 5, 6:
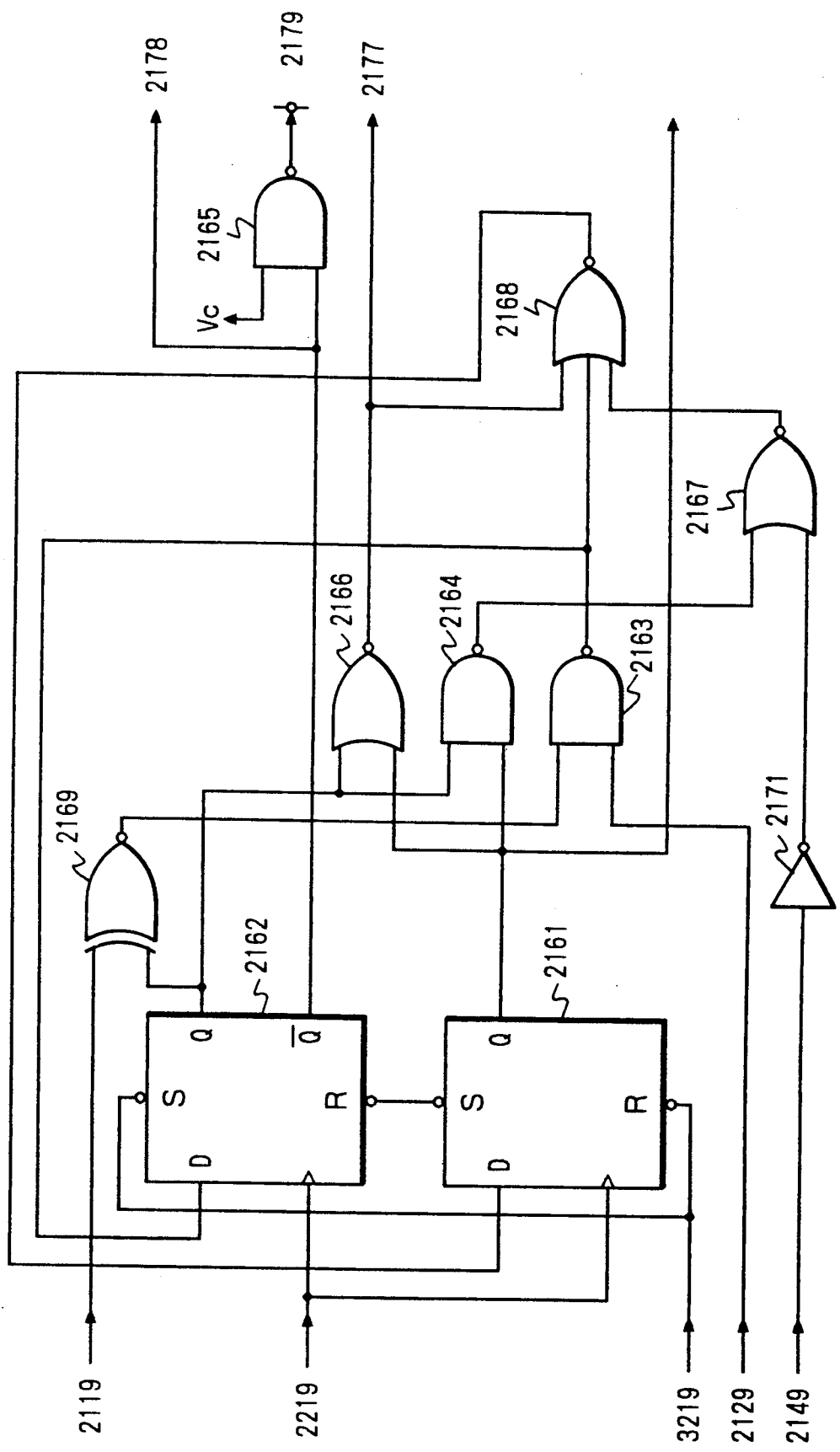

In FIGS. 5-2A to 5-2C, there are shown time charts of a large number of signals when, on receiving a signal transmitted from the LS synchronizing part 700 through the ascending link transmission line LU, the MS link synchronizing part 200 outputs the PCM signal to the highway switch 101. In these figures, a signal 2848 of (a) and a signal 2318 of (b) are the outputs of the MS bit synchronizing circuit 230. A signal 3717 of (c) and a signal 3719 of (d) are respectively the outputs of the received code converter circuit 370. A bus signal 316 of (e), a bus signal 317 of (f) and a signal 3149 of (g) are respectively the outputs of the frame synchronizing circuit 310. A signal 4022 of (h), a signal 4023 of (i), a signal 4046 of (p) and a signal 4149 of (q) are respectively the outputs of the receiving buffer circuit 400. The signal 4149 of (q) is the PCM output signal and is applied to the highway switch 101. A signal 3827 of (j), a signal 3828 of (k), a signal 3829 of (l) and a signal 3826 of (m) are respectively the outputs of the receiving timing creating circuit 380. A signal 1199 of (n) is the first clock signal of 2.048 MHz.

In FIGS. 5-3A and 5-3B, there are shown time charts of a large number of signals when creating signals to be transmitted from the MS link synchronizing part 200 to the LS link synchronizing part 700 by means of the descending link transmission line LD. In these figures, (a) represents a frame signal 102. A signal 2319 of (b) and a signal 2318 of (c) are the outputs of the MS bit synchronizing circuit 230. A signal 4046 of (d) is the output of the receiving buffer circuit 400. A bus signal 352 of (e) and a bus signal 353 of (f) are respectively the outputs of a transmission frame counter circuit 351 (FIG. 12-1) contained in the transmission timing creating circuit 350. A signal 3309 of (g) is the output of the transmission circuit 330. A signal 3585 of (h), a signal 3587 of (i), a signal 3586 of (j) and a signal 3584 of (p) are respectively the outputs of the transmission timing creating circuit 350. A signal 3580 of (k), signal 3581 of (l), a signal 3582 of (m) and a signal 3583 of (n) are respectively signals which are contained in a bus signal 358 that is the output of the transmission timing creating circuit 350. A signal 3618 of (q) is the output of the transmission code covering circuit 3650 and is also a signal to be transmitted to the LS link synchronizing part 700 by means of the descending link transmission line LD.

Figures 2, 3, 4, 5, 6:
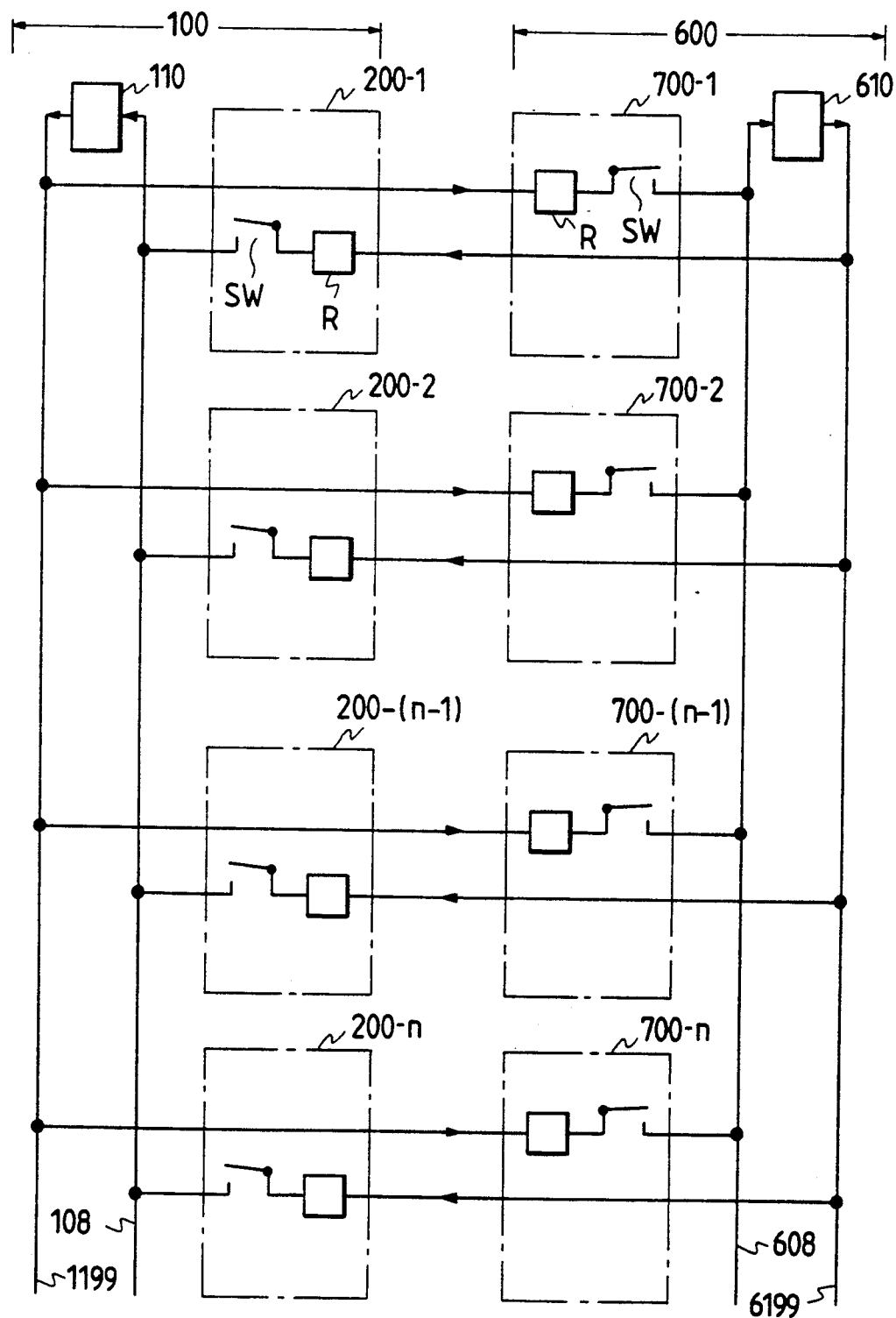

Referring now to FIG. 6-1, there is shown a circuit diagram of the MS arbiter circuit 210 contained in the MS link synchronizing part 200. In this figure, the MS arbiter circuit 210 monitors the state of the busy signal 107 to thereby perform a competitive control (arbitration) relating to the selection of a master clock source. The MS arbiter circuit 210 includes an input signal creating circuit 211, a coincidence circuit 212, a timer circuit 214, an MS link arbiter circuit 216 and a received clock output circuit 219.

In FIG. 6-2, there is shown a circuit diagram of the input signal creating circuit 211. In this figure, 2111 designates a D flip-flop, 2112 stands for an AND gate, and 2113 represents an inverter. The state of the busy signal 107 is sampled at a timing of a signal 2219 which is a starting pulse from the starting pulse creating circuit 220, thereby obtaining a signal 2119 as an output.

In FIG. 6-3, there is shown a circuit diagram of the coincidence circuit 212. In this figure, 2121-2123 respectively designates D flip-flops, 2124 designates a JK flip-flop, 2125 shows an OR gate, 2126 stands for a NOR gate, 2127 and 2128 respectively represents inverters. In this figure, when a signal 4023 from the receiving buffer circuit 400 coincides with a signal 3827 for timing from the receiving timing creating circuit 380, there is obtained a signal 2129 as an output.

In FIG. 6-4, there is shown a circuit diagram of the timer circuit 214. In this circuit configuration, 2141-2143 respectively designate counters, 2144 and 2145 respectively stand for D flip-flops, and 2146 represents an AND gate. If a signal 2176 from the MS link arbiter circuit 216 and a signal 219 which is a starting pulse from the starting pulse creating circuit 220 are both "H" and when a signal 2318 of 2.048 MHz from the MS bit synchronizing circuit 230 is counted 127 times, then a signal 2149 is output.

In FIG. 6-5, there is shown a circuit diagram of the MS link arbiter circuit 216. In this figure, 2161 and 2162 respectively designate D flip-flops, 2163-2165 respectively stand for NAND gates, 2166-2168 respectively represent NOR gates, 2169 shows an exclusive NOR gate, and 2171 expresses an inverter. The MS link arbiter circuit 216 receives a signal 2119 from the input signal creating circuit 211, a signal 2219 which is a starting pulse from the starting pulse creating circuit 220, a signal 3219 from the synchronized state circuit 320, a signal 2129 from the coincidence circuit 212 and a signal 2149 from the timer circuit 214, and also outputs signals 2176-2179. In this figure, the signal 2179 shows a busy state and it is then output to provide the busy signal 107.

In FIG. 6-6, there is shown a circuit diagram of the received clock output circuit 219. In this figure, 2191 designates a D flip-flop, 2192 and 2193 respectively stand for inverters. The signal 2176 from the MS link arbiter circuit 216 is sampled at a timing of the signal 2318 of 2.048 MHz from the MS bit synchronizing circuit 230, and the signal 2199 is output.

Figure 7:
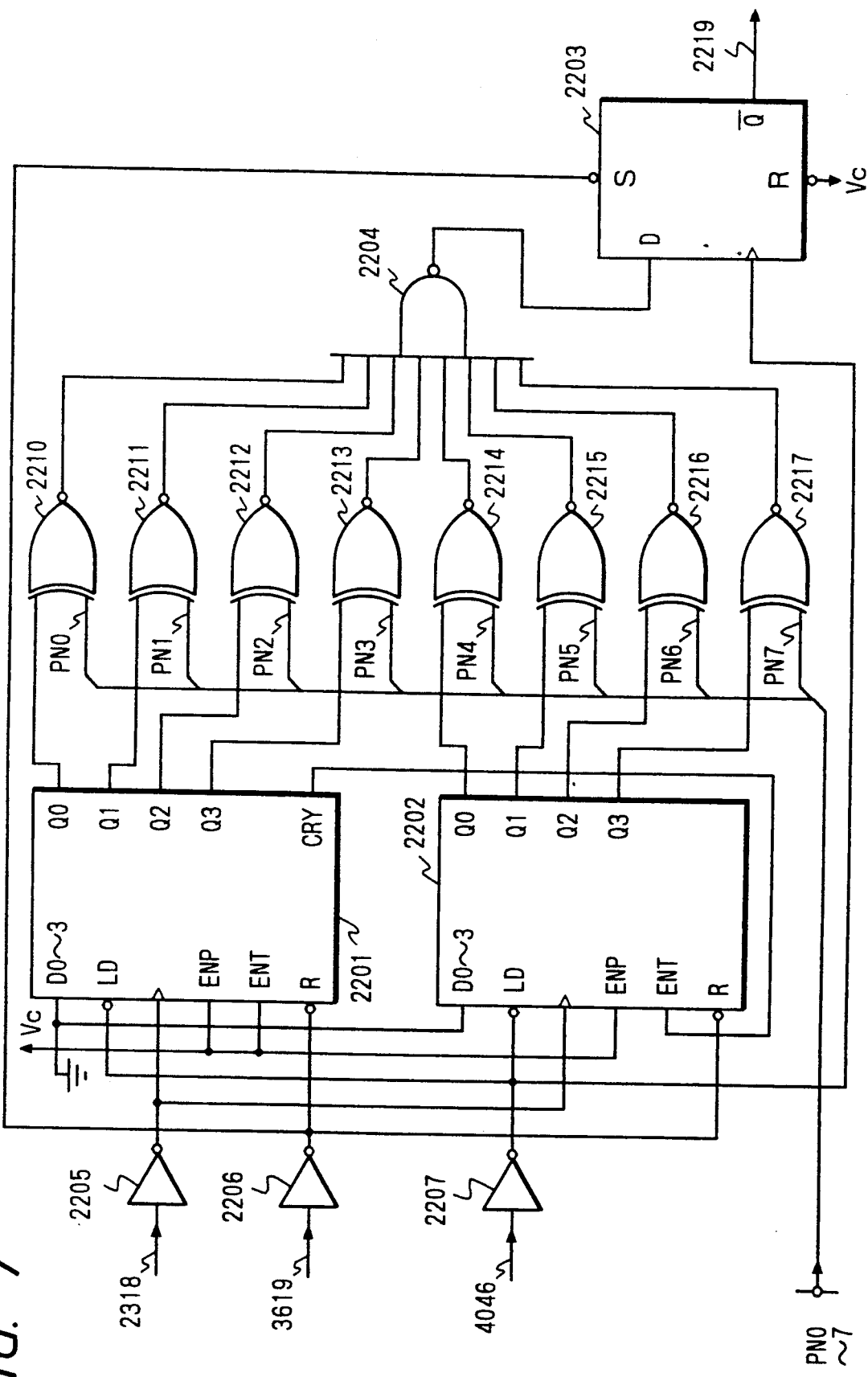
FIG. 7 is a circuit diagram of a starting pulse creating circuit included in the MS link synchronizing part.

Referring now to FIG. 7, there is shown a circuit diagram of the starting pulse creating circuit 220 contained in the MS link synchronizing part 200. In this figure, 2201 and 2202 respectively designate 4-bit counters, 2203 represents a D flip-flop, 2204 stands for a NAND gate, 2205-2207 respectively designate inverters, and 2210-2217 respectively stand for exclusive NOR gates. The MS link synchronizing part 200 has previously been given identification numbers PN 0-7. In accordance with the identification numbers, the MS link synchronizing part 200 receives a signal 4046 (FIGS. 5-2A-5-2C (P)) output frame by frame from the receiving buffer circuit 400, counts up a signal 2318 of 2.048 (FIGS. 5-3A-5-3B (c)) from the MS bit synchronizing circuit 230 by 8 bits, and generates a signal 2219 which is a starting pulse. The signal 2219 is identical with the signal 7219 shown in FIG. 2-4 (c)-(g)

In FIGS. 8-1A and 8-1B, there are respectively shown circuit diagrams of the MS bit synchronizing circuit 230 contained in the MS link synchronizing part 200. In these figures, the MS bit synchronizing circuit 230 includes a clock generation circuit 2301, a transmission clock creating circuit 231, a received phase comparison circuit 232, a received random walk filter circuit 234, a received phase control circuit 242, a received phase comparison circuit 246, a received phase control circuit 249, a received random walk filter circuit 254, a phase filter circuit 262, and a delay register circuit 280.

The MS bit synchronizing circuit 230 creates a clock necessary to obtain a PCM signal from a signal received by means of the ascending link transmission line LU. Also, the MS bit synchronizing circuit 230 creates a signal 2539 serving as the second clock signal 108 from controlling signals 2176 and 2199 from the MS arbiter circuit 210.

In order to eliminate the possibility that the transmission delay of the link transmission lines LD and LU has an influence on a synchronizing frequency when the MS and LS link synchronizing parts 200 and 700 are synchronized with each other, that is, in order to prevent the synchronizing frequency from vary under the influence of the lengths of the transmission lines LD and LU, the MS bit synchronizing circuit 230 includes the delay register circuit 280 which controls an amount of delay in such a manner that a round loop delay of the link transmission lines LD and LU in the mutually synchronized state is an integral multiple of a cycle of the synchronizing signal. Also, in order to eliminate the possibility that the phase of a signal 2539 serving as the second clock signal 108 when a master clock source is switched may be changed suddenly, there are provided the random walk filter circuits 254 and 234 which respectively perform an integration operation.

In FIGS. 8-2 (a) and (b), there are shown circuit diagrams of the transmission clock creating circuit 231 and the clock generation circuit 2301, respectively. In FIG. 8-2 (a), 2311 designates a serial register, and 2312 stands for an exclusive OR gate. The first clock signal 1199 of 2.048 MHz, (FIGS. 5-2A-5-2C (n)) is used to create a signal 2318 of 2.048 MHz, serving as a clock for transmission, and a signal 2319 of 4.096 MHz (FIG. 5-3A, (c), (b) of FIG. 5-3B).

In FIGS. 8-3, there is shown a circuit diagram of the received phase comparison circuit 232. In this figure, 2321-2325 respectively designate D flip-flops, 2326 and 2327 respectively stand for NAND gates, 2331 and 2332 respectively represent NOR gates, and 2333 and 2334 respectively show inverters. The received phase comparison circuit 232 compares the phases of the signal 2459 of 2.048 MHz from the received phase control circuit 242 (FIGS. 5-2A-5-2C (b)) and the signal 3717 from the received code converter circuit 370 (FIG. 5-2C (c)) with each other, and outputs the comparison result as the signals 2338 and 2339. A signal 3619 is used for resetting and a signal 2846 is a signal of 20.48 MHz from the delay register circuit 280.

Figures 4E, 8:
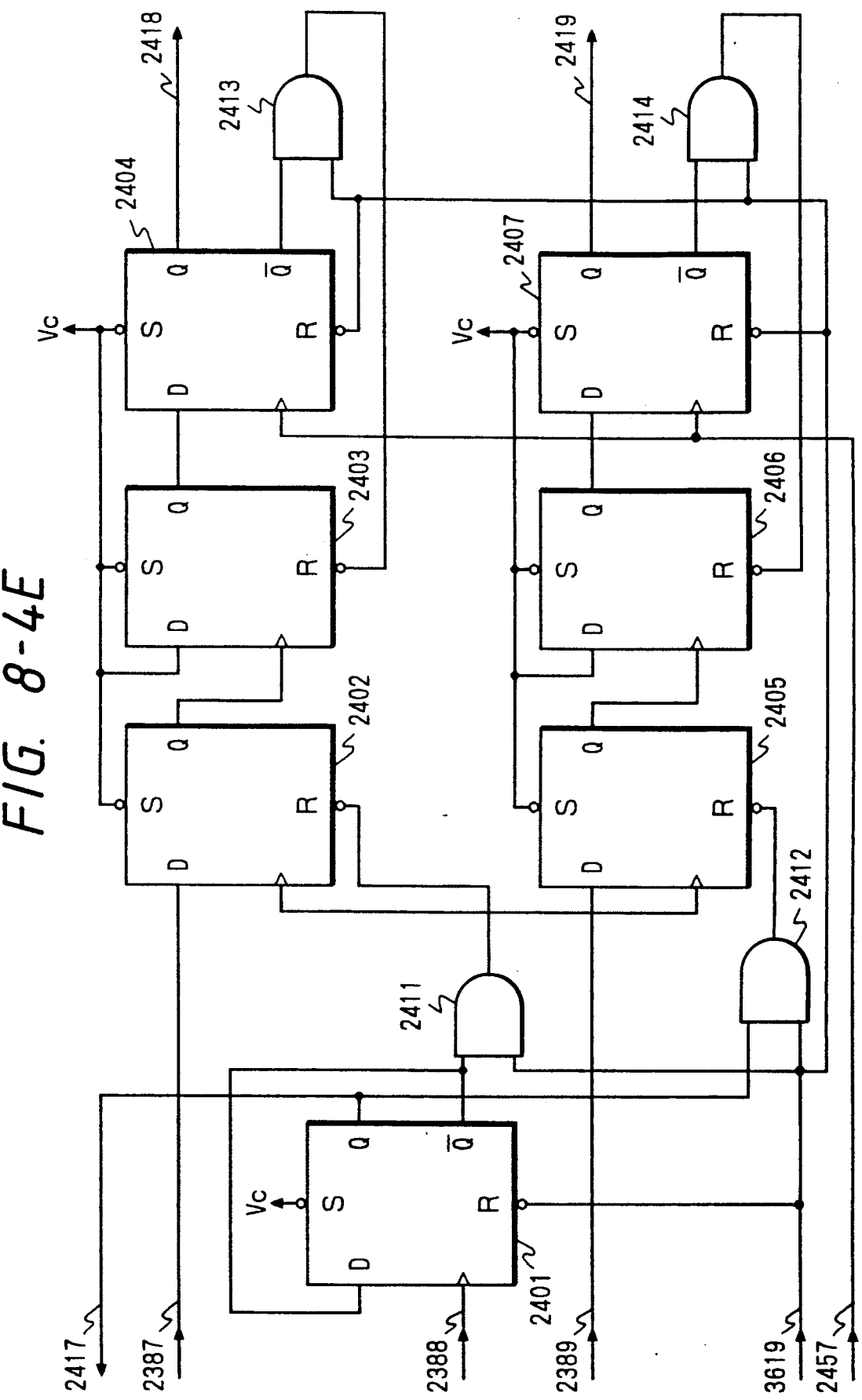
Figures 5A, 8:
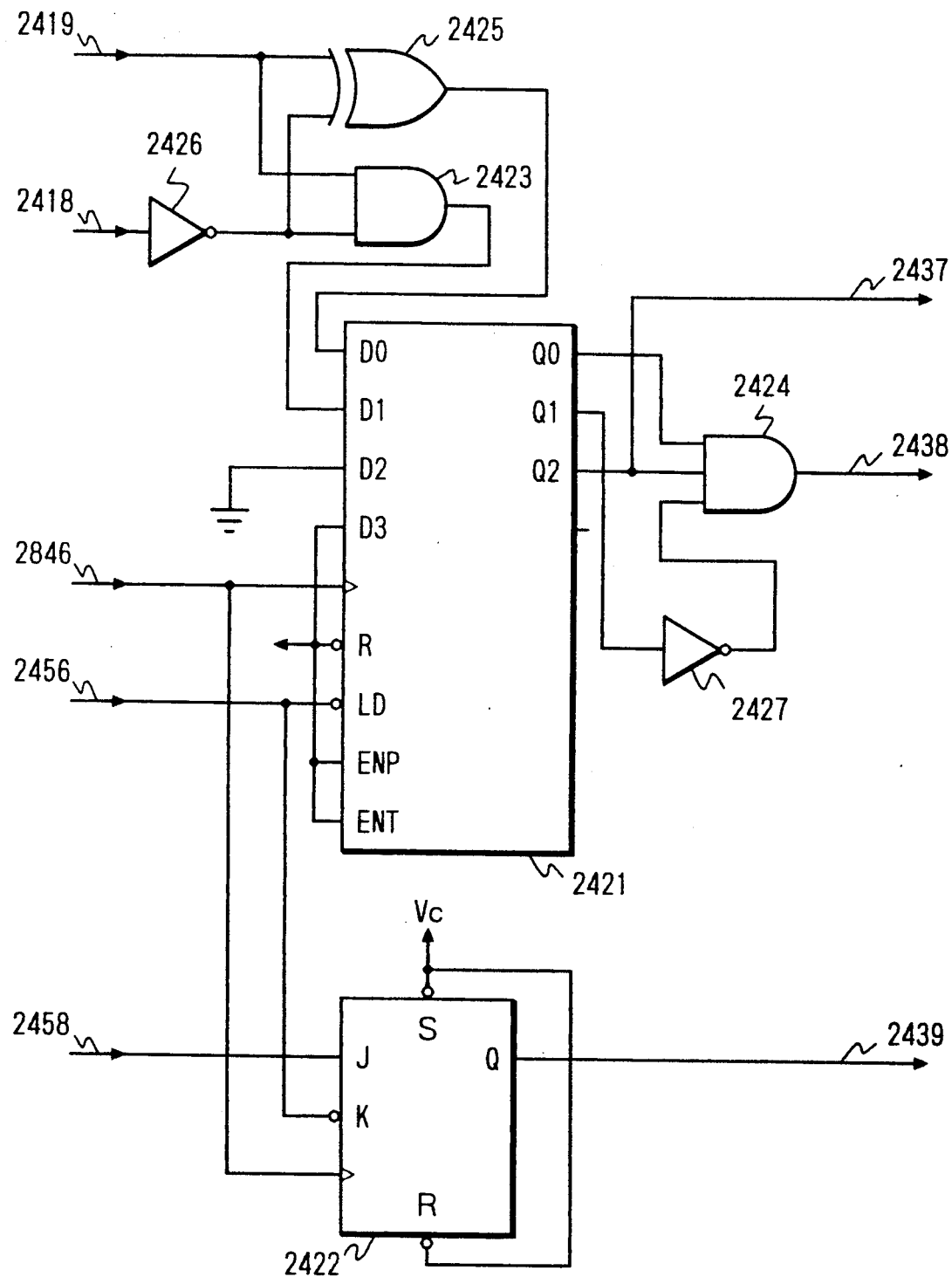
Figures 5B, 8:
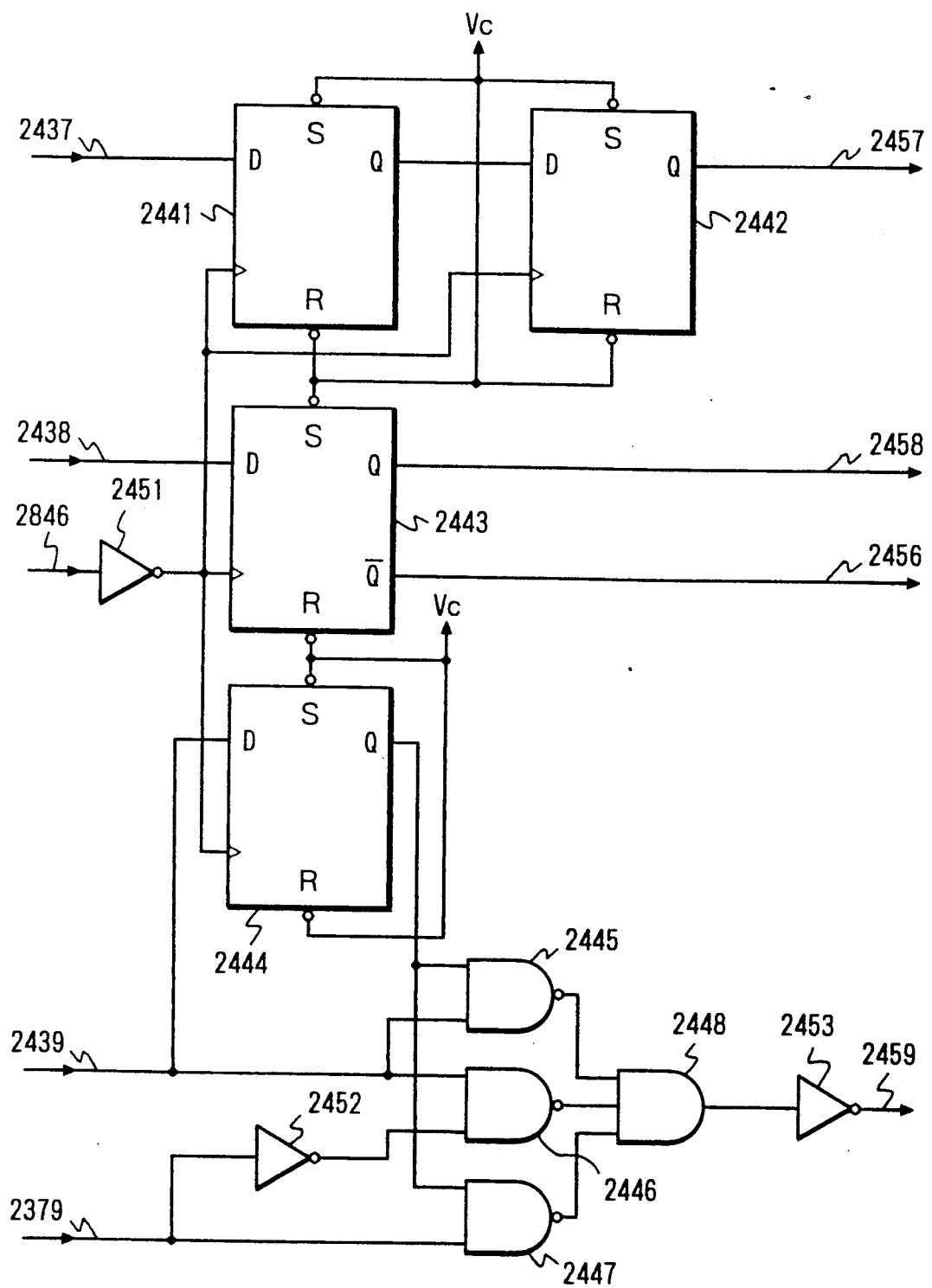
Figures 6, 8:
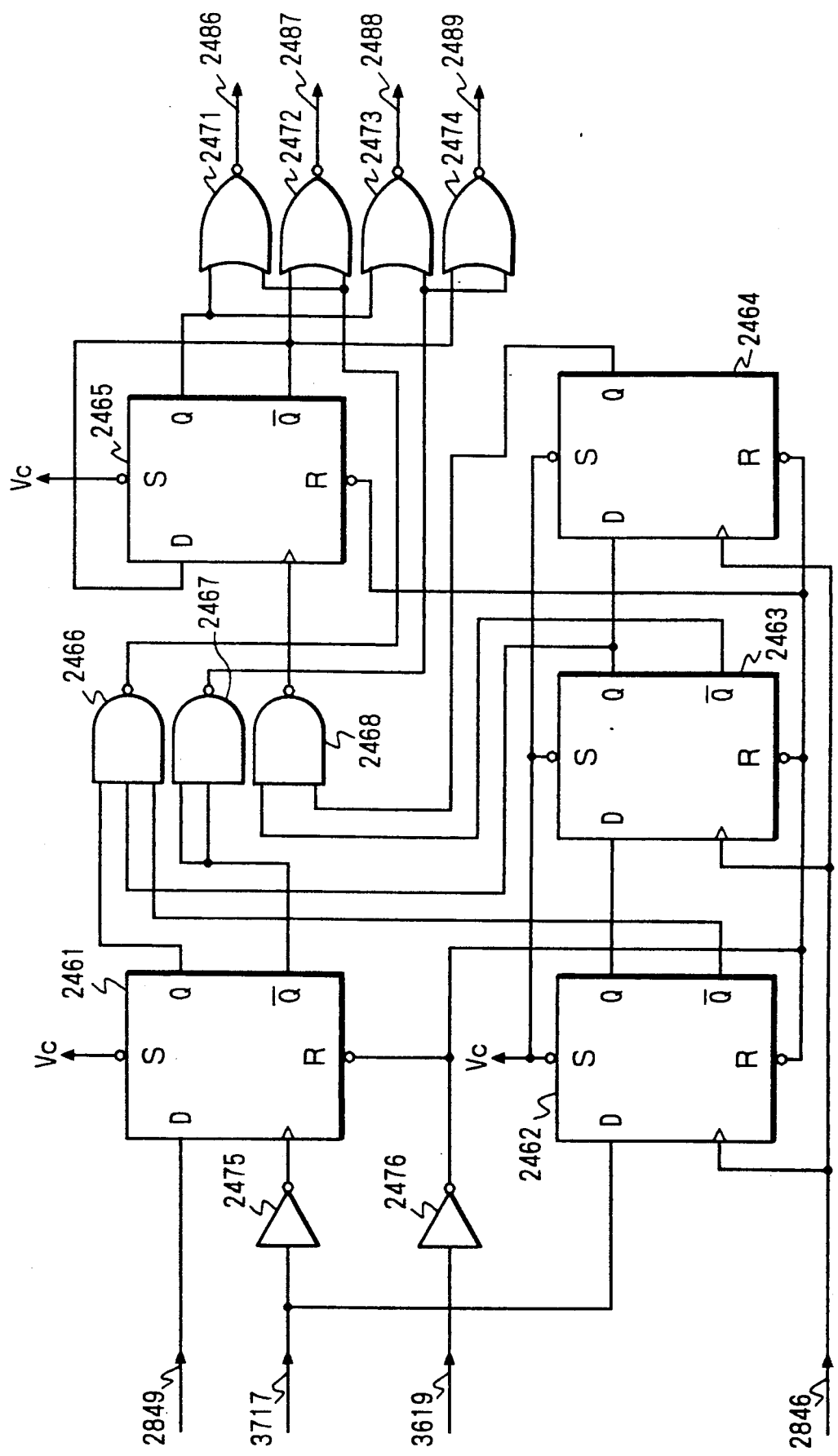

In FIGS. 8-4A-8-4E, there is shown a circuit diagram of the received random walk filter circuit 234. In FIG. 8-4A, 2341 and 2342 respectively designate multiplexers, 2343 stands for an exclusive OR gate, and 2344, 2345 respectively represent inverters. The received random walk filter circuit 234 receives signals from FIG. 8-4B and signals 2376, 2377 and 2378 from FIG. 8-4C, and outputs a signal 2349.

In FIG. 8-4B, 2351 designates a D flip-flop and 2352, 2353 respectively stand for AND gates. The received random walk filter circuit 234 receives a signal 2349 from FIG. 8-4A, a signal 2846 of 20.48 MHz from the delay register circuit 280 and a resetting signal 3619 from the transmission code converter circuit 360, and obtains signals 2356-2359.

In FIG. 8-4C, 2361 designates a multiplexer, 2362-2367 respectively stand for D flip-flops, 2371 represents an exclusive OR gate, and 2372, 2373 respectively expresses inverters. In this figure, the received random walk filter circuit 234 receives the signals 2338, 2339 from the received phase comparison circuit 232, signals 2358, 2359 from FIG. 8-4B, signal 2846 from the delay register circuit 280, signal 2417 from FIG. 8-4E, signal 3619 from the transmission code converter circuit 360, and signal 2457 from the received phase control circuit 242, and outputs signals 2376-2379.

In FIG. 8-4D, 2381, 2382 respectively designate D flip-flops, 2383, 2384 respectively stand for AND gates, 2385 represents an OR gate, and 2386 expresses an inverter. In this structure, the received random walk filter circuit 234 receives the signals 2338, 2339 from the received phase comparison circuit 232, signals 2358, 2359 from FIG. 8-4B, signal 2846 from the delay register circuit 280, and signal 3619 from the transmission code converter circuit 360, and outputs signals 2387-2389.

In FIG. 8-4E, 2401-2407 respectively designate D flip-flops, 2411-2414 respectively stand for AND gates. In this structure, the received random walk filter circuit 234 receives the signals 3619 from the transmission code converter circuit 360 and signal 2457 from the received phase control circuit 242, and outputs signals 2417-2419.

In the above-mentioned received random walk filter circuit 234, there is formed an up/down counter capable of counting the values of 0-2, which counter samples the signal 2339 at the falling of a signal 2846 and counts down at the rising of the signal 2846 when the value thereof is "H", while the up/down counter samples the signal 2338 at the falling of the signal 2846 and counts up at the rising of the signal 2846 when the value thereof is "H".

Figures 3, 4, 5, 5A:
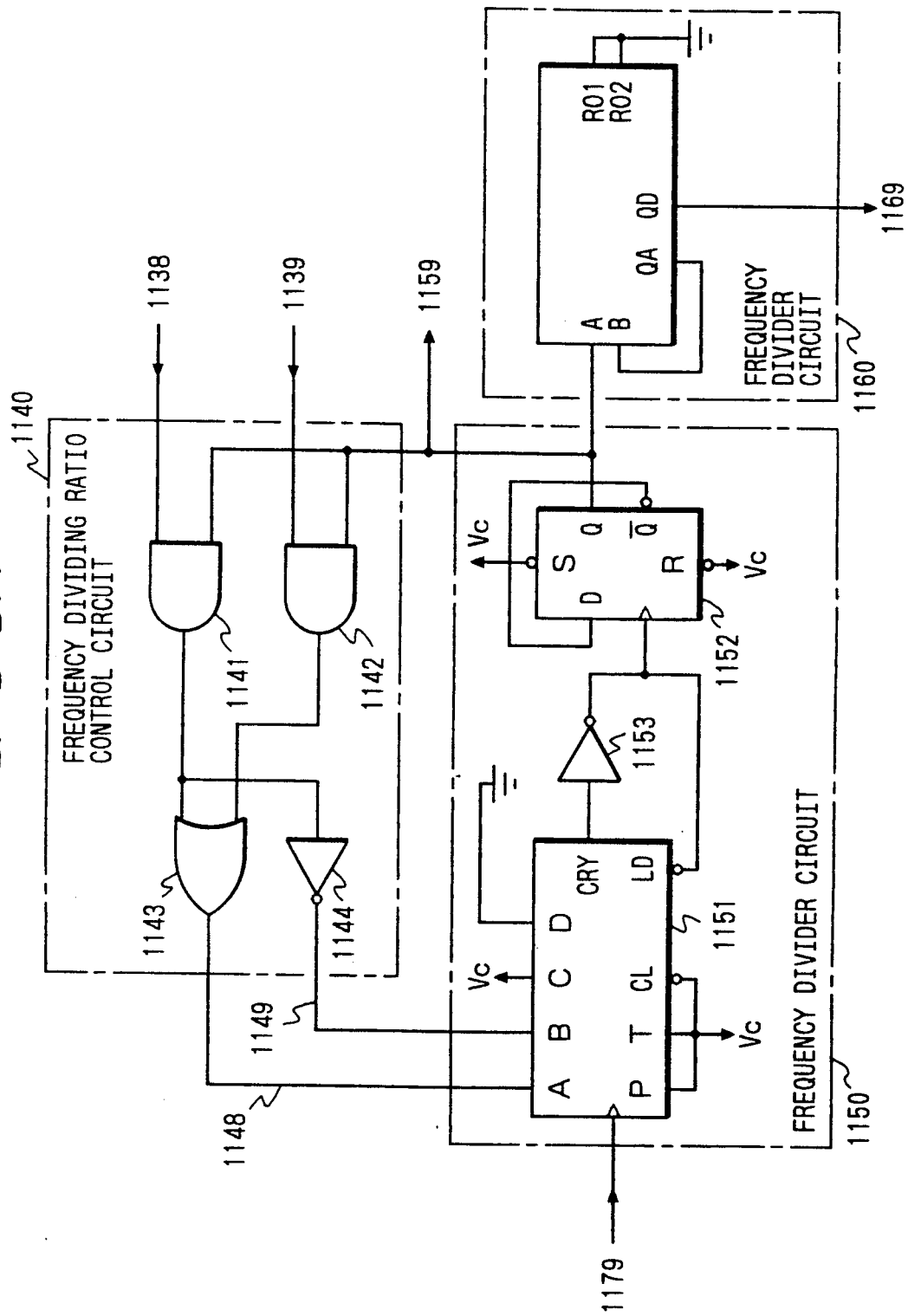
Figures 3, 4, 5, 5B:
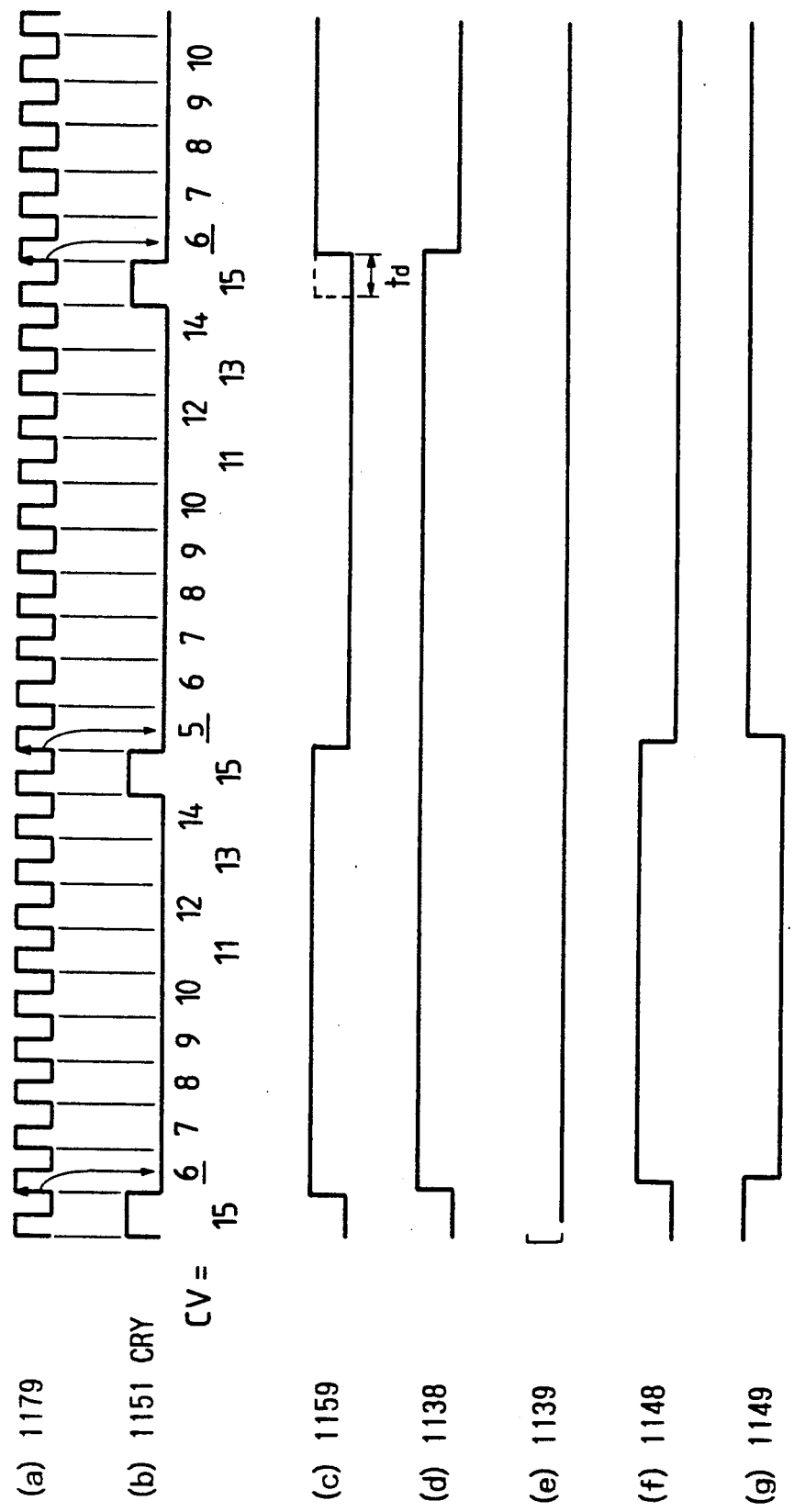
Figures 3, 4, 5, 5C:
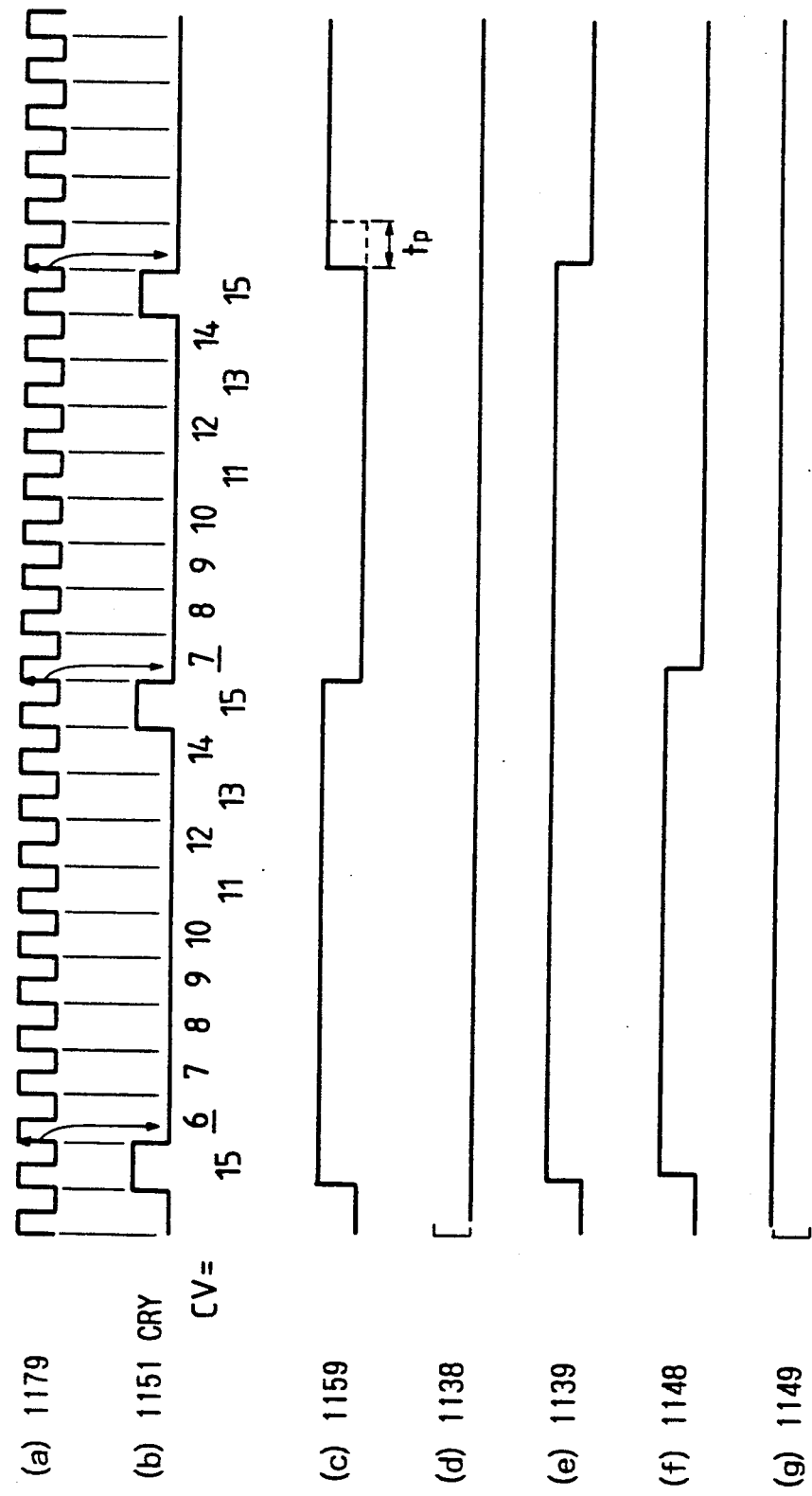
Figures 3, 4, 5, 6:
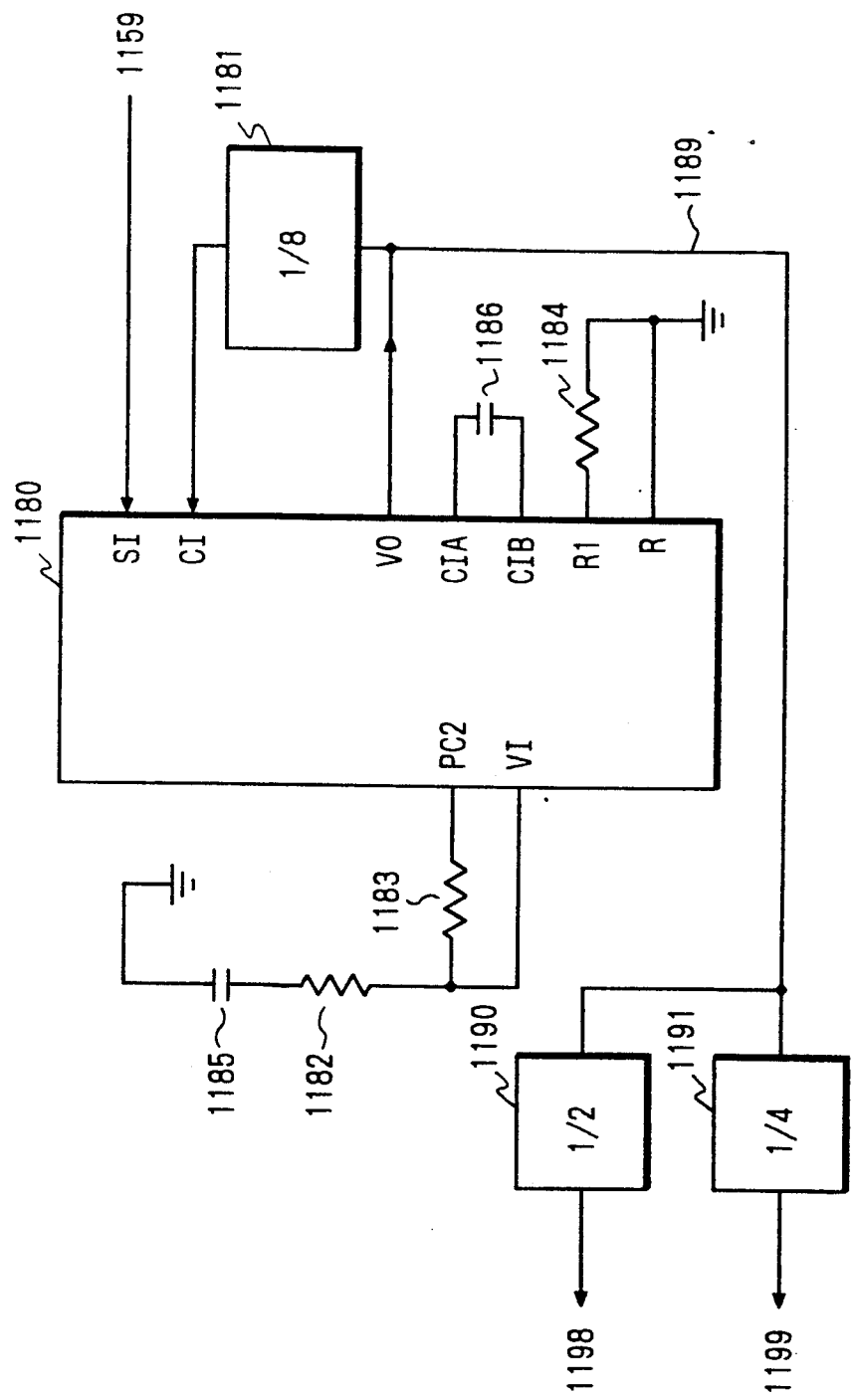
Figures 1, 4:
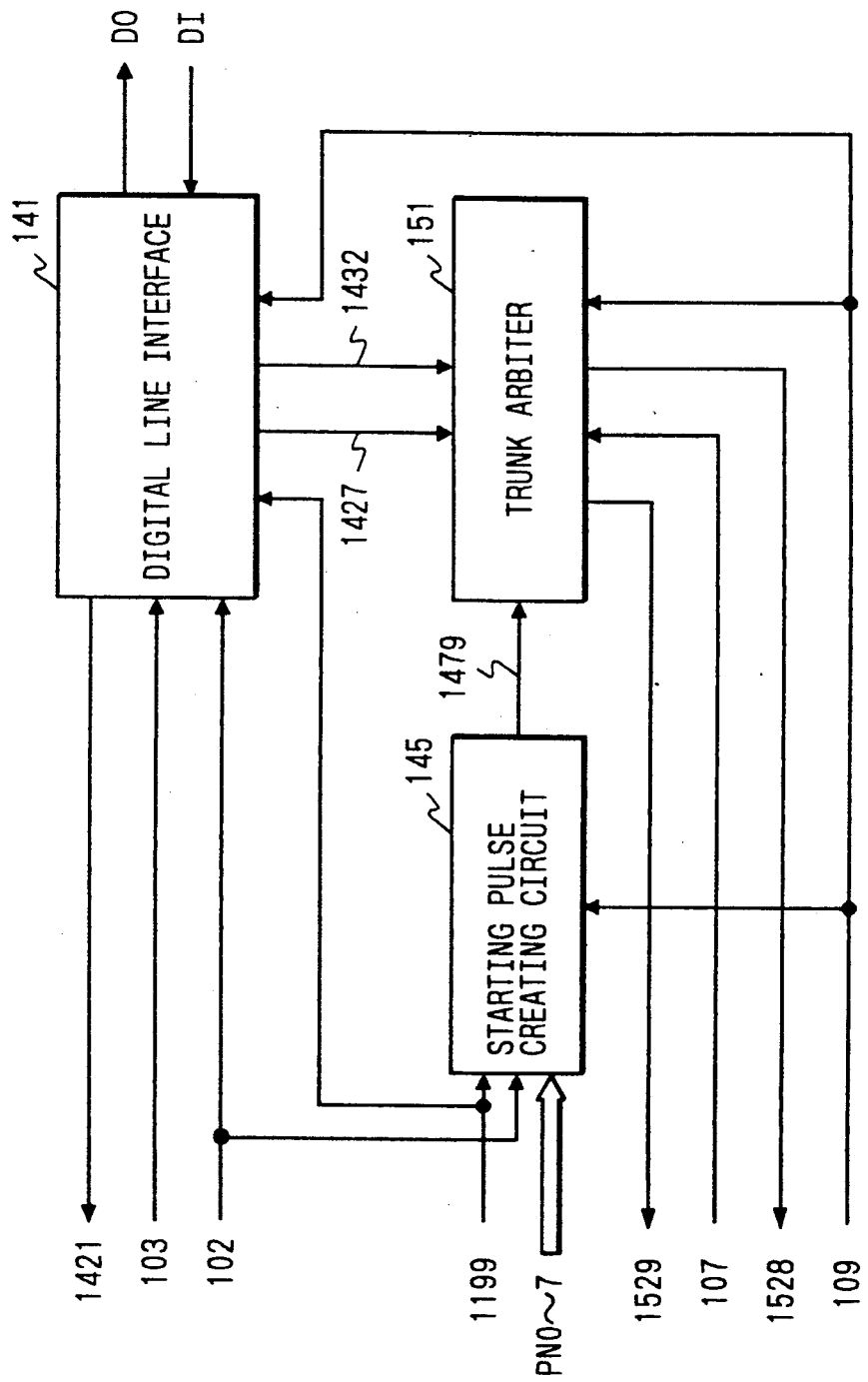
Figures 2, 4:
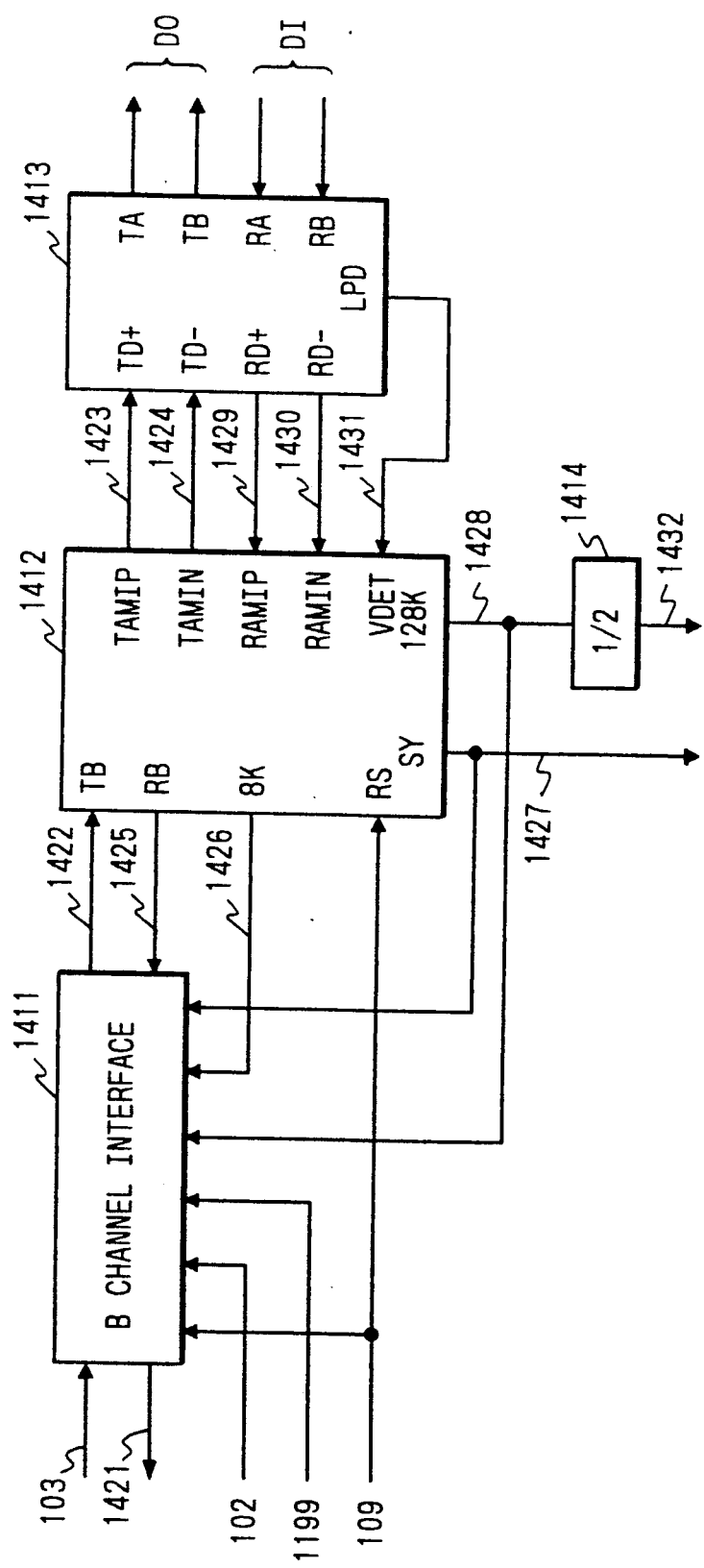
Figures 3, 4:
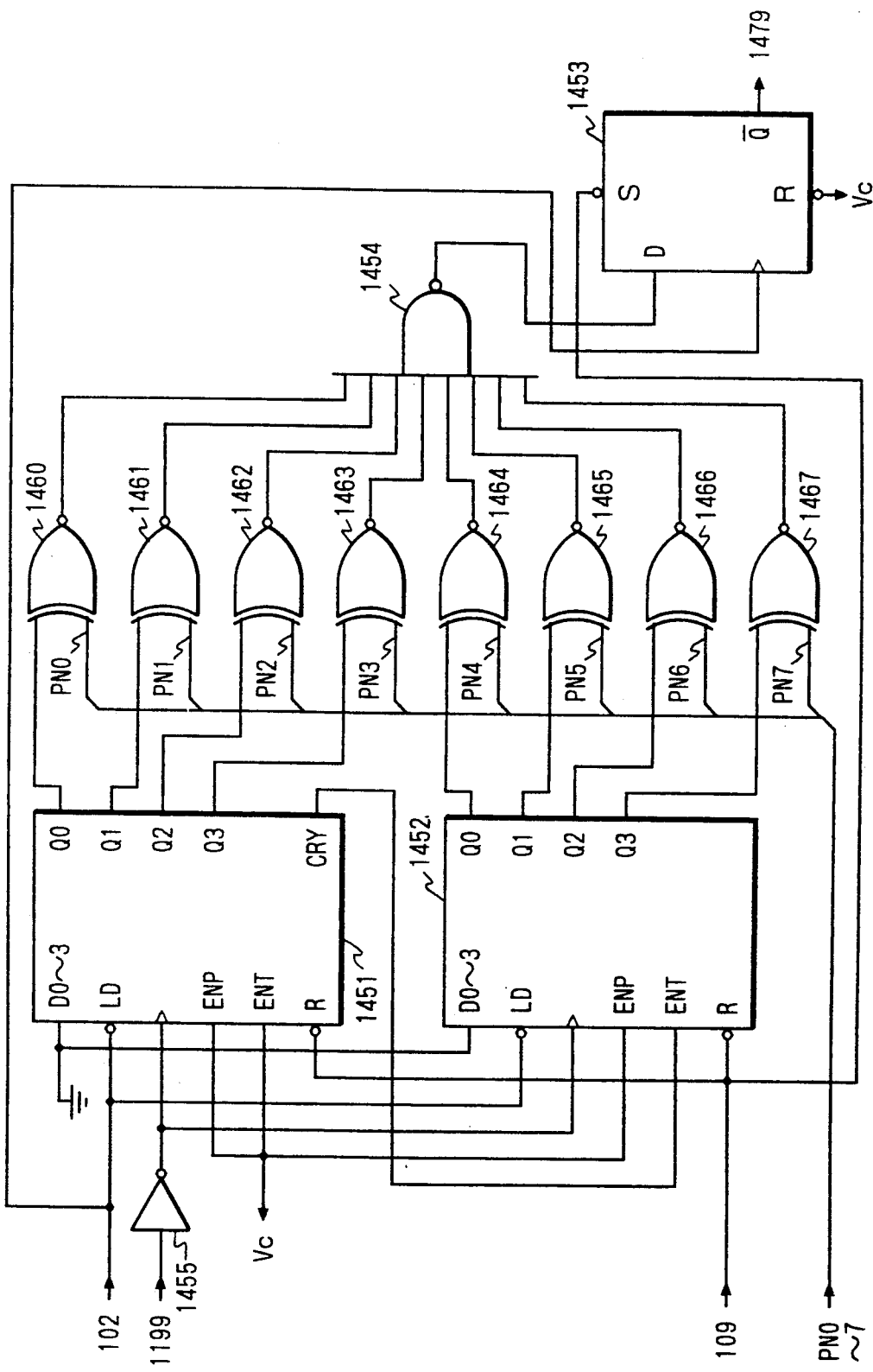
Figure 4:
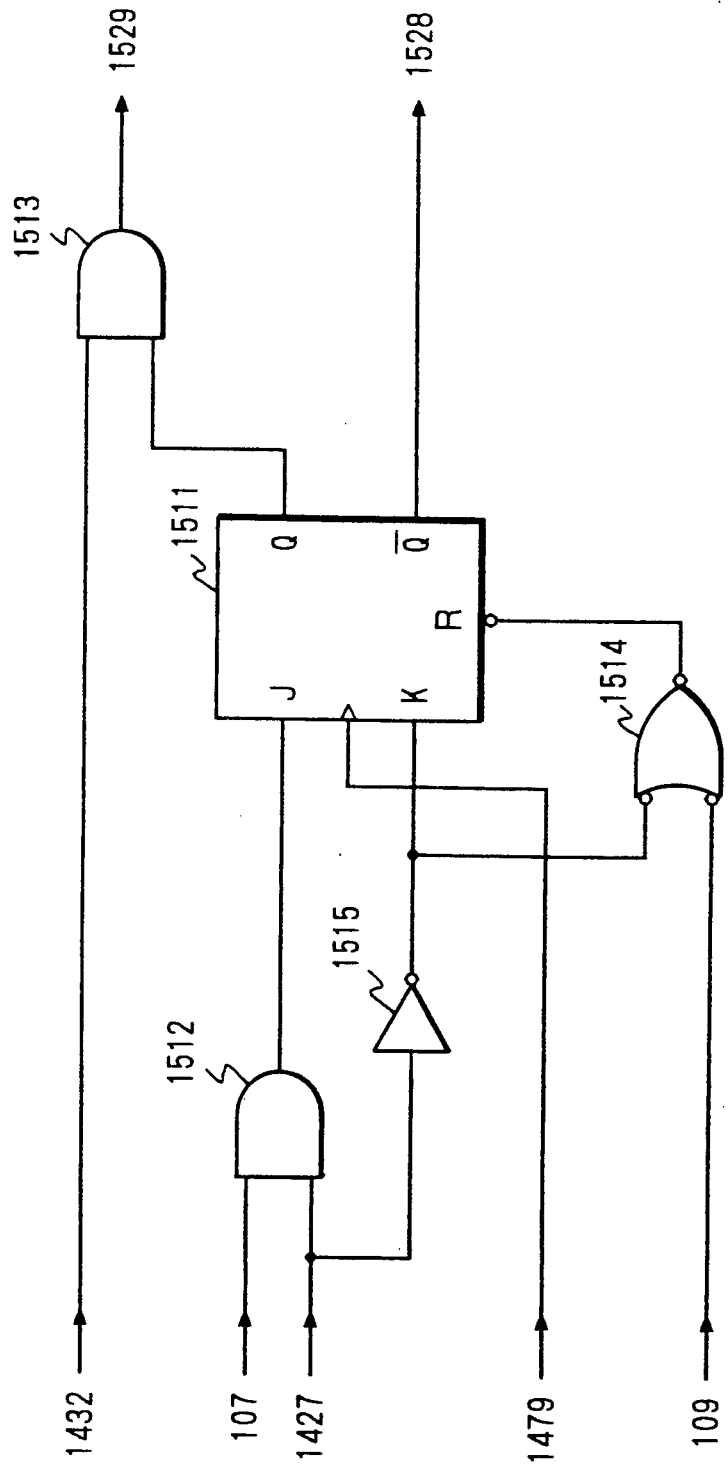

Referring now to FIGS. 8-5A and 8-5B, there is shown a circuit diagram of the received phase control circuit 242. In FIG. 8-5A, 2421 designates a counter of 4-bit, 2422 stands for a JK flip-flop, 2423, 2424 respectively show AND gates, 2425 expresses an exclusive OR gate, and 2426, 2427 respectively represent inverters. In this structure, the received phase control circuit 242 receives the signals 2418, 2419 from the received random walk filter circuit 234, signal 2846 from the delay register circuit 280, and signals 2456, 2458 from FIG. 8-5B, and outputs signals 2437-2439.

In FIG. 8-5B, 2441-2444 respectively designate D flip-flops, 2445-2447 respectively stand for NAND gates, 2448 expresses an AND gate, and 2451-2453 respectively represent inverters. In this structure, the received phase control circuit 242 receives the signals 2437, 2438, 2439 from FIG. 8-5A, signal 2846 from the delay register circuit 280, and signal 2379 from the received random walk filter circuit 234, and outputs signals 2456-2459.

The received phase control circuit 242 receives the phase control signals 2379, 2418, 2419 from the received random walk filter circuit 234, and outputs a signal 2459 of 2.048 MHz after the phase thereof is controlled (FIGS. 5-2A-5-2C (b)).

Referring now to FIG. 8-6, there is shown a circuit diagram of the received phase comparison circuit 246. In this 2461-2465 respectively designate D flip-flops, 2466-2468 2468 respectively stand for NOR gates, and 2475, 2476 respectively represent inverters. The received phase comparison circuit 246 compares the phases of the signal 2849 of 2.048 MHz from the delay register circuit 280 and the signal 3717 from the received code converter circuit 370 (FIGS. 5-2A-5-2C (c)) with each other, and outputs the comparison result in the form of signals 2486-2489. A signal 3619 is used for resetting and the signal 2846 is a signal of 20.48 MHz from the delay register circuit 280.

Figures 7A, 8:
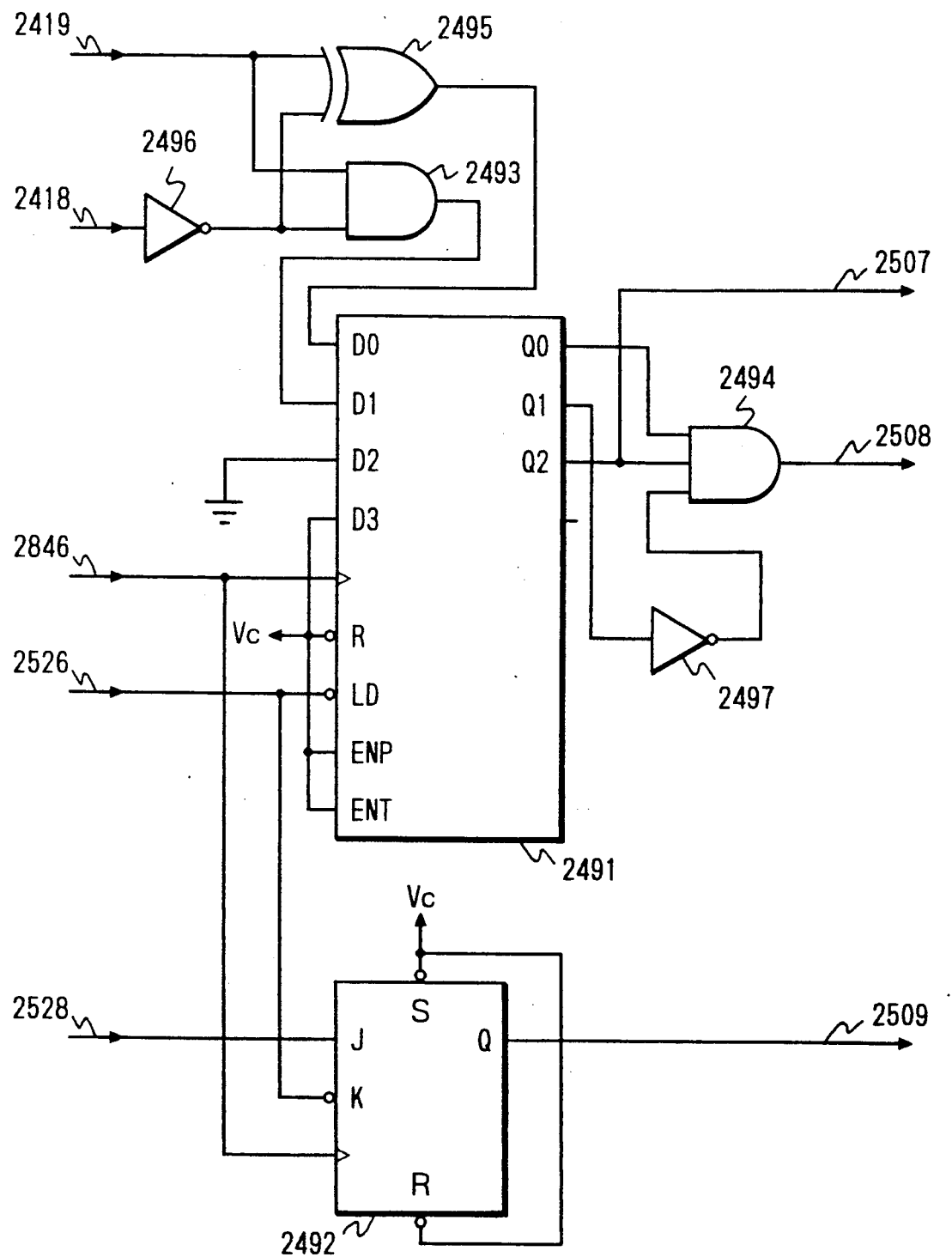
Figures 7B, 8:
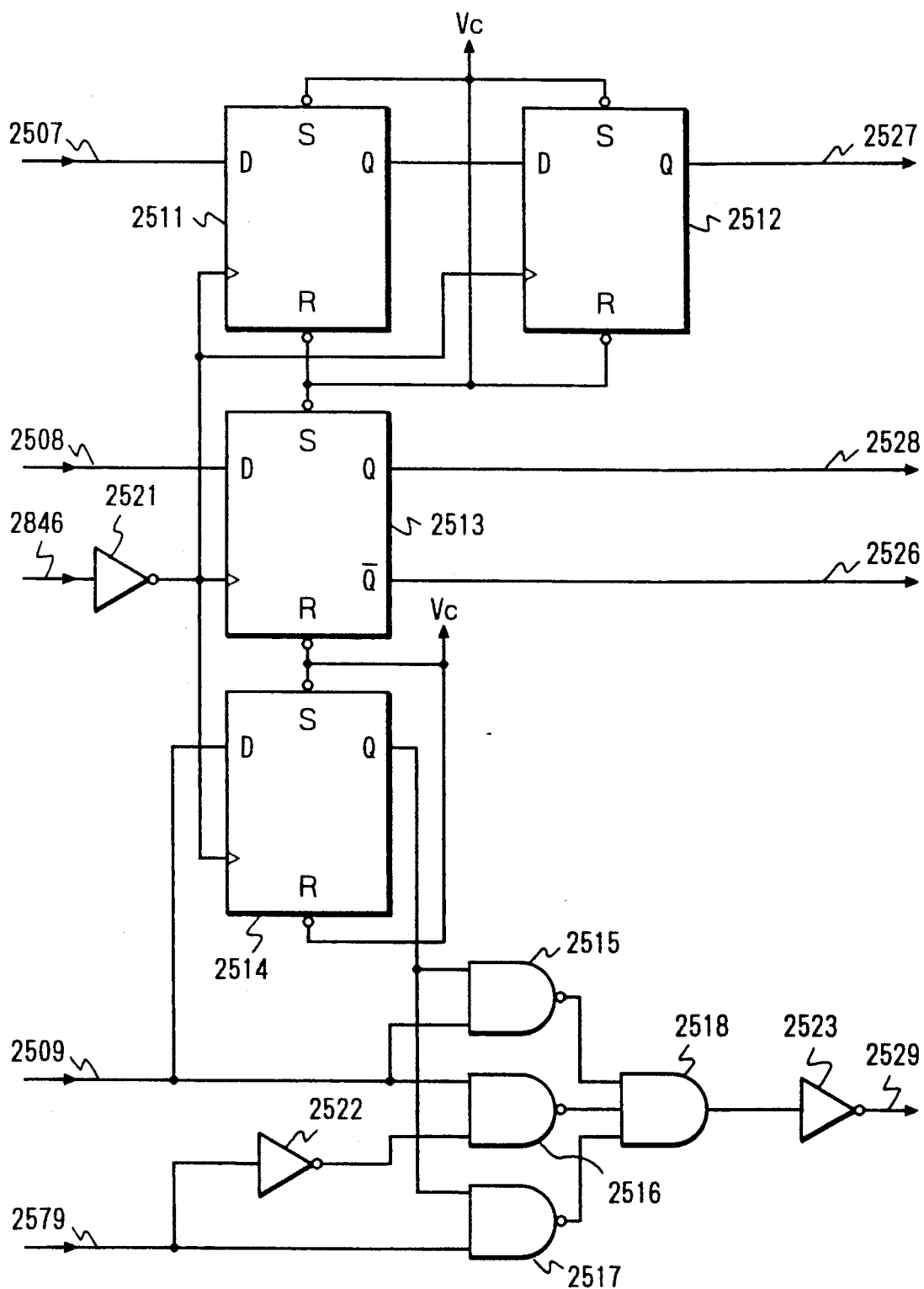
Figures 7C, 8:
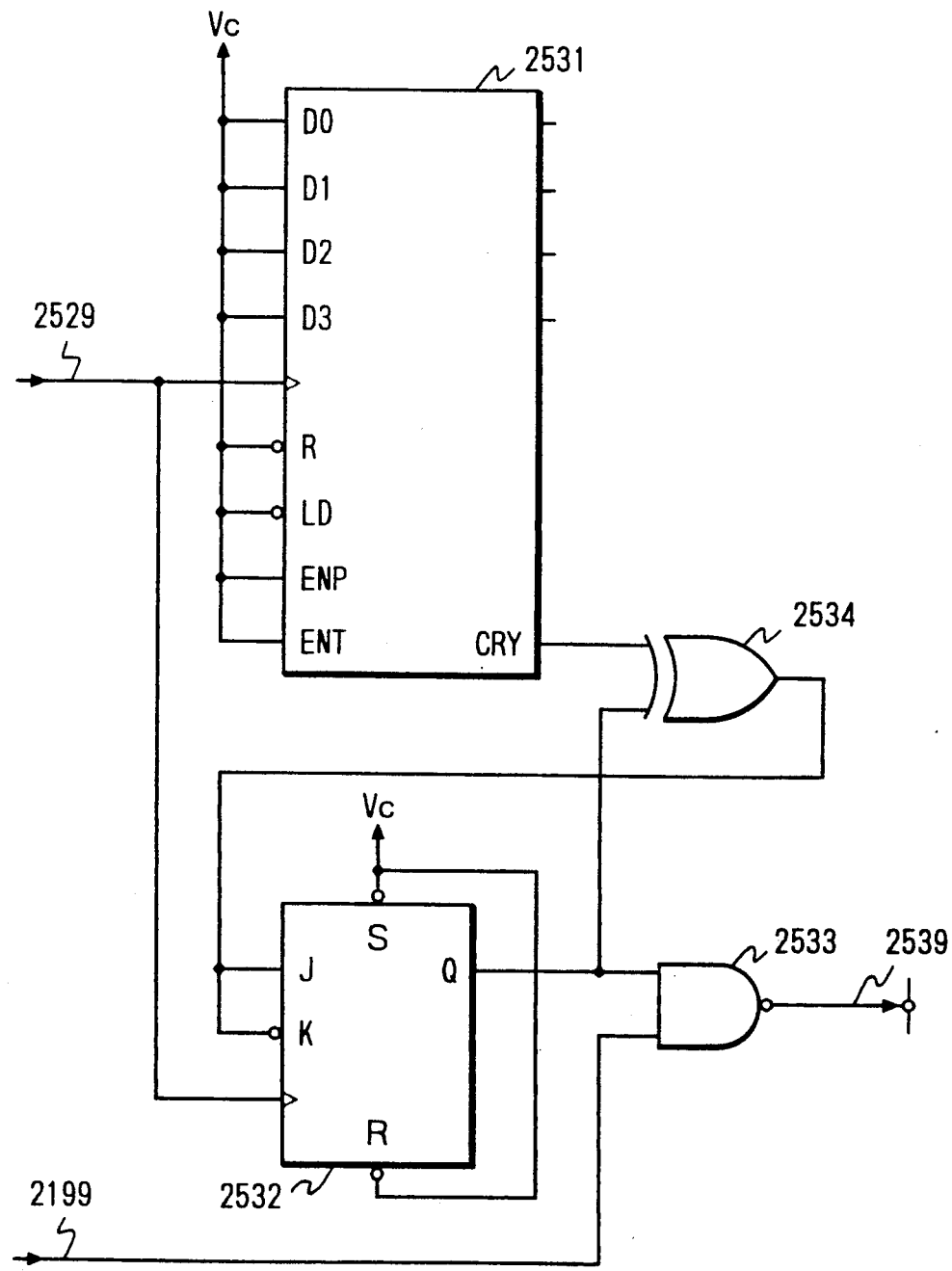

In FIGS. 8-7A to 8-7C, there is shown a circuit diagram of the received phase control circuit 249. In FIG. 8-7A, 2491 designates a counter, 2492 stands for a JK flip-flop, 2493, 2494 respectively represents AND gates, 2495 expresses an exclusive OR gate, and 2496, 2497 respectively expresses inverters. In this structure, the received phase control circuit 249 receives the signals 2618, 2619 from the received random walk filter circuit 254, signal 2846 from the delay register circuit 280, and signals 2526, 2528 from FIG. 8-7B, and outputs signals 2507-2509.

In FIG. 8-7B, 2511-2514 respectively designate D flip-flops, 2515-2517 respectively stand for NAND gates, 2518 represents an AND gate, and 2521-2523 respectively designate inverters. In this structure, the received phase control circuit 249 receives the signals 2507, 2508, 2509 from FIG. 8-7A, signal 2846 from the delay register circuit 280, and signal 2579 from the received random walk filter circuit 254, and outputs signals 2526-2529.

In FIG. 8-7C, 2531 designates a counter, 2532 stands for a JK flip-flop, 2533 respectively a NAND gate, and 2534 expresses an exclusive OR gate. In this structure, the received phase control circuit 249 divides the frequency of a signal 2529 of 2.048 MHz by 32 to thereby obtain a signal 2539 of 64 KHz.

The received phase control circuit 249 receives the phase control signals 2579, 2618, 2619 from the received random walk filter circuit 254 and outputs the signals 2539 of 64 KHz after it controls the phase of the signal. This signal 2539 is used as the second clock signal 108.

Figures 8, 8A:
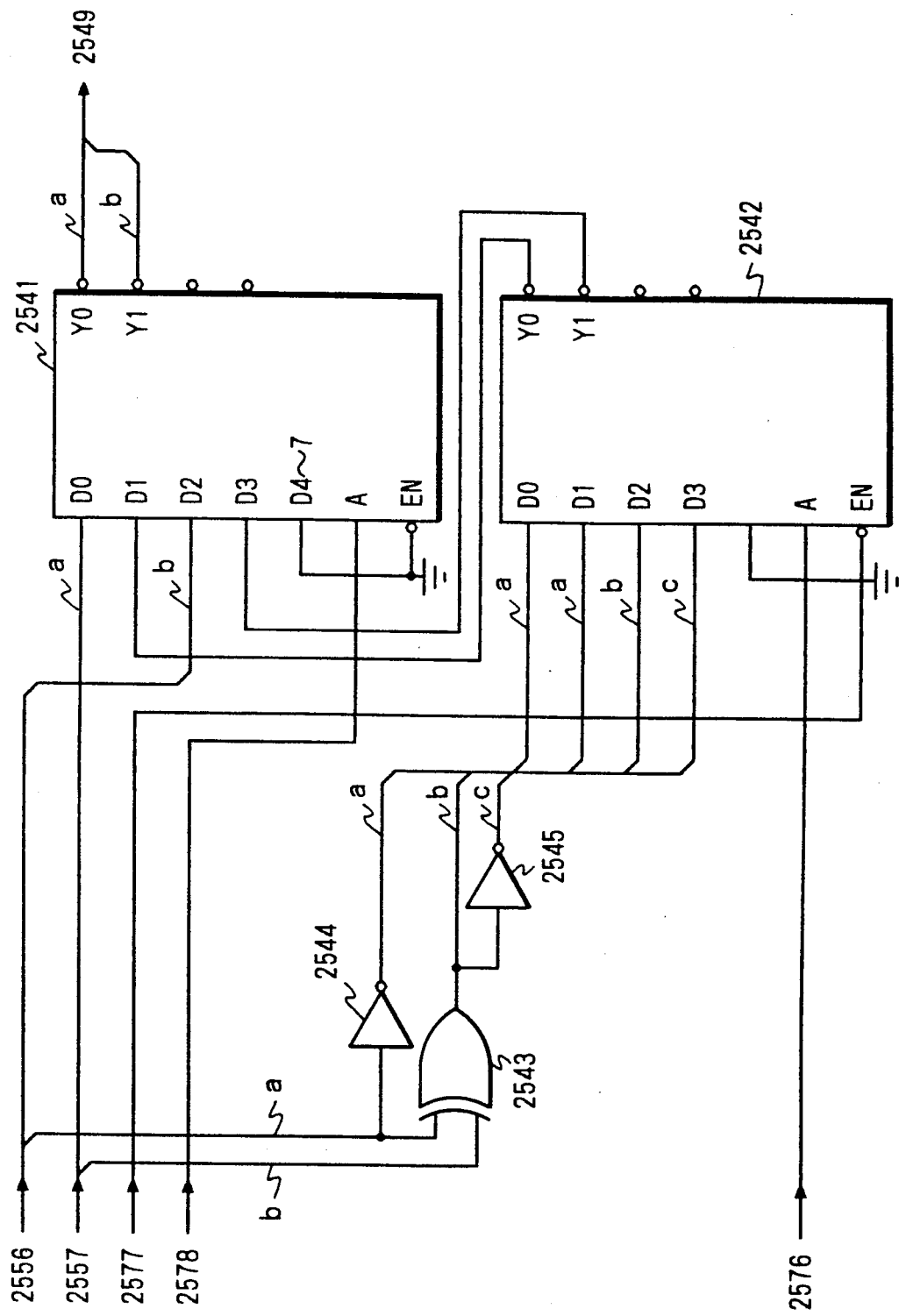
Figures 8, 8B:
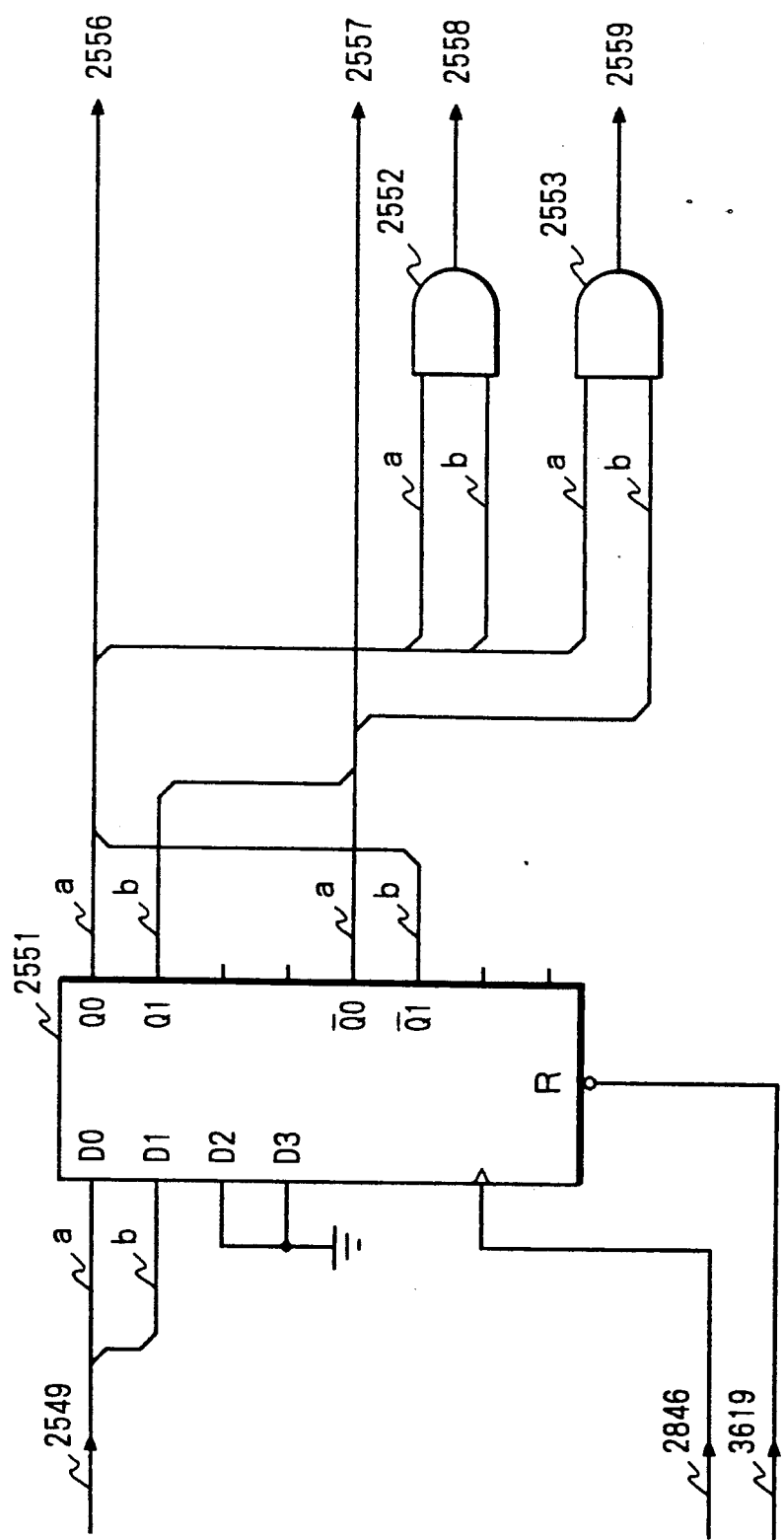
Figures 8, 8C:
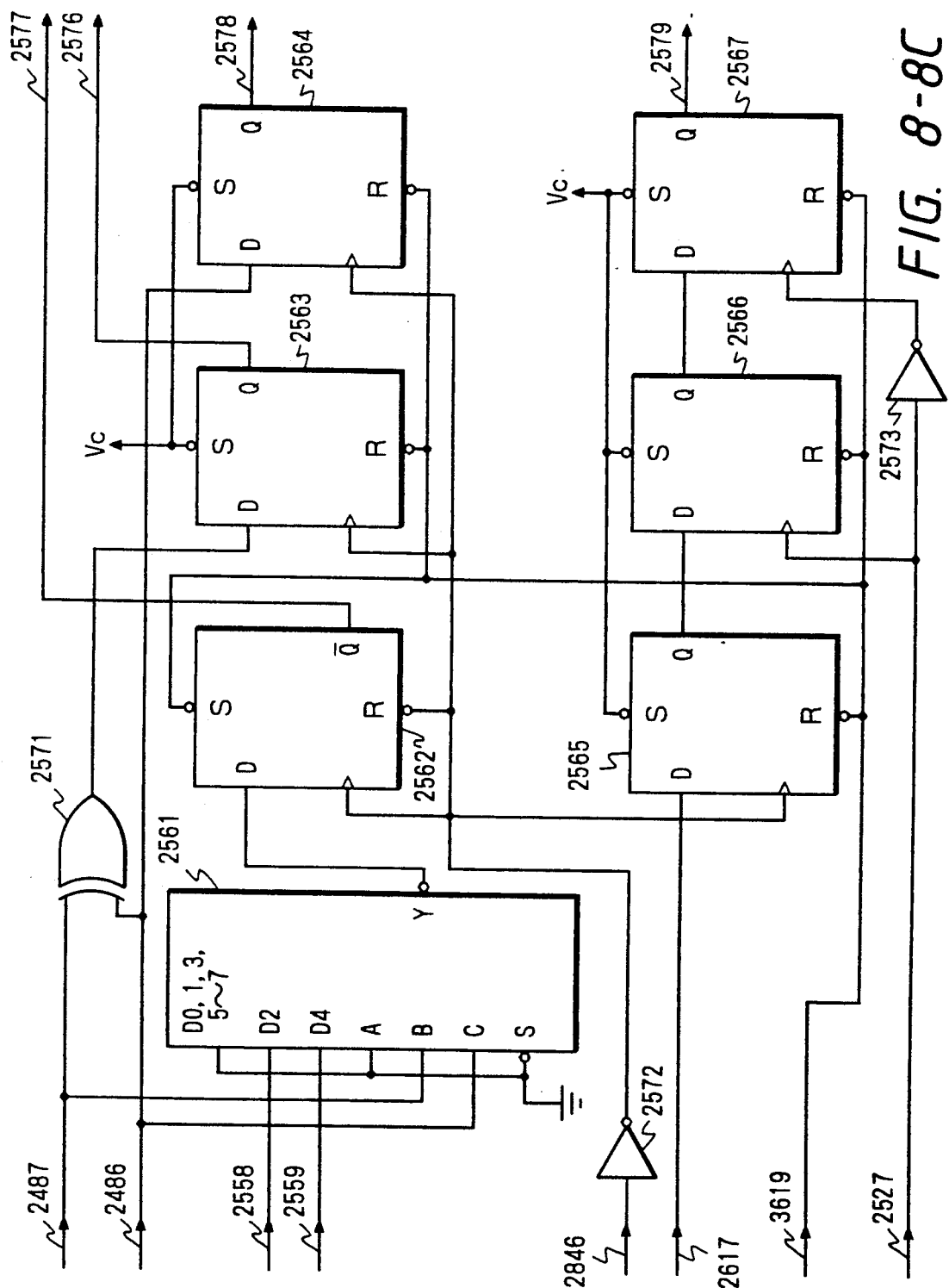
Figures 8, 8D:
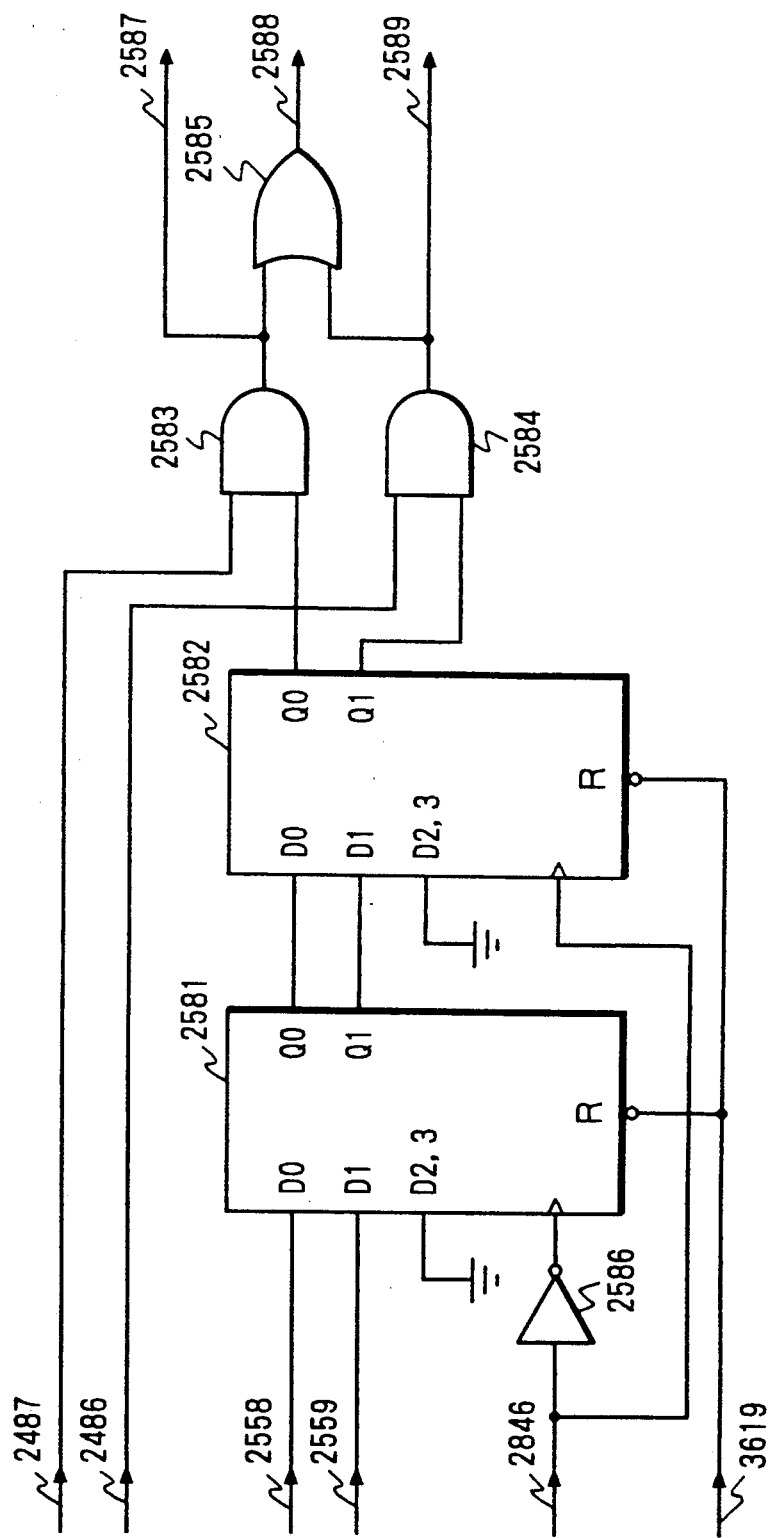
Figures 8, 8E:
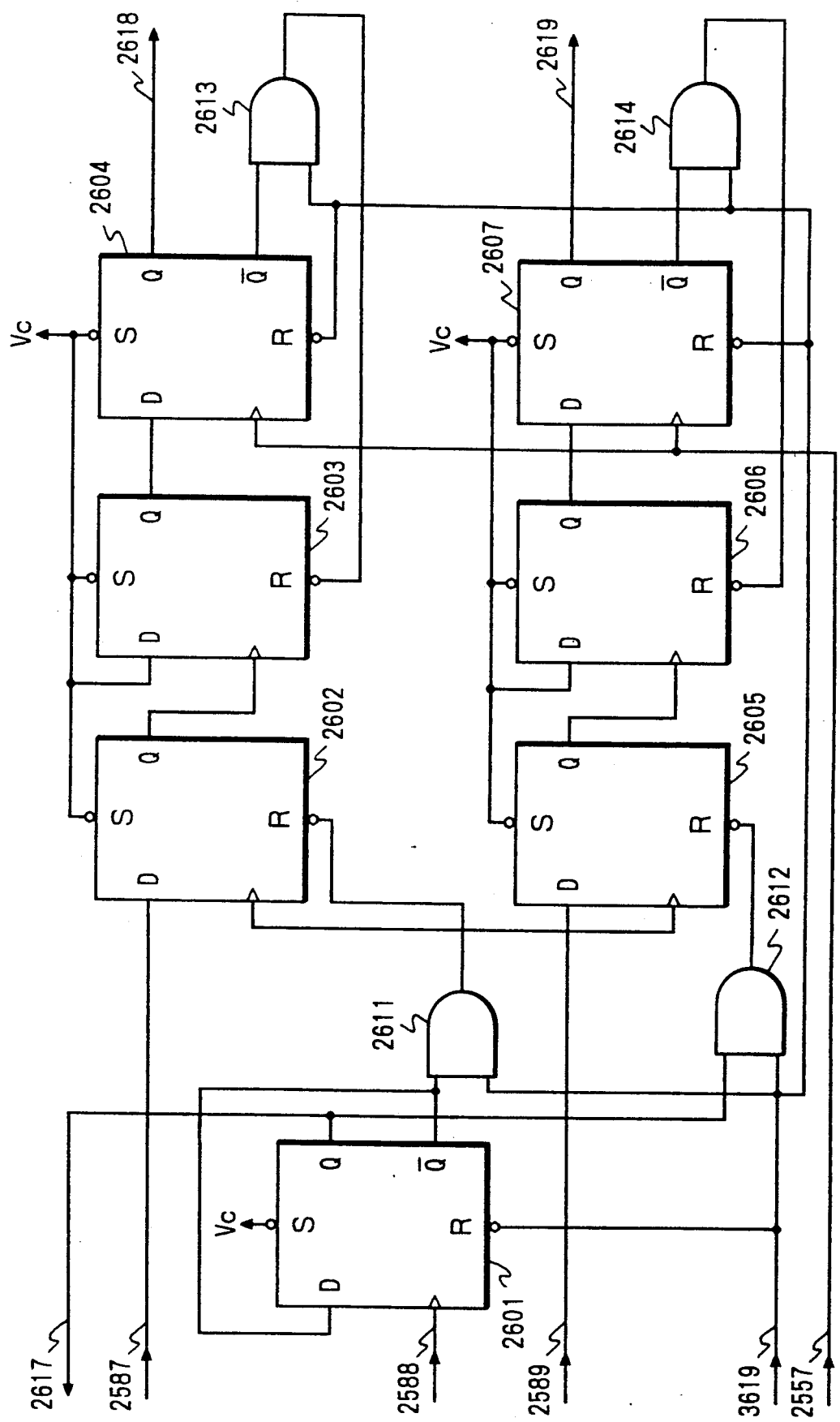

Referring now to FIGS. 8-8A through 8-8E, there is shown a circuit diagram of the received random walk filter circuit 254. In FIG. 8-8A, 2541, 2542 respectively designate multiplexers, 2543 stands for an exclusive OR gate, and 2544, 2545 respectively designate inverters. In this structure, the received random wark filter circuit 254 receives the signals 2556, 2557 from FIG. 8-8B and signals 2576, 2577, 2578 from FIG. 8-8C, and outputs a signal 2549.

In FIG. 8-8B, 2551 designates a D flip-flop, and 2552, 2553 respectively stand for AND gates. In this figure, the received random walk filter circuit 254 receives the signal 2549 from FIG. 8-8A signal 2846 of 20.48 MHz from the delay register circuit 280, and signal 3619 for resetting from the transmission code converter circuit 360, and obtains signals 2556-2559.

In FIG. 8-8C, 2561 designates a multiplexer, 2562-2567 respectively stand for D flip-flops, 2571 represents an exclusive OR gate, and 2572, 2573 respectively express inverters. In this structure, the received random walk filter circuit 254 receives the signals 2486, 2487 from the received phase comparison circuit 246, signals 2558, 2559 from FIG. 8-8B, signal 2846 from the delay register circuit 280, signal 2617 from FIG. 8-8E, signal 3619 from the transmission code converter circuit 360, and signal 2527 from the received phase control circuit 249, and outputs signals 2576-2579.

In FIG. 8-8D, 2581, 2582 respectively designate D flip-flops, and 2583, 2584 respectively stand for AND gates, 2585 represents an OR gate, and 2586 expresses an inverter. In this figure, the received random walk filter circuit 254 receives the signals 2486, 2487 from the received phase comparison circuit 246, signals 2558, 2559 from FIG. 8-8B, signal 2846 from the delay register circuit 280, and signal 3619 from the transmission code converter circuit 360, and outputs signals 2587-2589.

In FIG. 8-8E, 2601-2607 respectively designate flip-flops and 2611-2614 respectively stand for AND gates. In this figure, the received random walk filter circuit 254 receives the signals 2587-2589 from FIG. 8-8D, signal 3619 from the transmission code converter circuit 360, and signal 2527 from the received phase control circuit 249, and outputs signals 2617-2619.

The present received random walk filter circuit 254 forms an up/down counter capable of counting the values of 0-2. This up/down counter samples the signal 2539 at the falling of a signal 2846 and counts down at the rising of the signal 2846 when the value thereof is "H", and samples the signal 2486 at the falling of the signal 2846 and counts up at the rising of the signal 2846 when the value thereof is "H".

Referring now to FIGS. 8-9A through 8-9K, there is shown a circuit diagram of a phase filter circuit. In FIG. 8-9A, 2621-2623 respectively designate NAND gates, 2624-2627 respectively stand for exclusive OR gates, and 2628 represents an inverter. In this structure, the phase filter circuit receives signals 2686a-e, 2687a-e from FIG. 8-9E, and outputs signals 2639a-e.

In FIG. 8-9B, 2641 designates an AND gate, 2642, 2643 respectively stand for NAND gates, 2644-2546 respectively represent exclusive OR gates, and 2647 express an inverter. In this structure, the phase filter circuit receives the signals 2639a-e from 8-9A and signals 2686a-e from FIG. 8-9E, and outputs signals 2649a-d.

In FIG. 8-9C, 2651, 2652 respectively designate multiplexers. In this figures, the phase filter circuit receives the signals 2687a-e, 2686e from FIG. 8-9E, signals 2669a-e from FIG. 8-9D, and signal 2787 from FIG. 8-9K, and outputs signals 2659a-e.

In FIG. 8-9D, 2661, 2662 respectively designate multiplexers. In this figure, the phase filter circuit receives the signals 2639a-e from FIG. 8-9A, signal 2766 from FIG. 8-9J, signals 2649a-d from FIG. 8-9B, and signal 2768 from FIG. 8-9J, and outputs signals 2669a-e.

In FIG. 8-9E, 2671, 2672 respectively designate D flip-flops, and 2673-2676 respectively stand for NAND gates, and 2681, 2682 respectively represent NOR gates. In this figure, the phase filter circuit receives the signals 2659a-e, signal 2846 from the delay register circuit 280, and signal 2767 from FIG. 8-9J, and outputs 2686-2689.

In FIG. 8-9F, 2691 2694 respectively designate D flip-flops. In this figure, the phase filter circuit receives the signal 2846 from the delay register circuit 280, signal 2767 from FIG. 8-9J, and signals 2749a-e, and outputs signals 2697-2699.

In FIG. 8-9G, 2701, 2702 respectively designate AND gates, 2703 stands for a NAND gate, 2704-2707 respectively represent exclusive OR gates, and 2708 expresses a NOR gate. In this structure, the phase filter circuit 262 receives the signals 2699a-d and 2698c-e from FIG. 8-9F, and outputs signals 2718a-d and a signal 2719.

In FIG. 8-9H, 2721, 2722 respectively designate AND gates 2723, 2724 respectively stand for NAND gates, 2725-2727 respectively represent exclusive OR gates, and 2728 expresses an inverter. In this structure, the phase filter circuit 262 receives the signals 2718 a from FIG. 8-9G, and signals 2699c,d and 2698a-e from FIG. 8-9F, and outputs signals 2738a-d and a signal 2739.

In FIG. 8-9I, 2741-2743 respectively designate multiplexers and 2744, 2745 respectively stand for OR gates. In this structure, the phase filter circuit 262 receives the signals 2698a, c, d, 2699a, b, e from FIG. 8-9F, signals 2718a-d from FIG. 8-9G, signals 2738a-d from FIG. 8-9H, signal 2766 from FIG. 8-9J, and signal 2789, 2786, 2788 from FIG. 8-9K, and outputs signals 2749a-e.

In FIG. 8-9J, 2751 designate multiplexers, 2752, 2753 respectively stand for D flip-flops, and 2754-2756 respectively represent inverters. In this structure, the phase filter circuit 262 receives the signal 2689, 2688 from FIG. 8-9E, signal 2176 from the MS arbiter circuit 210, signal 3619 from the transmission code converter circuit 360, signals 2488, 2489 from the received phase comparison circuit 246, and signal 2846 from the delay register circuit 280, and outputs signals 2766-2769.

In FIG. 8-9K, 2771 designates a multiplexer, 2772-2775 respectively stand for AND gates, and 2776 represents an inverter. In this structure, the phase filter circuit 262 receives the signals 2688, 2689 from FIG. 8-9E, signal 2719 from FIG. 8-9G, signal 2716 from the MS arbiter circuit 210, signal 2739 from FIG. 8-9H, signal 2689 from FIG. 8-9E, signals 2768, 2769 from FIG. 8-9J, and signal 3619 from the transmission code converter circuit 360, and outputs signals 2786-2789.

The phase filter circuit 262 forms a filter which serves as an up/down counter in order to determine the amount of delay of the delay register circuit 280.

Referring now to FIGS. 8-10A through 8-10D, there is shown a circuit diagram of the delay register circuit 280. In FIG. 8-10A, 2801-2803 respectively designate shift registers and 2804-2808, 2811-2816 respectively stand for NAND gates. In this structure, the delay register circuit 280 receives the signal 2529 from the received phase control circuit 249, signal 2309 from the clock generation circuit 2301, and signal 2889 from FIG. 8-10D, and outputs a signal 2819.

In FIG. 8-10B, 2821, 2822 respectively designate shift registers, 2823-2825 respectively stand for D flip-flops, 2826-2828 respectively represent AND gates, 2831, 2832 respectively express NAND gates, 2833 designates an exclusive OR gate, 2834 stands for an OR gate, 2835 represents a NOR gate, 2836, 2937 respectively show inverters, and 2838 stands for butter. In this structure, the delay register circuit 280 receives the signal 2697a from the phase filter circuit 262, signal 2459 from the received phase control circuit 242, signal 2819 from FIG. 8-10A, and signal 2309 from the clock generation circuit 2301, and outputs signals 2846-2849. In this figure, the signal 2848 is a signal of 4.096 MHz (FIGS. 5-2A-5-2C (a))

In FIG. 8-10C, 2851, designates a decoder, 2852 stands for NAND gate, 2853 represents an OR gate, 2854 shows a NOR gate, and 2855-2858, 2861-2866 respectively express inverters. In this structure, the delay register circuit 280 receives the signals 2697d-e from the phase filter circuit 262 and outputs signals 2868a-j.

In FIG. 8-10D, 2871-2874 respectively designate D flip-flops, 2875-2877 respectively stand for AND gates, and 2881, 2882 respectively represent NAND gates. In this structure, the delay register circuit 280 receives the signals 2869a-j from FIG. 8-10C and signal 2847 from FIG. 8-10B, and outputs a signal 2889.

The delay register circuit 280, in accordance with the delay amount select data (signal 2697) from the phase filter circuit 262, controls the phase of a clock of 2.048 MHz from the received phase control circuit 249 and outputs a signal 2849 of 2.048 MHz and a signal 2848 of 4.096 MHz.

Figures 8, 9, 9A:
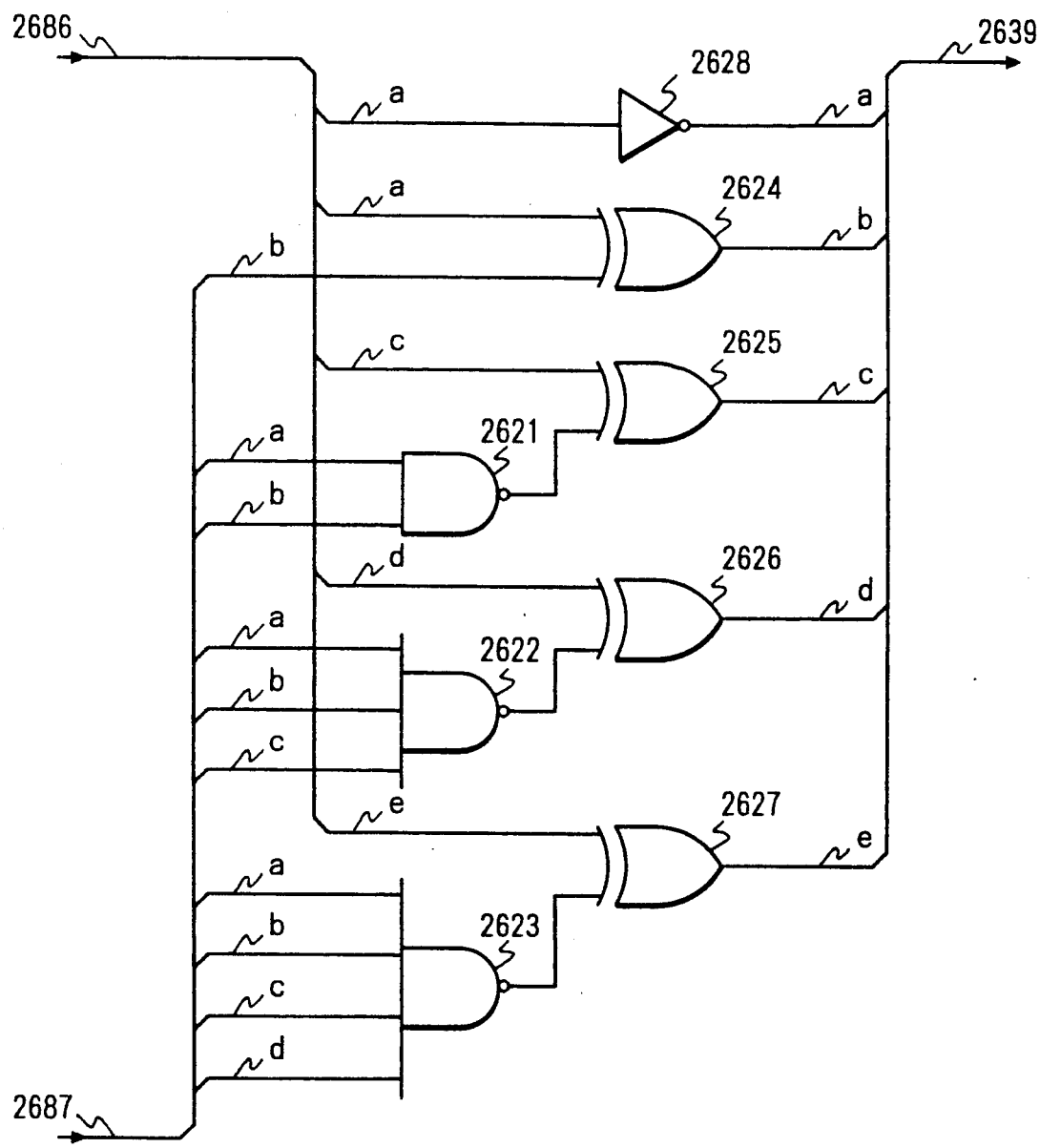
Figures 8, 9, 9B:
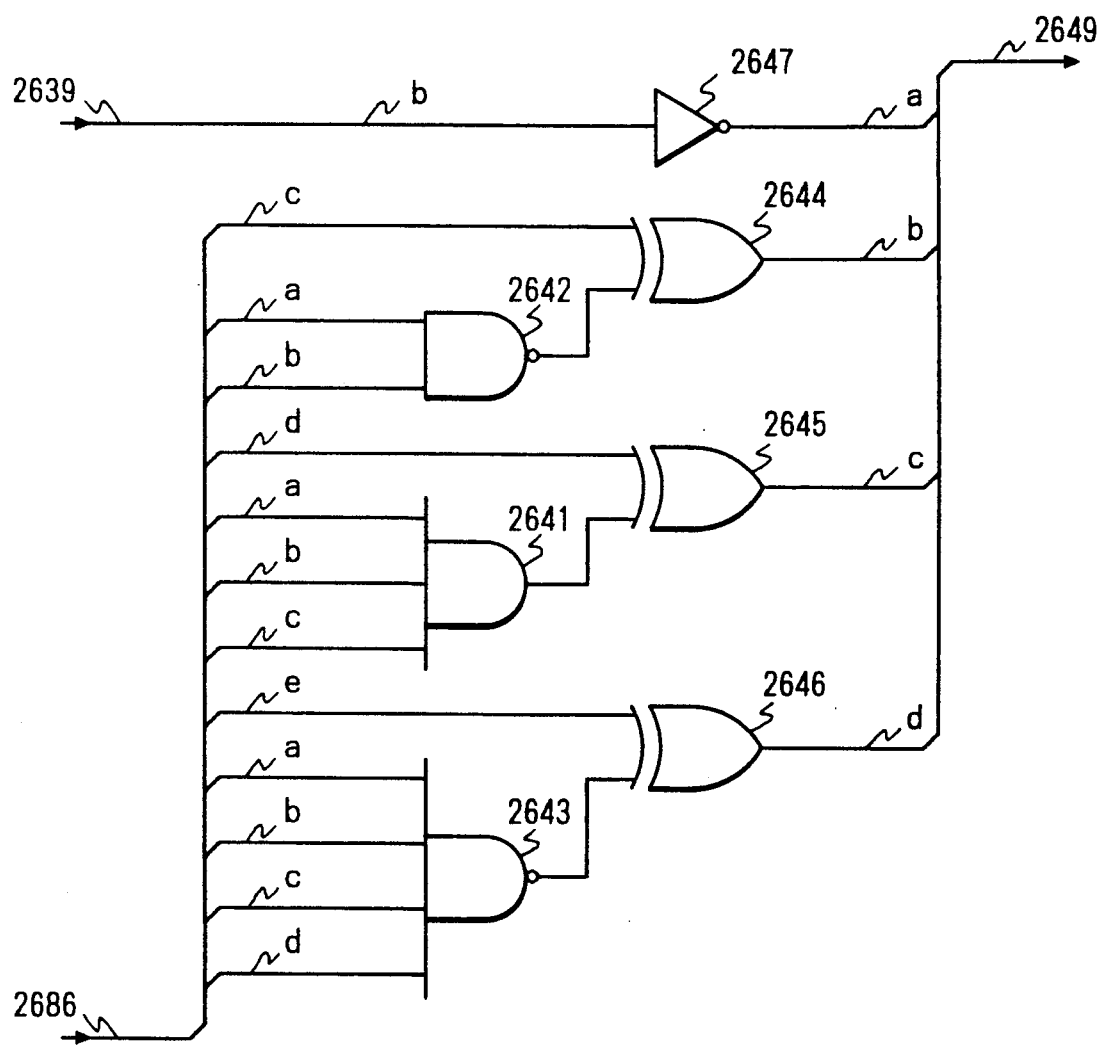
Figures 8, 9, 9C:
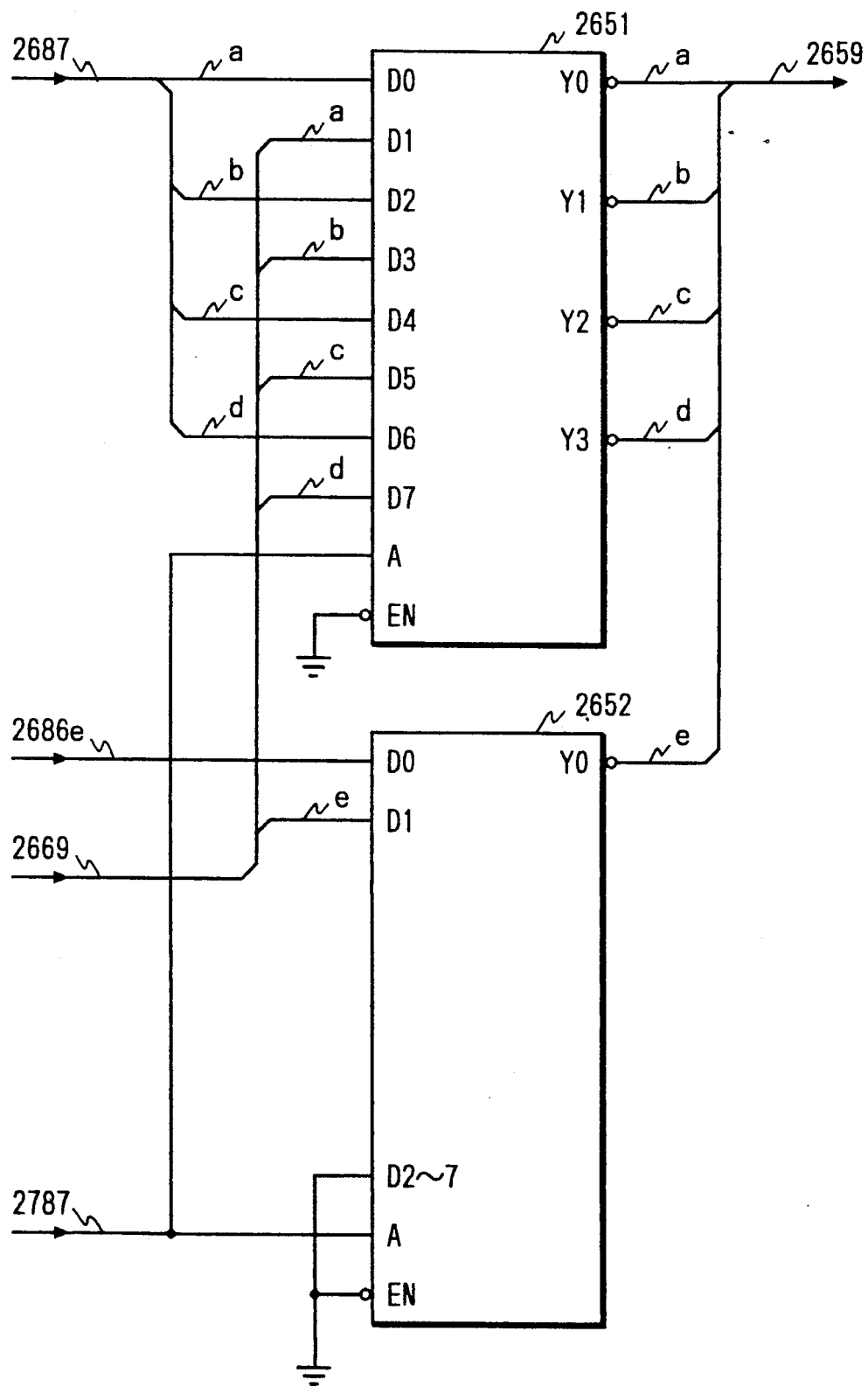
Figures 8, 9, 9D:
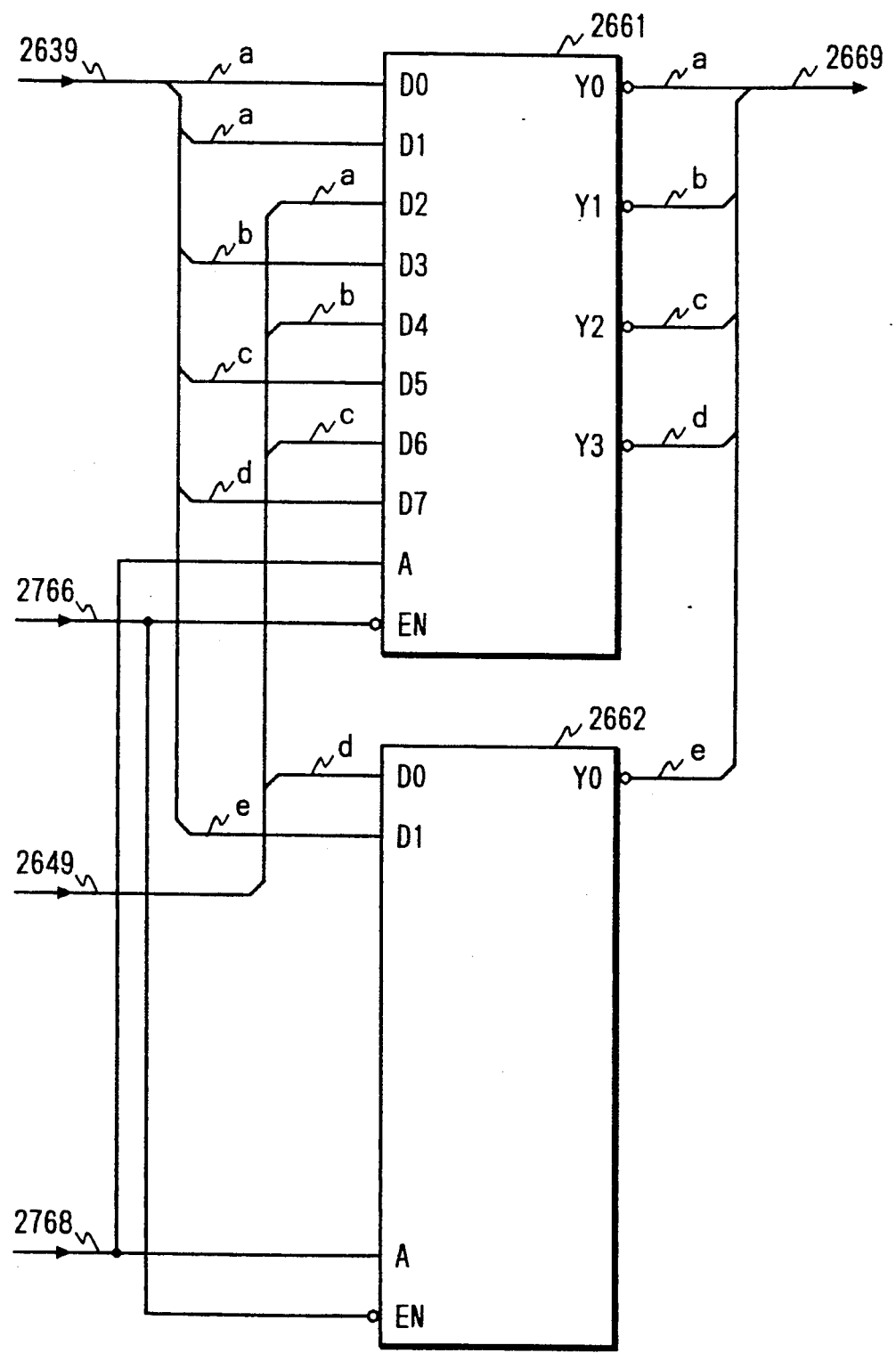
Figures 8, 9, 9E:
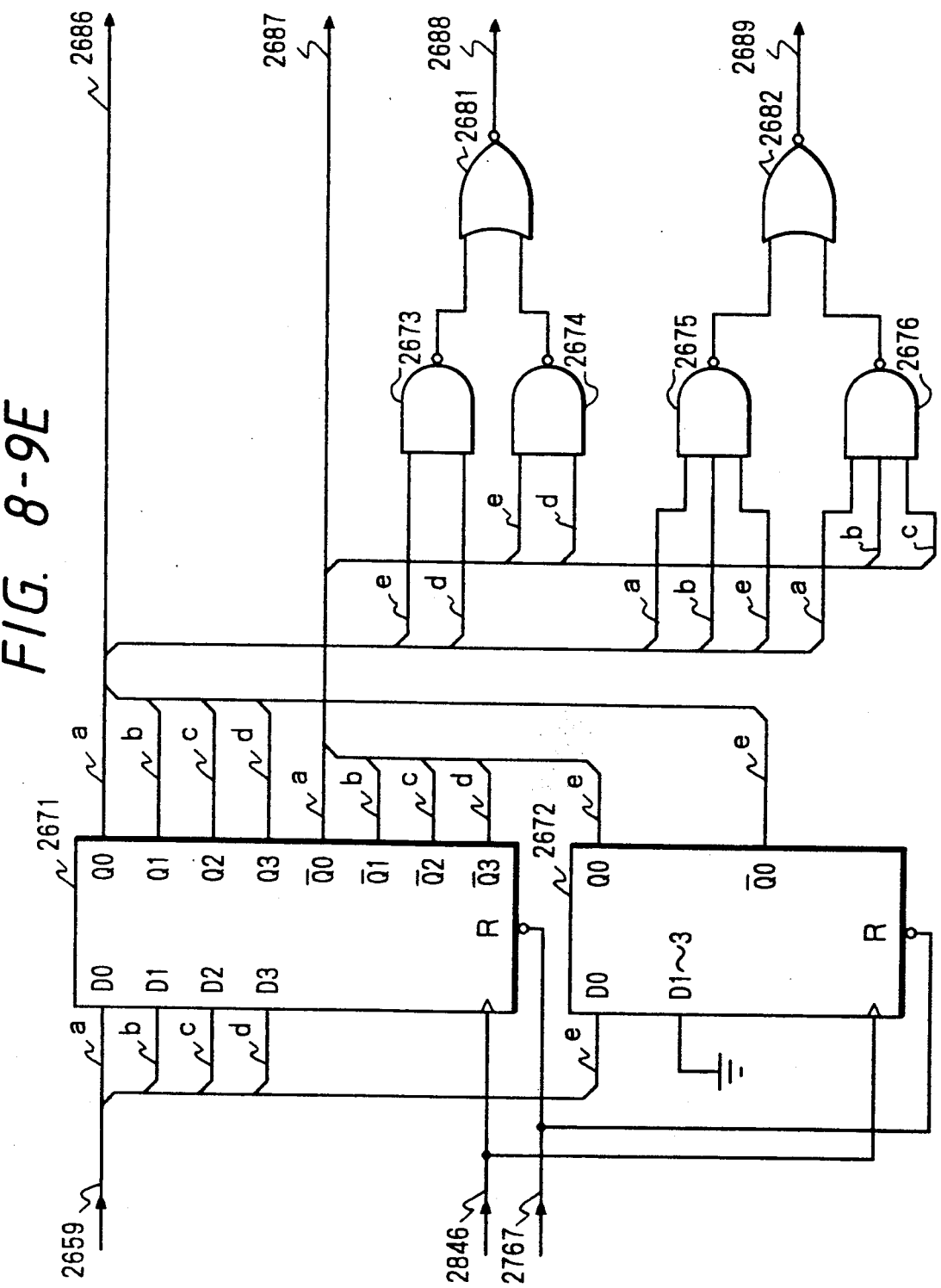
Figures 8, 9, 9F:
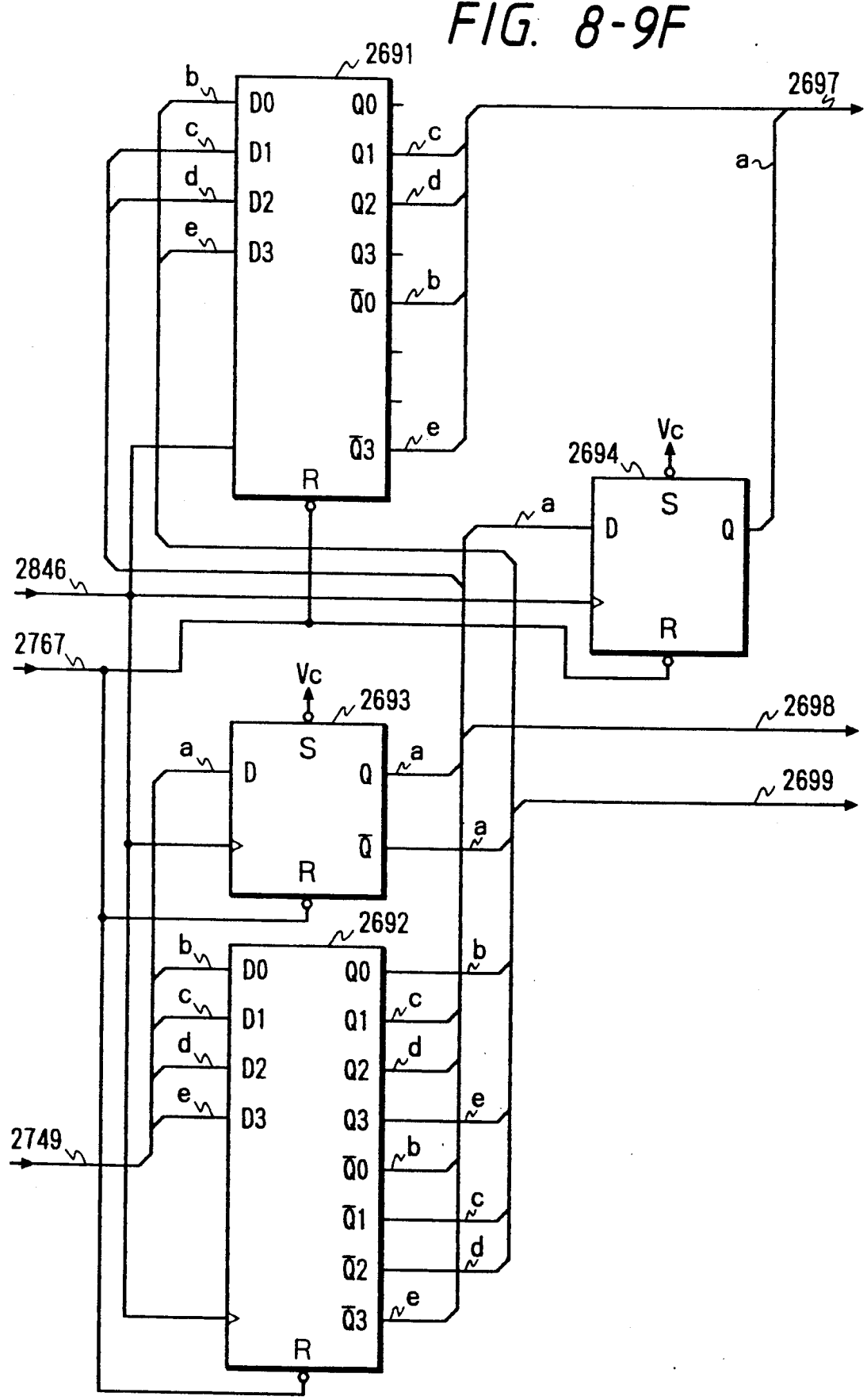
Figures 8, 9, 9G:
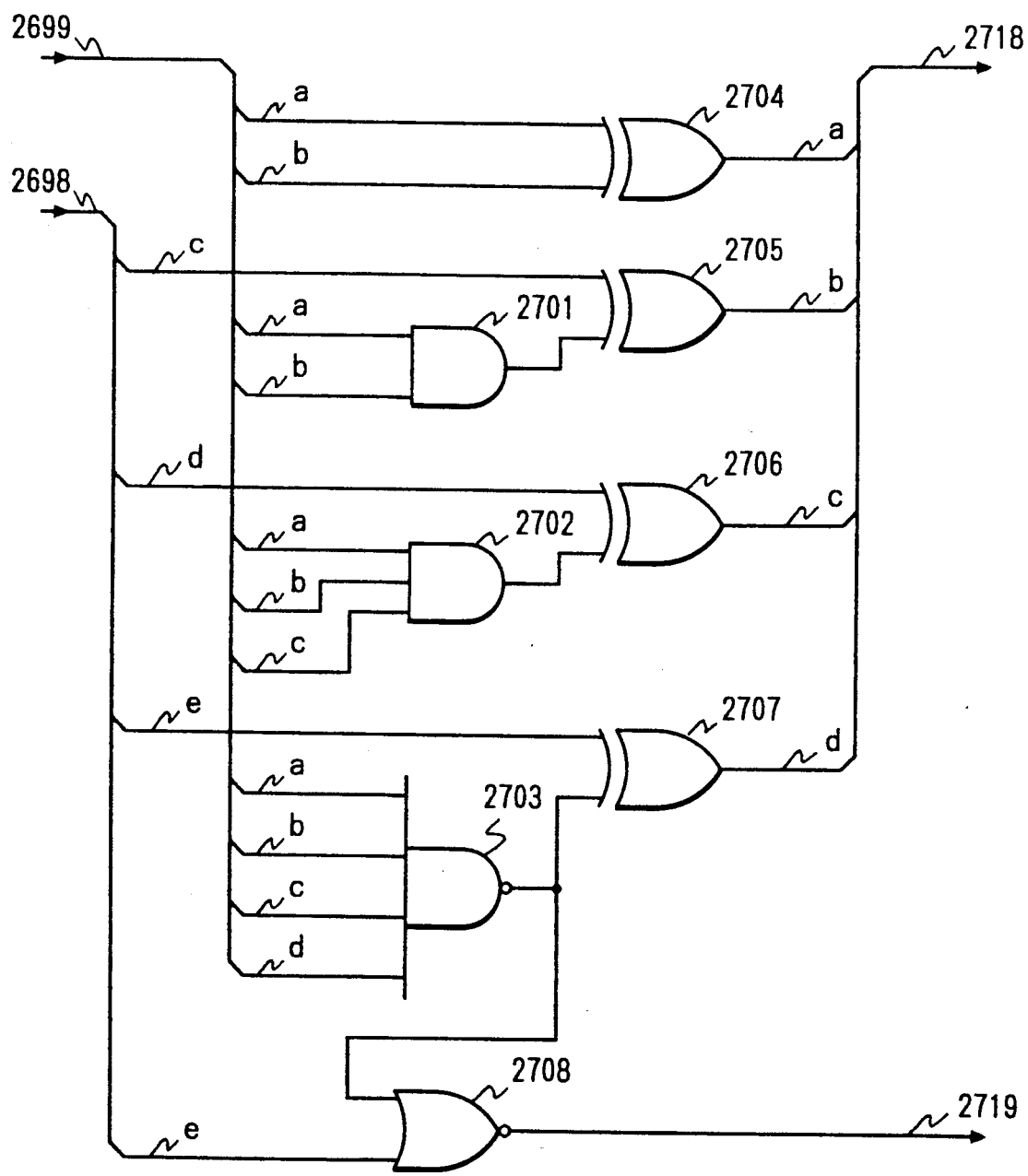
Figures 8, 9, 9H:
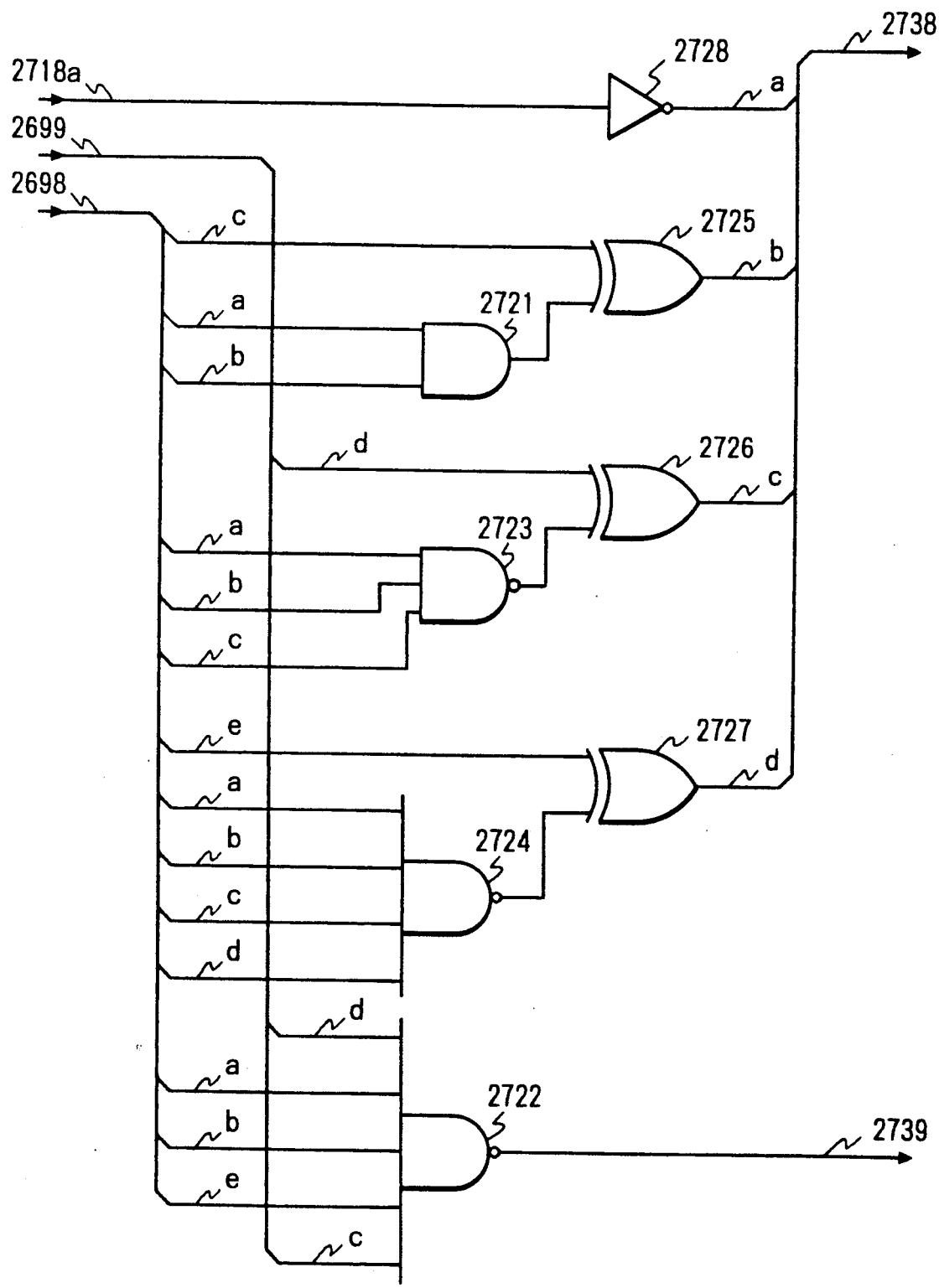
Figures 8, 9, 9I:
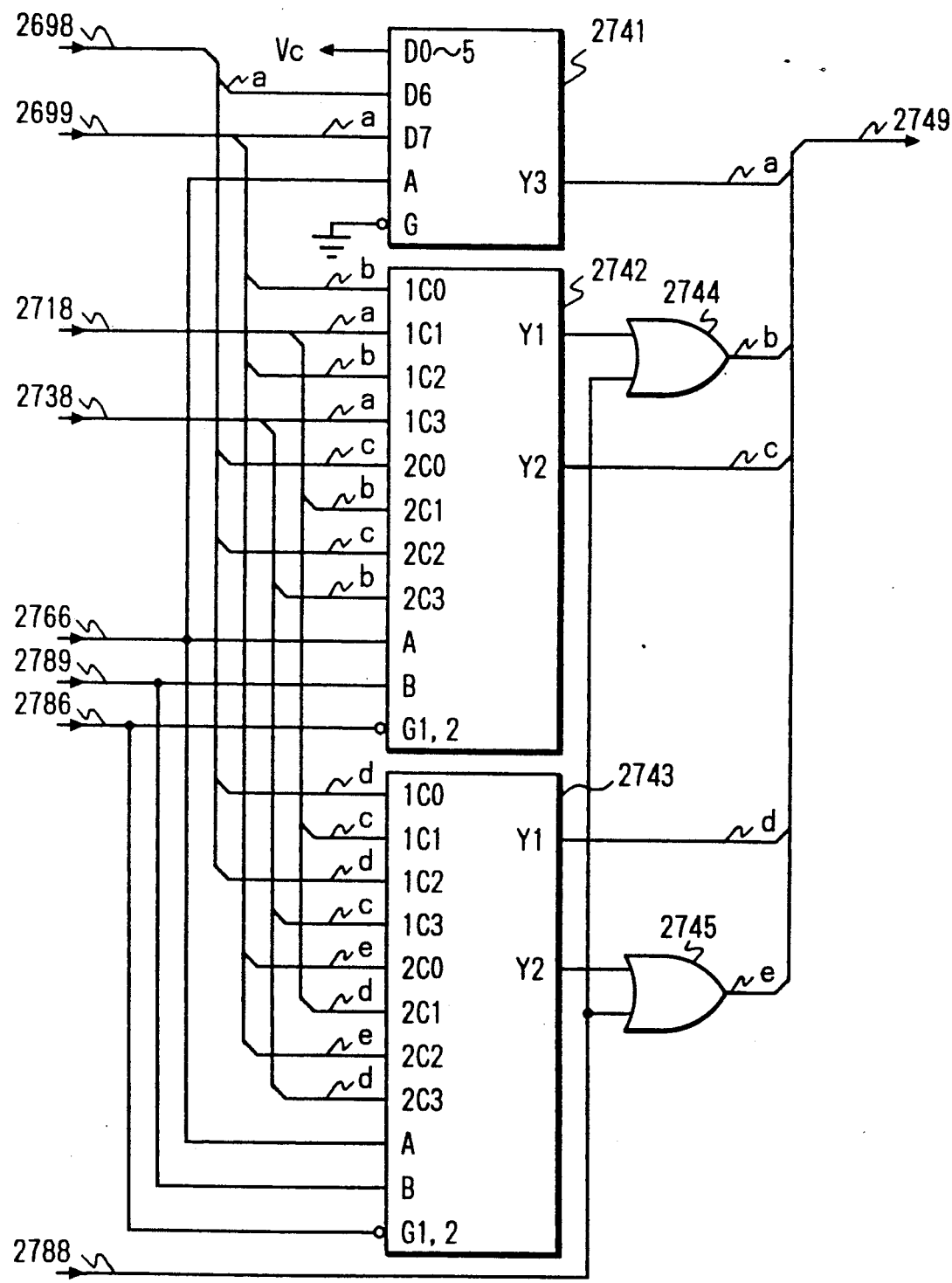
Figures 8, 9, 9J:
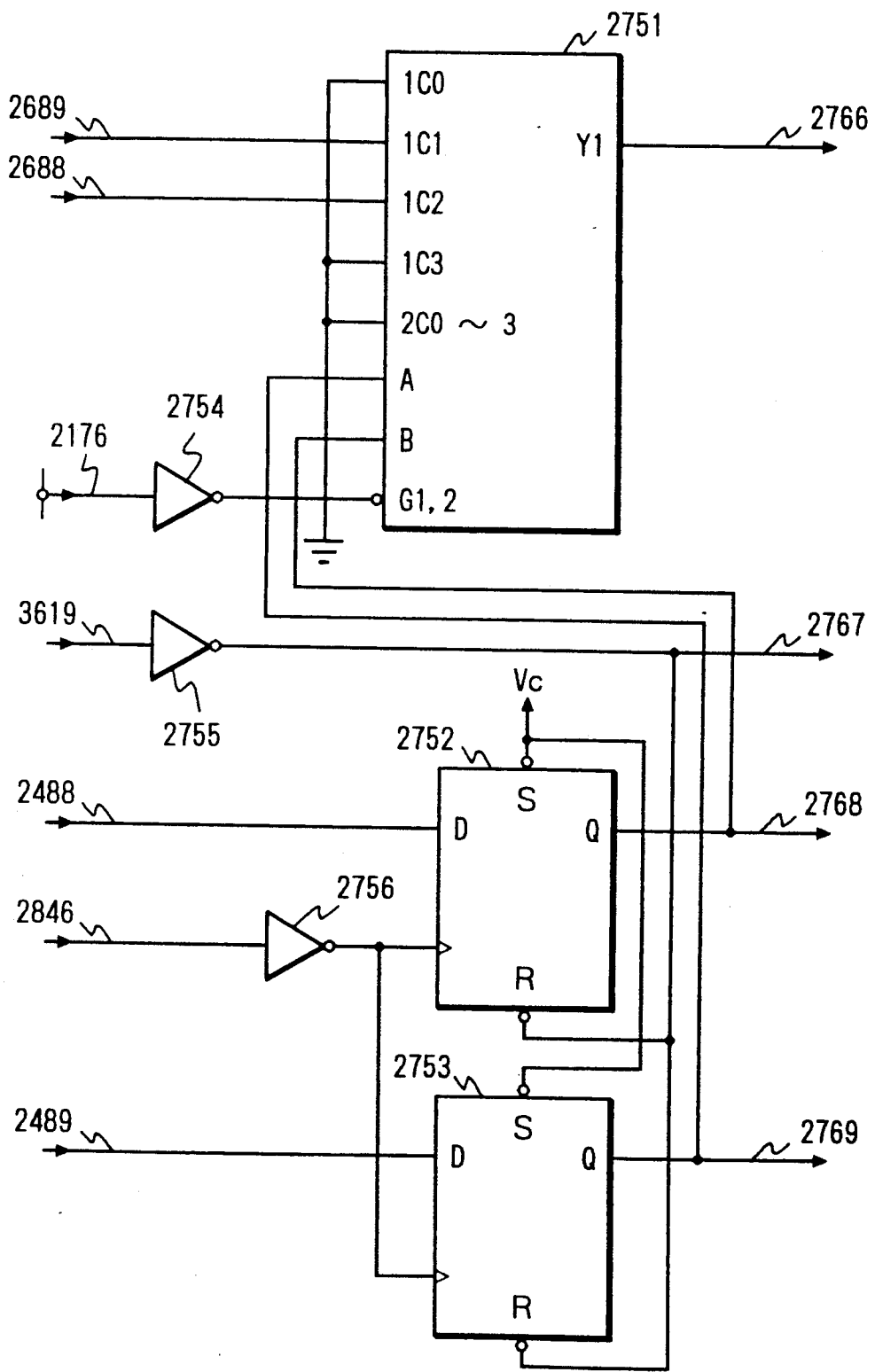
Figures 8, 9, 9K:
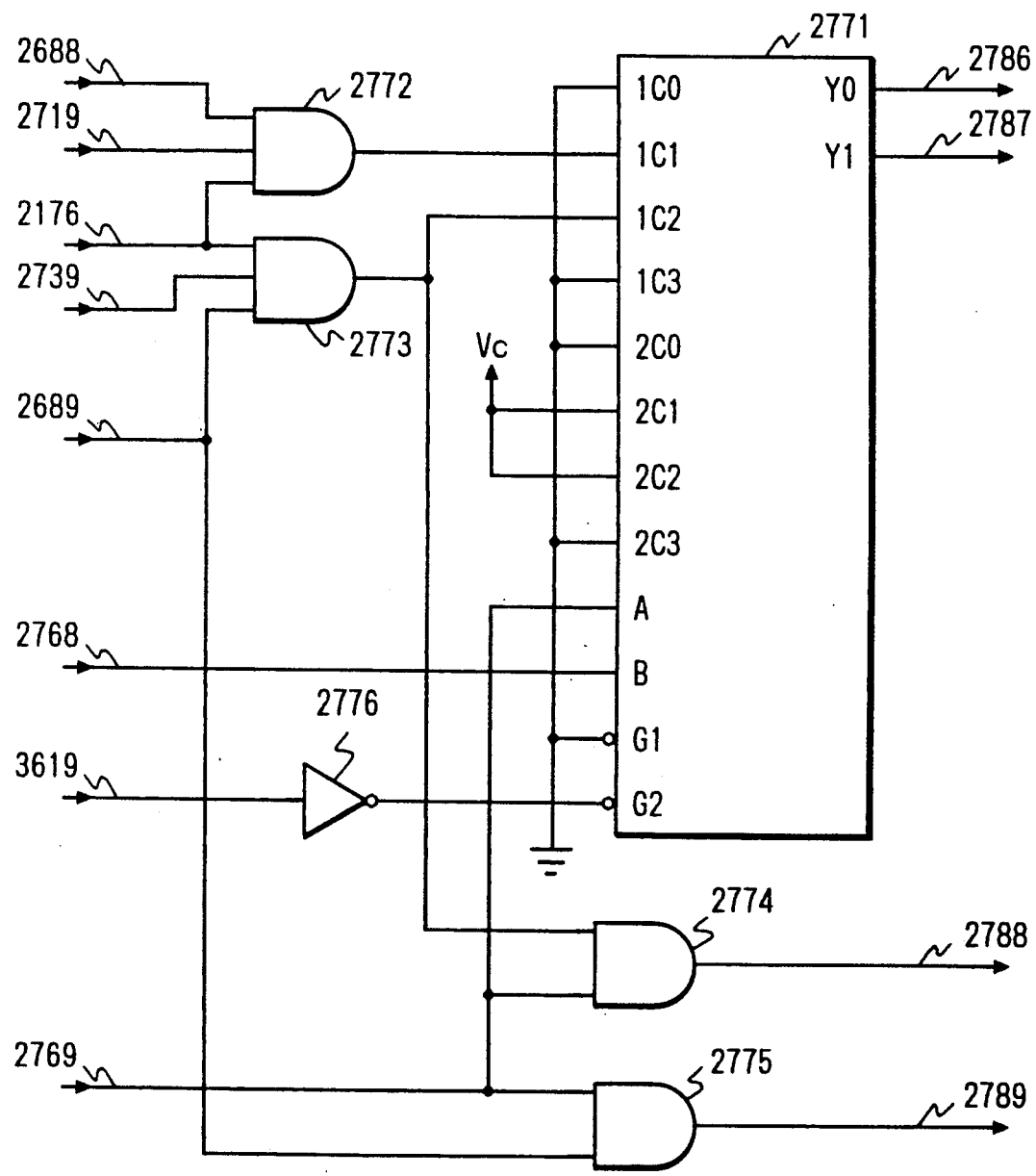

In FIG. 9-1, there is shown a circuit diagram of the frame synchronizing circuit 310 contained in the MS link synchronizing part 200. In this structure, the frame synchronizing circuit 310 includes a violation detect circuit 311, a synchronism protect circuit 313 and a counter circuit 315. In this frame synchronizing circuit 310, the violation detect circuit 311 detects a synchronized violation from the signals 3717, 3718 coming from the received code converter circuit 370 which has received a signal through the ascending link transmission line LU, the counter circuit 315 confirms a position where the violation occurs, and the synchronism protect circuit 313 generates a signal 3149 which indicates a synchronized state or non-synchronized state, so that an accurate frame synchronism can always be obtained.

In FIG. 9-2, there is shown a circuit diagram of the violation detect circuit 311. In this figure, 3111-3113 respectively designate D flip-flops, 3114 stands for a NAND gate, 3115 represents an exclusive OR gate, and 3116, 3117 respectively express inverters. In this structure, the violation detect circuit 311 receives the signals 3717, 3718 from the received code converter circuit 370, signal 2459 of 2.048 MHz from the MS bit synchronizing part 230, and signal 3619 from the transmission code converter circuit 360, and outputs a signal 3119 which indicates that the occurrence of violation has been detected.

In FIG. 9-3, there is shown a circuit diagram of the synchronism protect circuit 313. In this figure, 3131-3137 respectively designate D flip-flops, 3138-3140 respectively stand for a NAND gates, 3141 represents a NOR gate, and 3142-3145 respectively shows inverters. In this structure, the synchronism protect circuit 313 receives the signals 3119 indicating the detection of the violation occurrence, signal 3828 (FIGS. 5-2A-5-2C (k)) from the received timing creating circuit 380, signal 2459 of 2.048 MHz from the received MS bit synchronizing circuit 230, and signal 3619 from the transmission code converter circuit 360, and outputs a signal 3149 which indicates a synchronized state (FIGS. 5-2A-5-2C (g)).

In FIG. 9-4, there is shown a circuit diagram of the counter circuit 315. In this figure, 3151, 3152 respectively designate counters, 3153 stands for a NAND gate, and 3154-3156 respectively represent inverters. In this figure, the counter circuit 315 receives the signal 3149 from the synchronism protect circuit 313, signal 3619 from the transmission code converter circuit 360, and signal 2459 of 2.048 MHz from the MS bit synchronizing circuit 230, and outputs a bus signal 316 including signals 3160-3162 and a bus signal 317 including signals 3170-3174 (FIGS. 5-2A-5-2C (e), (f)). These bus signals 316, 317 represent the position of a time slot (TS No. FIG. 2-1) in which the violation has occurred and the position of the bit (Bit No. FIG. 2-1).

Figures 8, 9, 10, 10A:
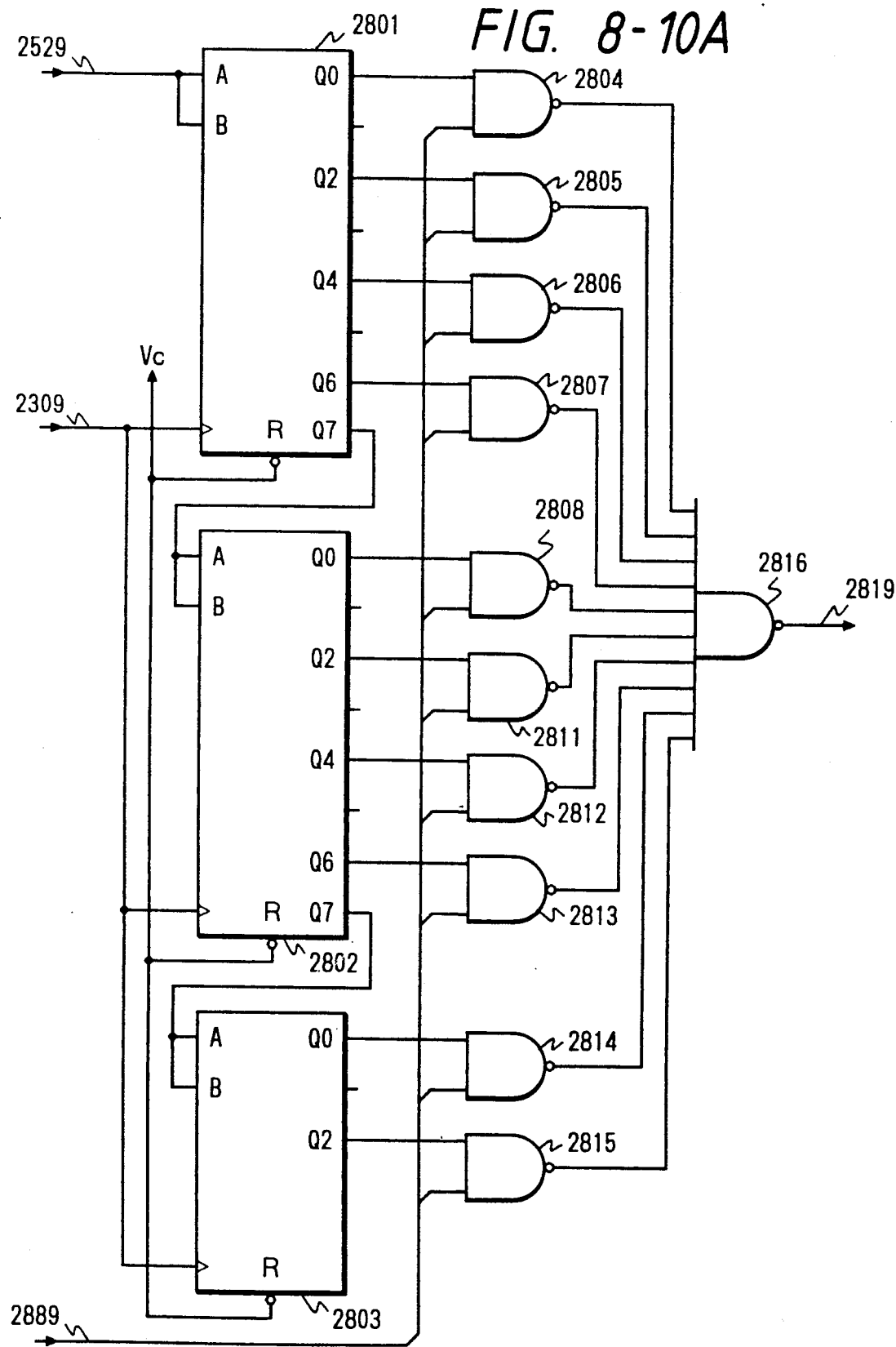
Figures 8, 9, 10, 10B:
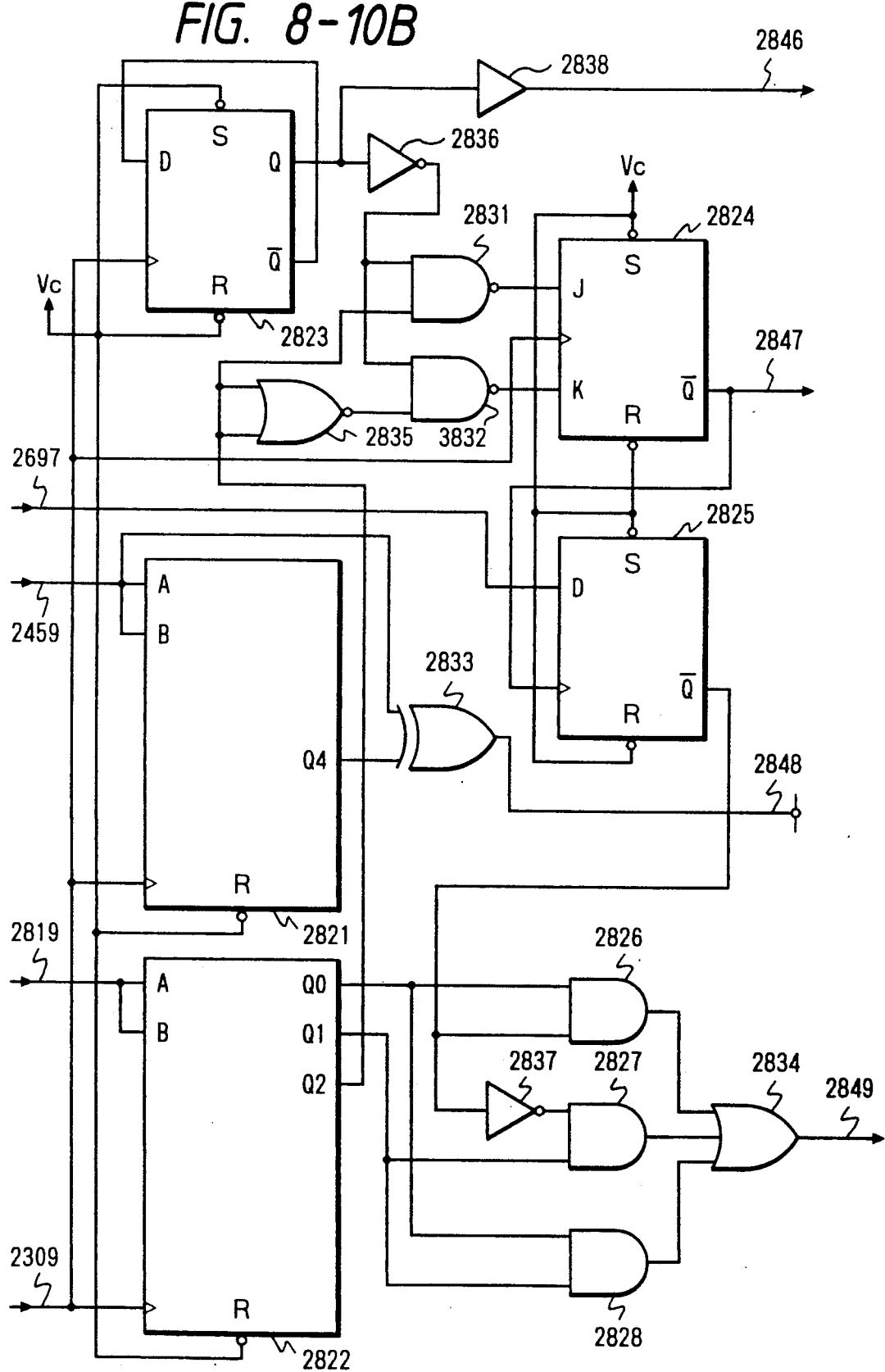
Figures 8, 9, 10, 10C:
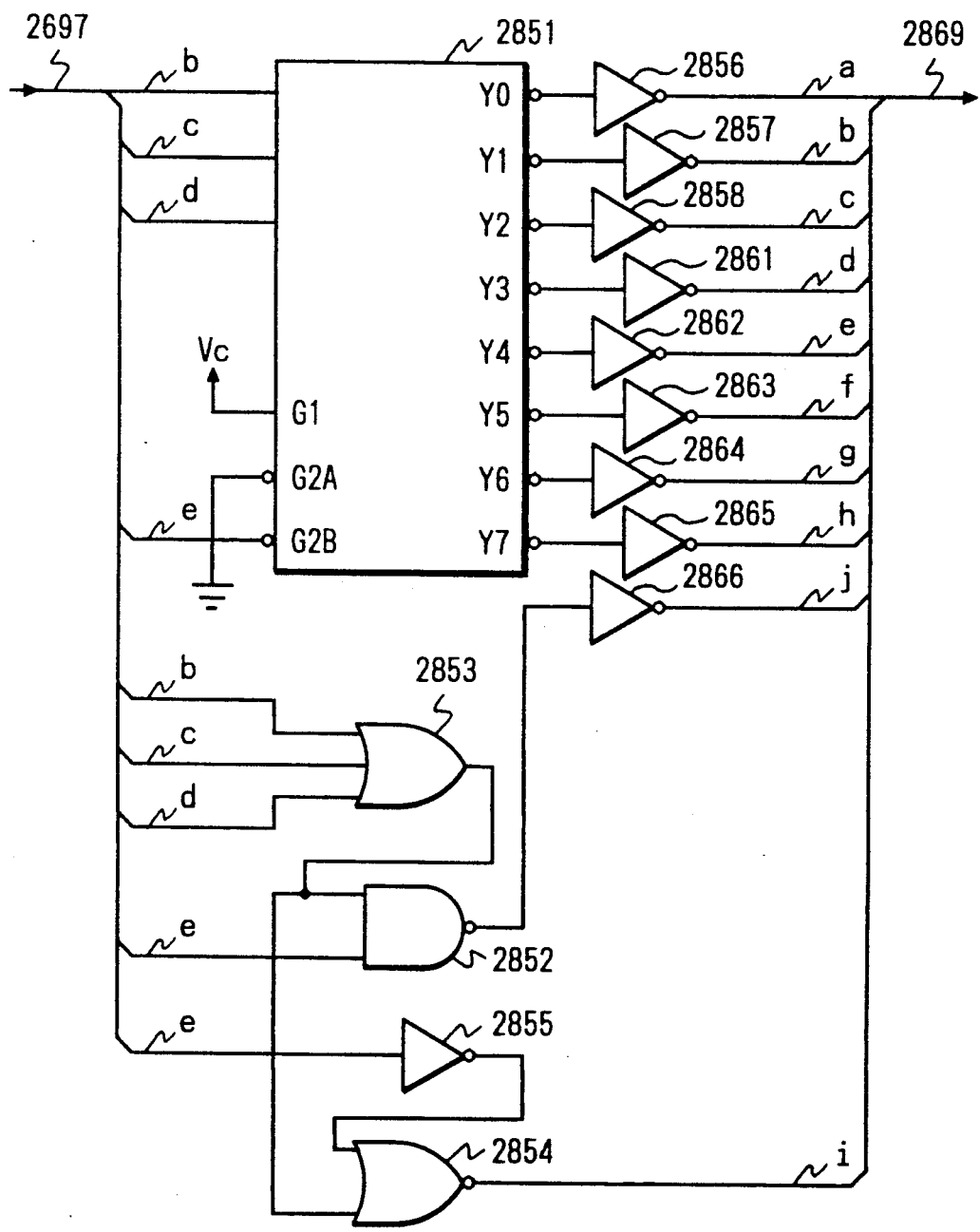
Figures 8, 9, 10, 10D:
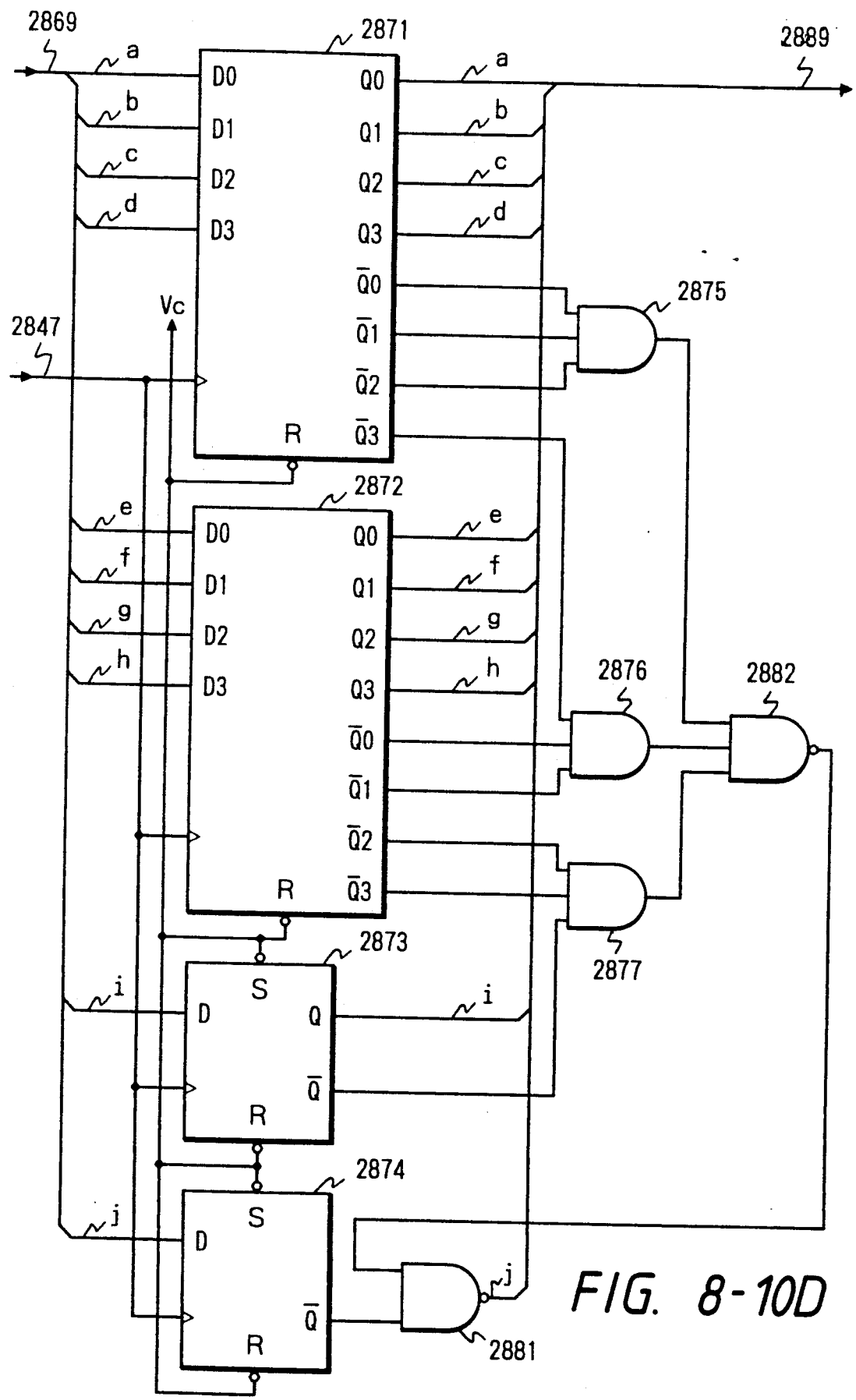
Figures 1, 9:
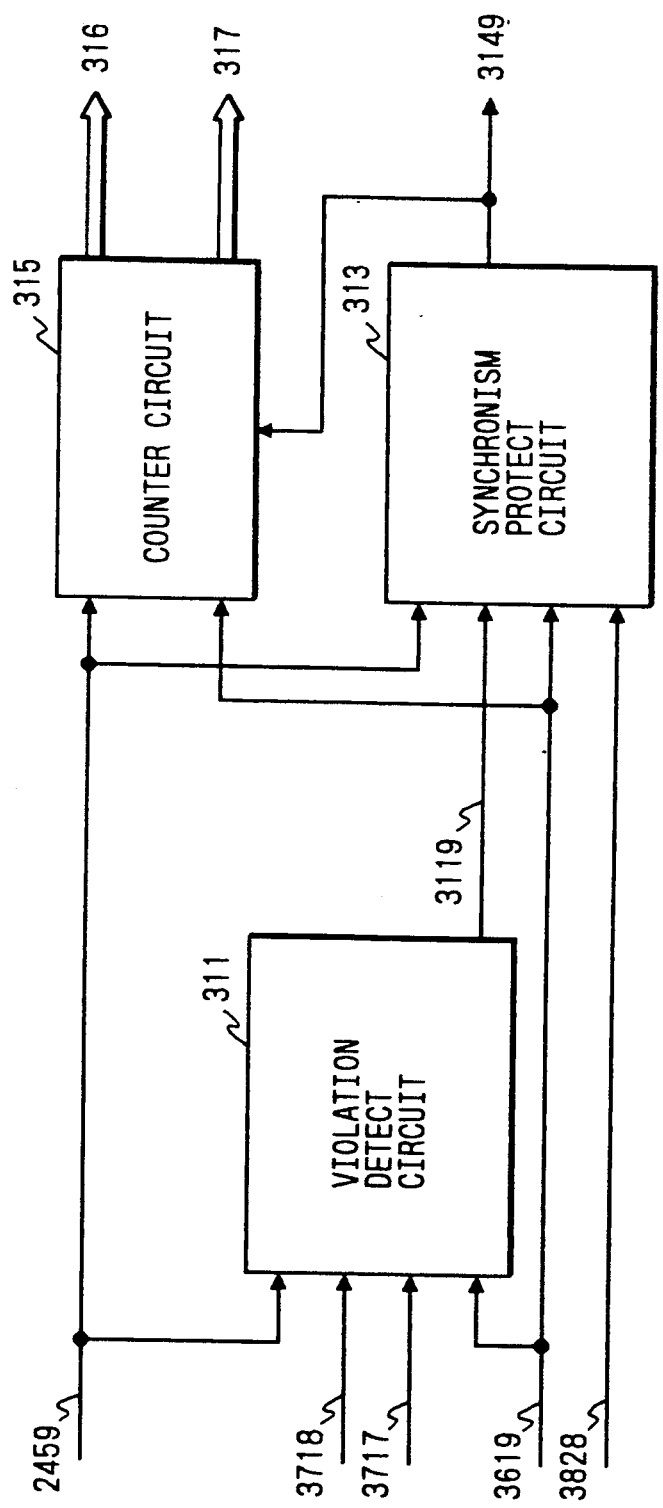
Figures 2, 9:
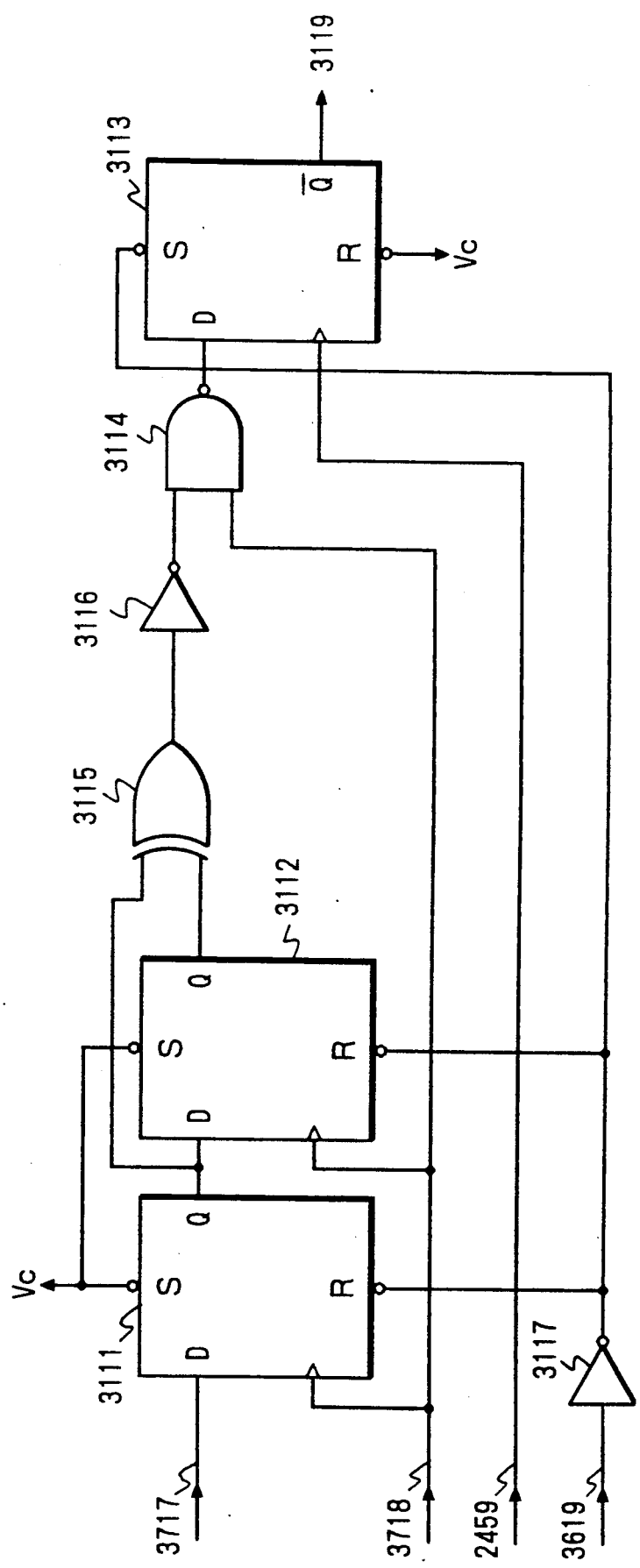
Figures 3, 9:
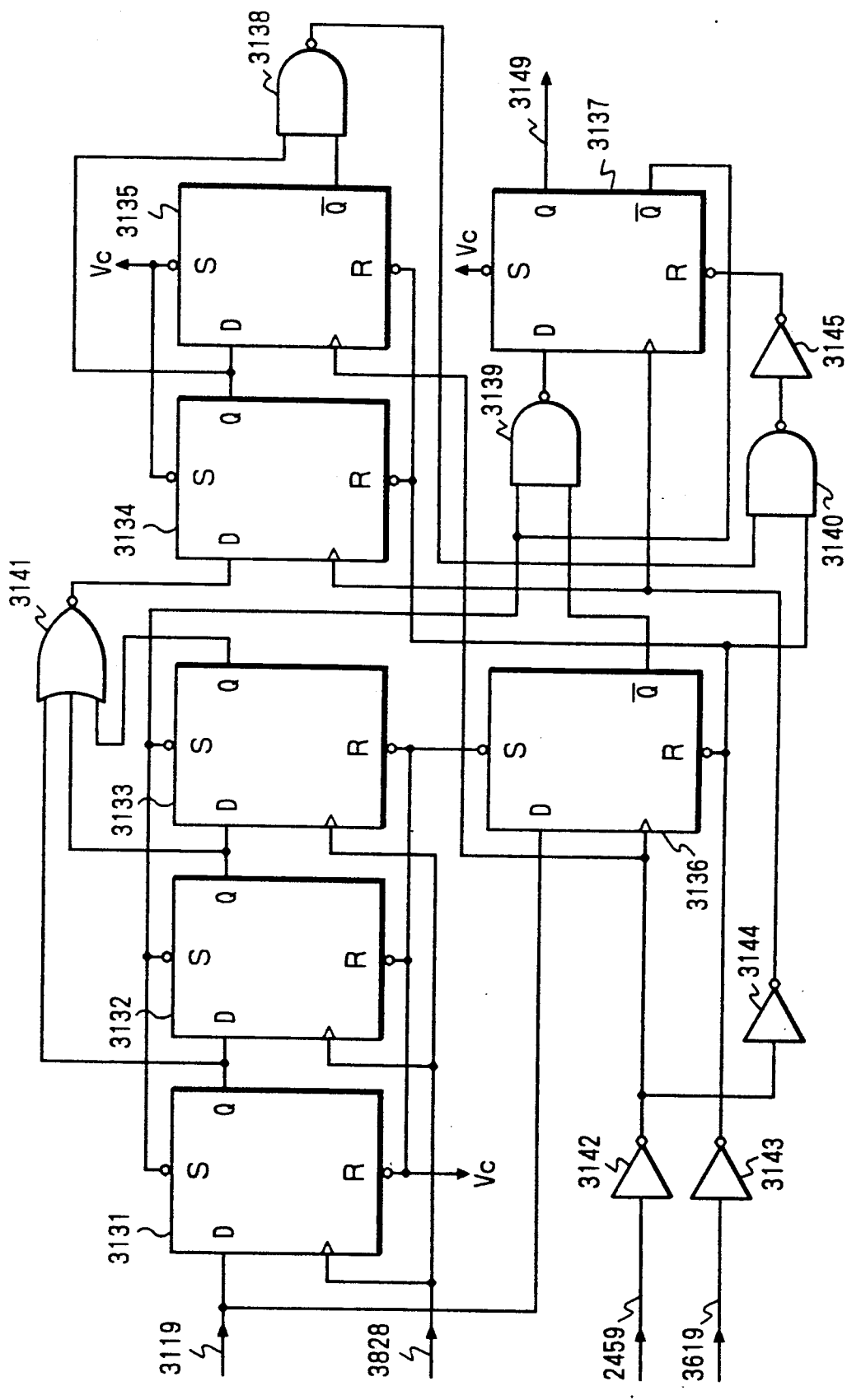
Figures 4, 9:
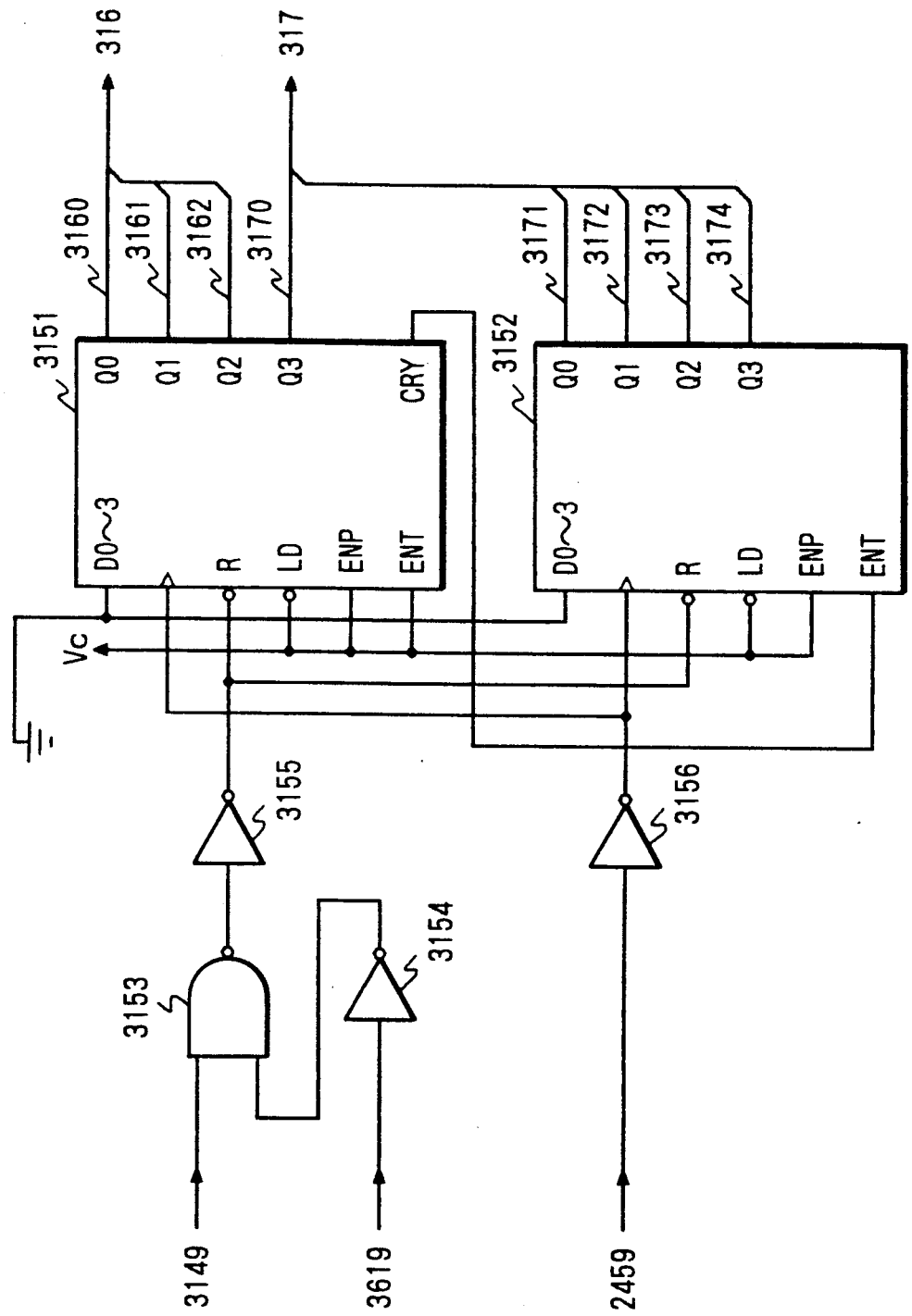
Figure 10:
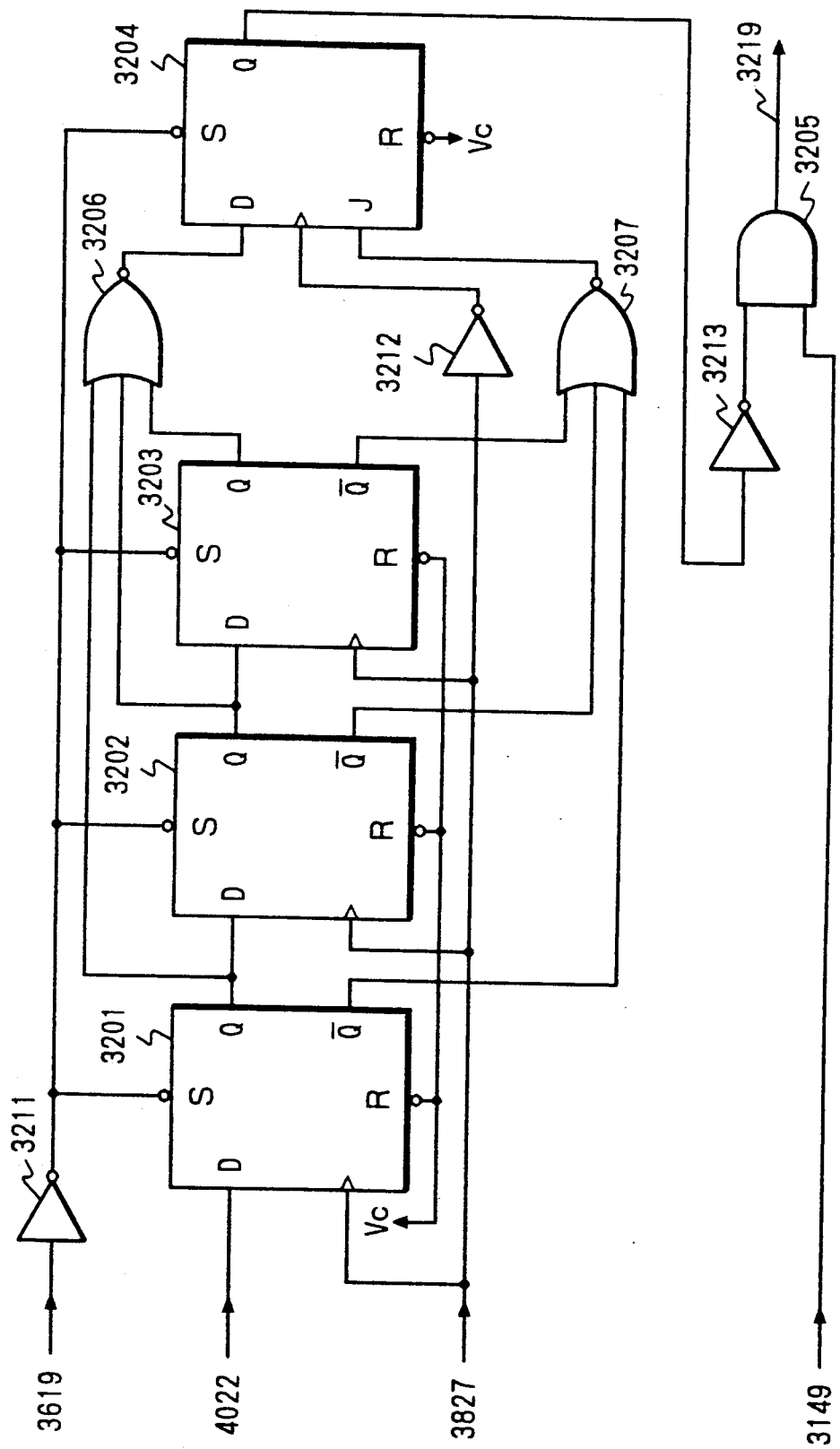

In FIG. 10, there is shown a circuit diagram of the synchronism state circuit 320 contained in the MS link synchronizing part 200. In this figure, 3201-3204 respectively designate D flip-flops, 3205 stands for an AND gates, 3206, 3207 respectively represent NOR gates, and 3211-3213 respectively express inverters. In this structure, the synchronized state circuit 320 receives the signal 3619 from the transmission code converter circuit 360, signal 4022 from the receiving buffer circuit 400, signal 3827 from the timing creating circuit 380, and signal 3149 from the frame synchronizing circuit 310, and outputs a signal 3219. The present synchronizing circuit 310, and outputs a signal 3219. The present synchronized state circuit 320 outputs a signal 3219 which indicates that the descending and ascending link transmission lines LD, LU are synchronized with each other.

Figure 11:
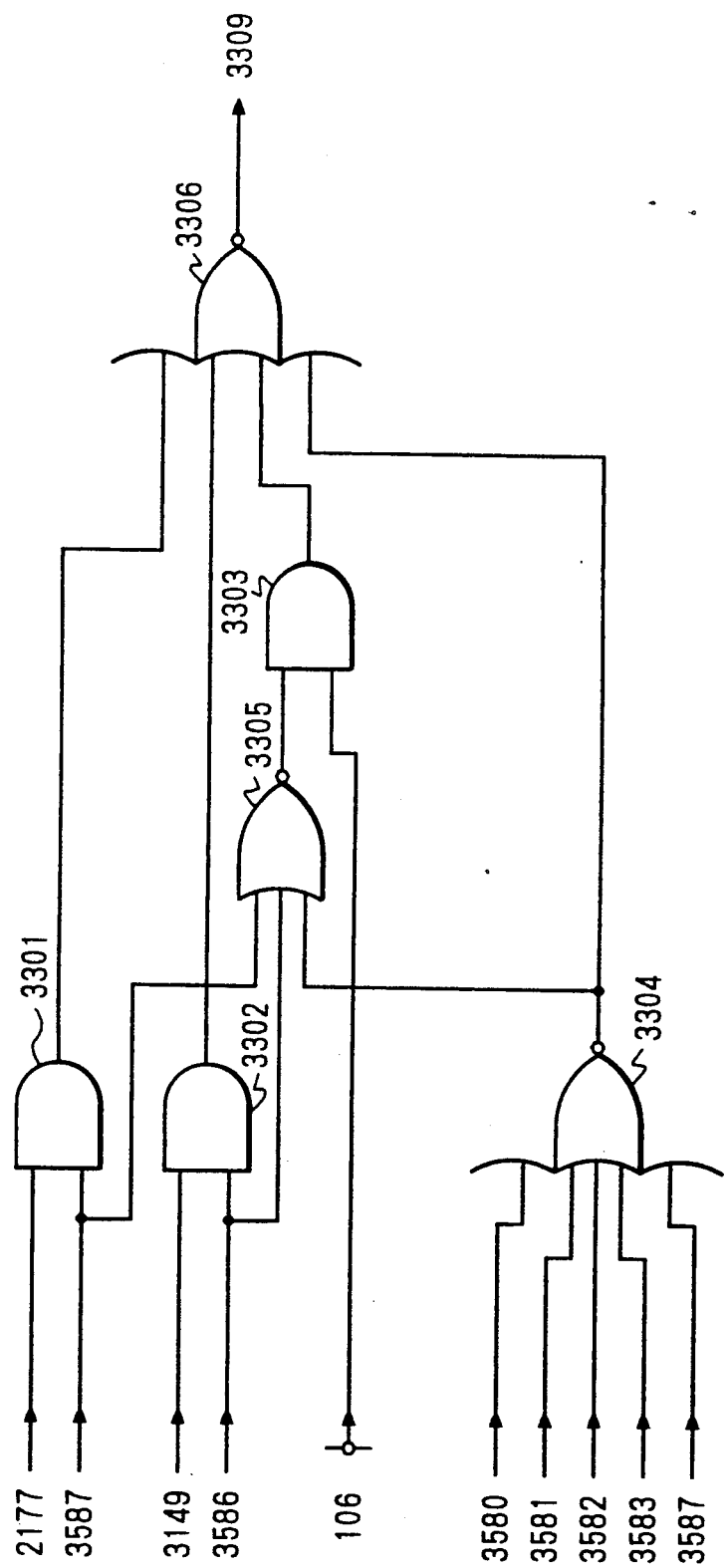
FIG. 11 is a circuit diagram of a transmission circuit included in the MS link synchronizing part.

Referring now to FIG. 11, there is shown a circuit diagram of the transmission circuit 330 contained in the MS link synchronizing part 200. In this figure, 3301-3303 respectively designate AND gates, 3304 stand for an OR gate and 3305, 3306 respectively represent NOR gates. In FIG. 11, the transmission circuit 330 receives the signal 2177 from the MS arbiter circuit 210, signals 3586, 3587, and signals 3580-3583 (FIGS. 5-3A, 5-3B (i)-(n)) contained in the bus signal 358 from the transmission timing creating circuit 350, signal 3149 from the frame synchronizing circuit 310, and PCM input signal 106 from the highway switch (HWS) 101, and outputs a signal 3309 (FIGS. 5-3A, 5-3B (g)) The present transmission circuit 330 multiplexes the PCM input signal 106 and various signals for controlling at specified timings to thereby obtain a signal 3309.

Figures 1, 12:
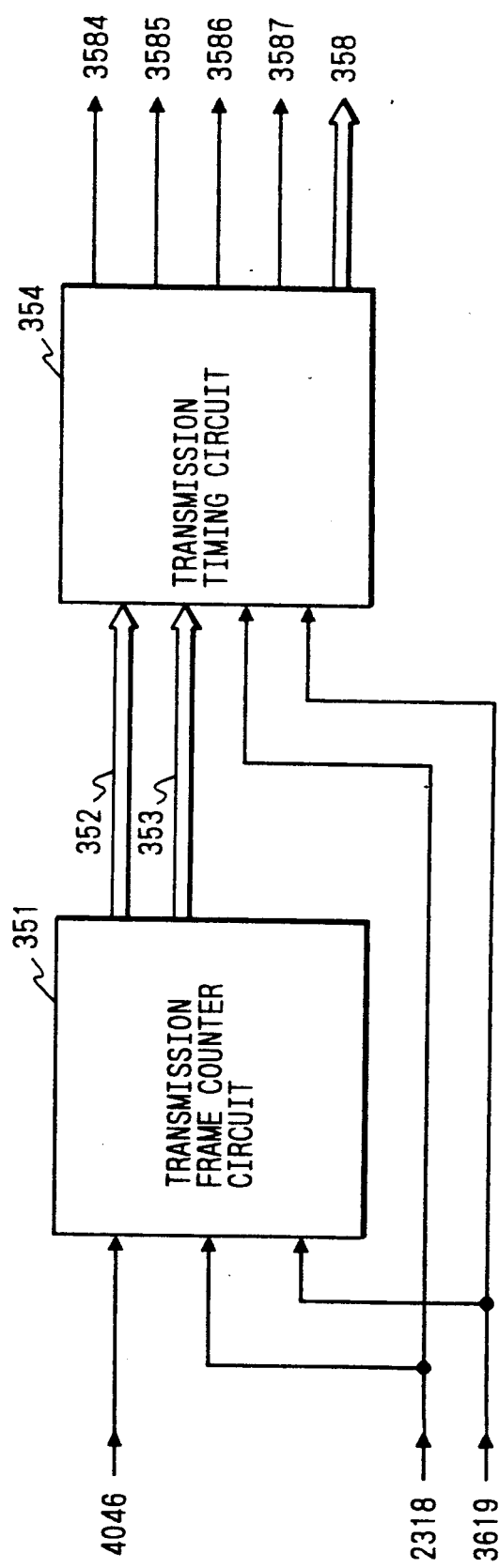
Figures 2, 12:
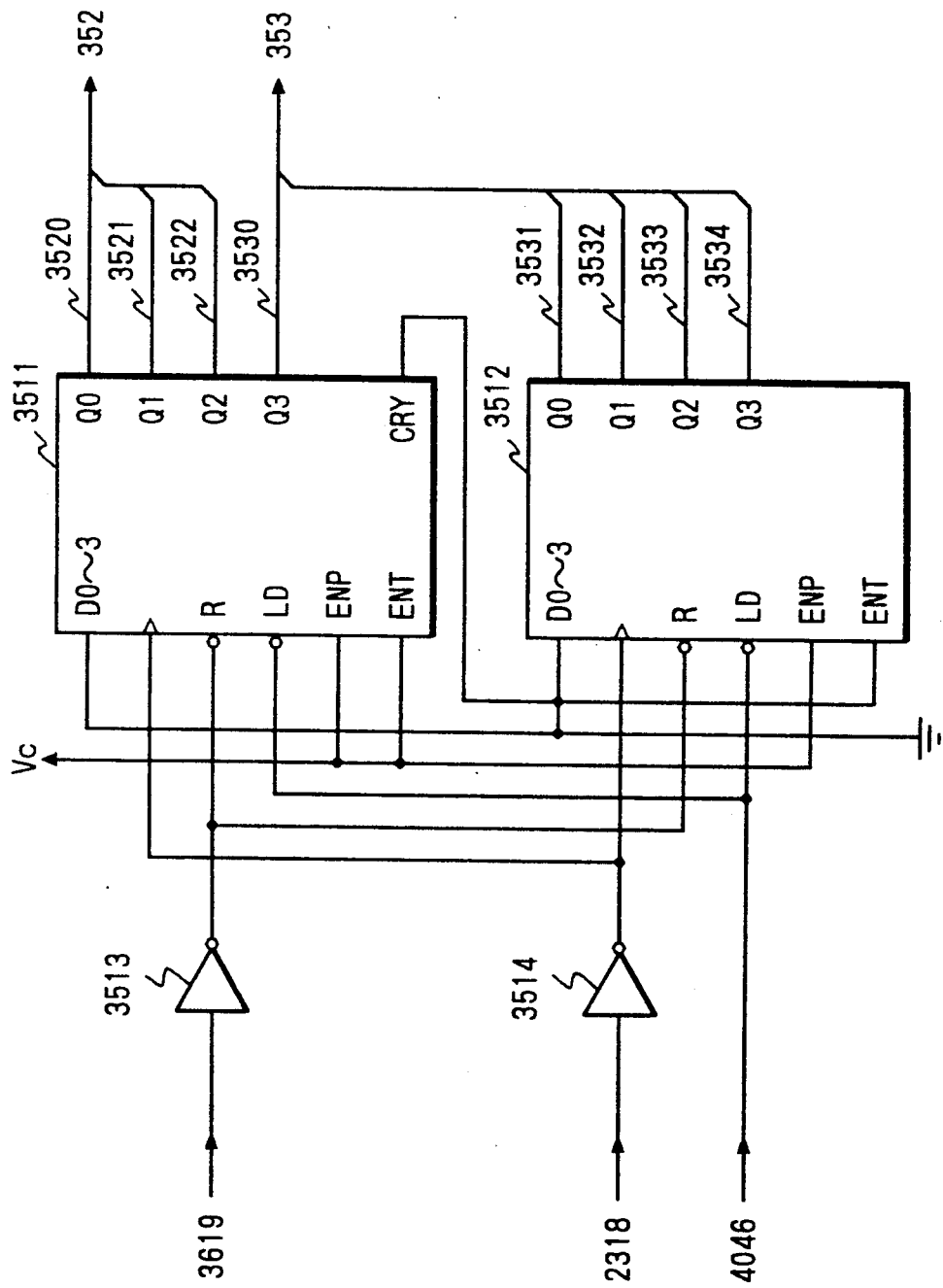
Figures 3A, 12:
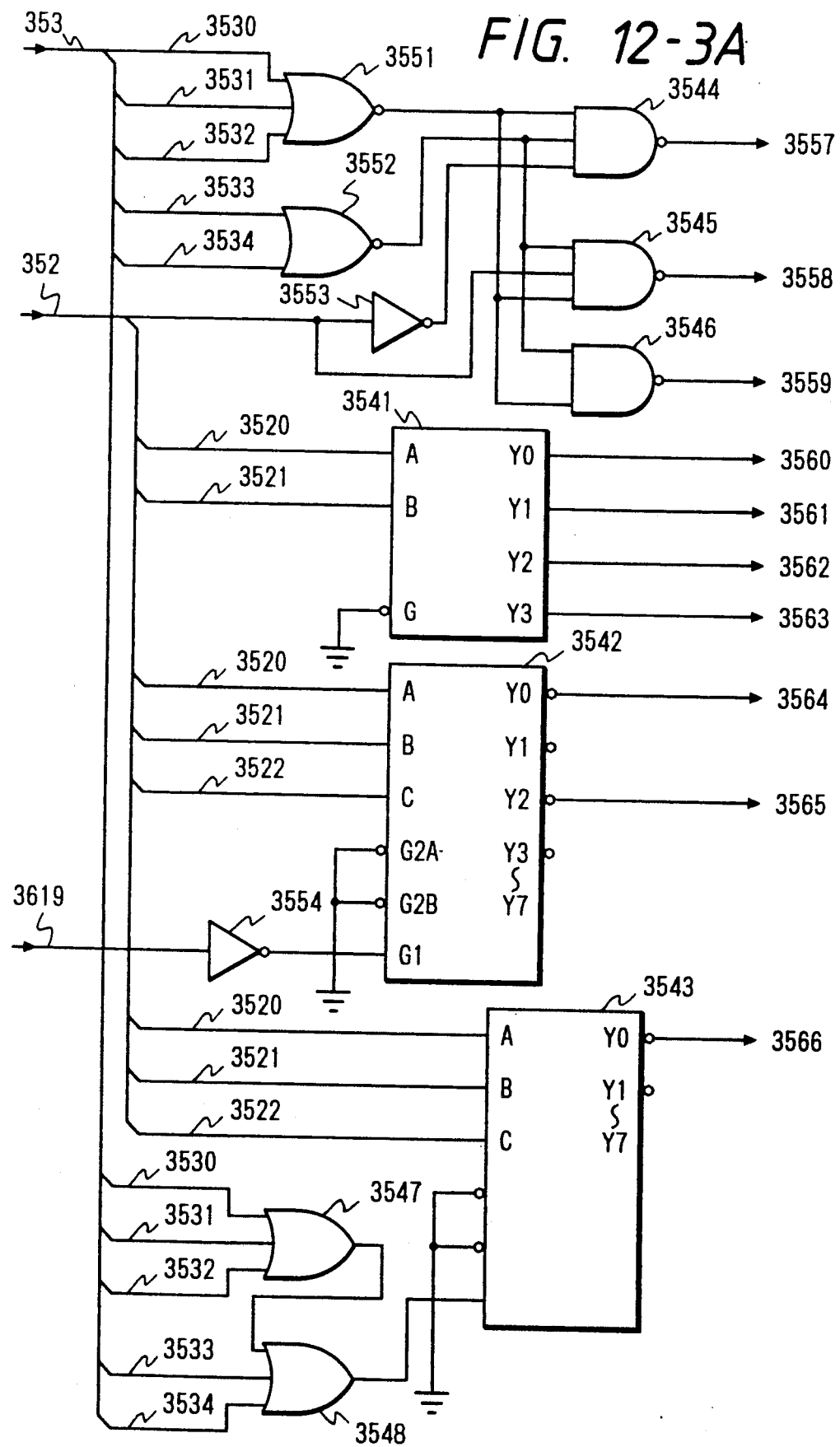
Figures 3B, 12:
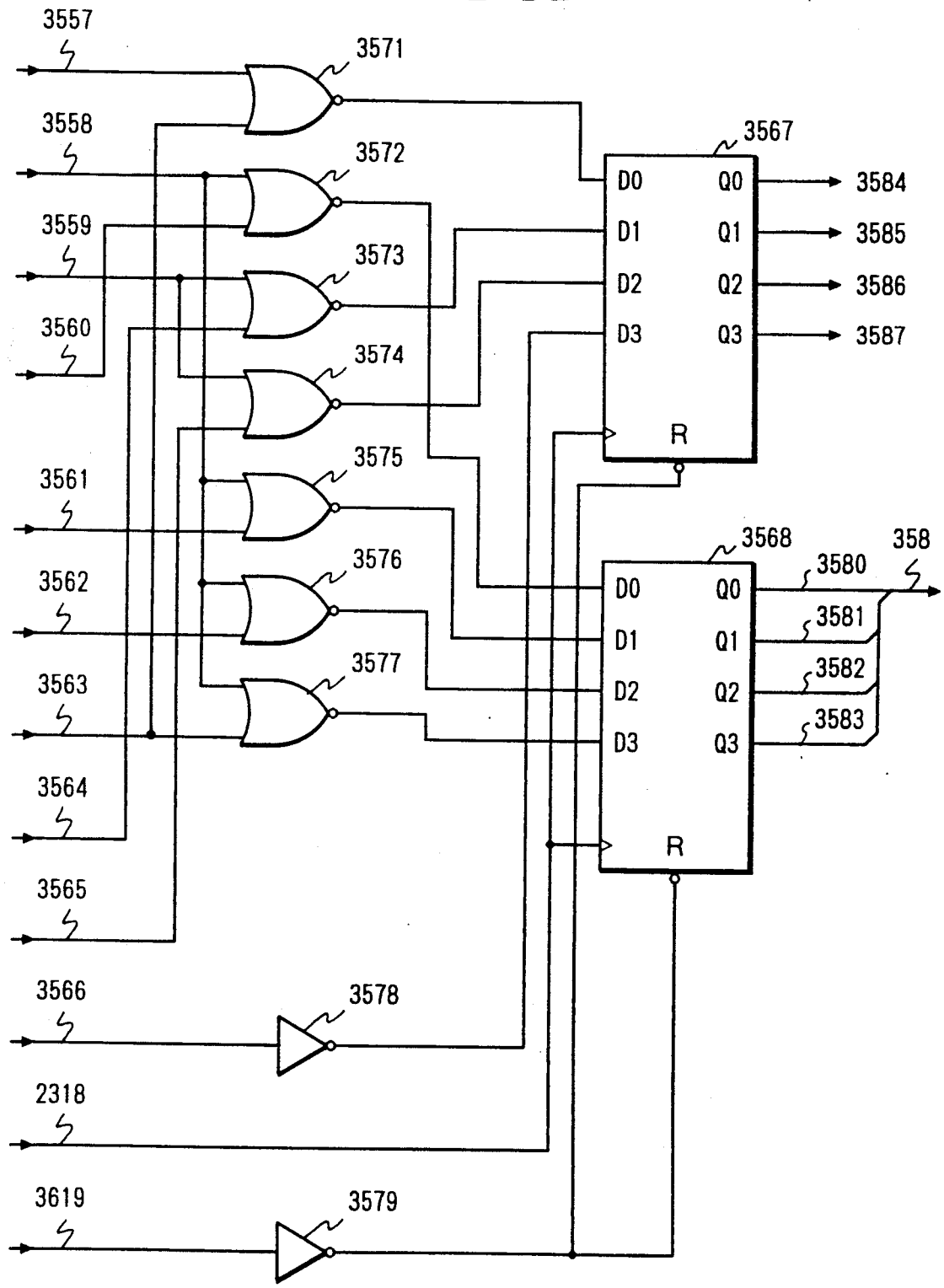

In FIG. 12-1, there is shown a circuit diagram of the transmission timing creating circuit 350 contained in the MS link synchronizing part 200. In this figure, the transmission timing creating circuit 350 includes a frame counter circuit 351 and a transmission timing circuit 354. In FIG. 12-1, the signal 2318 of 2.048 MHz from the bit synchronizing circuit 230 and the signal 4046 (FIGS. 5-3A, 5-3B (d)), which is a frame pulse synchronized with the signal 2318, from the receiving buffer circuit 400 are used to form bus signals 352, 353 respectively for counting the number of frames and multiframes. Based on the counting bus signals 352, 353, various timing signals used to transmit various signals (FIG. 2-1) to the descending link transmission line LD are created.

In FIG. 12-2, there is shown a circuit diagram of the transmission frame counter circuit 351 included in the transmission timing creating circuit 350. In this figure, 3511, 3512 respectively designate counters, and 3513, 3514 respectively stand for inverters. In FIG. 12-2, the transmission frame counter circuit 351 receives the signal 3619 for resetting from the transmission code converter circuit 360, signal 2318 of 2.048 MHz from the MS bit synchronizing circuit 230, and signal 4046, which is a frame pulse synchronized with the signal 2318, from the receiving buffer circuit 400, and outputs a bus signal 352 including signals 3520-3522 and a bus signal 353 including signals 3530-3534 (FIGS. 5-3, 5-3B (e), (f)). In this figure, there is formed a transmission frame counter of 256-adic which counts up at the falling of the signal 2318.

Referring now to FIGS. 12-3A and 12-3B, there are shown circuit diagrams of the transmission timing circuit 354, respectively.

In FIG. 12-13A, 3541-3543 respectively decoders, 3544-3546 respectively stand for NANd gates, 3547, 3548 respectively represent OR gates, 3551, 3552 respectively express NOR gates, and 3553, 3554 respectively show inverters. In this figure, the transmission timing circuit 354 receives the bus signals 352, 353 and the signal 3619, and outputs signals 3557-3566.

In FIG. 12-3B, 3567, 3568 respectively designate latches, 3571-3577 respectively stand for NOR gates, and 3578, 3579 respectively represent inverters. In this structure, the transmission timing circuit 354 receives the signals 3557-3566 from FIG. 12-3A, signal 2318 from the bit synchronizing circuit 230 and signal from the transmission code converter circuit 360, and outputs a bus signal 358 including signals 3580-3583 (FIG. 5-3A, 5-3B (k), (l), (m), (n)) as well as signals 3584-3587 (FIGS. 5-3A, 5-3B (h), (i), (j), (p)).

Figure 13:
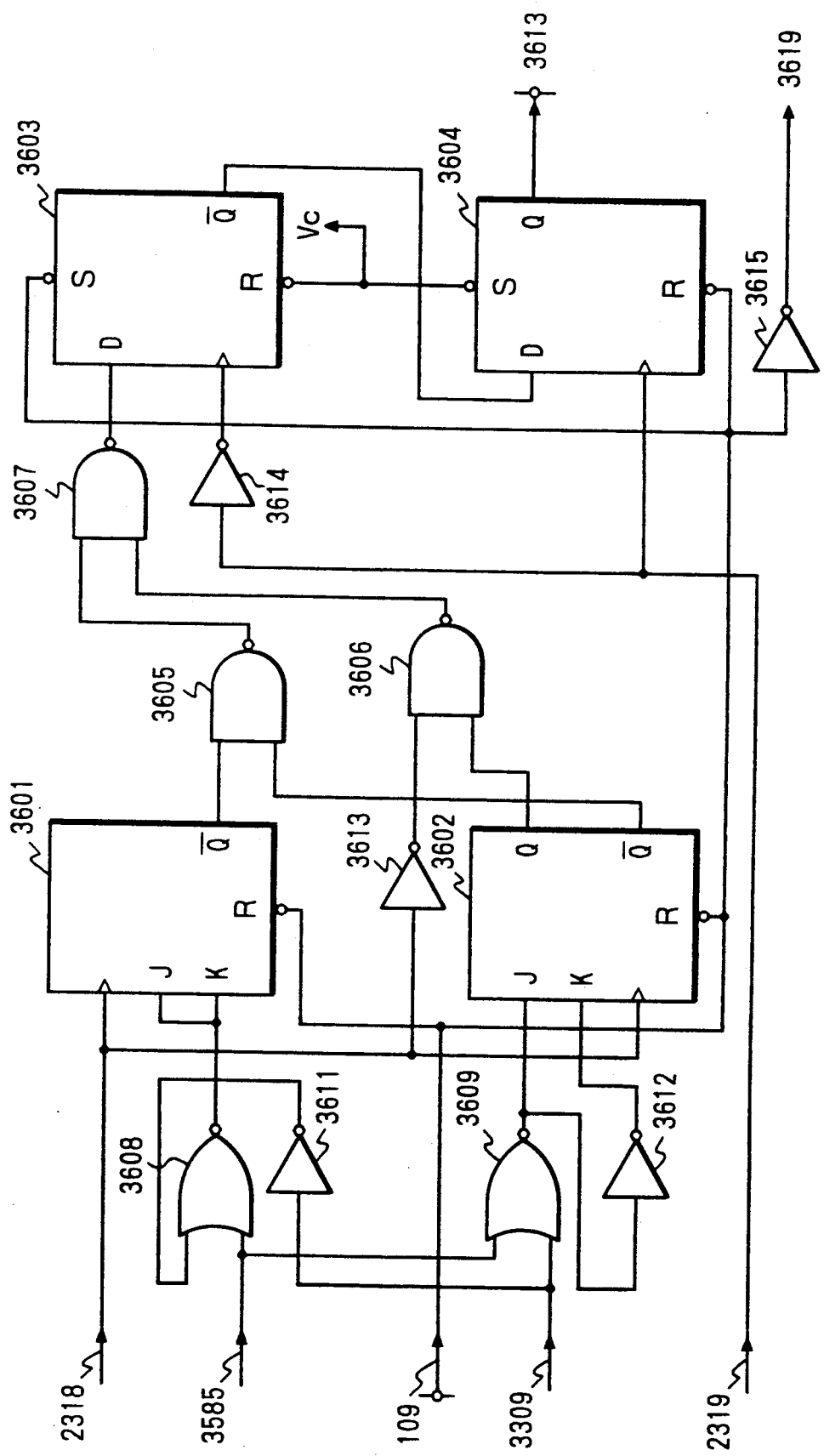
FIG. 13 is a circuit diagram of a transmission code converting circuit included in an MS link synchronizing part 200.

Referring now to FIG. 13, there is shown a circuit diagram of the transmission code converter circuit 360 included in the MS link synchronizing part 200. In this figure, 3601, 3602 respectively designate JK flip-flops, 3603, 3604 respectively stand for D flip-flops, 3605-3607 respectively represent NAND gates, 3608, 3609 respectively express NOR gates, and 3611-3615 respectively show inverters. In this structure, the transmission code converter circuit 360 receives the signals 2318, 2319 each of 2.048 from the MS bit synchronizing circuit 230, signal 3585 from the transmission timing creating circuit 350, reset signal 109 and signal 3309 from the transmitting circuit 330, and outputs signals 3618 and 3619. The present transmission code converter circuit 360 receives the signal 309 which is a PCM signal, adds a "1" violation to the head of a frame by means of the signal 3585 indicting a frame, and then transmits the signal to the descending link transmission line LD in the form of the signal 3618 (FIGS. 5-3A, 5-3B (q))

Figure 14:
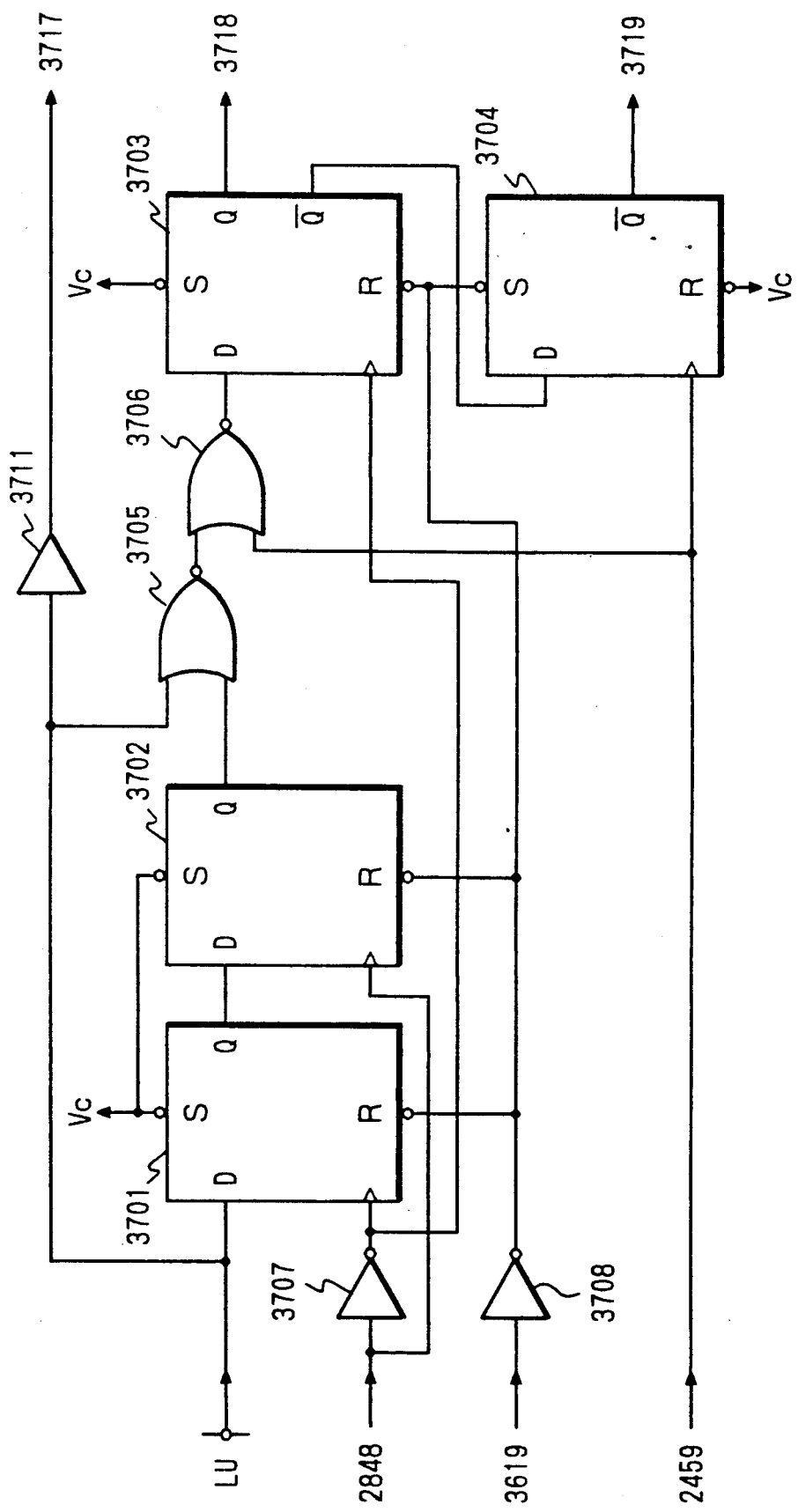
FIG. 14 is a circuit diagram of a received code converting circuit included in the MS link synchronizing part.

Referring now to FIG. 14, there is shown a circuit diagram of the received code converter circuit 370 included in the MS link synchronizing part 200. In this figure, 3701, 3704 respectively designate D flip-flops, 3705, 3706 respectively stand for NOR gates, and 3707, 3708 respectively designate inverters. In this structure, the received code converter circuit 370 receives the signal from the ascending line transmission line LU, signals 2848, 2459 from the MS bit synchronizing circuit 230 and resetting signal from the transmission code converter circuit 360, and outputs signals 3717–3719 (FIGS. 5-2A, 5-2C (c), (d)).

The present received code converter circuit 370 converts a signal in the code of CMI from the ascending link transmission line LU to an NRZ signal to thereby obtain the signal 3719.

Figure 15:
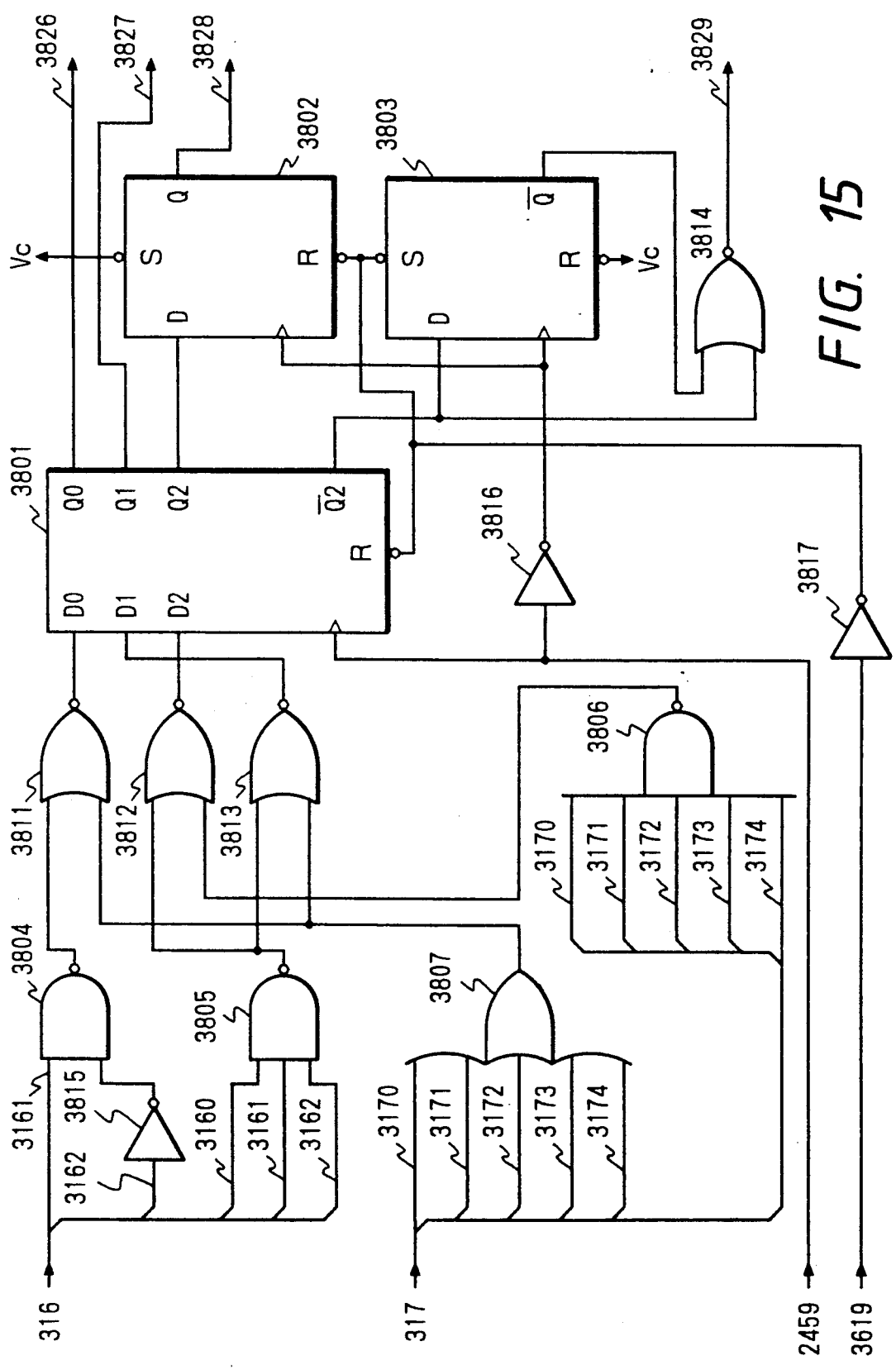
FIG. 15 is a circuit diagram of a received timing creating included in the MS link synchronizing part.

In FIG. 15, there is shown a circuit diagram of the receiving timing creating circuit 380. In this figure, 3801, 3803 respectively designate D flip-flops, 3804–3806 respectively stand for NAND gates, 3807 represents an OR gates, 3811–3814 respectively express NOR gates, and 3815–3817 respectively inverters. In this structure, the receiving timing creating circuit 380 receives the bus signal 316 including the signals 3160–3162 and bus signal 317 including the signals 3170–3174 respectively from the frame synchronizing circuit 310, signal 2459 of 2.048 MHz from the MS bit synchronizing circuit 230 and signal 3619 from the transmission code converter circuit 360, and outputs signals 3826–3829. The present receiving timing creating circuit 380 creates a timing signal which is used to sample various signals contained in the signal from the ascending link transmission line LU.

Figures 1, 16:
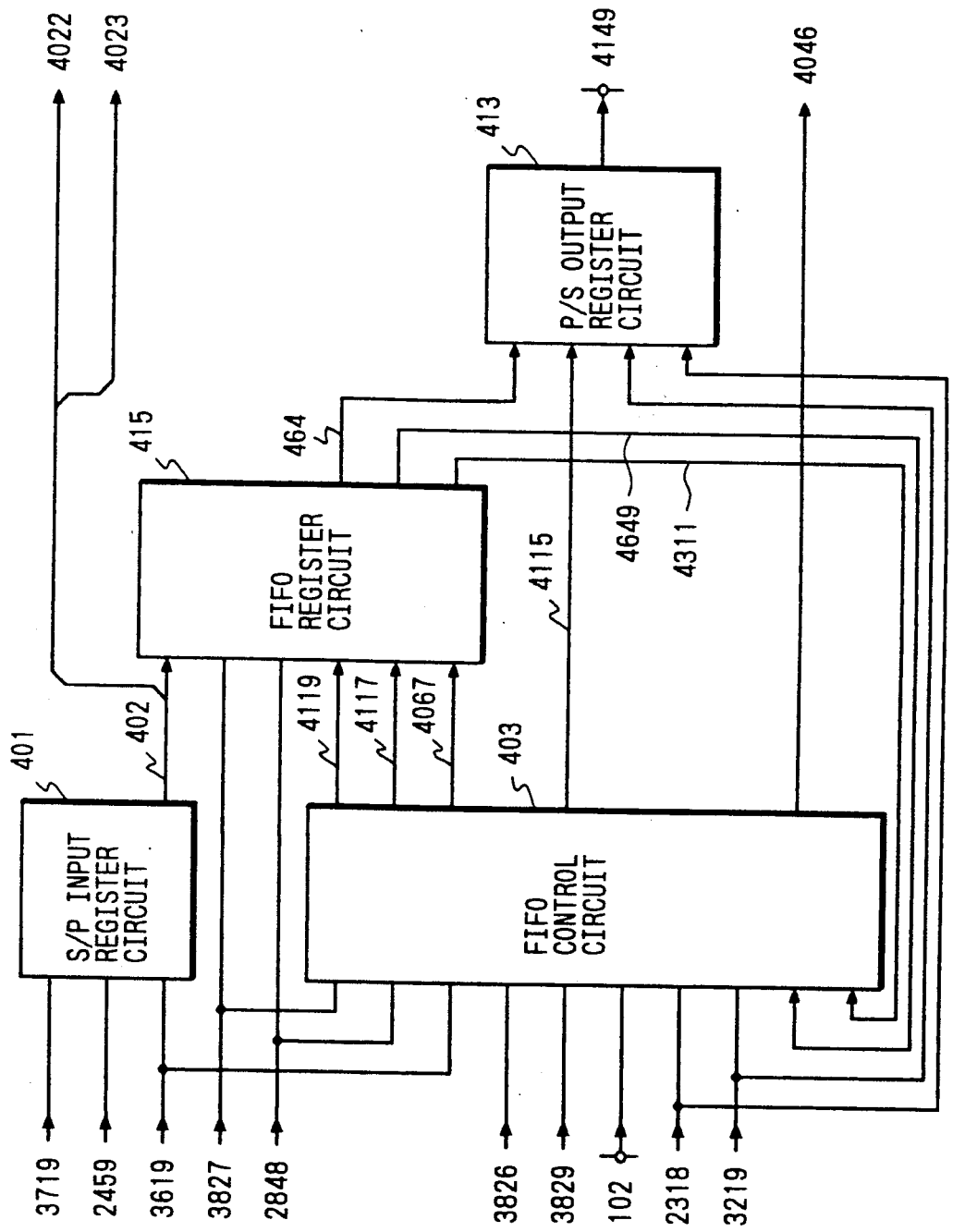
Figures 2, 16:
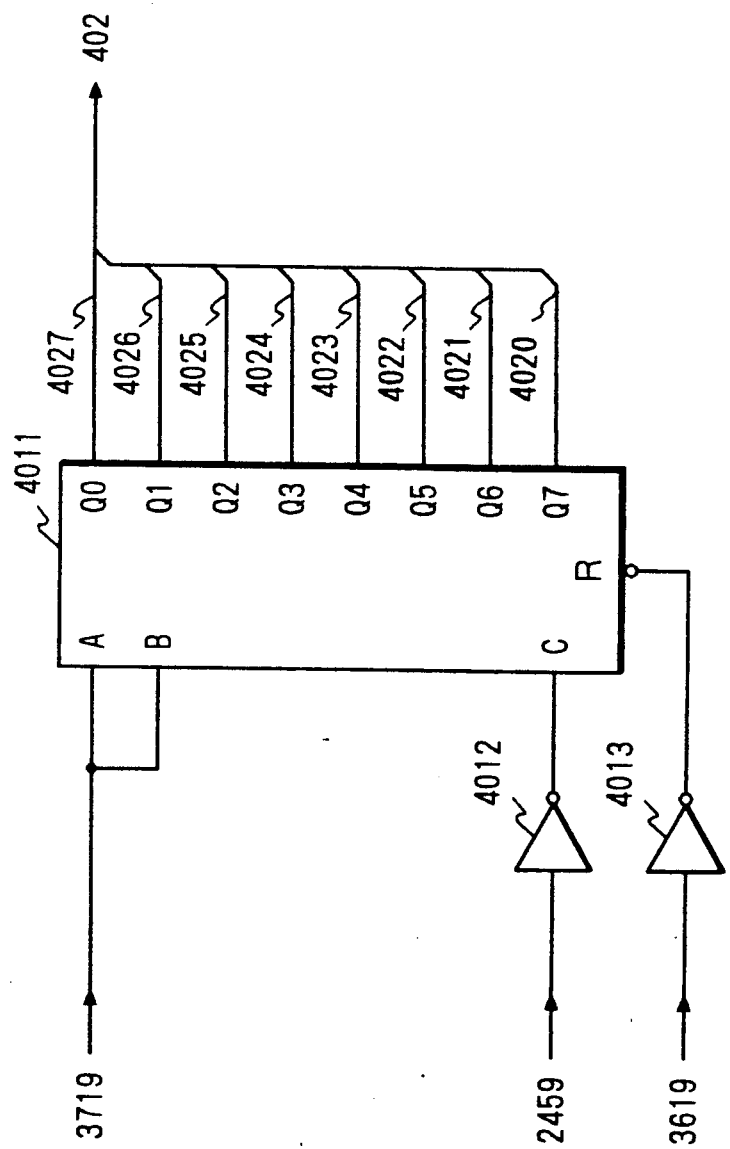
Figures 3A, 16:
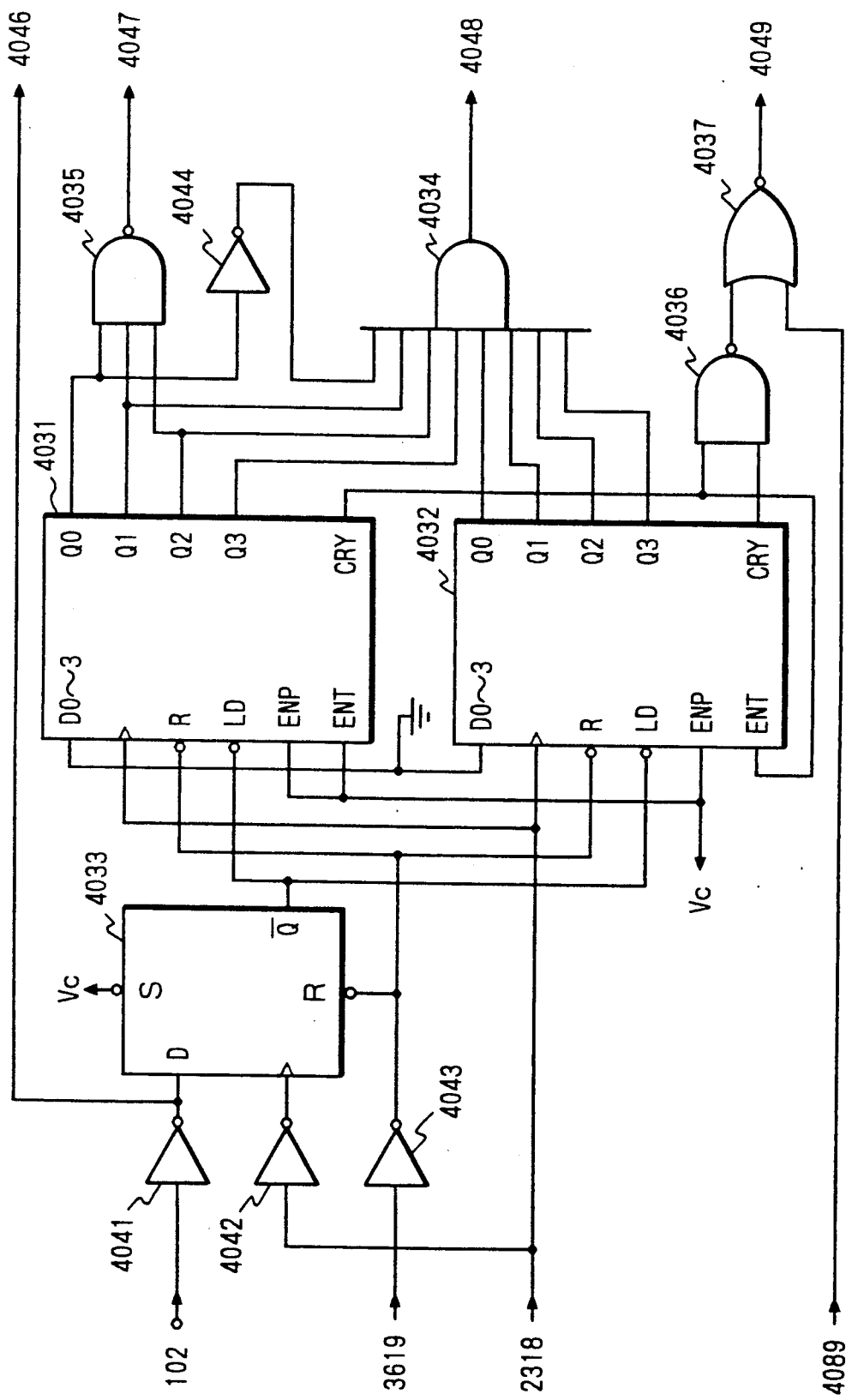
Figures 3B, 16:
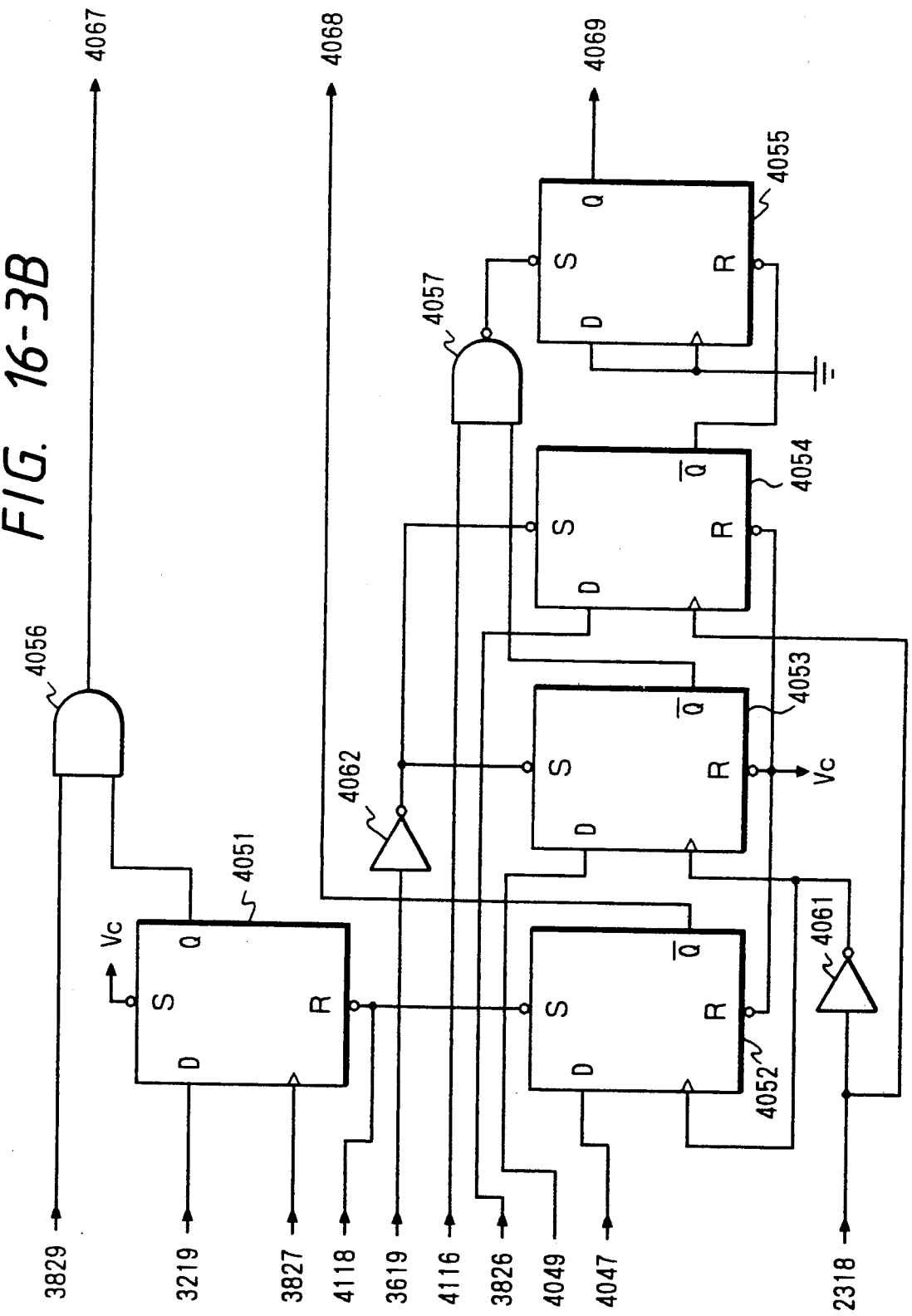

Referring now to FIG. 16-1, there is shown a circuit diagram of the receiving buffer circuit 400 included in the MS link synchronizing part 200. In this figure, 401 designates an S/P input register circuit, 403 stands for FIFO control circuit, 413 represents a P/S output register circuit, and 415 designates a FIFO register circuit. The present receiving buffer circuit 400 is a circuit which receives the input data from the ascending link transmission line LU in the form of the signal 3719 through the code converter circuit 370, buffers the signal temporarily, and outputs to the highway switch (HWS) 101 the time slot numbers (TS No.) 0–31 (FIG. 2-1) from the position of the frame signal 102 (FIGS. 5-3A, 5-3B (a)) in the form of PCM output signal 4149 (FIGS. 5-2A-5-2C (q))

In FIG. 16-2, there is shown a circuit diagram of the receiving buffer circuit 400. In this figure, 4011 designates a shift register and 4012, 4013 respectively stand for inverters. In this structure, the receiving buffer circuit 400 receives, in the form of the signal 3719 (FIGS. 5-2A-5-2C (d)), the serial data obtained by converting the input data of the ascending transmission line LU from the receiving code converter circuit 370 to the NRZ signal, and also receives the signal 2459, which is a clock of 2.048 MHz, from the MS bit synchronizing circuit 230 and the resetting signal 3619 from the transmission code converter circuit 360, and the buffer circuit 400 output signals 4020–4027 which are parallel to each other and respectively have 8 bits (FIGS. 5-2A-5-2C (h), (i)), in the form of a bus signal 402.

Figures 3C, 16:
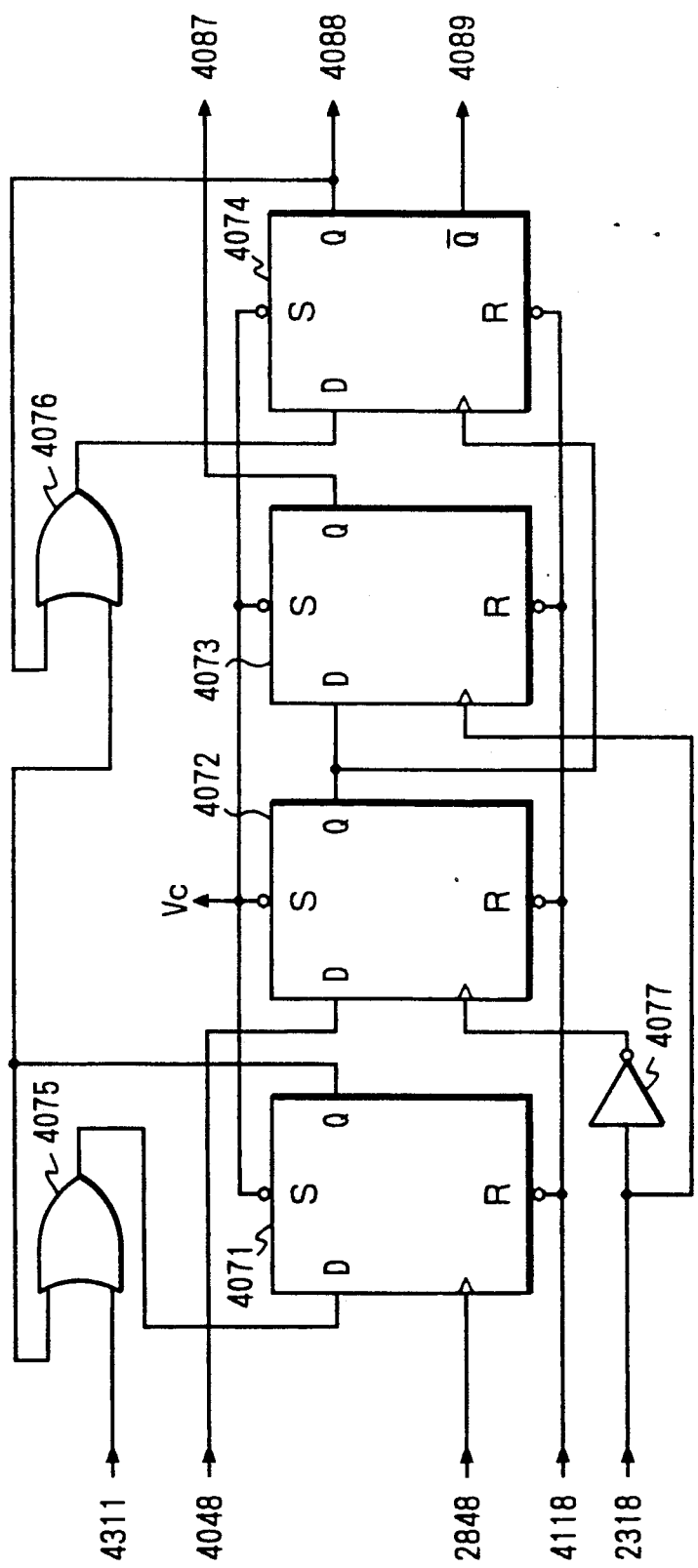
Figures 3D, 16:
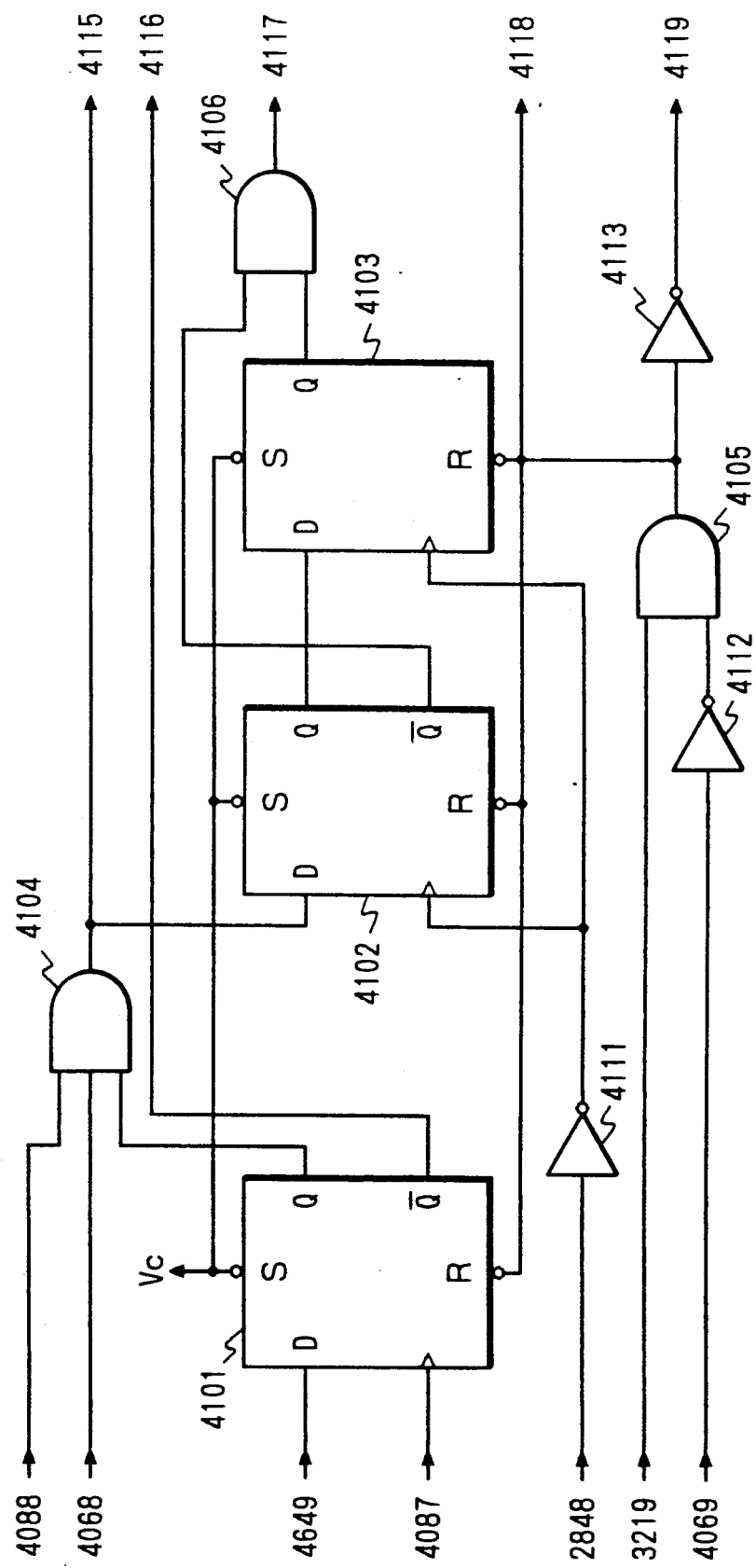
Figures 4, 16:
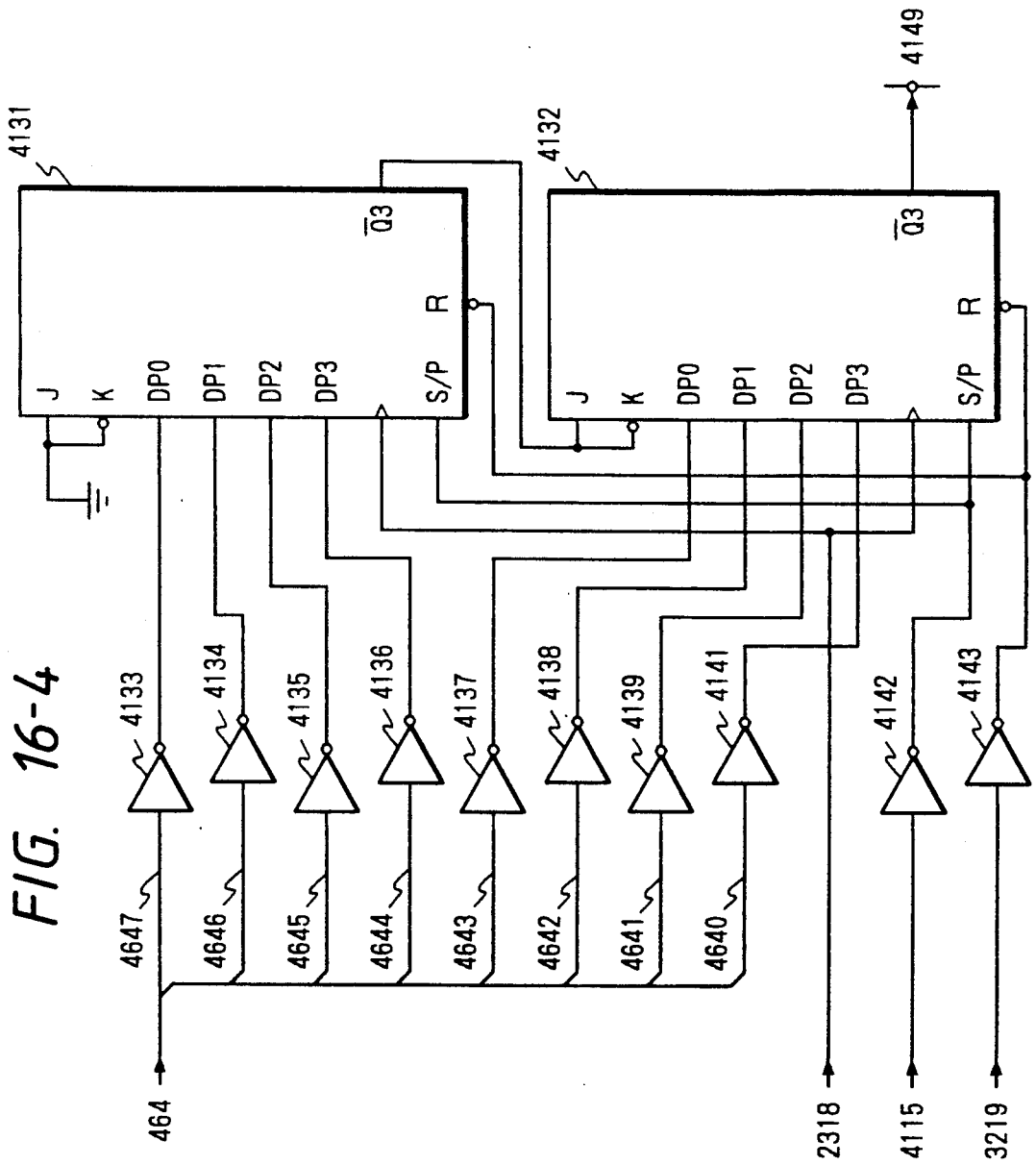
Figures 5A, 16:
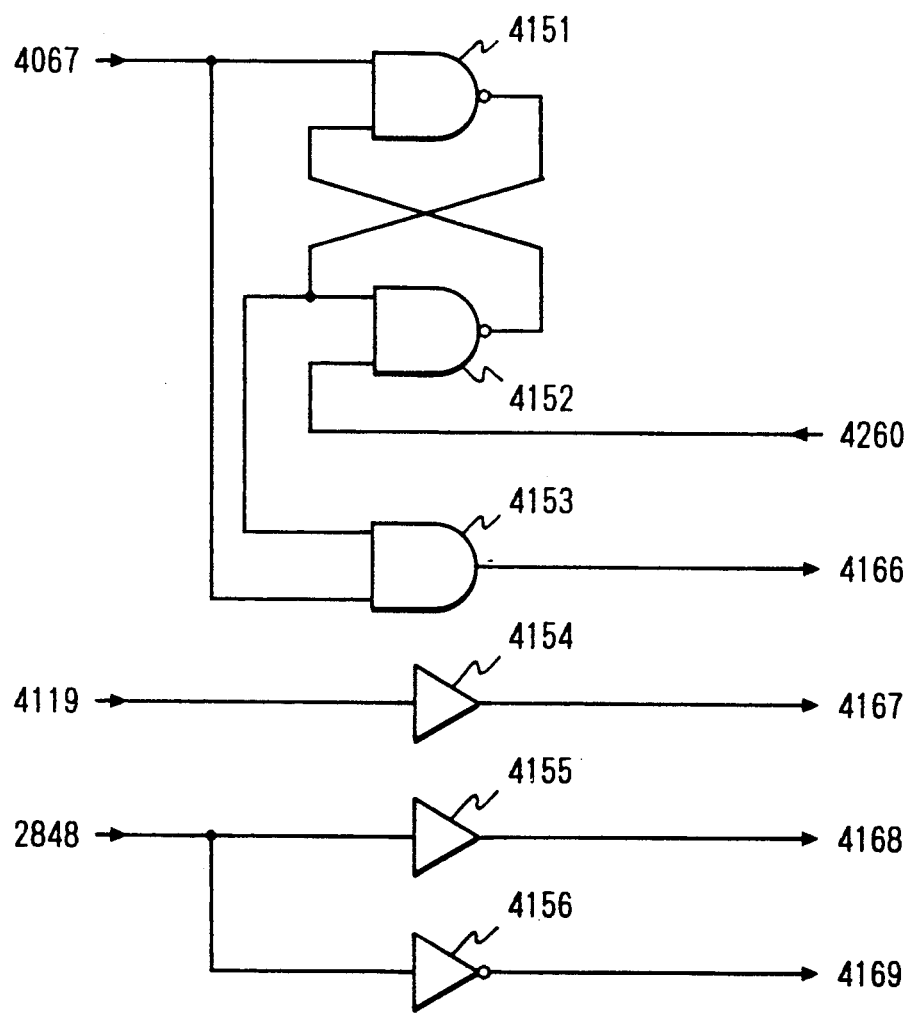
Figures 5B, 16:
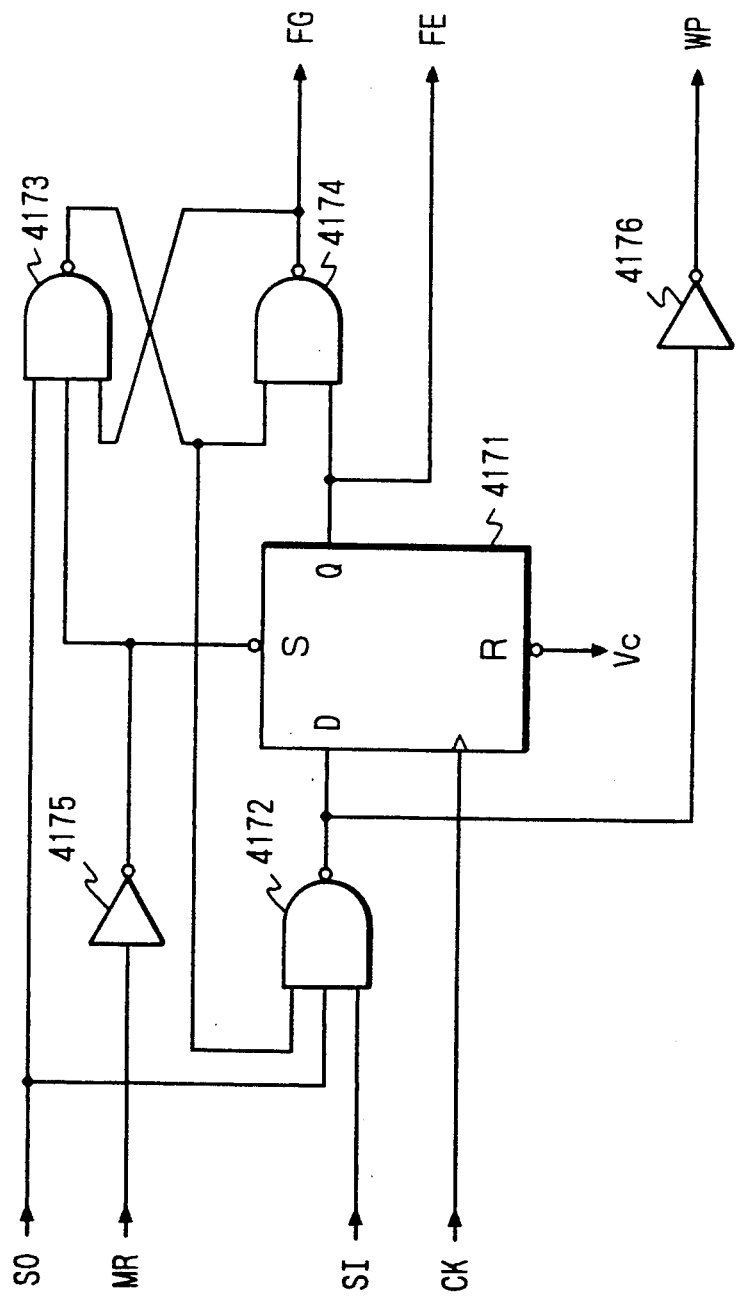
Figures 5C, 16:
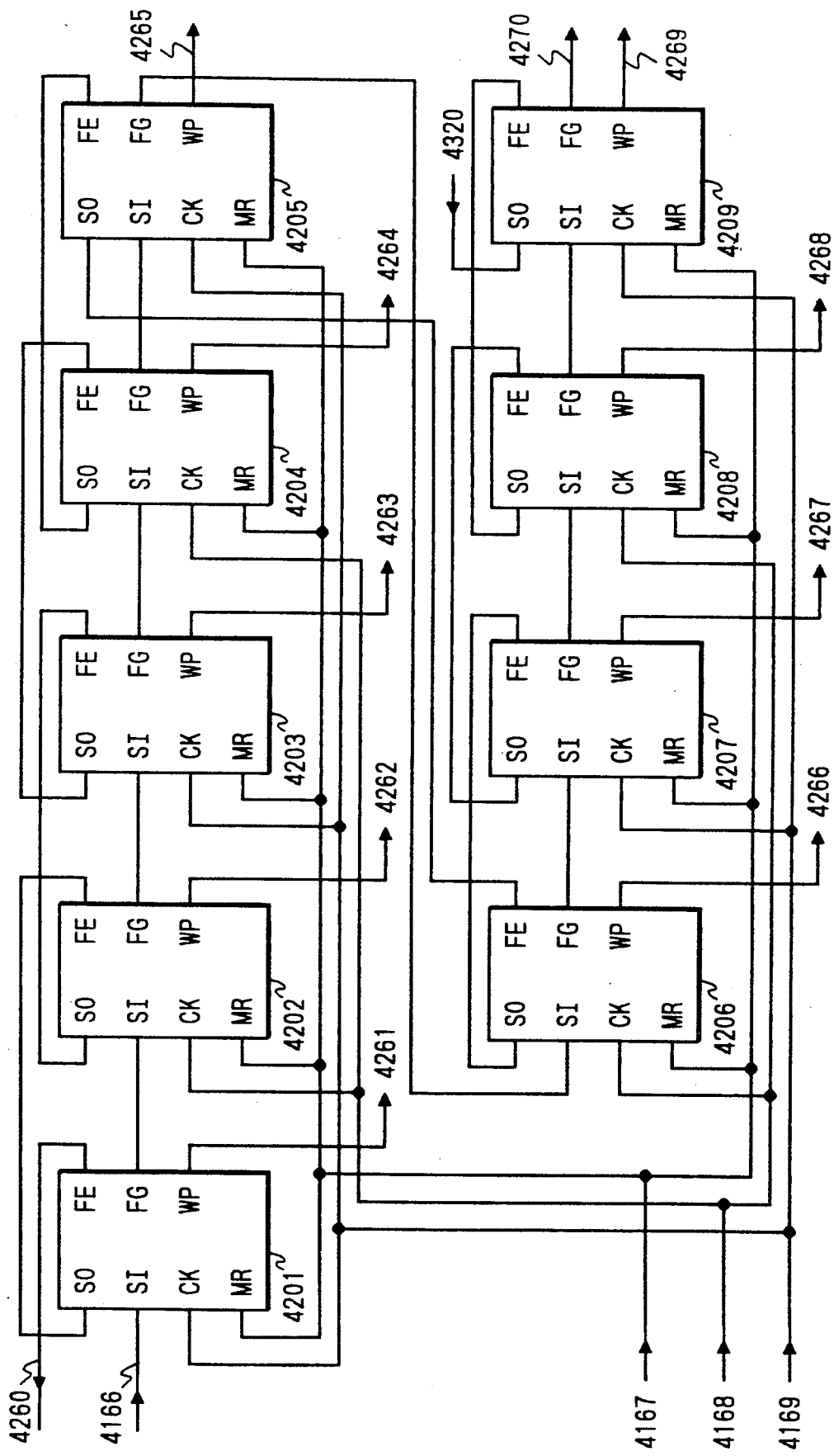
Figures 5D, 16:
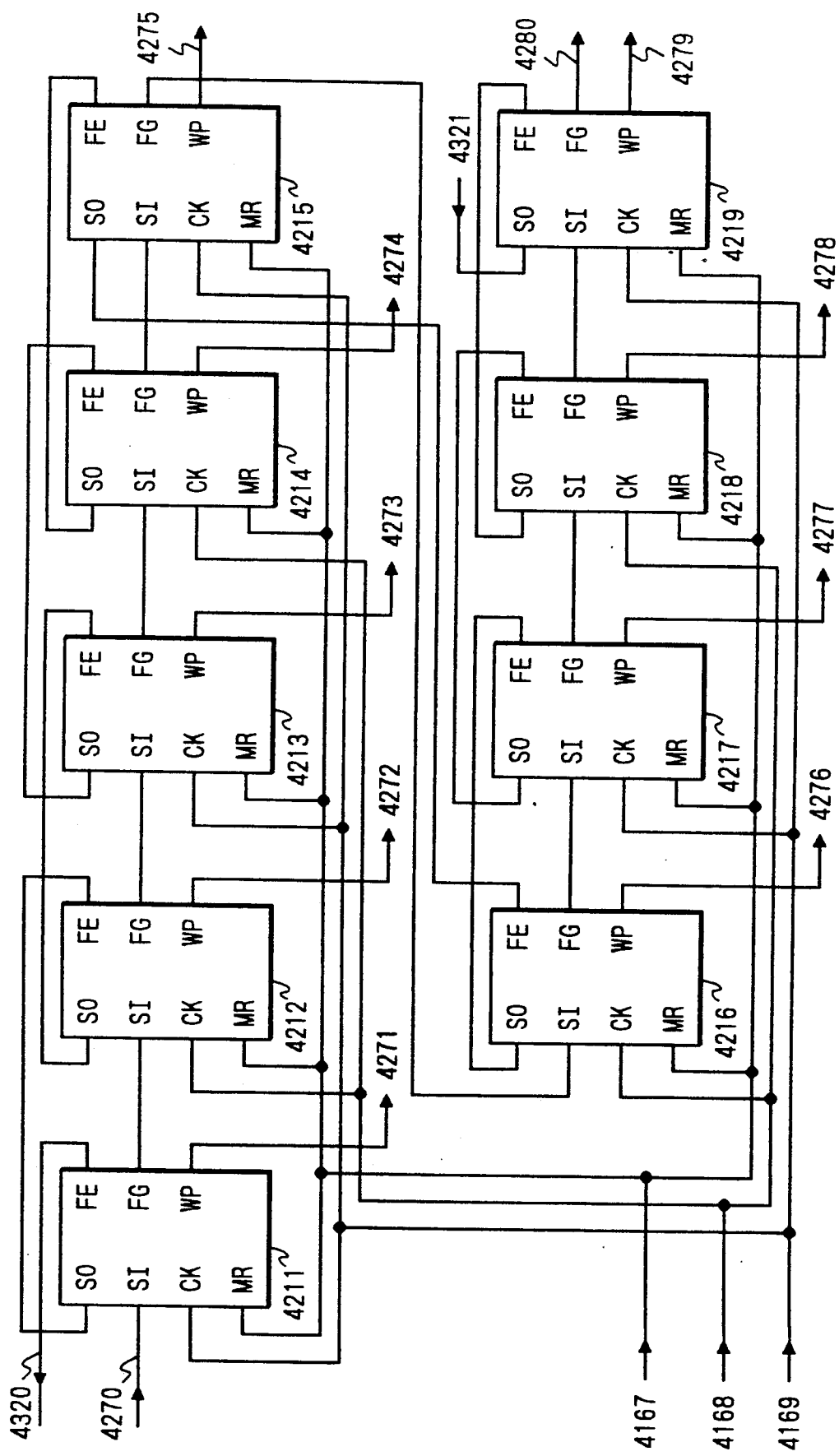

Referring now to FIGS. 16-3A through 16-3D, there are shown circuit diagrams of the FIFO control circuit 403 included in the receiving buffer circuit 400, respectively.

In FIG. 16-3A, 4031, 4032 respectively designate counters, 4033 stands for a D flip-flop, 4034 represents an AND gate, 4035, 4036 respectively express NAND gates, 4037 shows a NOR gate, and 4041–4044 respectively illustrate inverters. In this structure, the FIFO control circuit 403 receives the frame signal 102, signal 3619 for resetting from the transmission code converter circuit 360, signal 2318 of 2.048 MHz from the MS bit synchronizing circuit 230 and signal 4089 from FIG. 16-3C, and outputs signals 4046 (FIGS. 5-2A-5-2C (p))–4049.

In FIG. 16-3B, 4051–4055 respectively designate D flip-flops, 4056 stands for an AND gate, 4057 expressed a NAND gate, and 4061, 4602 respectively represent inverters. In this structure, the FIFO control circuit 403 receives the signals 3829, 3827, 3826 (FIGS. 5-2A-5-2C (l), (j), (m)) from the receiving timing creating circuit 380, signal 3219 from the synchronized state circuit 320, signals 4118, 4116 from FIG. 16-3D, signal 3619 from the transmission code converter circuit 360, signal 4116 from FIG. 16-3D, signals 4049, 4047 from FIG. 16-3A, and signal 2318 from the MS bit synchronizing circuit 230, and outputs signals 4067–4069.

In FIG. 16-3C, 4071–4074 respectively designate flip-flops, 4075, 4076 respectively stand for OR gates, and 4077 represents an inverter. In this structure, the FIFO control circuit 403 receives a signal 4311 from FIG. 16-5G, signal 4048 from FIG. 16-3A, signal 2848 of 4.096 MHz and signal 2318 of 2.048 MHz respectively from the MS bit synchronizing circuit 230, and signal 4118 from FIG. 16-3D, and outputs signals 4087–4089.

Figures 5E, 16:
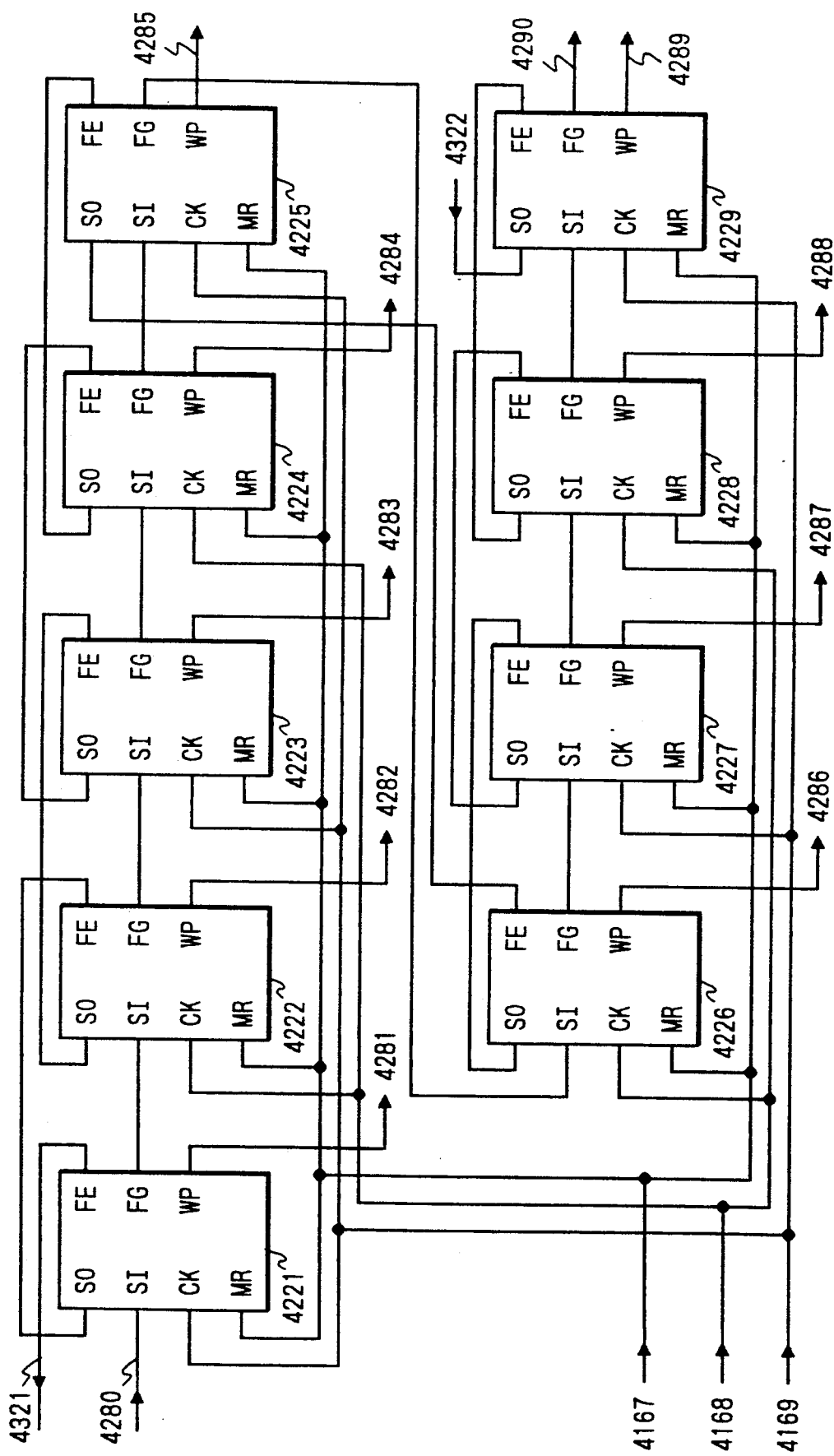
Figures 5F, 16:
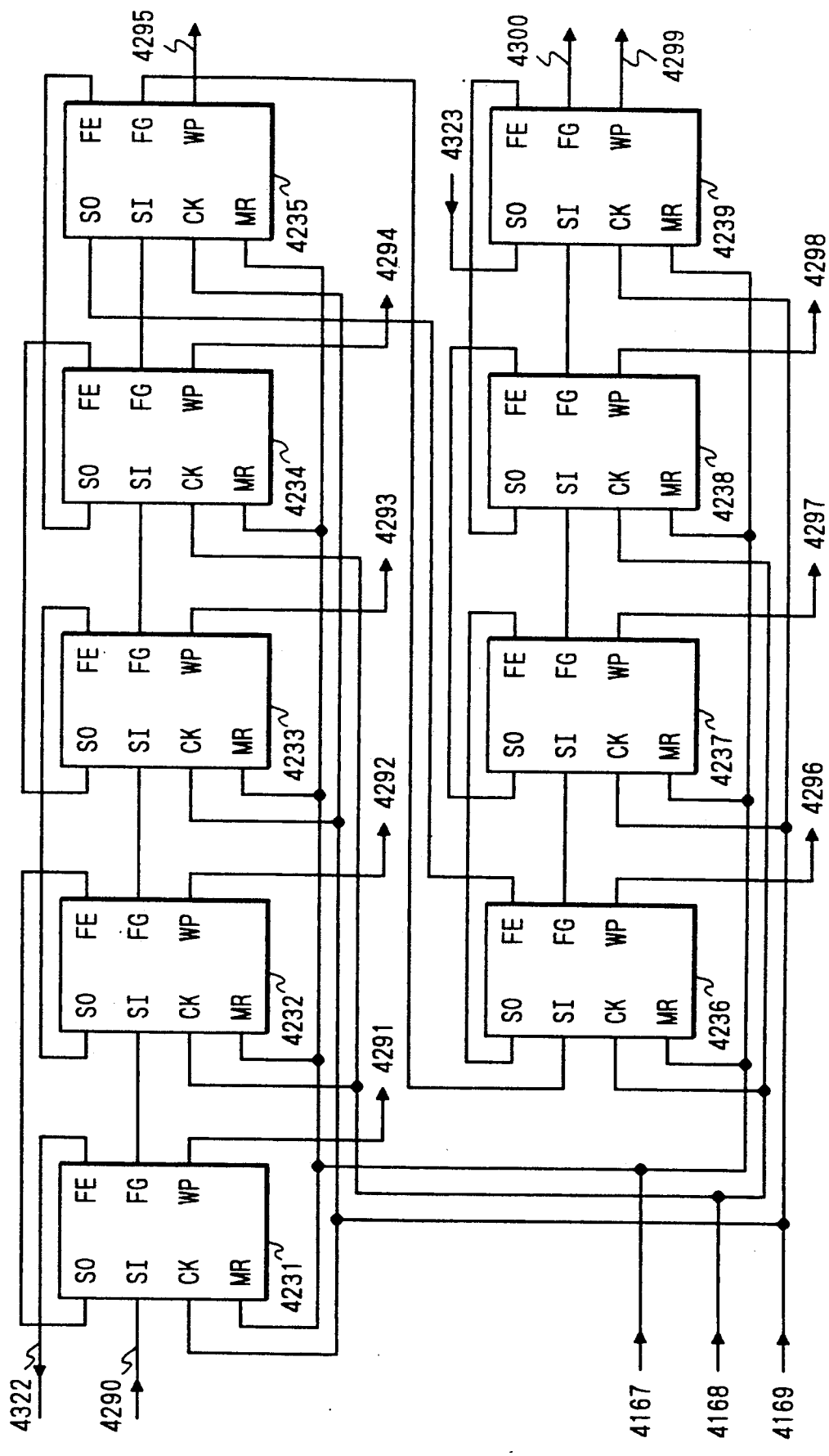
Figures 6A, 16:
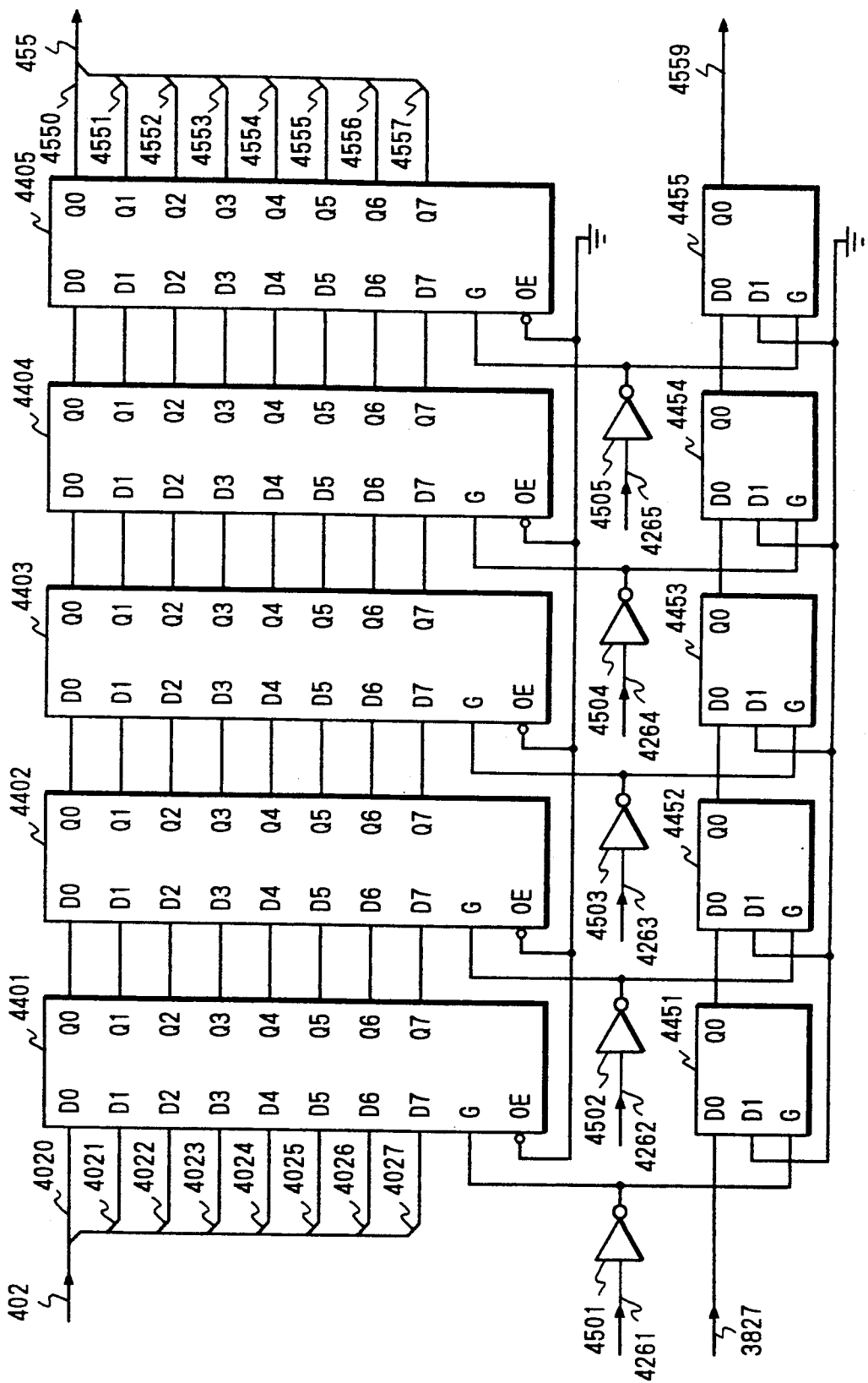
Figures 6B, 16:
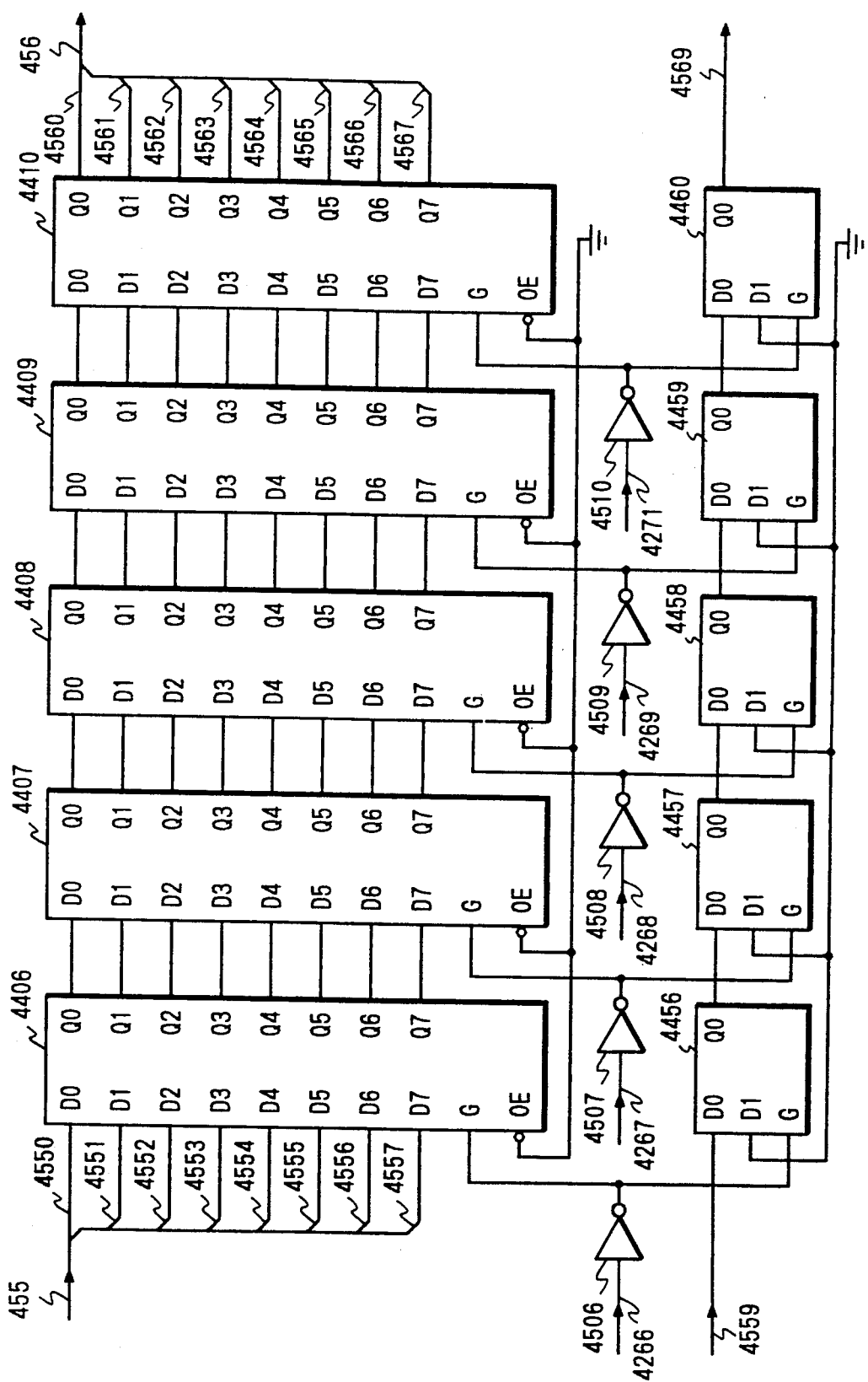
Figures 6C, 16:
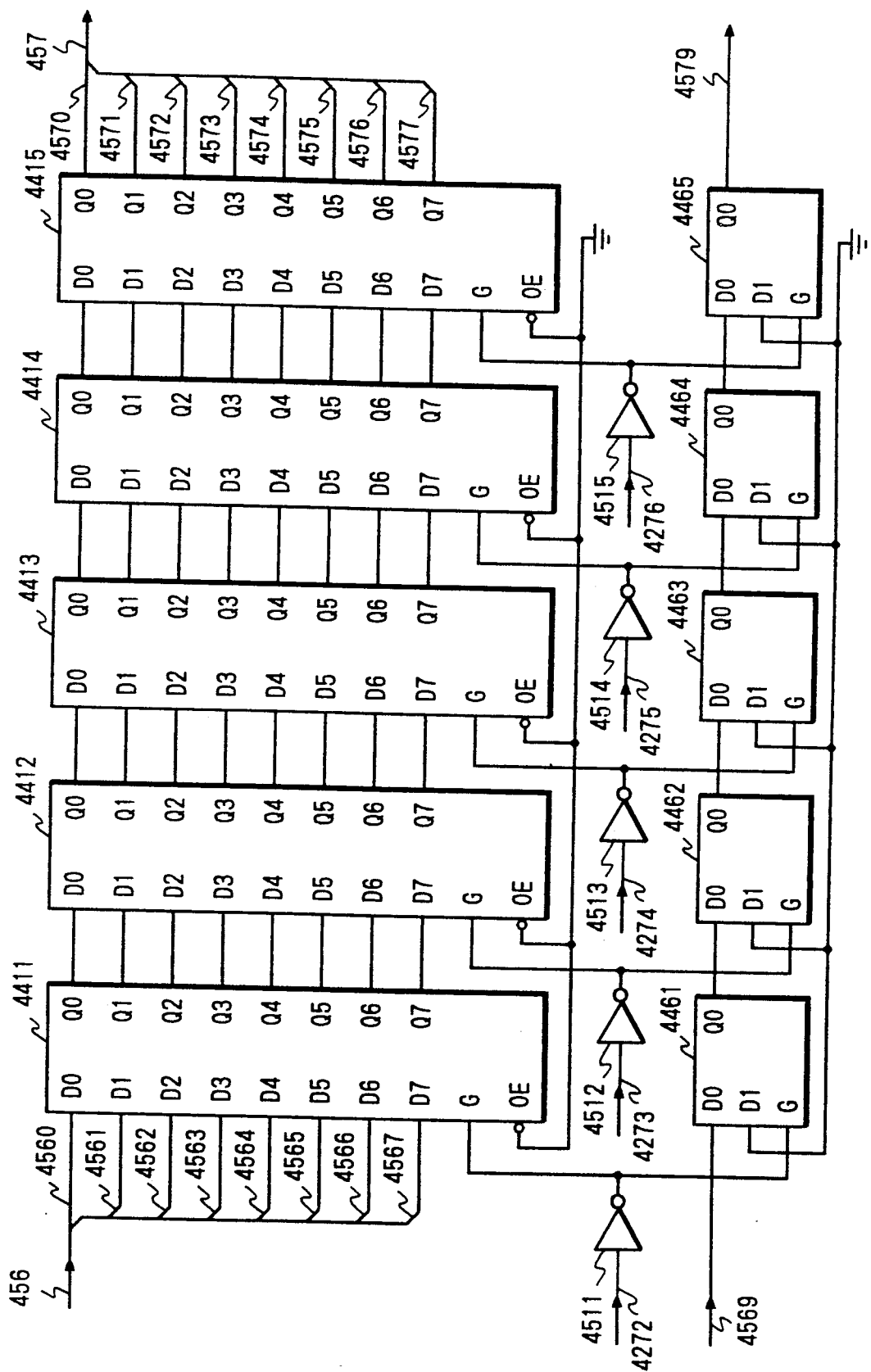
Figures 6D, 16:
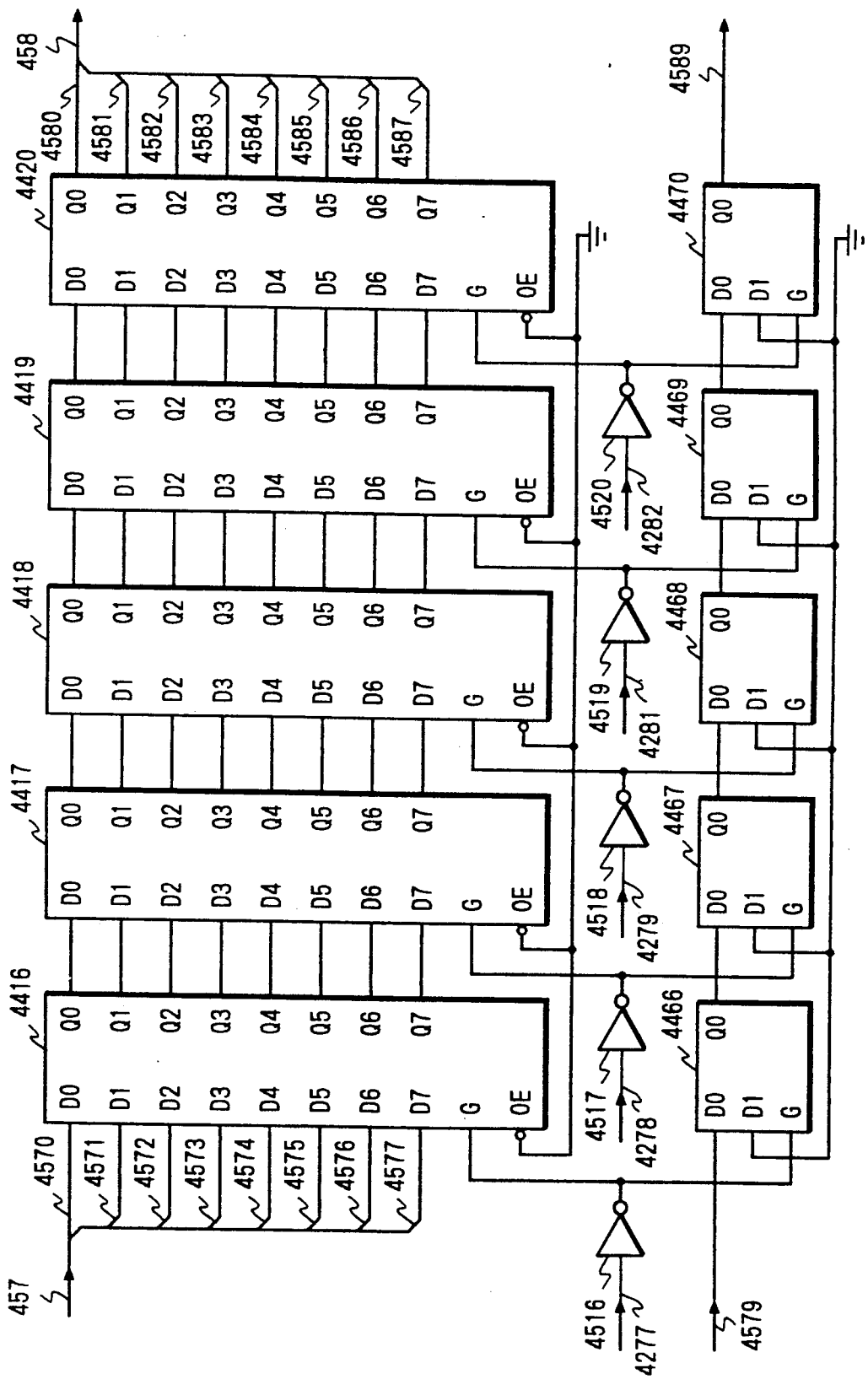
Figures 6E, 16:
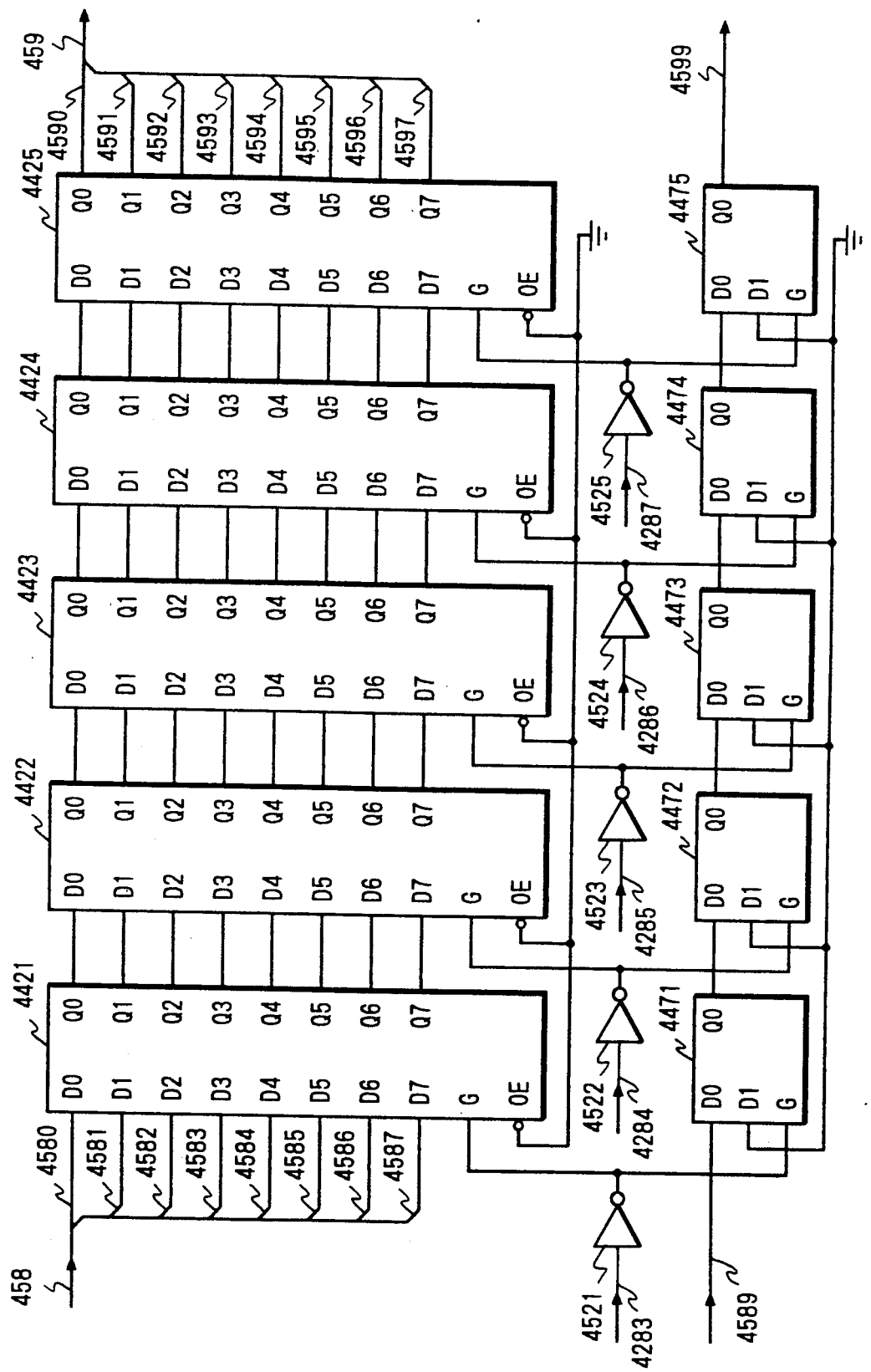
Figures 6F, 16:
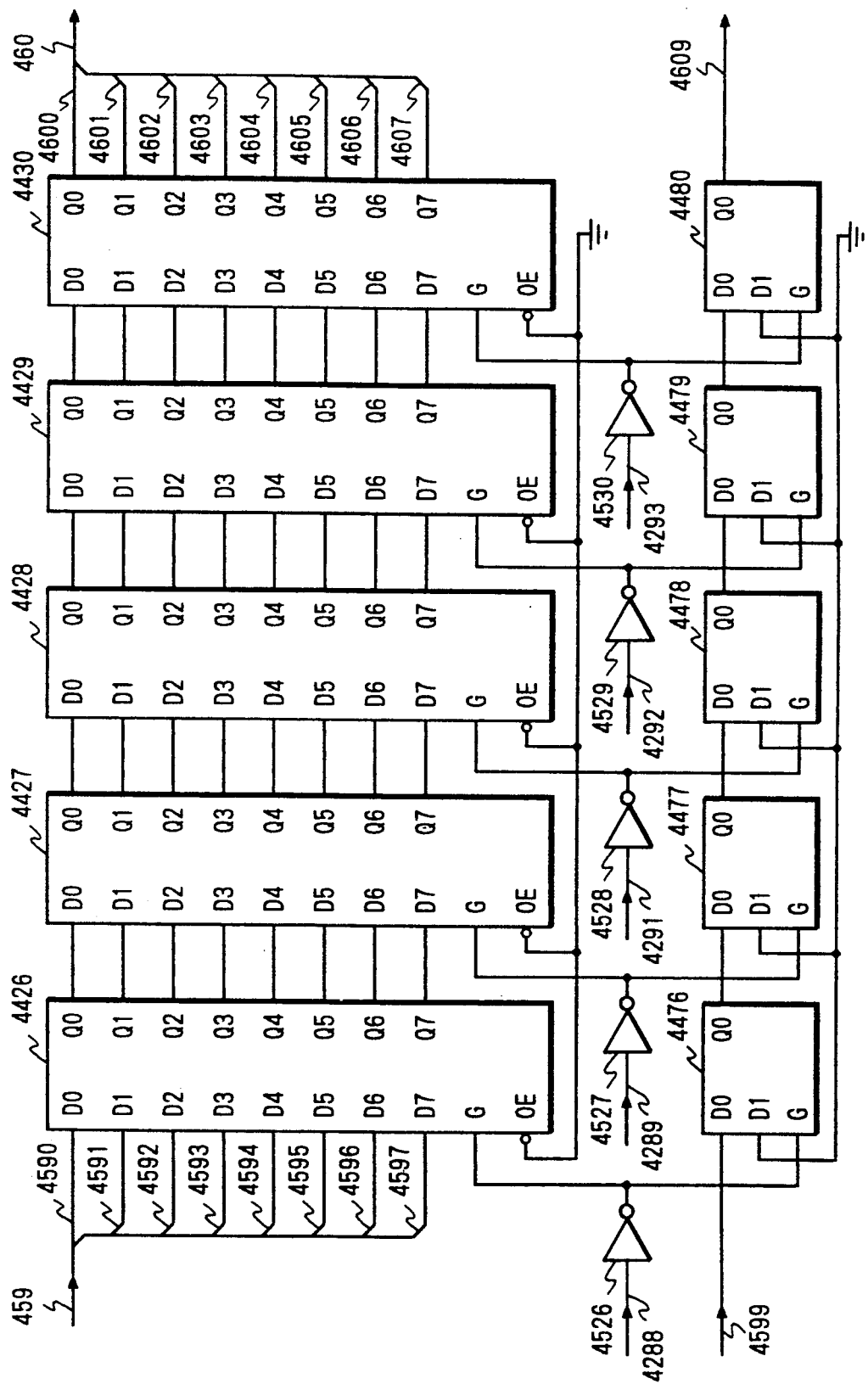
Figures 6G, 16:
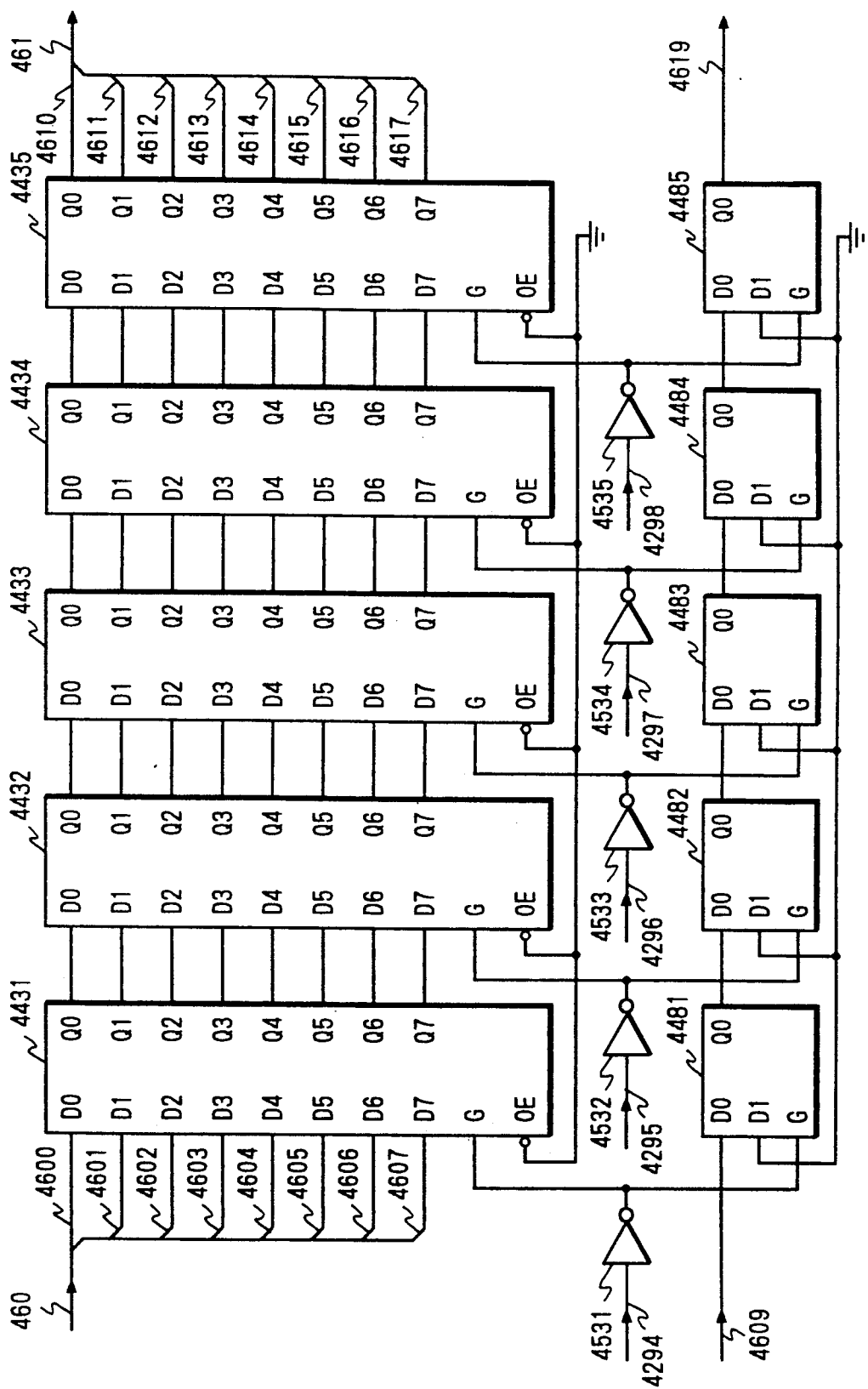
Figures 6H, 16:
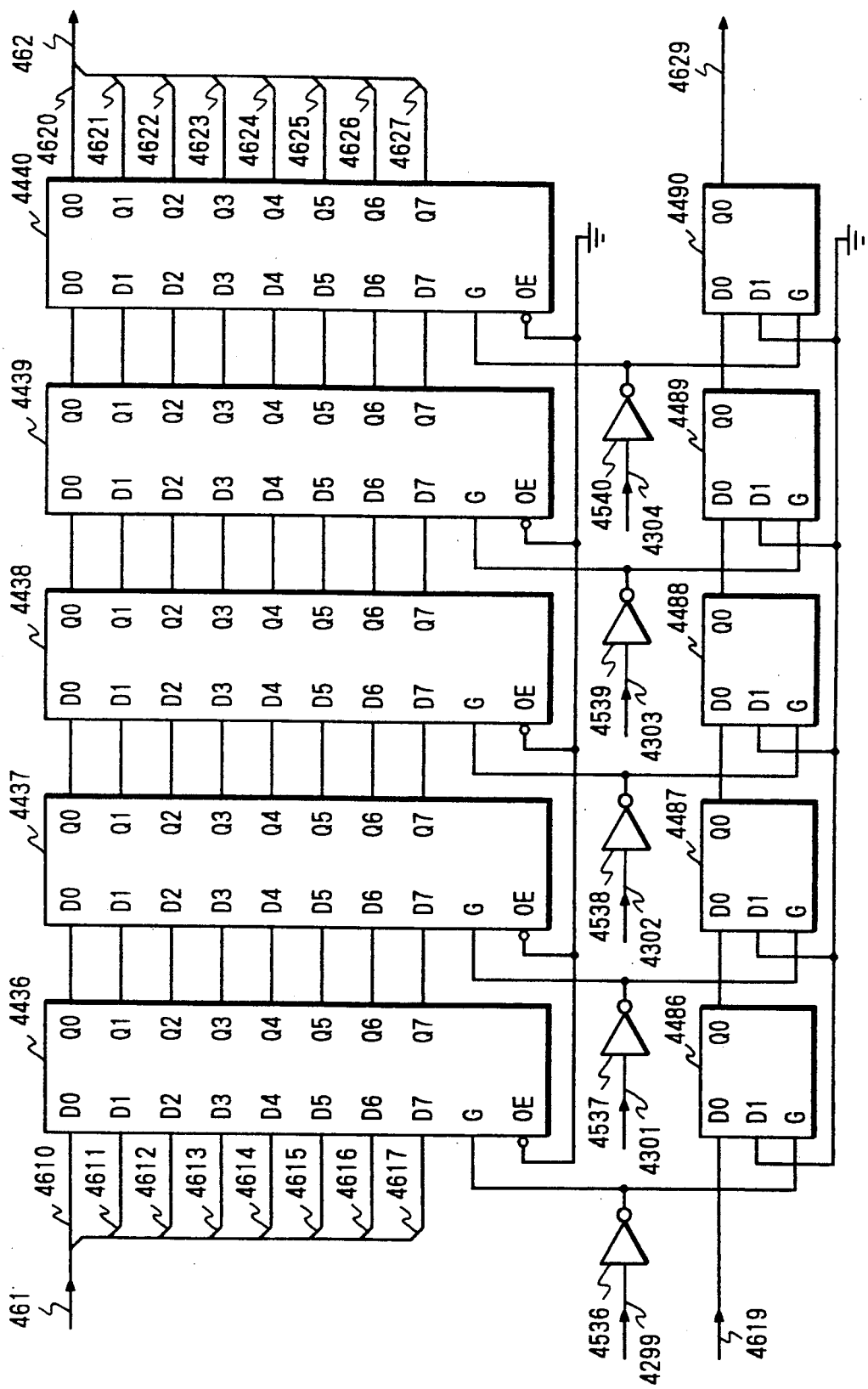

In FIG. 16-3D, 4101–4103 respectively designate D flip-flops, 4104–4106 respectively stand for AND gates, and 4111–4113 respectively represent inverters. In this structure, the FIFO control circuit 403 receives the signals 4088, 4087 from FIG. 16-3C, signal 4068, 4069 from FIG. 16-3B, signal 4649 from FIG. 16-6J, signal 2848 from the MS bit synchronizing circuit 230 and signal 3219 from the MS bit synchronizing circuit 230, and outputs signals 4115–4119.

Referring now to FIG. 16-4, there is shown a circuit diagram of the P/S output register circuit 413 included in the receiving buffer circuit 400. In this figure, 4131, 4132 respectively designates P/S (parallel/serial) converters, and 4133–4139, 4141–4143 respectively stand for inverters. In this structure, the P/S output register circuit 413 receives a bus signal 464 consisting of parallel signals 4640–4647 from FIG. 16-6J, signal 2318 from the MS bit synchronizing circuit 230, signal 4115 from FIG. 16-3D and signal 3219 from the synchronized state circuit 320, and outputs to the highway switch (HWS) 101 PCM output signal 4149 (FIGS. 5-2A-5-2C (q)) which is obtained by means of conversion from parallel to serial.

In FIGS. 16-5A to 16-5G and 16-6A to 16-6J, there are respectively shown circuit diagrams of the FIFO register circuit 415 included in the receiving buffer circuit 400. The present FIFO register circuit 415 incorporates therein register units of 9- bits and 46 stages 4201–4209, 4211–4219, 4221–4229, 4231–4239, 4241–4250, and latches 4401–4446, 4451–4496. The FIFO register circuit 415 transmits a bus signal 402, which is the bit data from the S/P input register circuit 401 and a signal 3827 for timing from the received timing circuit 380 sequentially to thereby obtain a bus signal 464 and a signal 4649.

In FIG. 16-5A, 4151, 4152 respectively designate NAND gates, 4153 stands for an AND gate, 4154, 4155 respectively represent buffers, and 4156 expresses an inverter. In this structure, the FIFO register circuit 415 receives the signals 4067, 4119 from the FIFO control circuit 403, signal 2848 of 4.096 MHz from the MS bit synchronizing circuit 230 and signal 4260 from FIG. 16-5C, and outputs signals 4166–4169.

In FIG. 16-5B, there is shown a circuit diagram of the interiors of one of the register units 4201–4209, 4211–4219, 4221–4229, 4231–4239 and 4241–4250. In this figure, 4171 designates a D flip-flop, 4172–4174 respectively NAND gates and 4175, 4176 respectively represent inverters. In this structure, the FIFO register circuit 415 includes input terminals SO, MR, SI, CK and output terminals FG, FE, WP.

In FIG. 16-5C, 4201–4209 respectively designate the register unit shown in FIG. 16-5B. In this structure, the FIFO register circuit 415 receives the signals 4166–4169 and signal 4320 from FIG. 16-5D, and outputs signals 4260–4270.

In FIG. 16-5D, 4211–4219 respectively designate the register units shown in FIG. 16-5B. In this structure, the FIFO register circuit 415 receives the signal 4270 from FIG. 16-5C, signals 4167–4169 from FIG. 16-5A and signal 4321 from FIG. 16-5E, and outputs signals 4271–4280 and a signal 4320.

In FIG. 16-5E, 4221–4229 respectively stand for the register units shown in FIG. 16-5B. In this structure, the FIFO register circuit 415 receives the signal 4280 from FIG. 16-5A, signals 4167–4169 from FIG. 16-5A and signal 4322 from FIG. 16-5F, and outputs signals 4281–4290 and a signal 4321.

In FIG. 16-5F, 4231–4239 respectively designate the register units shown in FIG. 16-5B. In this structure, the FIFO register circuit 415 receives the signal 4290 from FIG. 16-5E, signals 4167–4169 from FIG. 16-5A and signal 4323 from FIG. 16-5G, and outputs signals 4291–4300 and a signal 4322.

In FIG. 16-5G, 4241–4250 respectively designate the register units shown in FIG. 16-5B, 4251 stands for an AND gate, and 4252 represents an inverter. In this structure, the FIFO register circuit 415 receives the signal 4167–4169 from FIG. 16-A and signal 4300 from FIG. 16-5F, and outputs signals 4301–4311.

Referring now to FIG. 16-6A, 4401–4405, and 4451–4455 respectively designate latches, and 4501–4505 respectively stand for inverters. In this structure, the FIFO register circuit 415 receives a signal 402 consisting of signals 4020–4027 from the S/P input register circuit 401, signals 4261–4265 from FIG. 16-5C and signal 3827 from the receiving timing creating circuit 380, and outputs a bus signal 455 consisting of signals 4550–4557 and a signal 4559.

In FIG. 16-6B, 4406–4410 and 4456–4460 respectively designate latches and 4506–4510 respectively stand for inverters. In this structure, the FIFO register circuit 415 receives a bus signal 455 consisting of 4550–4557 from FIG. 16-6A, signals 4266–4269 from FIG. 16-5C, signal 4271 from FIG. 16-5D and signal 4559 from FIG. 16-6A, and outputs a bus signal 456 consisting of signals 4560–4567 and a signal 4569.

In FIG. 16-6C, 4411–4415 and 4461–4465 respectively designate latches and 4511 4515 respectively stand for inverters. In this structure, the FIFO register circuit 415 receives a bus signal 456 consisting of signals 4560–4567 from FIG. 16-6B, signals 4272–4276 from FIG. 16-5D and signal 4569 from FIG. 16-6B, and outputs a bus signal consisting of signals 4570–4577 and a signal 4579.

In FIG. 16-6D, 4416–4420 and 4466–4470 respectively designate latches and 4516–4520 respectively stand for inverters. In this structure, the FIFO register circuit 415 receives a bus signal 457 consisting of signals 4570–4577 from FIG. 16-6C, signals 4277–4279 from FIG. 16-5D, signals 4281, 4282 from FIG. 16-6E and signal 4579 from FIG. 16-6C, and outputs a bus signal 458 consisting of signals 4580–4587 and a signal 4589.

In FIG. 16-6E, 4421–4425 and 4471–4475 respectively designate latches and 4521–4525 respectively stand for inverters. In this structure, the FIFO register circuit 415 receives a bus signal 458 consisting of signals 4580–4587 from FIG. 16-6D, signals 4283–4287 from FIG. 16-5E and signal 4589 from FIG. 16-6D, and outputs a bus signal 459 consisting of signals 4590–4597 and a signal 4599.

In FIG. 16-6F, 4426–4430 and 4476–4480 respectively designate latches and 4526–4530 respectively stand for inverters. In this structure, the FIFO register circuit 415 receives the bus signal 459 consisting of signals 4590–4597 from FIG. 16-6E, signals 4288–4289 from FIG. 165E, signals 4291–4293 and signal 4599 from FIG. 16-6E, and outputs a bus signal 460 consisting of signals 4600–4607 and a signal 4609.

In FIG. 16-6G, 4431–4435 and 4481–4485 respectively designate latches and 4531–4535 respectively stand for inverters. In this structure, the FIFO register circuit 415 receives the bus signal 460 consisting of signals 4600–4607 from FIG. 16-6F, signals 4294–4298 from FIG. 16-5F and signal 4609 from FIG. 16-6F, and outputs a bus signal 461 consisting of signals 4601–4617 and a signal 4619.

In FIG. 16-6H, 4436–4440 and 4486–4490 respectively designate latches and 4536–4540 respectively stand for inverters. In this structure, the FIFO register circuit 415 receives the bus signal 461 consisting of 4610–4617 from FIG. 16-6G, signals 4301–4304 from FIG. 16-5F and signal 4619 from FIG. 16-6G, and outputs a bus signal 462 consisting of signals 4620–4627 and a signal 4629.

In FIG. 16-6I, 4441–4445 and 4491–4495 respectively designate latches and 4541–4545 respectively stand for inverters. In this structure, the FIFO register circuit 415 receives the bus signal 462 consisting of signals 4620–4627 from FIG. 16-6H, signals 4305–4309 from FIG. 16-5G and signal 4629 from FIG. 16-6H, and outputs a bus signal 463 consisting of signals 4630–4637 and a signal 4639.

In FIG. 16-6J, 4446–4496 respectively designate latches and 4546 stand for inverters. In this structure, the FIFO register circuit 415 receives the bus signals consisting if 4630–4637 from FIG. 16-6I, signal 4310 from FIG. 16-5G, signal 4639 from FIG. 16-6I, and signal 4167 from FIG. 16-5A, and outputs a bus signal 464 consisting of signals 4640–4647 and a signal 4649.

Figures 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61:
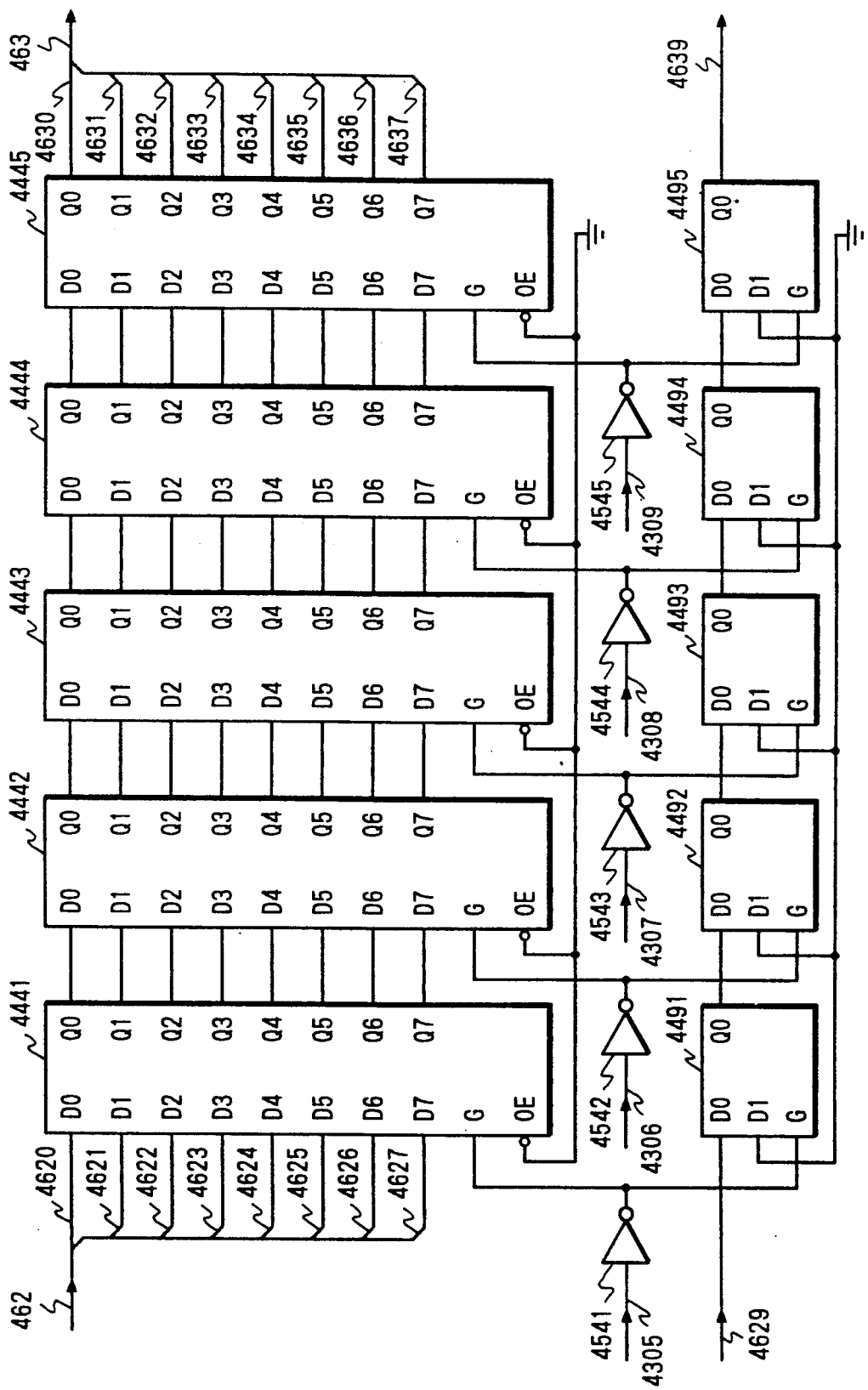
Figures 6J, 16:
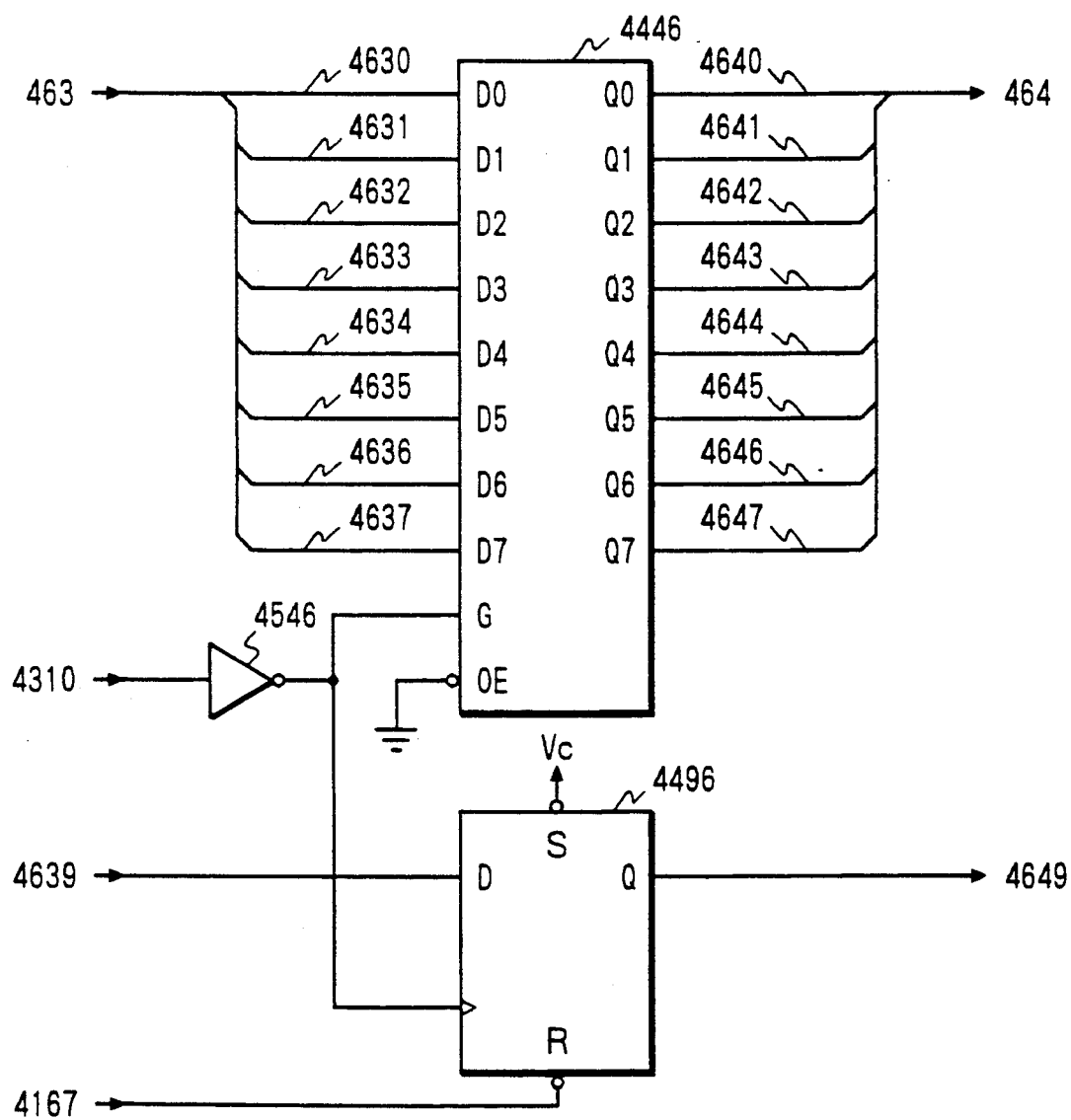
Figures 1, 17:
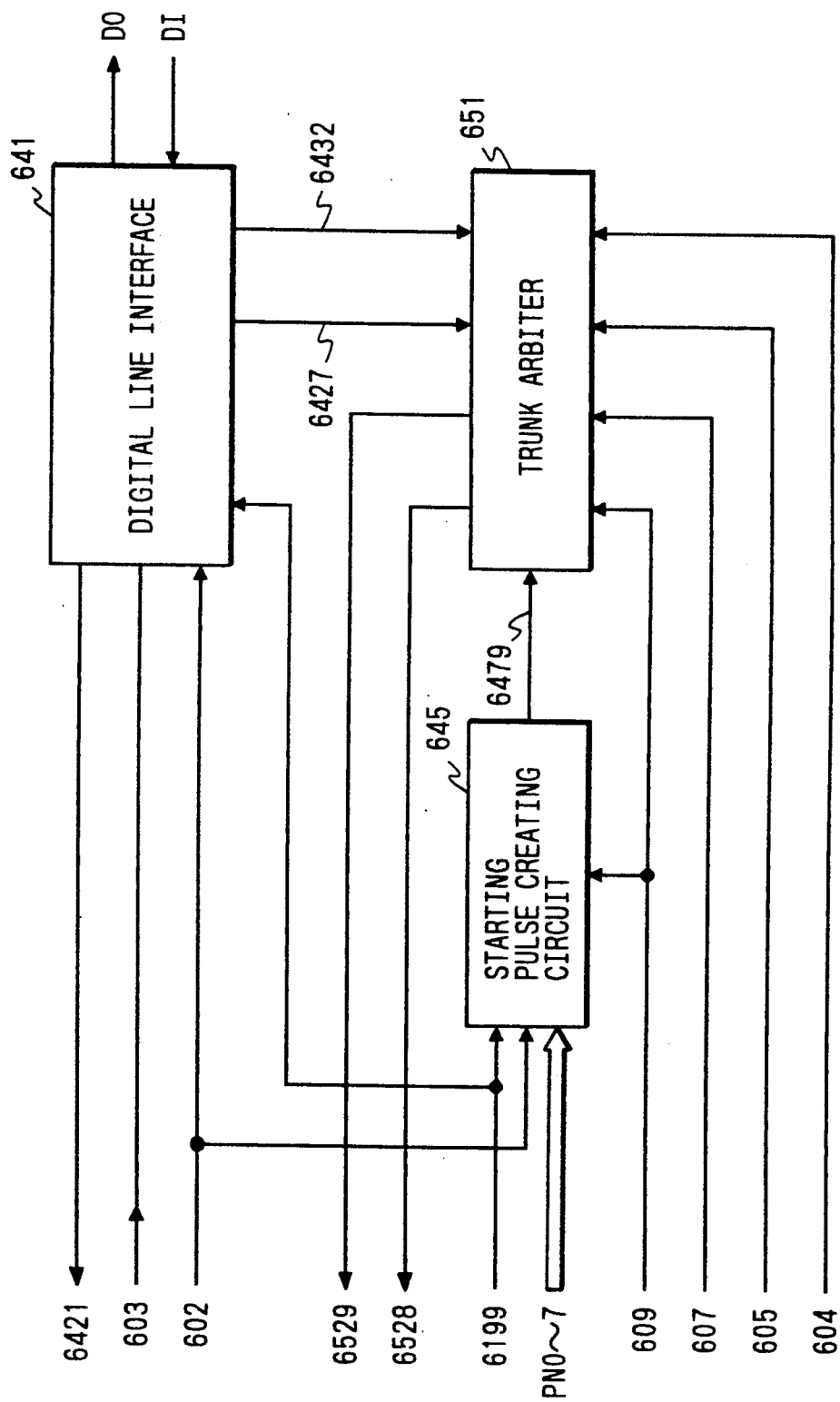
Figures 2, 17:
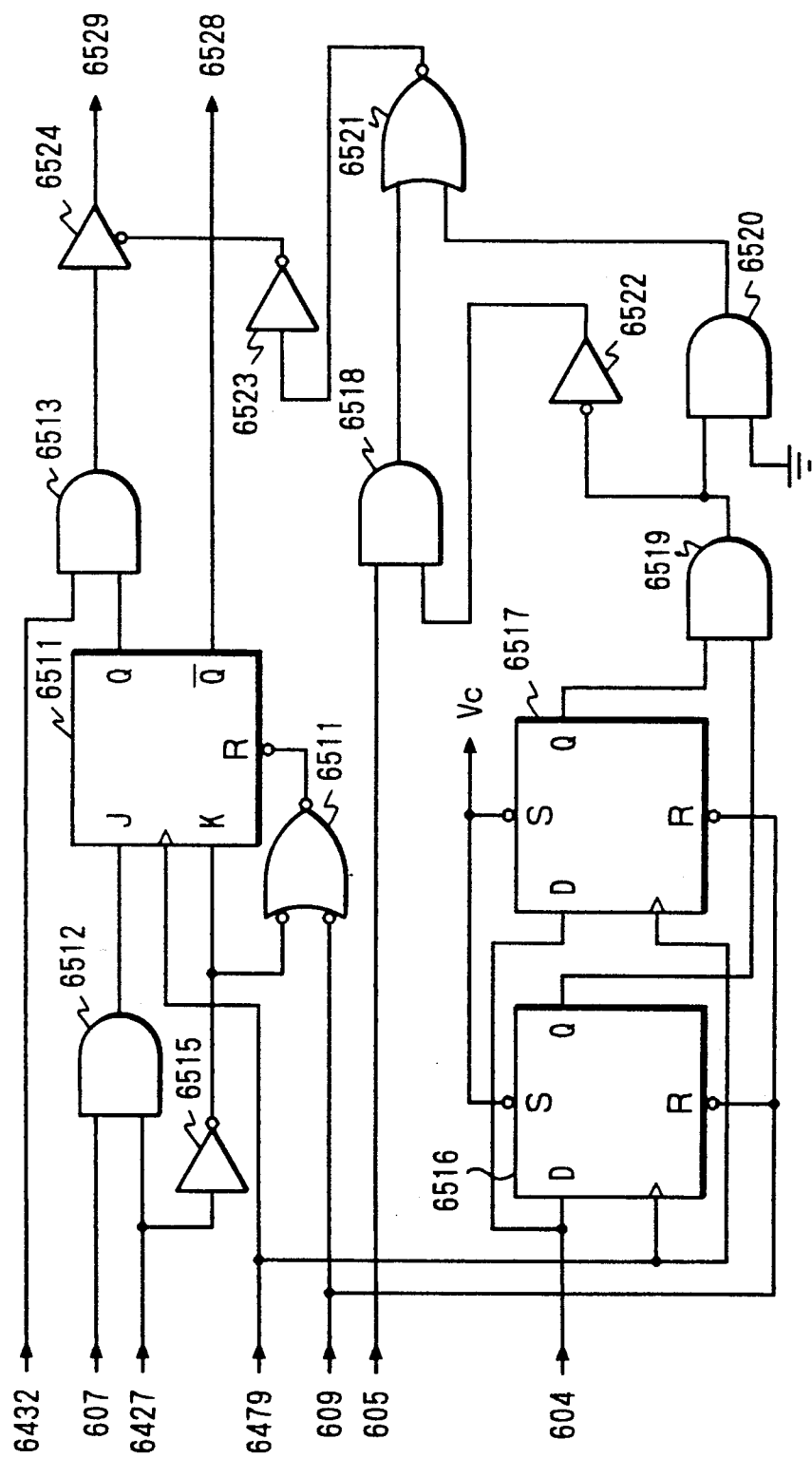

Referring now to FIG. 17-1, there is shown a circuit diagram of the digital trunk 640 included in the local switch 600. In this figure, the digital trunk 640 includes a digital line interface 641, a starting pulse creating circuit 645 and a trunk arbiter 651. To the digital line interface 641, there are connected an output DO leading to a digital line and an input DI coming from the digital line. There are applied to the digital line interface 641 a frame signal 602, a PCM input signal 603 from the highway switch 601 and a first clock signal 6199 of 2.048 MHz. The digital line interface 641 outputs a PCM output signal 6421 to the highway switch 601 and also outputs to the trunk arbiter 651 a signal 6432 having a clock cycle of 64 KHz received from the digital line input DI and a signal 6427 for synchronization having the cycle of the frame signal. The digital line interface 641 is identical with the digital line interface 141 of the digital trunk 140 included in the master switch 4100.

The starting pulse creating circuit 645 receives the first clock signal 6199, frame signal 602 and reset signal 609 and outputs the starting pulse 6479 shown in FIG. 2-3 at a timing determined by the identification numbers PN 0-7. This starting pulse creating circuit 645 is identical with the starting pulse creating circuit 145 of the digital trunk 140 included in the master switch 4100.

To the trunk arbiter 651, there are applied the signals 6432, 6427, 6479, busy signal 607, reset signal 609 and master right control signal 604, and clock transmission control signal 605. Accordingly, the trunk arbiter 651 checks whether its own clock source can be a master clock or not, and outputs a signal 6529 for a master clock and a signal 6528 which turns the busy signal 607 to "L" and display the state of busy.

In FIG. 17-2, there is shown a circuit diagram of the trunk arbiter 651. In this figure, the trunk arbiter 651 includes a JK flip-flop 6511, D flip-flops 6516, 6517, AND gates 6512–6514, 6518–6520, inverters 6515, 6522, 6523 and a tri-state buffer 6524. In this structure, the trunk arbiter 651 receives a signal 1432 of 64 KHz and the busy signal 107, a signal 6427 indicating a synchronized state, a starting pulse 6479, a reset signal 609, a master right control signal 604 and a clock transmission control signal 605, and outputs a signal 6528 which turns the busy signal 607 to "L" when the busy signal 107 is "H" and a synchronized state occurs, and a signal 6529 which should be a second clock signal.

Figure 18A:
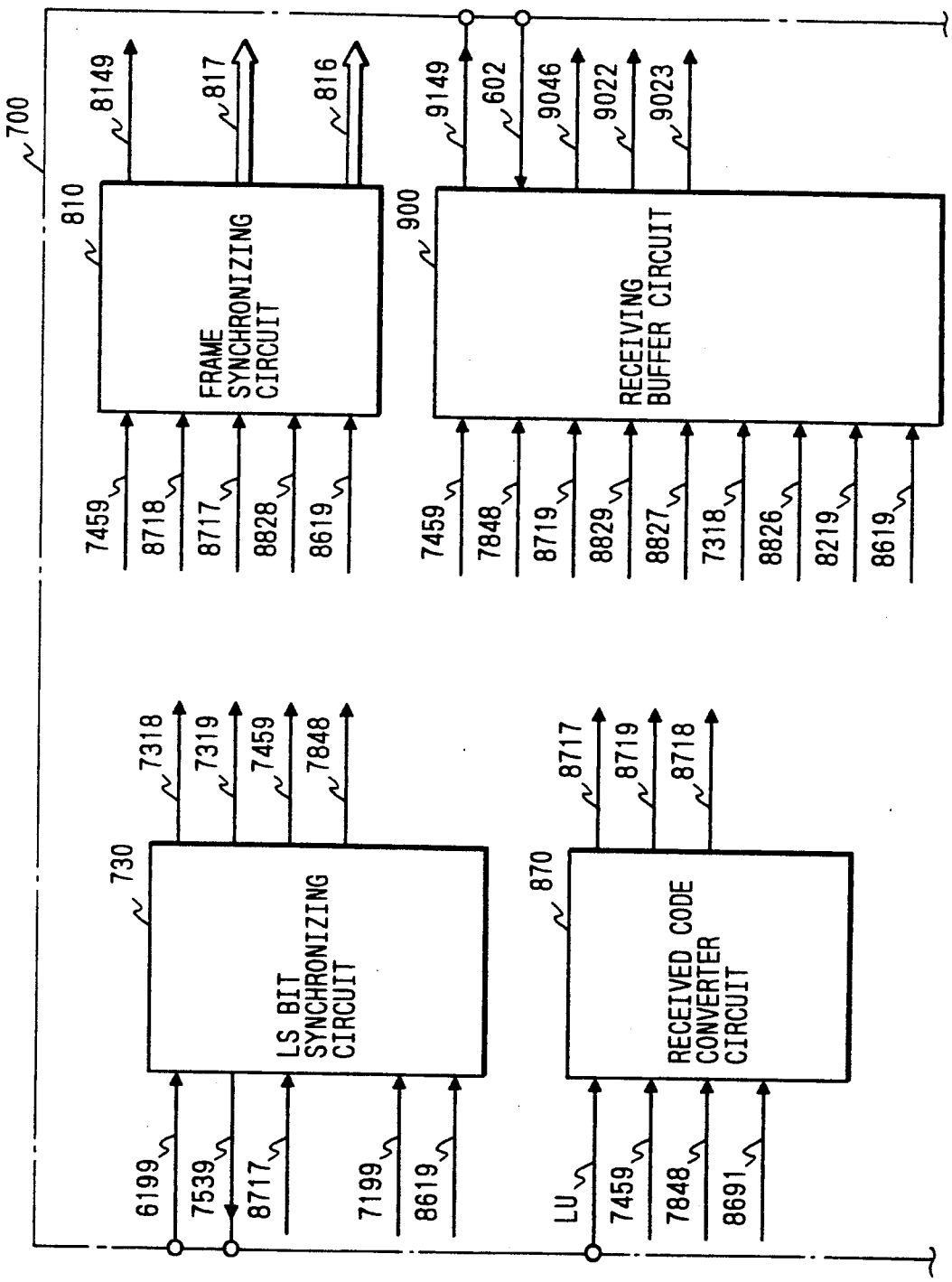
FIGS. 18A, 18B and 18C are respectively circuit diagram of an LS link synchronizing part included in a local switch.
Figure 18B:
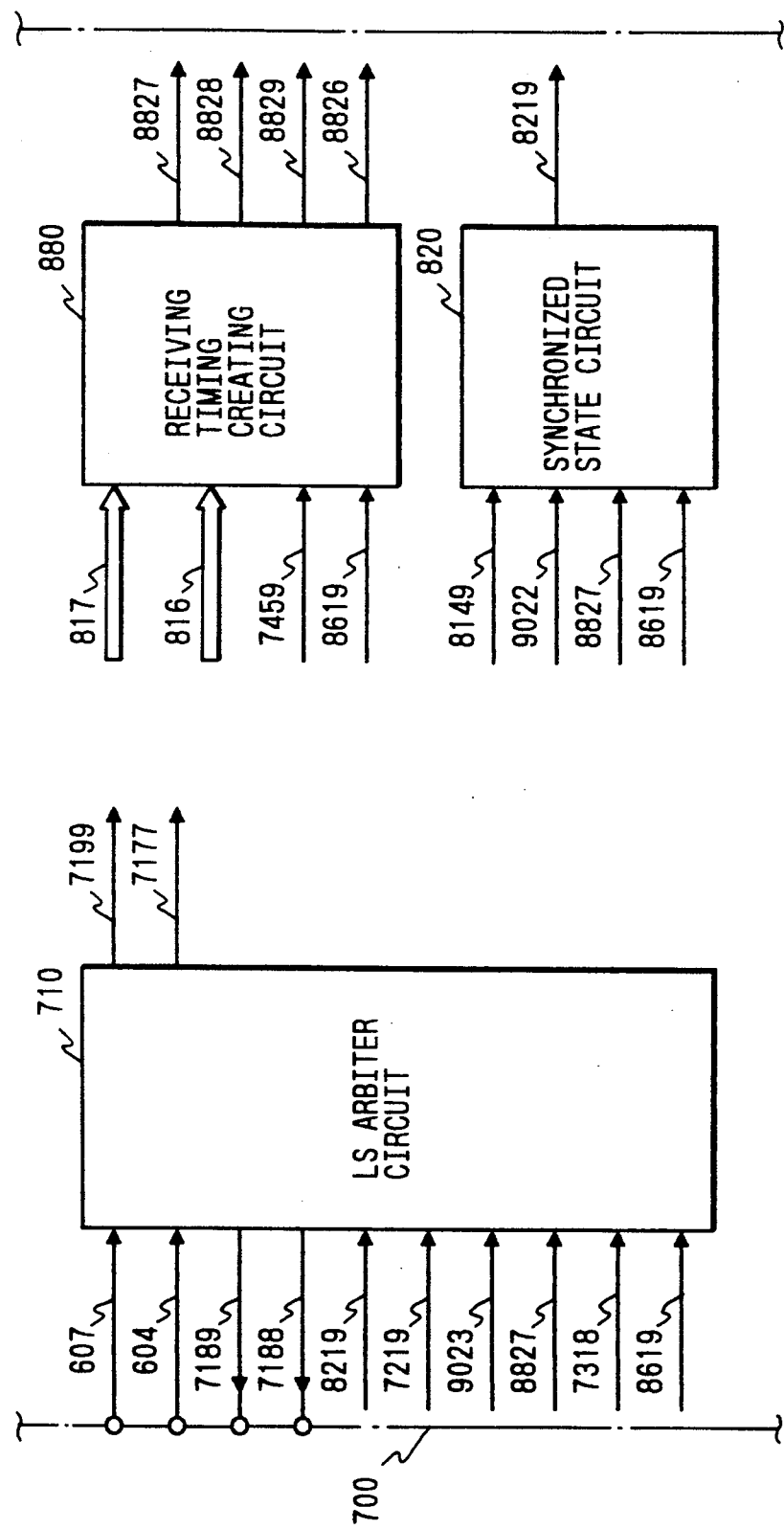
Figure 18C:
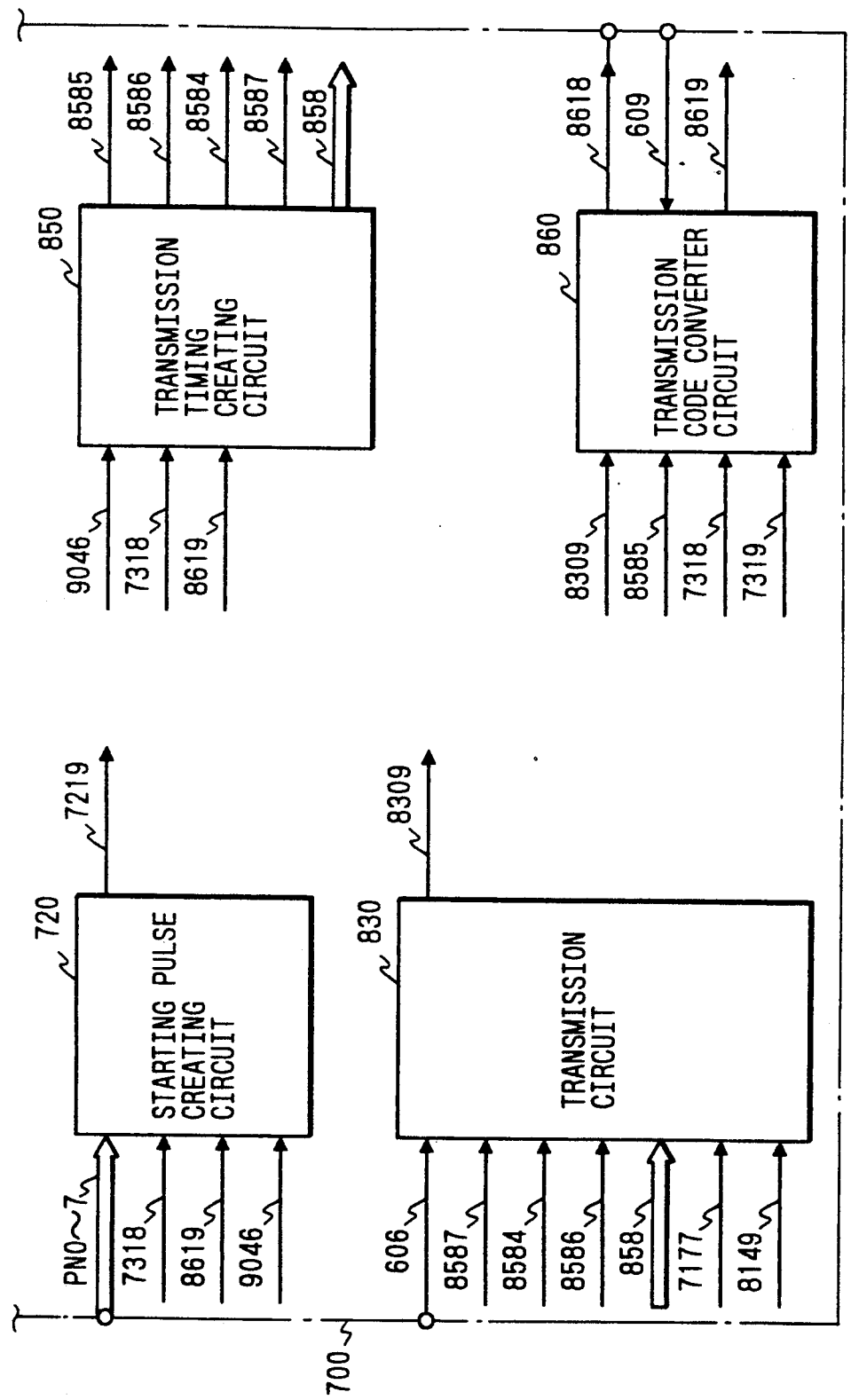
Figures 1, 19:
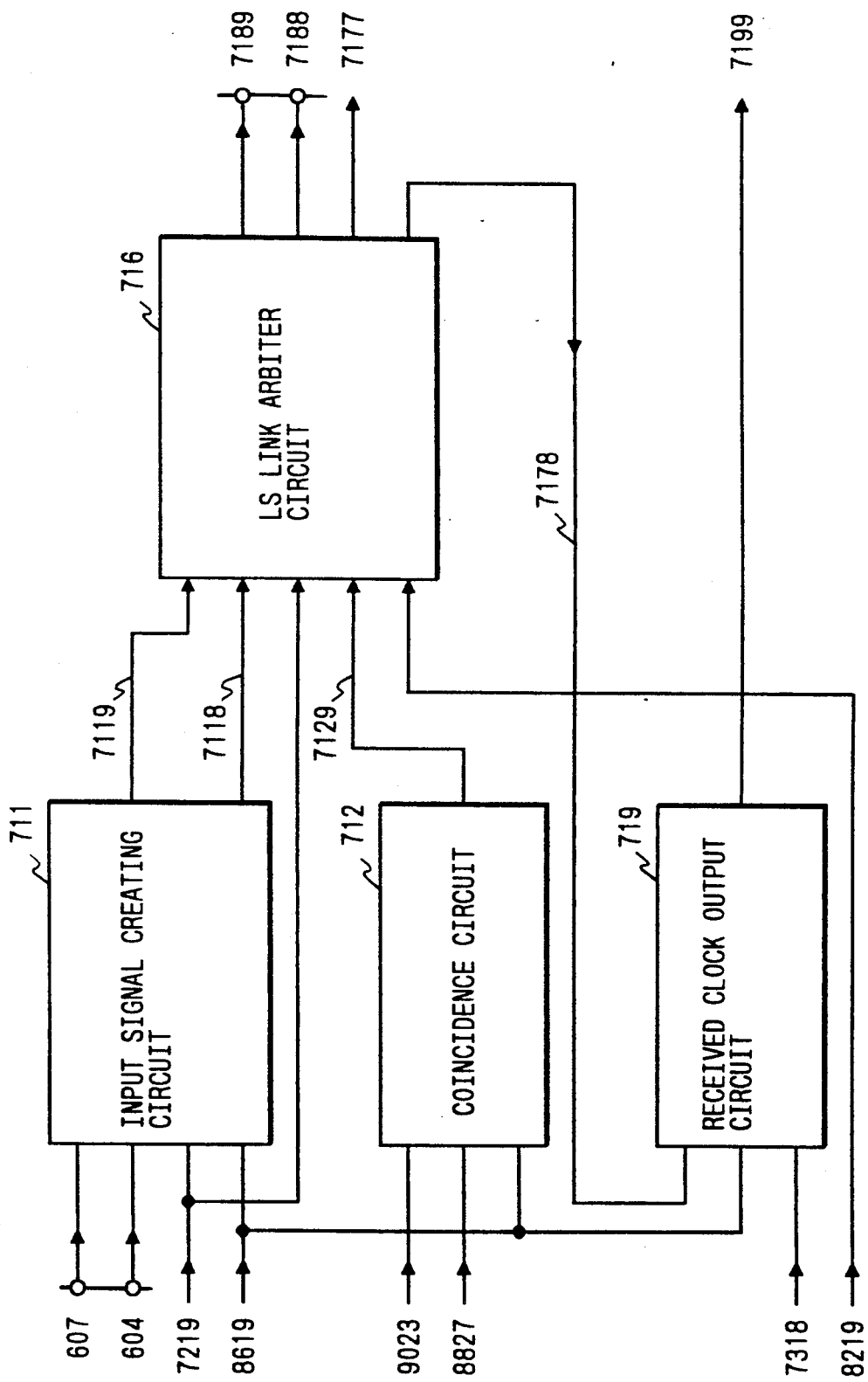
Figures 2, 19:
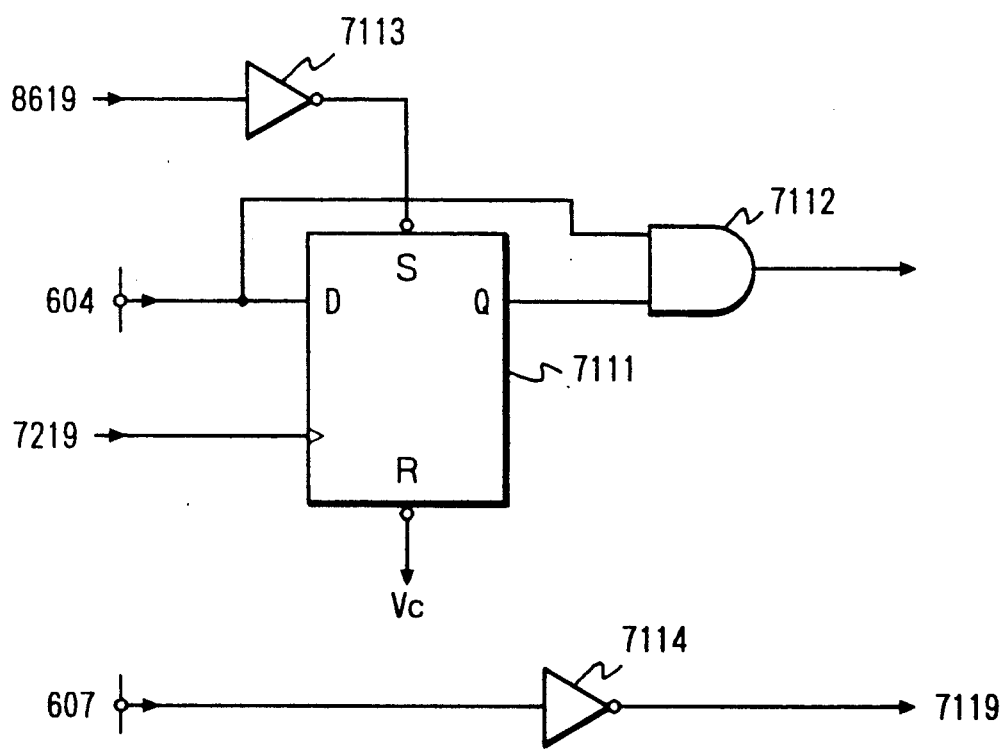
Figures 3A, 19:
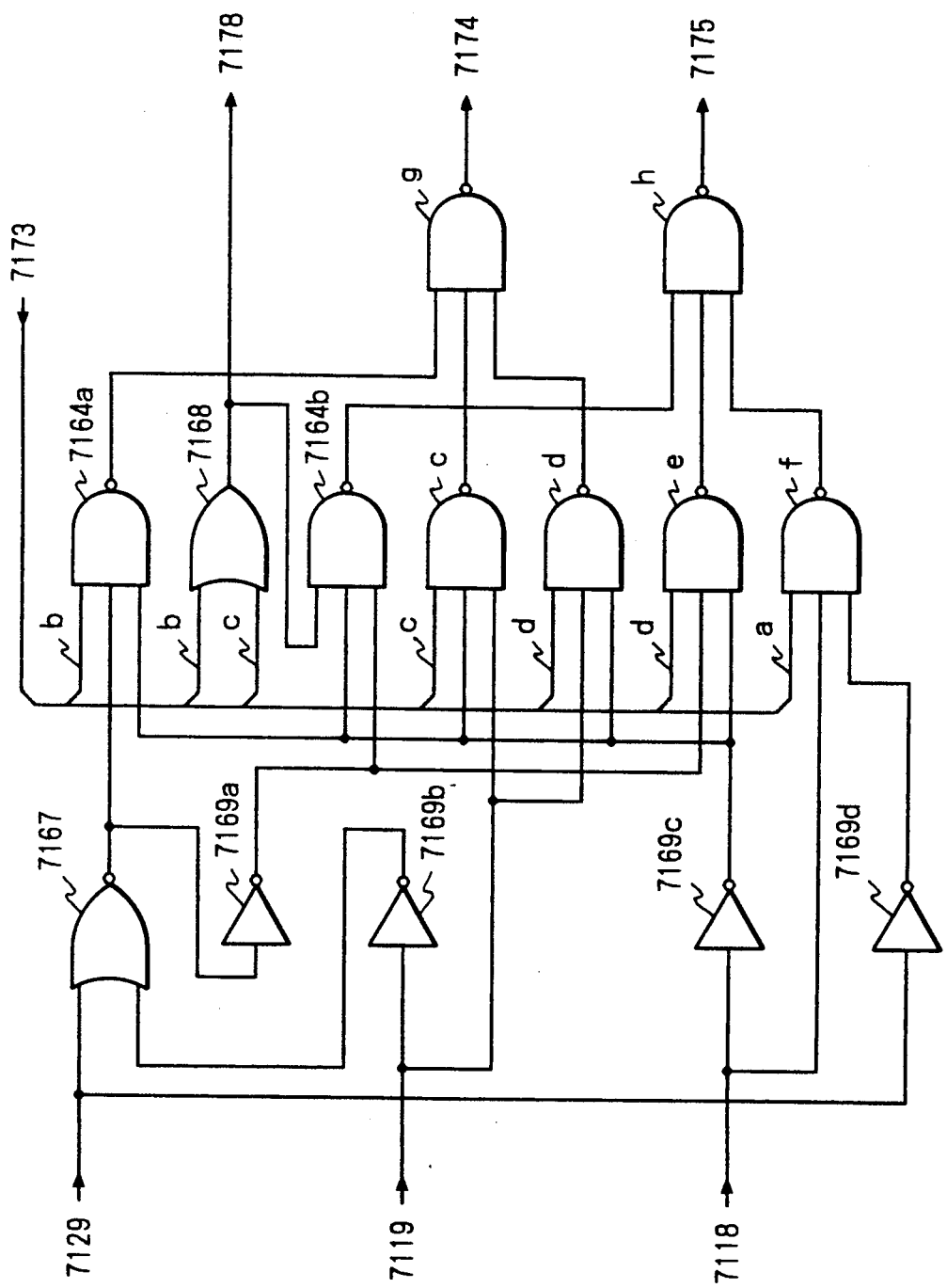
Figures 3B, 19:
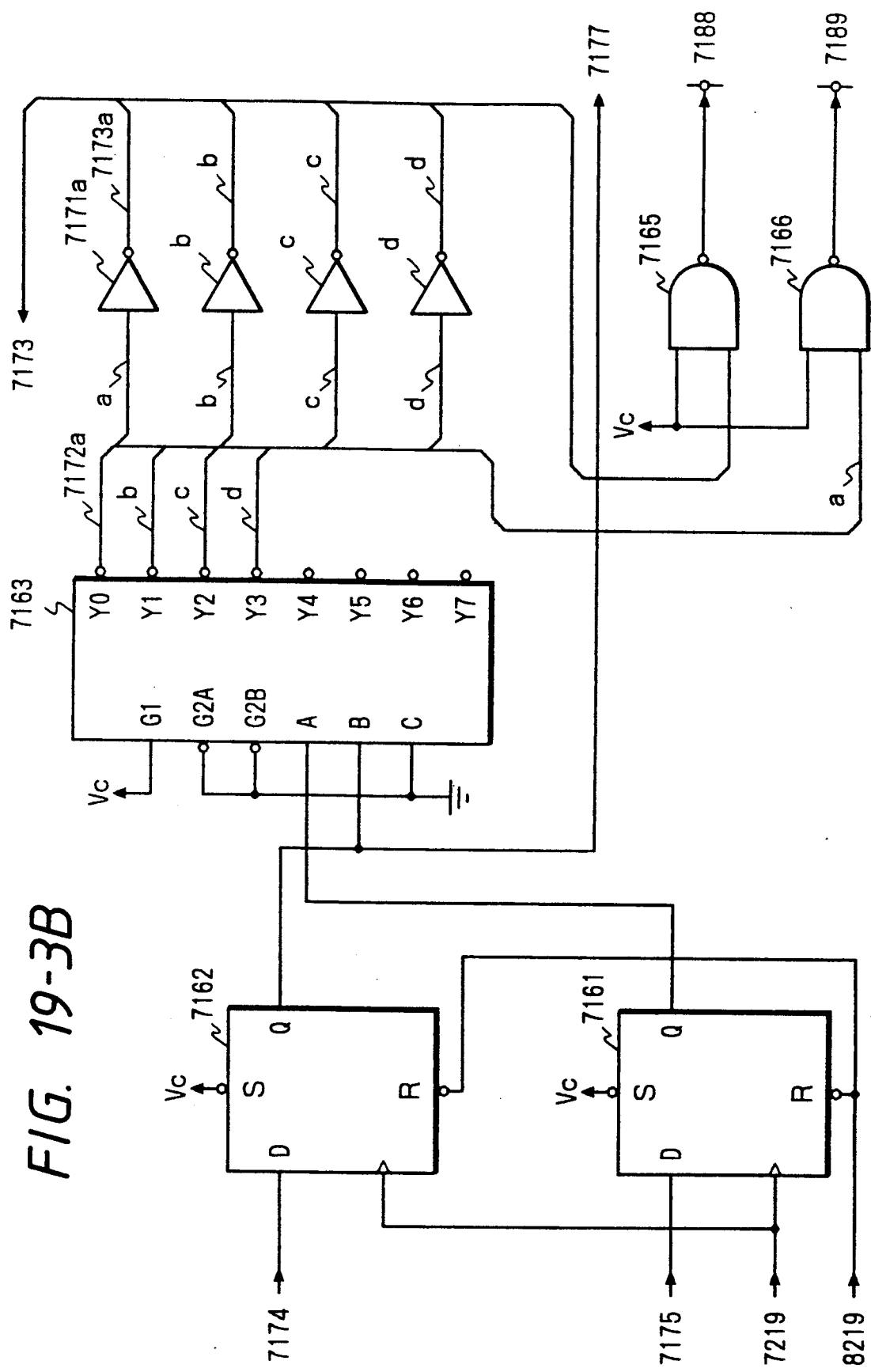
Figures 1, 20:
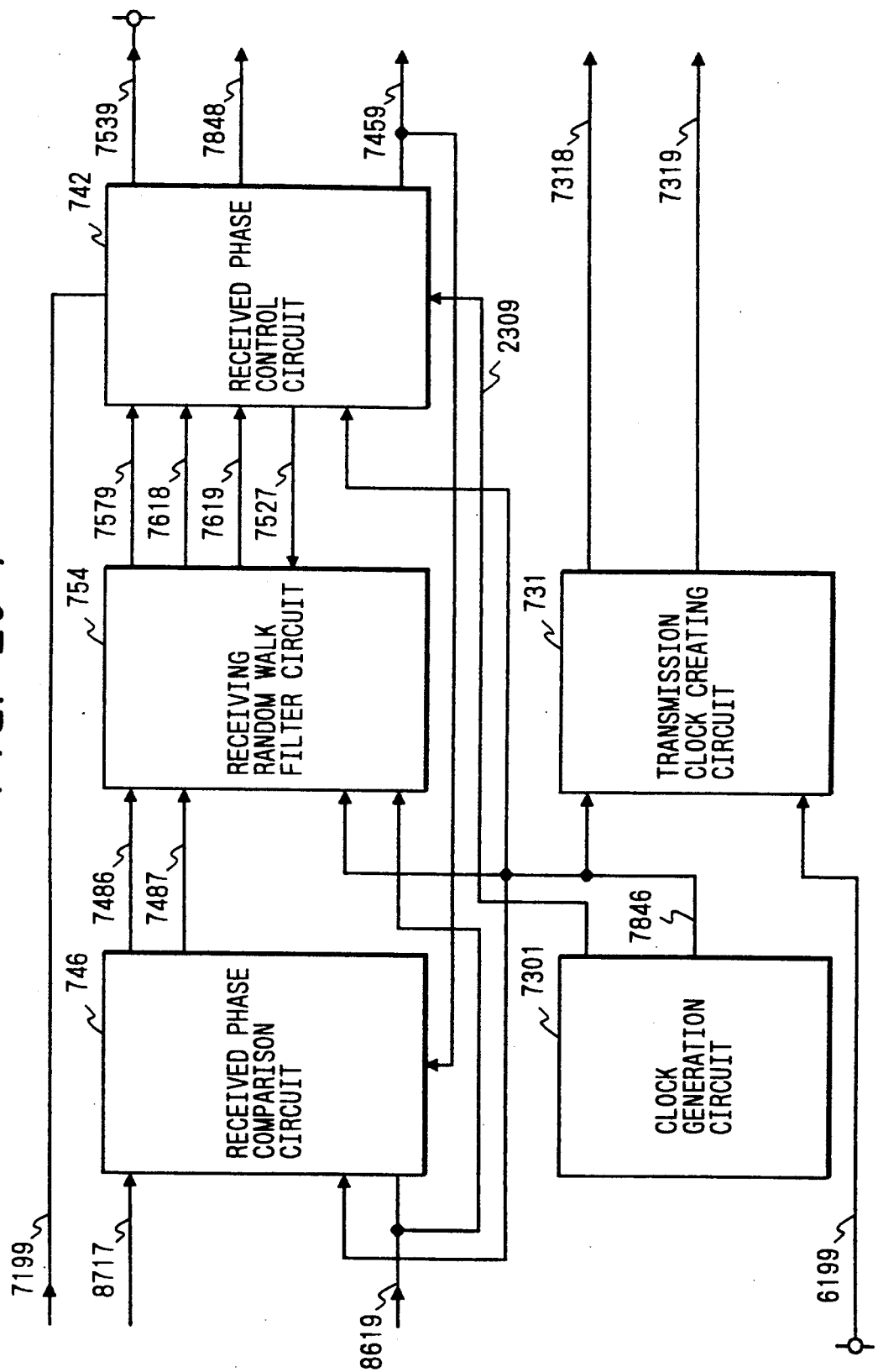
Figures 2A, 20:
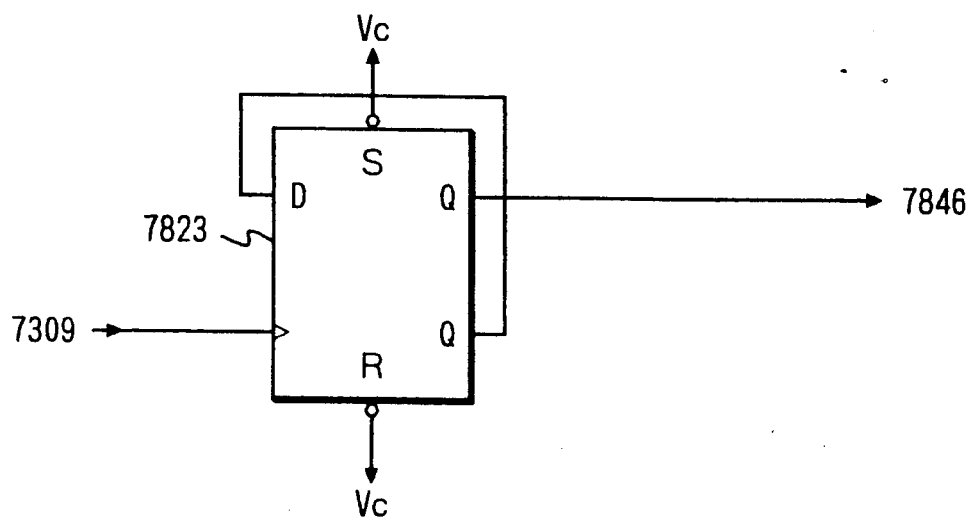
Figures 2B, 20:
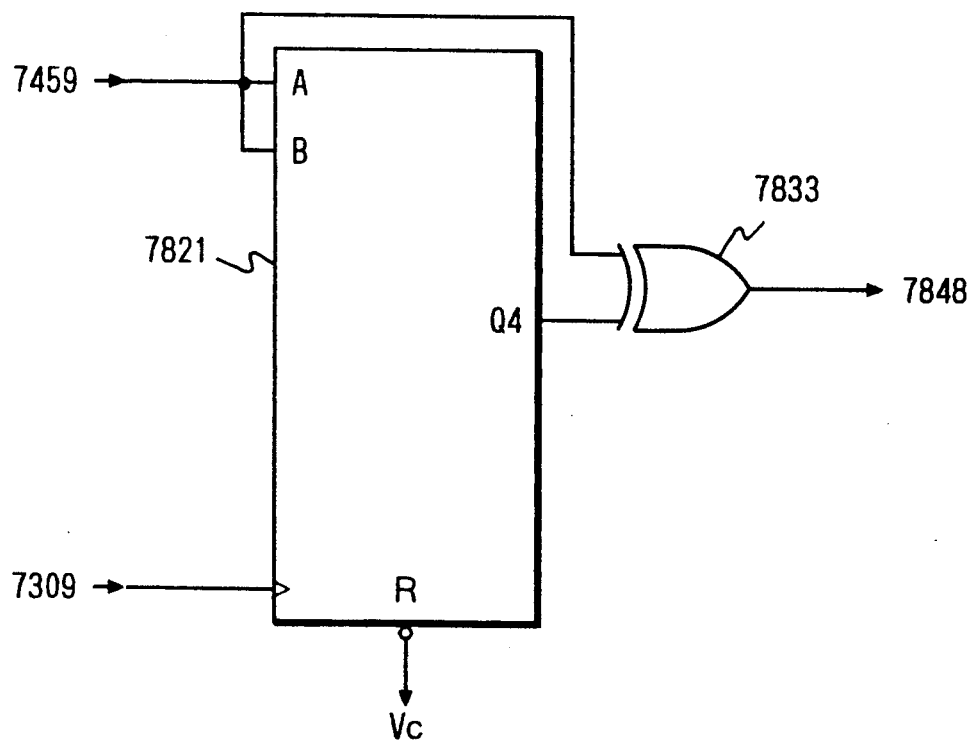

Referring now to FIGS. 18A to 18C, there are respectively shown circuit diagrams of the LS link synchronizing part 700. In these figures, the LS link synchronizing part 700 includes an LS arbiter circuit 710, a starting pulse creating circuit 720, an LS bit synchronizing circuit 730, a frame synchronizing circuit 8140, a synchronized state circuit 820, a transmission circuit 830, a transmission timing creating circuit 850, a transmission code converter circuit 860, a received code converter circuit 870, a receiving timing creating circuit 880, and a receiving buffer circuit 900 together with a large number of input and output signals.

In this structure, other circuits than the LS arbiter circuit 710 and LS bit synchronizing circuit 730 are identical with the circuits of the same names included in the MS link synchronizing part 200. Therefore, description will be given below of the LS arbiter circuit 710 and LS bit synchronizing circuit 730.

In FIG. 19-1, there is shown a circuit diagram of the LS arbiter circuit 710 which is included in the LS link synchronizing part 700. In this figure, the LS arbiter circuit 710 monitors the state of the busy signal 607 to thereby perform a competitive control (arbitration) on the selection of a master clock. The LS arbiter circuit 710 includes an input signal creating circuit 711, a coincidence circuit 712, an LS link arbiter circuit 716 and a receiving clock output circuit 719. Here, it should be noted that the coincidence circuit 712 and receiving clock output circuit 719 are respectively coincident with the circuits 212 and 219 of the same names included in the MS arbiter circuit 210.

In FIG. 19-2, there is shown a circuit diagram of the input signal creating circuit 711 included in the LS arbiter circuit 710. In this figure, 7111 designates a D flip-flop, 7112 stands for an AND gate, and 7113, 7114 respectively represent inverters. The circuit 711 is different from the circuit shown in FIG. 6-2 in that a master right control signal 604, instead of the busy signal 107, is applied to the data terminal D of the D flip-flop 7111 to output a signal 7118 and the busy signal 607 is output as a signal 7119 by means of the inverter 7114.

In FIGS. 19-3A and 19-3B, there are respectively shown circuit diagrams of the LS link arbiter circuit 716 included in the LS arbiter circuit 710.

In FIG. 19-3A, 7164a–h respectively designate NAND gates, 7176 stands for a NOR gate, 7168 represents an OR gate, and 7169a–d respectively express inverters. In this structure, the LS link arbiter circuit 716 receives the signal 7129 from the coincidence circuit 712, signals 7119, 7118 from the input signal creating circuit 711 and signals 7113a–d from FIG. 19-3B, and outputs signals 7178, 7174, 7175.

In FIG. 19-3B, 7161, 7162 respectively designate D flip-flops, 7163 stands for a decoder, 7165, 7166 respectively represent NAND gates, and 7171a–d respectively express inverters. In this structure, the LS link arbiter circuit 716 receives the signals 7174, 7175 from FIG. 19-3A, signal 7219 from the starting pulse creating circuit 720 and signal 8219 from the synchronized state circuit 820, and outputs signals 7173a–d, 7177–7189. Here, the signal 7188 provides a clock transmission control signal 605 and the signal 7189 provides a master right control signal 604.

Referring now to FIG. 20-1, there is shown a circuit diagram of the LS bit synchronizing circuit 730. In this figure, the LS bit synchronizing circuit 730 includes a clock generation circuit 7301, a transmission clock creating circuit 731, a received phase control circuit 742, a received phase comparison circuit 746 and a receiving random walk filter circuit 754. The transmission clock creating circuit 731 and receiving random walk filter circuit 754 are respectively identical with the transmission clock creating circuit 231 and receiving random walk filter circuit 254 respectively contained in the MS bit synchronizing circuit 230 shown in FIGS. 8-1A and 8-1B. Also, the clock generation circuit 7301, received phase control circuit 742 and received phase comparison circuit 746 are respectively similar to the clock generation circuit 2301, received phase control circuit 242 and received phase comparison circuit 246 shown in FIGS. 8-1A and 8-1B. Therefore, description will be given only as to differences therebetween.

In FIG. 20-2 (a), there is shown a partial circuit of the clock generation circuit 7301, in which the output signal 2309 of the clock generation circuit 2301 shown in FIG. 8-2 is rewritten to 7309 and the signal 7309 is applied to the clock terminal to the D flip-flop 823 to thereby output a signal 7846. In other words, the clock generation circuit 7301 is a combination of the circuit shown in FIG. 8-2 (b) and the circuit shown in FIG. 20-2 (a).

The received phase control circuit 742 adds a shift register 821 and an exclusive OR gate 7833 respectively shown in FIG. 20-2 to the received phase control circuit 249 shown in FIG. 8-1A to thereby obtain a signal 7848. Here, signals 7529 and 3309 are respectively identical with the signals 2529 and 2309 respectively shown in FIG. 8-1A and FIG. 8-1B, but they are given different numerals respectively.

The received phase comparison circuit 746 is identical with the received phase comparison circuit 246 exclusive of the AND gate 2467, and NOR gates 2473, 2474.

As has been described hereinbefore, according to the invention, when a main device and a large number of slave devices are connected to each other in a star manner and also they can be respectively connected to a digital line network, each time a call occurs a competitive control (arbitration) operation is executed, so that a master clock source can be moved quickly to thereby establish a synchronized state immediately. That is, the present invention provides a great effect.

What is claimed is:

1. A synchronizing system in a digital communication line, comprising:

a plurality of local switch (LS) means for storing at least one digital line and monitoring a first piece of busy information when a clock source is already present, said local switch means, if a first new clock source occurs while said first busy information is indicating no busy state, being capable of transmitting a master right request to turn said busy information to the busy state and to specify said first new clock source as a master clock and, on receiving a master right specification with respect to said master right request, being capable of outputting said first new clock source as said master clock; and master switch (MS) means connected to said plurality of local switch means in a star manner, by means of a link transmission line for transmitting control information including said master clock, master right request and master right specification, for monitoring a second piece of busy information indicating a busy state, said master switch means, if a second new clock source occurs while said second busy information is indicating no busy state, being capable of transmitting said second new clock source as a master clock and, if said second new clock source competes with said first new clock source in said local switch means that has output said master right request, being capable of arbitrating said competition between said first and second new clock sources and selecting one of said clock sources to thereby turn said first and second pieces of busy information to said busy state and, if said first clock source is selected, outputting said master right specification to said local switch means that has transmitted said master right request.

2. A synchronizing system as claimed in claim 1, wherein said master switch means includes MS clock generation means for obtaining an MS synchronizing clock synchronized in phase with said selected clock source and transmitting said MS synchronizing clock to said link transmission line, and wherein each of said plurality of local switch means includes LS clock generation means for obtaining an LS synchronizing clock synchronized in phase with said MS synchronizing clock supplied by said master switch means.

3. A synchronizing system as claimed in claim 2, wherein each of said MS and LS clock generation means includes:

digital PLL means comprising integration means to prevent a sudden phase change when said selected clock source is changed, and phase comparison means to compare phases with each other to thereby detect a difference between said phases, said digital PLL means being capable of performing a phase synchronizing operation in a digital manner; and, analog PLL means for receiving the output of said digital PLL means to perform a phase synchronizing operation in an analog manner so as to smooth the quantized jitters contained in said output.

4. A synchronizing system as claimed in claim 1, wherein said master switch means includes MS bit synchronizing means which, when one of said plurality of local switch means is selected as said selected clock source, creates a clock signal to provide bit synchronization for a signal to be transmitted from said selected local switch means in compensation for a delay time of said link transmission line.

5. A synchronizing system as claimed in claim 4, wherein said MS bit synchronizing means comprises:

integration means for preventing a sudden change in phase when said selected clock source is changed;

delay compensation means for compensating the delay time of said signal from the selected clock source;

phase comparison means for comparing the selected clock signal from said selected clock source with said clock to provide the bit synchronization of said signal to be transmitted; and phase control means for controlling the phase of said clock signal to provide the bit synchronization of said signal to be transmitted in accordance with the phase comparison result in said phase comparison means.

6. A synchronizing system as claimed in claim 1, wherein each of said plurality of local switch means and said master switch means comprises:

synchronized state means for obtaining a signal which is synchronized in phase with a digital signal of a frame structure in said link transmission line to extract a clock and a frame to indicate a frame synchronized state; and, arbiter means, when in said frame synchronized state there are present a plurality of clocks which are synchronized in phase with said digital signal, for selecting as a clock source only one of said clocks in phase synchronization with said digital signal.

7. A synchronizing system as claimed in claim 1, wherein said master switch means comprises arbiter means which, when there exist competitively a plurality of transmission requests for said master clock from said plurality of local switch means, arbitrates said competition and permits the transmission request of said master clock to only one of said local switches.

8. A synchronizing system as claimed in claim 1, wherein each of said plurality of local switch means comprises LS arbiter means which, when said selected clock source is eliminated by said arbitration, controls said selected switch means to immediately assign the right of transmission of the master clock to one of said plurality of local switch means and said master switch means.

9. A synchronizing system as claimed in claim 8, wherein each of said plurality of local switch means includes LS arbiter means which, when there are stored a plurality of said link transmission lines and there are included a plurality of said LS arbiter means, and also when no phase-synchronized clock and frame can be extracted from a digital signal of a frame structure transmitted by at least one of said plurality of link transmission lines so that a signal indicating a frame synchronized state can not be obtained, can switch said selected link transmission line to one of the remaining link transmission lines in such a manner that said newly selected link transmission line is able to transmit and receive said master right request and master right specification.

* * * * *